United States Patent
Carpenter et al.

(10) Patent No.: US 12,503,529 B2
(45) Date of Patent: Dec. 23, 2025

(54) POLYMERS OF 4-SUBSTITUTED HEXADIENE AND PROCESSES FOR PRODUCTION THEREOF

(71) Applicant: ExxonMobil Chemical Patents Inc., Baytown, TX (US)

(72) Inventors: Alex E. Carpenter, Seabrook, TX (US); Tzu-Pin Lin, Seabrook, TX (US); Brian J. Rohde, Houston, TX (US); Sarah J. Mattler, League City, TX (US); Nikola S. Lambic, Houston, TX (US); Hsu Chiang, Humble, TX (US); Peijun Jiang, Katy, TX (US); Irene C. Cai, Webster, TX (US); Gursu Culcu, Humble, TX (US); Jarod M. Younker, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 787 days.

(21) Appl. No.: 17/678,822

(22) Filed: Feb. 23, 2022

(65) Prior Publication Data

US 2022/0289879 A1    Sep. 15, 2022

Related U.S. Application Data

(60) Provisional application No. 63/154,010, filed on Feb. 26, 2021.

(51) Int. Cl.
| | |
|---|---|
| C08F 210/18 | (2006.01) |
| C08F 4/76 | (2006.01) |
| C08F 36/20 | (2006.01) |
| C08F 236/20 | (2006.01) |
| C08L 23/08 | (2006.01) |
| C08L 23/14 | (2006.01) |
| C08L 23/16 | (2006.01) |

(52) U.S. Cl.
CPC ............. *C08F 36/20* (2013.01); *C08F 4/76* (2013.01); *C08F 210/18* (2013.01); *C08F 236/20* (2013.01); *C08L 23/08* (2013.01); *C08L 23/14* (2013.01); *C08L 23/16* (2013.01); *C08F 2420/00* (2013.01); *C08F 2500/36* (2021.01)

(58) Field of Classification Search
CPC ...... C08F 36/20; C08F 136/20; C08F 236/20; C08F 210/18; C08F 2500/36
See application file for complete search history.

(56) References Cited

U.S. PATENT DOCUMENTS

| | | | |
|---|---|---|---|
| 4,336,296 A * | 6/1982 | Fukuta | D03D 41/004 442/205 |
| 4,680,318 A * | 7/1987 | Fujii | C08J 9/103 521/95 |
| 5,041,584 A | 8/1991 | Crapo et al. | 556/179 |
| 5,153,157 A | 10/1992 | Hlatky et al. | 502/117 |
| 5,225,501 A * | 7/1993 | Fujita | C08F 210/06 526/170 |
| 5,447,895 A | 9/1995 | Marks et al. | 502/117 |
| 5,453,410 A | 9/1995 | Kolthammer et al. | 502/155 |
| 5,750,625 A | 5/1998 | Medsker et al. | 525/133 |
| 6,175,409 B1 | 1/2001 | Nielsen et al. | 356/337 |
| 6,211,105 B1 | 4/2001 | Holtcamp | 502/105 |
| 6,260,407 B1 | 7/2001 | Petro et al. | 73/61.52 |
| 6,265,338 B1 | 7/2001 | Canich et al. | 502/103 |
| 6,294,388 B1 | 9/2001 | Petro | 436/8 |
| 6,306,658 B1 | 10/2001 | Turner et al. | 436/37 |
| 6,309,997 B1 | 10/2001 | Fujita et al. | 502/167 |
| 6,406,632 B1 | 6/2002 | Safir et al. | 210/656 |
| 6,436,292 B1 | 8/2002 | Petro | 210/656 |
| 6,454,947 B1 | 9/2002 | Safir et al. | 210/656 |
| 6,455,316 B1 | 9/2002 | Turner et al. | 436/37 |
| 6,461,515 B1 | 10/2002 | Safir et al. | 210/656 |
| 6,475,391 B2 | 11/2002 | Safir et al. | 210/656 |
| 6,489,168 B1 | 12/2002 | Wang et al. | 436/37 |
| 6,491,816 B2 | 12/2002 | Petro | 210/198.2 |
| 6,491,823 B1 | 12/2002 | Safir et al. | 210/656 |
| 6,689,847 B2 | 2/2004 | Mawson et al. | 526/116 |
| 6,841,502 B2 | 1/2005 | Boussie et al. | 502/125 |
| 6,884,748 B2 | 4/2005 | McCullough | 502/117 |
| 6,900,321 B2 | 5/2005 | Boussie et al. | 546/4 |
| 6,958,306 B2 | 10/2005 | Holtcamp | 502/128 |
| 6,995,109 B2 | 2/2006 | Mink et al. | 502/103 |
| 7,087,686 B2 | 8/2006 | Britovsek et al. | 526/113 |
| 7,091,292 B2 | 8/2006 | Boussie et al. | 526/172 |
| 7,129,302 B2 | 10/2006 | Mink et al. | 526/116 |
| 7,157,531 B2 | 1/2007 | Szul et al. | 526/79 |
| 7,169,864 B2 | 1/2007 | Paczkowski et al. | 526/129 |

(Continued)

FOREIGN PATENT DOCUMENTS

| | | | |
|---|---|---|---|
| EP | 0458731 | 11/1991 | ............ C08F 210/18 |
| EP | 0573120 | 11/1998 | ............. C08F 10/00 |

(Continued)

OTHER PUBLICATIONS

U.S. Appl. No. 63/064,392, filed Aug. 11, 2020, Holtcamp, M. et al.
U.S. Appl. No. 16/394,186, filed Apr. 25, 2019, Faler, C. et al.
*Chemical and Engineering News*, v.63(5), p. 27 (1985).
Gibson, V. C. et al. (2003) "Advances in Non-Metallocene Olefin Polymerization Catalysis," *Chem. Rev.*, v.103(1), pp. 283-315.
Makio, H. et al. (2009) "Development and Application of FI Catalysts for Olefin Polymerization: Unique Catalysis and Distinctive Polymer Formation," *Accounts of Chemical Research*, v.42(10), pp. 1532-1544.
Matsui, S. et al. (2001) "A Family of Zirconium Complexes Having Two Phenoxy-Imine Chelate Ligands for Olefin Polymerization," *J. Am. Chem. Soc.*, v.123(28), pp. 6847-6856.

(Continued)

*Primary Examiner* — Rip A Lee

(57) ABSTRACT

This invention relates to polymers comprising: one or more that include 1) at least 11 wt % 4 substituted 1,4 hexadiene and less than 20 wt % 5-methyl-1,4-hexadiene, based upon the weight of the polymer, and 2) optionally, one or more olefins; and processes to produces such polymers using metallocene or post-metallocene catalyst compounds.

16 Claims, 8 Drawing Sheets

(56) References Cited

U.S. PATENT DOCUMENTS

| | | | |
|---|---|---|---|
| 7,179,876 B2 | 2/2007 | Szul et al. | 526/348.2 |
| 7,795,347 B2 | 9/2010 | Kaneko et al. | 525/100 |
| 7,915,354 B2 | 3/2011 | Wouters et al. | 526/65 |
| 7,973,116 B2 | 7/2011 | Hagadorn et al. | 526/172 |
| 8,188,200 B2 | 5/2012 | Sita et al. | 526/161 |
| 8,404,880 B2 | 3/2013 | Kaji et al. | 556/179 |
| 8,592,615 B2 | 11/2013 | Kuhlman et al. | 556/51 |
| 8,658,556 B2 | 2/2014 | Stewart | 502/202 |
| 8,975,209 B2 | 3/2015 | Kaji et al. | C07F 5/066 |
| 9,340,630 B2 | 5/2016 | Kaji et al. | C08F 110/02 |
| 9,745,327 B2 | 8/2017 | Atienza et al. | C07F 7/00 |
| 10,221,260 B2 | 3/2019 | Atienza et al. | C08F 10/02 |
| 2007/0055028 A1 | 3/2007 | Casty et al. | 526/127 |
| 2011/0224391 A1 | 9/2011 | Hagadorn et al. | 526/161 |
| 2011/0301310 A1 | 12/2011 | Hagadorn et al. | 526/172 |
| 2012/0071616 A1 | 3/2012 | Hagadorn et al. | 526/170 |
| 2015/0119539 A1 | 4/2015 | McCullough | C08F 4/76 |
| 2015/0141601 A1 | 5/2015 | Hagadorn et al. | C08F 4/76 |
| 2018/0002352 A1 | 1/2018 | Hagadorn et al. | C07F 7/00 |
| 2019/0330139 A1 | 10/2019 | Faler et al. | C07C 211/64 |
| 2019/0330392 A1 | 10/2019 | Faler et al. | C08F 10/02 |
| 2020/0254431 A1 | 8/2020 | Goryunov et al. | B01J 31/2295 |
| 2020/0255553 A1 | 8/2020 | Goryunov et al. | C08F 10/02 |
| 2020/0255555 A1 | 8/2020 | Goryunov et al. | C08F 10/14 |
| 2020/0255556 A1 | 8/2020 | Goryunov et al. | C08F 10/14 |
| 2020/0255561 A1 | 8/2020 | Harlan et al. | C08F 210/16 |

FOREIGN PATENT DOCUMENTS

| | | | | |
|---|---|---|---|---|
| EP | 0874005 | | 7/2003 | C08F 10/00 |
| GB | 1443595 A | * | 7/1976 | C08F 36/20 |
| JP | 57059933 | | 4/1982 | |
| JP | 57093142 | | 6/1982 | |
| JP | 57093143 | | 6/1982 | |
| JP | 59155416 | | 9/1984 | C08F 295/00 |
| JP | 62115007 | | 5/1987 | C08F 210/00 |
| JP | 62115008 | | 5/1987 | C08F 210/16 |
| JP | 57038825 | | 8/1992 | |
| JP | H05-179078 | | 7/1993 | C08F 291/00 |
| JP | 2002-265881 | | 9/2002 | C09D 163/00 |
| JP | 2002-332312 | | 11/2002 | C08F 210/00 |
| JP | 2003-313247 | | 11/2003 | C08F 210/00 |
| JP | 2004-107486 | | 4/2004 | C08F 210/00 |
| JP | 2004-107563 | | 4/2004 | C08F 210/00 |
| WO | WO1994/007928 | | 4/1994 | C08F 10/02 |
| WO | WO1995/014044 | | 5/1995 | C08F 4/02 |
| WO | WO1997/022635 | | 6/1997 | C08F 10/00 |
| WO | WO2000/009255 | | 2/2000 | B01J 19/00 |
| WO | WO2000/069922 | | 11/2000 | C08F 10/00 |
| WO | WO2001/030860 | | 5/2001 | C08F 10/00 |
| WO | WO2001/030861 | | 5/2001 | C08F 10/00 |
| WO | WO2002/046246 | | 6/2002 | C08F 10/00 |
| WO | WO2002/050088 | | 6/2002 | C07F 19/00 |
| WO | WO2004/026921 | | 4/2004 | C08F 10/06 |
| WO | WO2004/046214 | | 6/2004 | C08F 210/06 |
| WO | WO2006/019494 | | 2/2006 | C08F 10/02 |
| WO | WO2006/020624 | | 2/2006 | C08F 110/06 |
| WO | WO2017/004462 | | 1/2017 | C08F 210/16 |
| WO | WO2019/089144 | | 5/2019 | C08F 4/602 |
| WO | WO2020/167821 | | 8/2020 | C08F 10/00 |

OTHER PUBLICATIONS

Murphy, V. and Boussie, T. et al. (2003) "A Fully Integrated High-Throughput Screening Methodology for the Discovery of New Polyolefin Catalysts: Discovery of a New Class of High Temperature Single-Site Group (IV) Copolymerization Catalysts," *J. Am. Chem. Soc.*, v.125, pp. 4306-4317.

Nakayama, Y et al. (2004), "Olefin Polymerization Behavior of bis(phenoxy-imine) Zr, Ti, and V complexes with MgC12-based Cocatalysts," *J. Mol. Catalysis A: Chemical*, v.213, pp. 141-150.

Nakayama, Y. et al. (2005), "Propylene Polymerization Behavior of Fluorinated Bis(phenoxy-imine) Ti Complexes with an $MgCl_2$-Based Compound ($MgCl_2$-Supported Ti-Based Catalysts)," *Macromol. Chem. Phys.*, v.206(18), pp. 1847-1852.

Nakayama, Y. et al. (2006), "$MgCl_2/R^i_nAl(OR)_{3-n}$: An Excellent Activator/Support for Transition-Metal Complexes for Olefin Polymerization," *Chem Eur. J.*, v.12(29), pp. 7546-7556.

Oliveira et al. (2000) "High-Pressure Phase Equilibria for Polypropylene-Hydrocarbon Systems," *Ind. Eng. Chem. Res.*, v.29, pp. 4627-4633.

Resconi, L. et al. (2000) "Selectivity in Propene Polymerization with Metallocene Catalysts," *Chem. Rev.*, v.100(4), pp. 1253-1346 (Split into 5 docs).

Schmidt, V. A. et al. (2018) "Selective [1.4]-Hydrovinylation of 1,3-dienes With Unactivated Olefins Enabled by Irone Diimine Catalysts" *J. Am. Chem. Soc.* v.140(9), pp. 3443-3453.

Wreford, S. et al. (1981) "Magnesium butadiene as a reagent for the preparation of transition-metal butadiene complexes: molecular structure of bis(η-butadiene)[1,2-bis(dimethylphosphine)ethane] hafnium," *Inorg. Chem.*, v.20(11), pp. 3918-3924.

* cited by examiner

POLYMERS OF 4-SUBSTITUTED HEXADIENE AND PROCESSES FOR PRODUCTION THEREOF

CROSS REFERENCE TO RELATED APPLICATIONS

This application claims the benefit of and priority to U.S. Provisional Application No. 63/154,010 filed Feb. 26, 2021, the disclosure of which is incorporated herein by reference.

FIELD OF THE INVENTION

This invention relates to homopolymers and copolymers comprising 4-substituted hexadiene, and processes to produce such.

BACKGROUND OF THE INVENTION

There is a need to develop a broad array of curable elastomeric and curable plastic products derived from ethylene and other low-cost olefin precursors. For good cure performance, it is useful to employ at least one diene monomer in co-polymerizations. Industry currently employs diene co-monomers (e.g., butadiene, isoprene, vinylnorbornene, ethylidene norbornene, 1,4-hexadiene, cyclopentadiene, dicyclopentadiene) which suffer from various deficiencies. 1,3 conjugated dienes and sterically unencumbered dienes (i.e. 1,4-hexadiene) are challenging to polymerize with good regioselectivity and productivity. Unencumbered dienes (i.e. 1,4-hexadiene) also suffer from poor cure performance relative to commonly used cyclic dienes (i.e. 5-ethylidene-2-norbornene). This impedes materials containing unencumbered dienes (i.e. ethylene-propylene-1,4-hexadiene terpolymers) from being utilized with conventional cure formulations. Cyclic dienes are costly, complex to manufacture and exhibit unwanted effects relative to polymer glass transition temperatures.

Ziegler-Natta catalysts have been used to make polymeric compositions employing isomeric mixtures of methyl-hexadiene (e.g., 5-methyl-1,4-hexadiene combined with 4-methyl-1,4-hexadiene) but not from a single-isomer, with single-site catalyst. (see for example, JP 59155416 A (Kokai Tokkyo Koho (1984), JP 59155416 A 19840904, entitled Unsaturated Block Polymers); and JP 62115008 A (Fujii, Masayuki; Goto, Shiro; Nakagawa, Hideaki; Ito, Ryoichi, Kokai Tokkyo Koho (1987), JP 62115008 A (19870526, entitled Unsaturated Polymers).

Other References of Interest Include:
1) JP 05179078 A (Nakano, Hiroshi; Yamauchi, Shinichi, Kokai Tokkyo Koho, 19930720, entitled Thermoplastic Resin Compositions with Good Compatibility of Unsaturated Olefin Copolymers and Poly(Phenylene Ethers).
2) EP 458 731 A1.
3) JP 62115007 A (Fujii, Masayuki; Goto, Shiro; Nakagawa, Hideaki; Ito, Ryoichi, Kokai Tokkyo Koho (1987), 19870526, entitled Unsaturated Copolymers.
4) JP 57059933 A (Kokai Tokkyo Koho (1982), 19820410, entitled Coating of Polyolefin Moldings).
5) JP 57093142 A (Kokai Tokkyo Koho (1982), 19820610, entitled Surface Treatment of Polyolefin Sheets).
6) JP 57093143 A (Kokai Tokkyo Koho (1982), 19820610, entitled Surface Processability of Polyolefin Moldings).
7) JP 57038825 A (Kokai Tokkyo Koho (1982), 19820303, entitled Coatable Polyolefin Compositions).
8) U.S. Pat. No. 4,680,318.

There is a need in the art for more suitable diene monomers that are cost-effective to manufacture and readily polymerized, so as to produce high diene content polymer at lower cost. The ability to produce substituted hexadiene as a compositionally pure monomer in a cost-effective manner allows for the commoditization of this diene in conjunction with single-site polymerization technology.

It is therefore an object of the present invention to provide polymers and copolymers comprising 4-substituted hexadiene, and processes for the polymerization of olefins and 4-substituted hexadiene.

SUMMARY OF THE INVENTION

This invention relates to homopolymers and copolymers comprising: 1) one or more dienes comprising 4 substituted 1,4 hexadiene (such as 4-methyl-1,4-hexadiene) and less than 20 wt % (based upon weight of the dienes present) of 5-methyl, 1,4-hexadiene; and, 2) optionally one or more olefins, such as alpha olefin(s). The polymers typically have a weight average molecular weight of 50,000 g/mol or more, and the copolymers also typically have at least 1 mol % diene content. These polymers can be used to generate curable polymers, typically by using peroxide and sulfur based cure packages, conferring advantaged properties typically relating to cross-link density (i.e. compression set). These curable polymers have reduced or no odors. 4-substituted 1,4-hexadiene (such as 4-methyl-1,4-hexadiene) also confers process advantages. For example, 4-methyl-1, 4-hexadiene boils at −91° C. (atmospheric pressure) rather than 146° C. as does 5-ethylidene-2-norbornene (ENB). This enhanced volatility allows 4-methyl 1,4-hexadiene to be amenable to gas-phase polymerization processes used to make polyolefins such as linear low density polyethylene (LLDPE), impact copolymers (ICP) or ethylene-propylene-diene monomer rubber (EPDM).

This invention relates to homopolymers and copolymers comprising diene consisting essentially of 4 substituted 1,4-hexadiene (such as 4-methyl-1,4-hexadiene) and optionally one or more olefin.

This invention also relates to a processes to produce such homopolymers and copolymers comprising contacting 4-substituted 1,4 hexadiene (such as 4-methyl-1,4-hexadiene) and one or more olefins with a catalyst system comprising single site coordination polymerization catalyst and activator.

This invention further relates to homopolymers of 4-substituted 1,4 hexadiene (such as 4-methyl-1,4-hexadiene) and copolymers of 4-substituted 1,4 hexadiene (such as 4-methyl-1,4-hexadiene) and $C_2$ to $C_{20}$ hydrocarbyl groups having at least one double bond, such as $C_2$ to $C_{20}$ olefins and vinyl aromatic monomers, such as ethylene, propylene, styrene and/or para-methyl-styrene.

This invention further relates to copolymers comprising ethylene-propylene-4 substituted 1,4-hexadiene (such as 4-methyl-1,4-hexadiene); ethylene and 4 substituted 1,4-hexadiene (such as 4-methyl-1,4-hexadiene); propylene and 4 substituted 1,4-hexadiene (such as 4-methyl-1,4-hexadiene); and ethylene, styrene and 4 substituted 1,4-hexadiene (such as 4-methyl-1,4-hexadiene).

DETAILED DESCRIPTION

Figure 1:
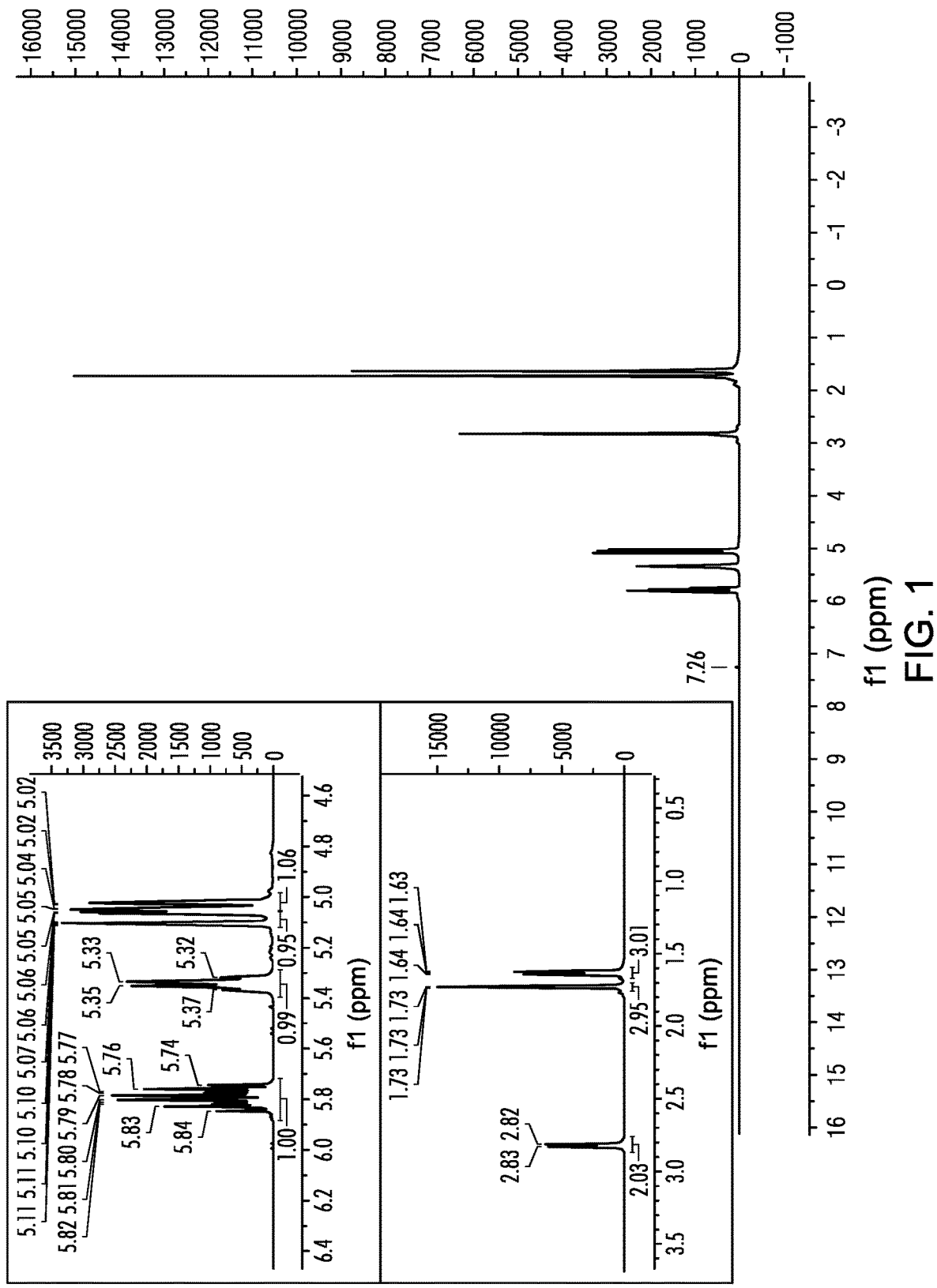
FIG. 1 (FIG. 1) is a $^1$H NMR (400.1 MHz, chloroform-$d_1$, 20° C.) spectrum of (z)-4-methyl-1,4-hexadiene.
Figure 2:
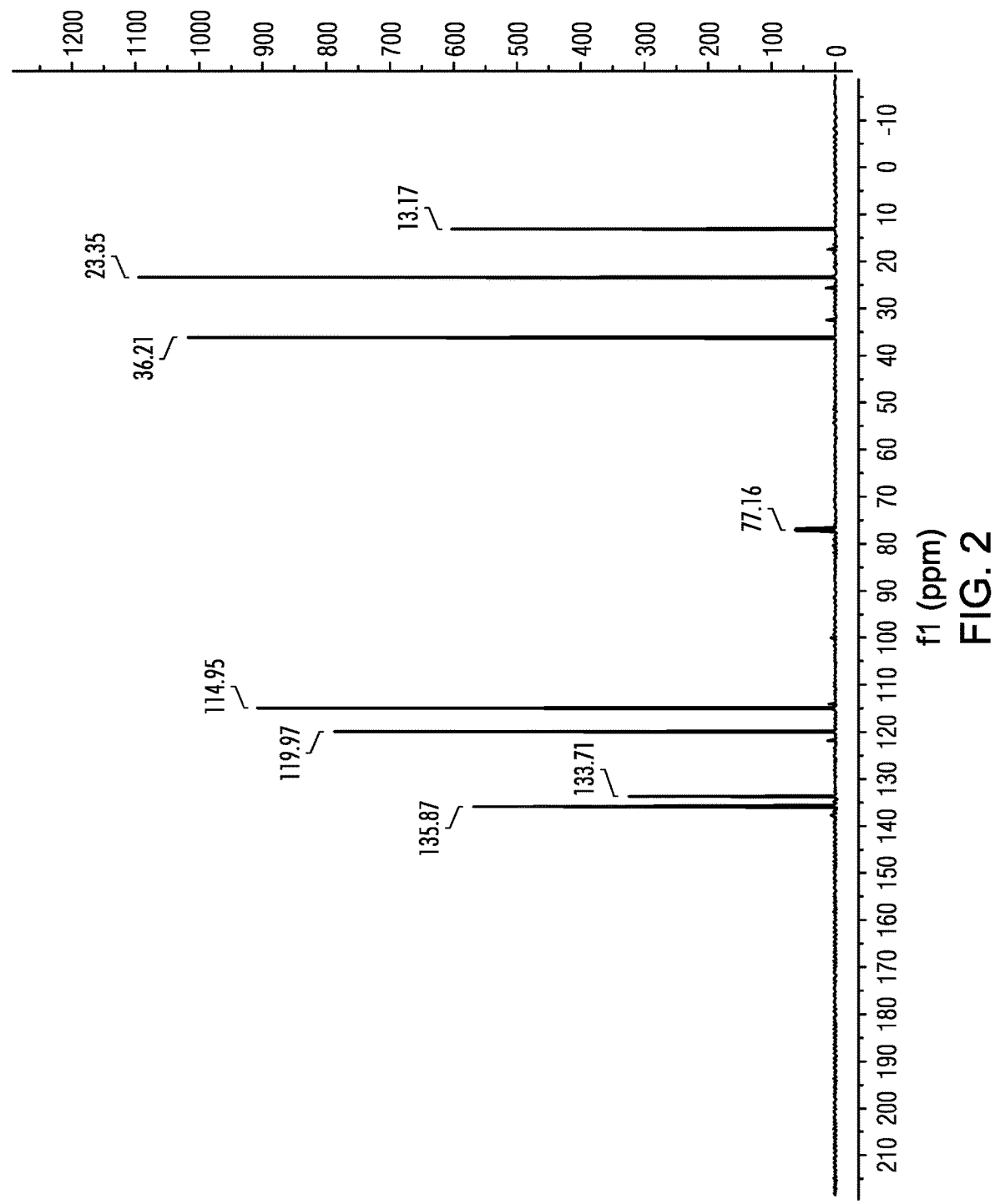
FIG. 2 (FIG. 2) is a $^{13}C\{^1H\}$ NMR (120.2 MHz, chloroform-$d_1$, 20° C.) spectrum of (z)-4-methyl-1,4-hexadiene.
Figure 3:
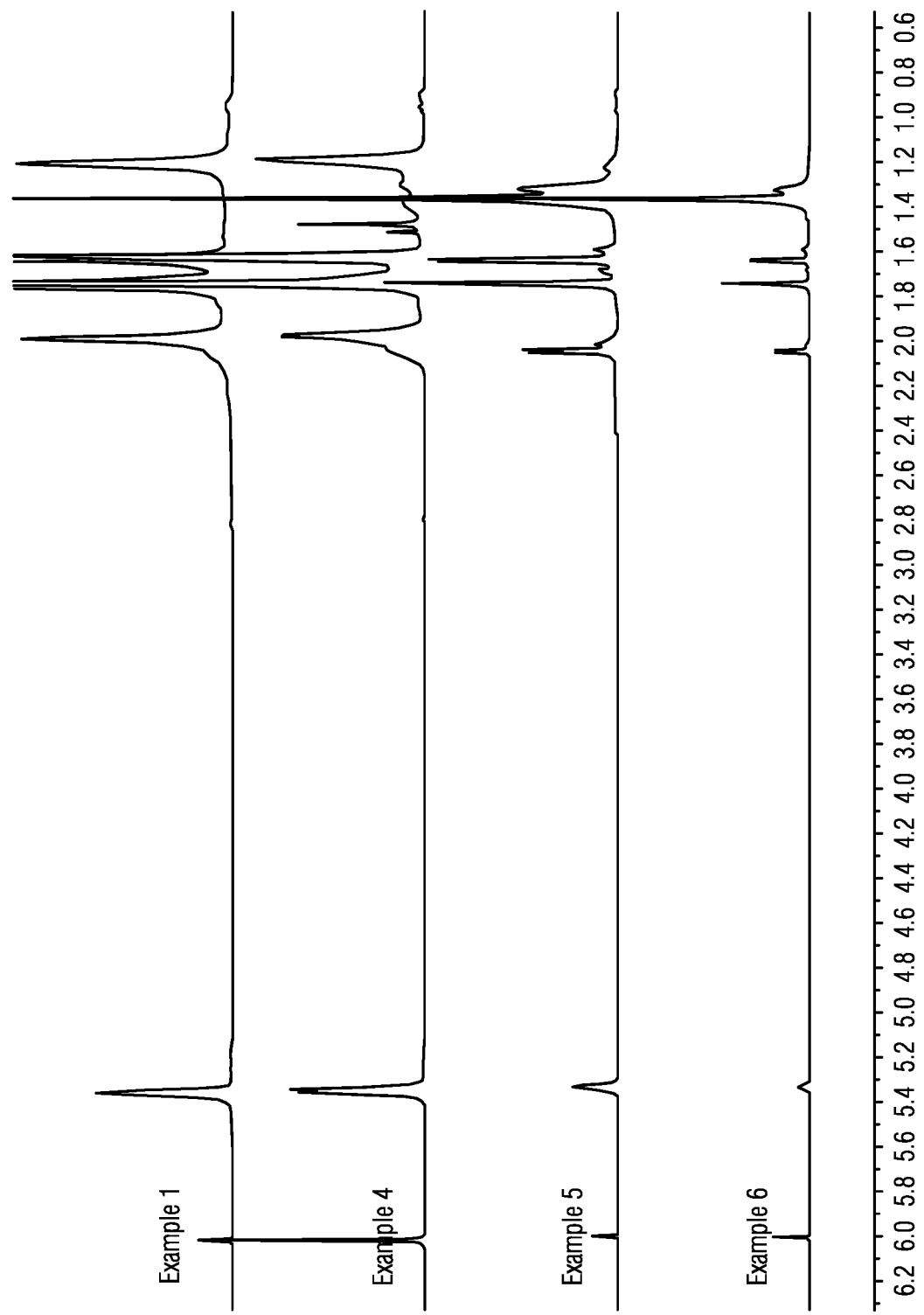
FIG. 3 (FIG. 3) is a $^1$H NMR spectrum of ethylene copolymers of 4-methyl-1,4-hexadiene (MHD) of Examples 1, 4, 5, and 6.
Figure 4:
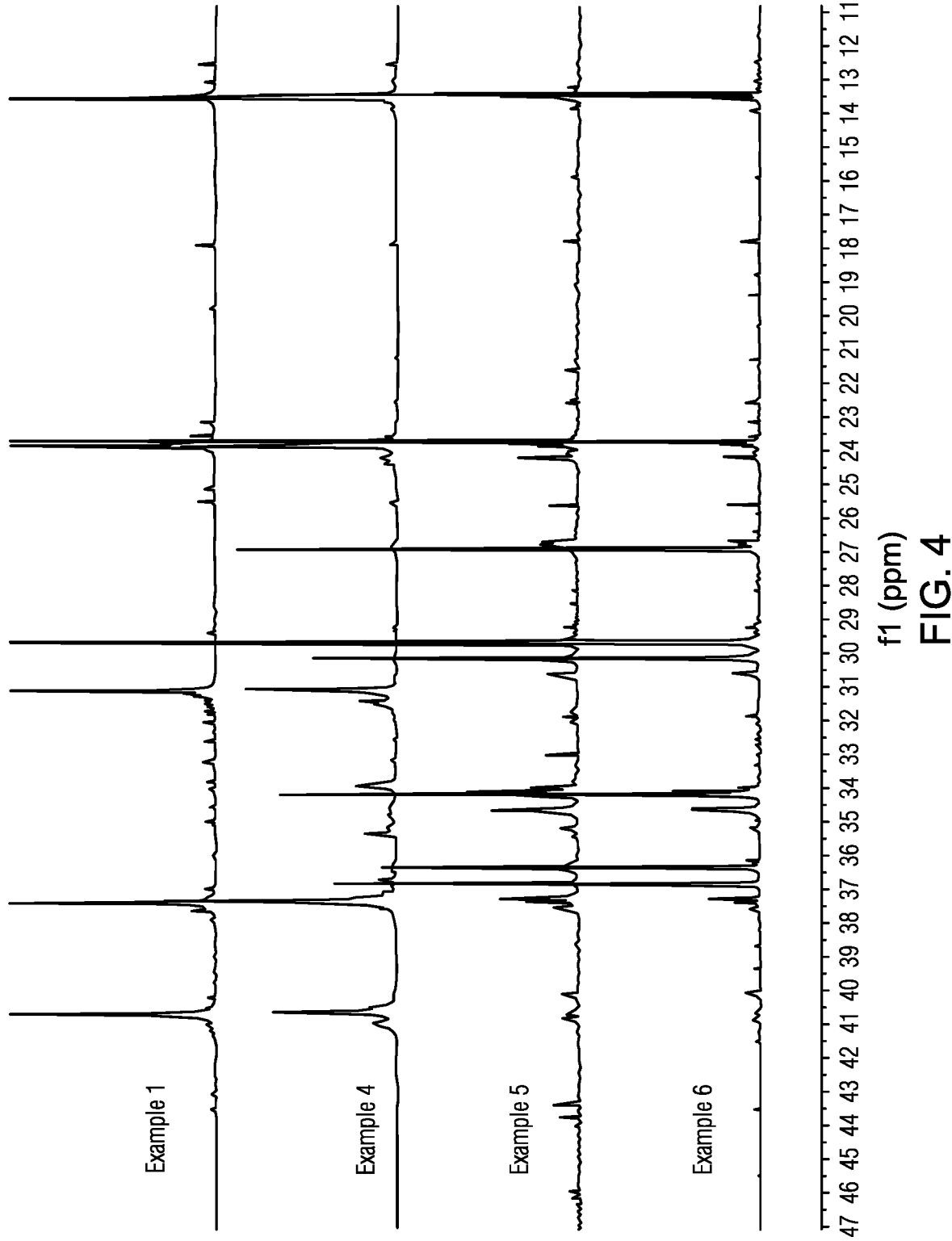
FIG. 4 (FIG. 4) is a $^{13}$C NMR spectrum of ethylene copolymers of 4-methyl-1,4-hexadiene (MHD) of Examples 1, 4, 5, and 6.

The term "pyridyldiamido complex" or "pyridyldiamide complex" or "pyridyldiamido catalyst" or "pyridyldiamide catalyst" refers to a class of coordination complexes described in U.S. Pat. No. 7,973,116B2; US 2012/0071616A1; US 2011/0224391A1; US 2011/0301310A1; US 2015/0141601A1; U.S. Pat. Nos. 6,900,321 and 8,592,615 that feature a dianionic tridentate ligand that is coordinated to a metal center through one neutral Lewis basic donor atom (e.g., a pyridine group) and a pair of anionic amido or phosphido (i.e., deprotonated amine or phosphine) donors. In these complexes the pyridyldiamido ligand is coordinated to the metal with the formation of one five membered chelate ring and one seven membered chelate ring. It is possible for additional atoms of the pyridyldiamido ligand to be coordinated to the metal without affecting the catalyst function upon activation; an example of this could be a cyclometalated substituted aryl group that forms an additional bond to the metal center.

The term "quinolinyldiamido complex" or "quinolinyldiamido catalyst" or "quinolinyldiamide complex" or "quinolinyldiamide catalyst" refers to a related class of pyridyldiamido complexes/catalysts described in US 2018/0002352 where a quinolinyl moiety is present instead of a pyridyl moiety in a pyridyldiamido complex.

The term "phenoxyimine complex" or "phenoxyimine catalyst" refers to a class of coordination complexes described in EP 0 874 005 that feature a monoanionic bidentate ligand that is coordinated to a metal center through one neutral Lewis basic donor atom (e.g., an imine moiety) and an anionic aryloxy (i.e., deprotonated phenoxy) donor. Typically two of these bidentate phenoxyimine ligands are coordinated to a group 4 metal to form a complex that is useful as a catalyst component.

The term "bisphenolate complex" or "bisphenolate catalyst" refers to a class of coordination complexes described in U.S. Pat. No. 6,841,502; WO 2017/004462, and WO 2006/020624 that feature a dianionic tetradentate ligand that is coordinated to a metal center through two neutral Lewis basic donor atoms (e.g., oxygen bridge moieties) and two anionic aryloxy (i.e., deprotonated phenoxy) donors.

The term "ONNO bisphenolate complex" or "ONNO bisphenolate catalyst" refers to a class of coordination complexes described in U.S. Pat. No. 10,221,260.

The term "ONYO bisphenolate complex" or "ONYO bisphenolate catalyst" refers to a class of coordination complexes described in U.S. Pat. No. 9,745,327.

The term "pyridyl bisphenolate complex" or "pyridyl bisphenolate catalyst" refers to a class of coordination complexes described in US 2020/0255555; US 2020/0254431; US 2020/0255553; US 2020/0255556; WO 2020/167821; and US 2020/0255561.

The terms "FI catalyst" and "PI Catalyst" mean a phenoxyimine-based catalyst (FI catalyst) or a pyrroleimine-based catalyst (PI catalyst) comprising (a) a group 3 to 11 transition metal compound having phenoxyimine or pyrroleimine as a ligand, and (b) one or more kind(s) of compound selected from (b-1) an organic metal compound, (b-2) an organic aluminumoxy compound, and (b-3) a compound that reacts with the transition metal compound (a) to form an ion pair, as described in JP-A-2001-72706; JP-A-2002-332312; JP-A-2003-313247; JP-A-2004-107486; and JP-A-2004-107563. See also U.S. Pat. No. 7,795,347, Column 16, line 56 et seq. Formula (XI) for a description of an FI catalyst.

The term "cyclopentadienyl-amidinate complex" or "cyclopentadienyl-amidinate catalyst" refers to a class of coordination complexes described in U.S. Pat. No. 8,188,200 that typically feature a group 4 metal bound to a cyclopentadienyl anion, a bidentate amidinate anion, and a couple of other anionic groups.

The term "iron pyridyl bis(imine) complex" refers to a class of iron coordination complexes described in U.S. Pat. No. 7,087,686 that typically feature an iron metal center coordinated to a neutral, tridentate pyridyl bis(imine) ligand and two other anionic ligands.

For the purposes of this invention and the claims thereto, the new numbering scheme for the Periodic Table Groups is used as described in Chemical And Engineering News, v. 63(5), pg. 27 (1985). Therefore, a "group 4 metal" is an element from group 4 of the Periodic Table, e.g. Hf, Ti, or Zr.

For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. Accordingly, the definition of copolymer, as used herein, includes terpolymers and the like. "Different" as used to refer to mer units indicates that the mer units differ from each other by at least one atom or are different isomerically. An "ethylene polymer" or "ethylene copolymer" is a polymer or copolymer comprising at least 50 mole % ethylene derived units, a "propylene polymer" or "propylene copolymer" is a polymer or copolymer comprising at least 50 mole % propylene derived units, and so on.

An "olefin" is a hydrocarbon comprising at least one carbon to carbon double bond.

An "alkene" is a hydrocarbon having a double bond typically represented by the formula $C_nH_{2n}$, where n is an integer of 1 or more.

The term "alpha-olefin" refers to an olefin having a terminal carbon-to-carbon double bond in the structure thereof (($R^1R^2$)—C=$CH_2$, where $R^1$ and $R^2$ can be independently hydrogen or any hydrocarbyl group; preferably $R^1$ is hydrogen and $R^2$ is an alkyl group). A "linear alpha-olefin" is an alpha-olefin defined in this paragraph wherein $R^1$ is hydrogen, and $R^2$ is hydrogen or a linear alkyl group.

For the purposes of this invention, ethylene shall be considered an α-olefin.

As used herein, and unless otherwise specified, the term "$C_n$," means hydrocarbon(s) having n carbon atom(s) per molecule, wherein n is a positive integer.

The term "hydrocarbon" means a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different values of n. Likewise, a "Cm-Cy" group or compound refers to a group or compound comprising carbon atoms at a total number thereof in the range from m to y. Thus, a $C_1$-$C_{50}$ alkyl group refers to an alkyl group comprising carbon atoms at a total number thereof in the range from 1 to 50.

The terms "group," "radical," and "substituent" may be used interchangeably.

The terms "hydrocarbyl radical," "hydrocarbyl group," or "hydrocarbyl" may be used interchangeably and are defined to mean a group consisting of hydrogen and carbon atoms only. Preferred hydrocarbyls are $C_1$-$C_{100}$ radicals that may be linear, branched, or cyclic, and when cyclic, aromatic or non-aromatic. Examples of such radicals include, but are not limited to, alkyl groups such as methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like, aryl groups, such as phenyl, benzyl naphthyl, and the like.

Unless otherwise indicated, (e.g., the definition of "substituted hydrocarbyl," "substituted aromatic," "substituted phenyl," etc.), the term "substituted" means that at least one hydrogen atom has been replaced with at least one non-hydrogen group, such as a hydrocarbyl group, a heteroatom, or a heteroatom containing group, such as halogen (such as Br, Cl, F or I) or at least one functional group such as —$NR^*_2$, —$OR^*$, —$SeR^*$, —$TeR^*$, —$PR^*_2$, —$AsR^*_2$, —$SbR^*_2$, —$SR^*$, —$BR^*_2$, —$SiR^*_3$, —$GeR^*_3$, —$SnR^*_3$, —$PbR^*_3$, —$(CH_2)q$-$SiR^*_3$, and the like, where q is 1 to 10 and each $R^*$ is independently hydrogen, a hydrocarbyl or halocarbyl radical, and two or more $R^*$ may join together to form a substituted or unsubstituted completely saturated, partially unsaturated, or aromatic cyclic or polycyclic ring structure), or where at least one heteroatom has been inserted within a hydrocarbyl ring.

The term "substituted hydrocarbyl" means a hydrocarbyl radical in which at least one hydrogen atom of the hydrocarbyl radical has been substituted with at least one heteroatom (such as halogen, e.g., Br, Cl, F or I) or heteroatom-containing group (such as a functional group, e.g., —$NR^*_2$, —$OR^*$, —$SeR^*$, —$TeR^*$, —$PR^*_2$, —$AsR^*_2$, —$SbR^*_2$, —$SR^*$, —$BR^*_2$, —$SiR^*_3$, —$GeR^*_3$, —$SnR^*_3$, —$PbR^*_3$, —$(CH_2)q$-$SiR^*_3$, and the like, where q is 1 to 10 and each $R^*$ is independently hydrogen, a hydrocarbyl or halocarbyl radical, and two or more $R^*$ may join together to form a substituted or unsubstituted completely saturated, partially unsaturated, or aromatic cyclic or polycyclic ring structure), or where at least one heteroatom has been inserted within a hydrocarbyl ring.

The term "substituted aromatic," means an aromatic group having 1 or more hydrogen groups replaced by a hydrocarbyl, substituted hydrocarbyl, heteroatom or heteroatom containing group. A "vinyl aromatic" is aromatic group having 1 or more hydrogen groups replaced by a hydrocarbyl group having a double bond at the terminal carbon atoms on the hydrocarbyl group (e.g., —C=C), examples of vinyl aromatic groups include styrene, and para-methyl styrene.

The term "substituted phenyl" mean a phenyl group having 1 or more hydrogen groups replaced by a hydrocarbyl, substituted hydrocarbyl, heteroatom or heteroatom containing group.

A "halocarbyl" is a halogen substituted hydrocarbyl group.

The terms "alkoxy" or "alkoxide" and aryloxy or aryloxide mean an alkyl or aryl group bound to an oxygen atom, such as an alkyl ether or aryl ether group/radical connected to an oxygen atom and can include those where the alkyl group is a $C_1$ to $C_{10}$ hydrocarbyl. The alkyl group may be straight chain, branched, or cyclic. The alkyl group may be saturated or unsaturated. Examples of suitable alkoxy and aryloxy radicals can include methoxy, ethoxy, n-propoxy, iso-propoxy, n-butoxy, iso-butoxy, sec-butoxy, tert-butoxy, phenoxyl, and the like.

The terms "alkyl radical," and "alkyl" are used interchangeably throughout this disclosure. For purposes of this disclosure, "alkyl radical" is defined to be a saturated hydrocarbon radical that may be linear, branched, or cyclic. Examples of such radicals can include $C_1$-$C_{100}$ saturated hydrocarbon radicals ($C_1$-$C_{100}$ alkyls), such as methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like including their substituted analogues. Substituted alkyl radicals are radicals in which at least one hydrogen atom of the alkyl radical has been substituted with at least a non-hydrogen group, such as a hydrocarbyl group, a heteroatom, or a heteroatom containing group, such as halogen (such as Br, Cl, F or I) or at least one functional group such as —$NR^*_2$, —$OR^*$, —$SeR^*$, —$TeR^*$, —$PR^*_2$, —$AsR^*_2$, —$SbR^*_2$, —$SR^*$, —$BR^*_2$, —$SiR^*_3$, —$GeR^*_3$, —$SnR^*_3$, —$PbR^*_3$, —$(CH_2)q$-$SiR^*_3$, and the like, where q is 1 to 10 and each $R^*$ is independently hydrogen, a hydrocarbyl or halocarbyl radical, and two or more $R^*$ may join together to form a substituted or unsubstituted completely saturated, partially unsaturated, or aromatic cyclic or polycyclic ring structure), or where at least one heteroatom has been inserted within a hydrocarbyl ring.

The term "aryl" or "aryl group" means an aromatic ring (typically made of 6 carbon atoms) and the substituted variants thereof, such as styryl, phenyl, 2-methyl-phenyl, xylyl, 4-bromo-xylyl. Likewise, heteroaryl means an aryl group where a ring carbon atom (or two or three ring carbon atoms) has been replaced with a heteroatom, such as N, O, or S. As used herein, the term "aromatic" also refers to pseudoaromatic heterocycles which are heterocyclic substituents that have similar properties and structures (nearly planar) to aromatic heterocyclic ligands, but are not by definition aromatic.

A "metallocene" catalyst compound is a transition metal (such as group 4, such as Hf, Zr or Ti) catalyst compound having one, two or three, typically one or two, substituted or unsubstituted cyclopentadienyl ligands bound to the transition metal, typically a metallocene catalyst is an organometallic compound containing at least one π-bound cyclopentadienyl moiety (or substituted cyclopentadienyl moiety). Substituted or unsubstituted cyclopentadienyl ligands/moieties include substituted or unsubstituted indenyl, fluorenyl, tetrahydro-s-indacenyl, tetrahydro-as-indacenyl, benz[f]indenyl, benz[e]indenyl, tetrahydrocyclopenta[b]naphthalene, tetrahydrocyclopenta[a]naphthalene, and the like.

The term "post-metallocene" also referred to as "post-metallocene catalyst" or "post-metallocene compound" describes transition metal complexes that contain a transition metal, at least one anionic donor ligand, and at least one leaving group with a non-carbon atom directly linking to the metal (such as halogen leaving group(s)), but do not contain any π-coordinated cyclopentadienyl anion donors (e.g., π-bound cyclopentadienyl moiety or substituted cyclopentadienyl moiety), where the complexes are useful for the polymerization of olefins, typically when combined with activator(s). Post-metallocene catalysts include those first disclosed after 1980, typically after 1990.

The term "single site coordination polymerization catalyst" means metallocene or post metallocene catalyst compounds, including but not limited to pyridyldiamido complexes, quinolinyldiamido complexes, phenoxyimine complexes, bisphenolate complexes, cyclopentadienyl-amidinate complexes, iron pyridyl bis(imine) complexes, FI catalysts, PI catalysts, pyridyl bisphenolate complexes, ONNO bisphenolate complexes, and ONYO bisphenolate complexes.

As used herein, Mn is number average molecular weight, Mw is weight average molecular weight, and Mz is z average molecular weight, wt % is weight percent, and mol % is mole percent. Molecular weight distribution (MWD), also referred to as polydispersity index (PDI), is defined to be Mw divided by Mn. Unless otherwise noted, all molecular weight units (e.g., Mw, Mn, Mz) are reported in g/mol (g mol$^{-1}$).

The following abbreviations may be used herein: Me is methyl, Et is ethyl, Pr is propyl, cPr is cyclopropyl, nPr is n-propyl, iPr is isopropyl, Bu is butyl, nBu is normal butyl, iBu is isobutyl, sBu is sec-butyl, tBu is tert-butyl, Oct is octyl, Ph is phenyl, MAO is methylalumoxane, dme is 1,2-dimethoxyethane, p-tBu is para-tertiary butyl, TMS is trimethylsilyl, TIBAL is triisobutylaluminum, TNOAL is tri(n-octyl)aluminum, p-Me is para-methyl, Bz and Bn are benzyl (i.e., CH$_2$Ph), THF (also referred to as thf) is tetrahydrofuran, RT is room temperature (and is 23° C. unless otherwise indicated), tol is toluene, EtOAc is ethyl acetate, Cbz is Carbazole, Cy is cyclohexyl, and MHD is 4-methyl-1,4-hexadiene.

A "catalyst system" is a combination of at least one catalyst compound, at least one activator, an optional co-activator, and an optional support material. When "catalyst system" is used to describe the composition before activation, it comprises the unactivated catalyst complex (precatalyst) together with an activator, optional co-activator, and optional support. When it is used to describe the pair after activation, it comprises the activated complex and the activator or other charge-balancing moiety. The transition metal compound may be neutral as in a precatalyst, or a charged species with a counter ion as in an activated catalyst system. For the purposes of this invention and the claims thereto, when catalyst systems are described as comprising neutral stable forms of the components, it is well understood by one of ordinary skill in the art, that the ionic form of the component is the form that reacts with the monomers to produce polymers. A polymerization catalyst system is a catalyst system that can polymerize monomers to polymer.

In the description herein, the catalyst may be described as a catalyst, a catalyst precursor, a pre-catalyst compound, catalyst compound or a transition metal compound, and these terms are used interchangeably.

An "anionic ligand" is a negatively charged ligand which donates one or more pairs of electrons to a metal ion. A "neutral donor ligand" is a neutrally charged ligand which donates one or more pairs of electrons to a metal ion.

The term "ring atom" means an atom that is part of a cyclic ring structure. By this definition, a benzyl group has six ring atoms and tetrahydrofuran has 5 ring atoms.

A "heterocyclic ring" is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring.

DESCRIPTION

This invention relates to homopolymers and copolymers comprising: 1) or more dienes that include at least 11 wt % (or preferably at least 15 wt %, or more preferably 11 to 30 wt %) 4 substituted 1,4 hexadiene (such as 4-methyl-1,4-hexadiene) and less than 20 wt % (such as less than 15 wt %, such as less than 10 wt %, such as less than 5 wt %, such as less than 1 wt %, preferably 0 wt %, based upon weight of the dienes present) of 5-substituted-1,4-hexadiene (such as 5-methyl-1,4-hexadiene), and 2) optionally one or more olefins, wherein the 4 substituted 1,4 hexadiene (such as 4-methyl-1,4-hexadiene) is represented by the Formula (XX):

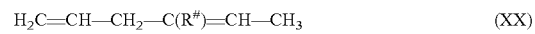

$$H_2C=CH-CH_2-C(R^\#)=CH-CH_3 \quad (XX)$$

wherein $R^\#$ is a $C_1$ to $C_{20}$ hydrocarbyl group, such as $C_1$ to $C_{20}$ alkyl group (alternately a $C_1$ to $C_{12}$ alkyl group, such as such as methyl, ethyl, propyl, butyl, pentyl, hexyl, heptyl, octyl, nonyl, decyl, undecyl, dodecyl, or an isomer thereof, such as n-isomers thereof), and/or a $C_6$ to $C_{20}$ aryl group (such as phenyl, benzyl naphthyl, styryl, xylyl or an isomer) or substituted variant thereof.

In embodiments, the homopolymers and copolymers have an Mw of 50,000 g/mol or more and the copolymers comprises at least 1 mol % of the one or more dienes. This invention also relates to processes to produce such homopolymers and copolymers comprising contacting 4-substituted 1,4 hexadiene (such as 4-methyl-1,4-hexadiene) and one or more olefins, such as alpha olefins, with a catalyst system comprising single site coordination polymerization catalyst and activator. The polymer can include 0.1-10 wt % of the 4 substituted 1,4 hexadiene based upon weight of the polymer when using propylene. The contacting can include using propylene as the one or more olefins, and the contacting is performed in solution, gas phase, slurry, or bulk-slurry. The resulting polymer can be a copolymer of the propylene and the 4 substituted 1,4 hexadiene, where the copolymer has an isotactic propylene backbone, and the copolymer has a melting point ranging from 80° C. to 155° C. The isotactic propylene backbone can have a meso pentad ranging from 0.500 to 0.985 as measured by $^{13}$C NMR spectroscopy.

Typically Ziegler-Natta ("Z-N") catalysts will produce broad molecular weight distribution polymers due to the multi-site nature. The advantage of single site catalysts of embodiments described herein over Ziegler Natta catalysts comes from several aspects. (1) Single site catalysts will produce a very uniform composition distribution with narrow polydispersity and will have ideally random distribution of comonomers (such as propylene and MHD) in the polymer chain. This generally leads to improved polymer performance properties, especially in terms of impact and elasticity. (2) On the other hand, Ziegler Natta catalysts tend to produce blocky structures, especially in the context of EP containing copolymers where often times a long running chains of ethylene are observed in polymer. This effect can be detrimental to polymer performance. (3) In addition, a major advantage of using single site catalysts over Z-N catalysts is in the high incorporation ability, especially for monomers containing longer alkyl chains (such as MHD). This unique behavior makes single site catalyst suitable for production of elastomeric polymers that contain higher alpha olefins and dienes with minimal effect on catalyst performance. At the same time, single site catalysts enable the production of these polymers that contain much higher levels of longer chain alpha olefins or dienes compared to Z-N. (4) Generally speaking, the performance of most Z-N catalyst will rapidly degrade with increased levels of these higher alpha olefins, which will typically lead to substantially lower activities and catalyst deactivation. This effect is not nearly as prominent for single site catalysts. In summary, the present technological advancement provides for improved incorporation ability of MHD, better tailored polymer microstructure and better overall productivity and comonomer tolerance, which makes single site catalysts more suitable for elastomer type applications such as EP-MHD.

Polymerization Catalyst Compounds

Any single site coordination polymerization catalyst (also referred to as "single site transition metal compound," "transition metal compound," "transition metal catalyst compound," "catalyst compound," or "transition metal complex") capable of catalyzing a polymerization reaction, upon activation with an activator as described herein, is suitable for use in polymerization processes of the present disclosure. Transition metal compounds known as metallocenes are exemplary catalyst compounds according to the present disclosure.

In at least one embodiment, the present disclosure provides a catalyst system comprising a catalyst compound having a metal atom. The catalyst compound can be a metallocene catalyst compound. The metal can be a Group 3 through Group 12 metal atom, such as Group 3 through Group 10 metal atoms, or lanthanide Group atoms. The catalyst compound having a Group 3 through Group 12 metal atom can have ligands that are monodentate or multidentate, such as bidentate, tridentate, or tetradentate, where a heteroatom of the catalyst, such as phosphorous, oxygen, nitrogen, or sulfur is chelated to the metal atom of the catalyst. Non-limiting examples include: amides, diamides, diamido amines, pyridyl imines, pyridyl diimines, acetoacetenoates, ether containing phenolates, pyridyl containing phenolates, phosphines, phosphinimides, phosphino-sulfonates, salicyaminatos, pyridyl amides, pyridyl diamides quinolyl diamides, bis(phenolate)s etc. In at least one embodiment, the Group 3 through Group 12 metal atom is selected from Group 5, Group 6, Group 8, or Group 10 metal atoms. In at least one embodiment, a Group 3 through Group 10 metal atom is selected from Cr, Sc, Ti, Zr, Hf, V, Nb, Ta, Mn, Re, Fe, Ru, Os, Co, Rh, Ir, and Ni. In at least one embodiment, a metal atom is selected from Groups 4, 5, and 6 metal atoms. In at least one embodiment, a metal atom is a Group 4 metal atom selected from Ti, Zr, or Hf. The oxidation state of the metal atom can range from 0 to +7, for example +1, +2, +3, +4, or +5, for example +2, +3, or +4.

Metallocene Catalyst Compounds

Useful metallocene catalyst compound can be transition metal catalyst compound having one, two or three, typically one or two, substituted or unsubstituted cyclopentadienyl ligands (such as substituted or unsubstituted Cp, Ind or Flu) bound to the transition metal. Metallocene catalyst compounds as used herein include metallocenes comprising Group 3 to Group 12 metal complexes, such as, Group 4 to Group 6 metal complexes, for example, Group 4 metal complexes. The metallocene catalyst compound of catalyst systems of the present disclosure may be unbridged metallocene catalyst compounds represented by the formula: $Cp^A Cp^B M'X'_n$, wherein each $Cp^A$ and $Cp^B$ is independently selected from cyclopentadienyl ligands (for example, Cp, Ind, or Flu) and ligands isolobal to cyclopentadienyl, one or both $Cp^A$ and $Cp^B$ may contain heteroatoms, and one or both $Cp^A$ and $Cp^B$ may be substituted by one or more R" groups; M' is selected from Groups 3 through 12 atoms and lanthanide Group atoms; X' is an anionic leaving group; n is 0 or an integer from 1 to 4; each R" is independently selected from alkyl, substituted alkyl, heteroalkyl, alkenyl, substituted alkenyl, heteroalkenyl, alkynyl, substituted alkynyl, heteroalkynyl, alkoxy, aryloxy, alkylthio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, substituted hydrocarbyl, heterohydrocarbyl, silyl, boryl, phosphino, phosphine, amino, amine, ether, and thioether.

In at least one embodiment, each $Cp^A$ and $Cp^B$ is independently selected from cyclopentadienyl, indenyl, fluorenyl, indacenyl, tetrahydroindenyl, cyclopenta-phenanthreneyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated and substituted versions thereof. Each $Cp^A$ and $Cp^B$ may independently be indacenyl or tetrahydroindenyl.

The metallocene catalyst compound may be a bridged metallocene catalyst compound represented by the formula: $Cp^A(T)Cp^B M'X'_n$, wherein each $Cp^A$ and $Cp^B$ is independently selected from cyclopentadienyl ligands (for example, Cp, Ind, or Flu) and ligands isolobal to cyclopentadienyl, where one or both $Cp^A$ and $Cp^B$ may contain heteroatoms, and one or both $Cp^A$ and $Cp^B$ may be substituted by one or more R" groups; M' is selected from Groups 3 through 12 atoms and lanthanide Group atoms, preferably Group 4; X is an anionic leaving group; n is 0 or an integer from 1 to 4; (T) is a bridging group selected from divalent alkyl, divalent substituted alkyl, divalent heteroalkyl, divalent alkenyl, divalent substituted alkenyl, divalent heteroalkenyl, divalent alkynyl, divalent substituted alkynyl, divalent heteroalkynyl, divalent alkoxy, divalent aryloxy, divalent alkylthio, divalent arylthio, divalent aryl, divalent substituted aryl, divalent heteroaryl, divalent aralkyl, divalent aralkylene, divalent alkaryl, divalent alkarylene, divalent haloalkyl, divalent haloalkenyl, divalent haloalkynyl, divalent heteroalkyl, divalent heterocycle, divalent heteroaryl, a divalent heteroatom-containing group, divalent hydrocarbyl, divalent substituted hydrocarbyl, divalent heterohydrocarbyl, divalent silyl, divalent boryl, divalent phosphino, divalent phosphine, divalent amino, divalent amine, divalent ether, divalent thioether. R" is selected from alkyl, substituted alkyl, heteroalkyl, alkenyl, substituted alkenyl, heteroalkenyl, alkynyl, substituted alkynyl, heteroalkynyl, alkoxy, aryloxy, alkylthio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, substituted hydrocarbyl, heterohydrocarbyl, silyl, boryl, phosphino, phosphine, amino, amine, germanium, ether, and thioether.

In at least one embodiment, each of $Cp^A$ and $Cp^B$ is independently selected from cyclopentadienyl, indenyl, fluorenyl, cyclopentaphenanthreneyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated, and substituted versions thereof, preferably cyclopentadienyl, n-propylcyclopentadienyl, indenyl, pentamethylcyclopentadienyl, tetramethylcyclopentadienyl, and n-butylcyclopentadienyl. Each $Cp^A$ and $Cp^B$ may independently be indacenyl or tetrahydroindenyl.

(T) is a bridging group containing at least one Group 13, 14, 15, or 16 element, in particular boron or a Group 14, 15 or 16 element, preferably (T) is O, S, NR', or SiR'$_2$, where each R' is independently hydrogen or $C_1$-$C_{20}$ hydrocarbyl.

In another embodiment, the metallocene catalyst compound is represented by the formula:

$$T_y Cp_m MG_n X_q$$

where Cp is independently a substituted or unsubstituted cyclopentadienyl ligand (for example, substituted or unsubstituted Cp, Ind, or Flu) or substituted or unsubstituted ligand isolobal to cyclopentadienyl; M is a Group 4 transition metal; G is a heteroatom group represented by the formula $JR^*_z$ where J is N, P, O or S, and R* is a linear, branched, or cyclic $C_1$-$C_{20}$ hydrocarbyl; z is 1 or 2; T is a bridging group; y is 0 or 1; X is a leaving group; m=1, n=1, 2 or 3, q=0, 1, 2 or 3, and the sum of m+n+q is equal to the coordination number of the transition metal.

In at least one embodiment, J is N, and R* is methyl, ethyl, propyl, butyl, pentyl, hexyl, heptyl, octyl, nonyl, cyclooctyl, cyclododecyl, decyl, undecyl, dodecyl, adamantyl or an isomer thereof.

In at least one embodiment, the catalyst compound is represented by Formula (II) or Formula (III):

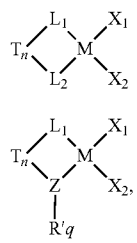

wherein in each of Formula (II) and Formula (III):
M is the metal center, and is a Group 4 metal, such as titanium, zirconium or hafnium, such as zirconium or hafnium when $L_1$ and $L_2$ are present and titanium when Z is present;
n is 0 or 1;
T is an optional bridging group which, if present, is a bridging group containing at least one Group 13, 14, 15, or 16 element, in particular boron or a Group 14, 15 or 16 element (preferably T is selected from dialkylsilyl, diarylsilyl, dialkylmethyl, ethylenyl (—CH$_2$—CH$_2$—) or hydrocarbylethylenyl wherein one, two, three or four of the hydrogen atoms in ethylenyl are substituted by hydrocarbyl, where hydrocarbyl can be independently $C_1$ to $C_{16}$ alkyl or phenyl, tolyl, xylyl and the like), and when T is present, the catalyst represented can be in a racemic or a meso form;
$L_1$ and $L_2$ are independently cyclopentadienyl, indenyl, tetrahydroindenyl or fluorenyl, optionally substituted, that are each bonded to M, or $L_1$ and $L_2$ are independently cyclopentadienyl, indenyl, tetrahydroindenyl or fluorenyl, which are optionally substituted, in which any two adjacent substituents on $L^1$ and $L^2$ are optionally joined to form a substituted or unsubstituted, saturated, partially unsaturated, or aromatic cyclic or polycyclic substituent;
Z is nitrogen, oxygen, sulfur, or phosphorus (preferably nitrogen);
q is 1 or 2 (preferably q is 1 when Z is N);
R' is a cyclic, linear or branched $C_1$ to $C_{40}$ alkyl or substituted alkyl group;
$X_1$ and $X_2$ are, independently, hydrogen, halogen, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or $X_1$ and $X_2$ are joined and bound to the metal atom to form a metallacycle ring containing from about 3 to about 20 carbon atoms; or both together can be an olefin, diolefin or aryne ligand.

Preferably, T in any formula herein is present and is a bridging group containing at least one Group 13, 14, 15, or 16 element, in particular a Group 14 element. Examples of suitable bridging groups include P(=S)R', P(=Se)R', P(=O)R', R'$_2$C, R'$_2$Si, R'$_2$Ge, R'$_2$CCR'$_2$, R'$_2$CCR'$_2$CR'$_2$, R'$_2$CCR'$_2$CR'$_2$CR'$_2$, R'C=CR', R'C=CR'CR'$_2$, R'$_2$CCR'=CR'CR'$_2$, R'C=CR'CR'=CR', R'C=CR'CR'$_2$CR'$_2$, R'$_2$CSiR'$_2$, R'$_2$SiSiR'$_2$, R'$_2$SiOSiR'$_2$, R'$_2$CSiR'$_2$CR'$_2$, R'$_2$SiCR'$_2$SiR'$_2$, R'C=CR'SiR'$_2$, R'$_2$CGeR'$_2$, R'$_2$GeGeR'$_2$, R'$_2$CGeR'$_2$CR'$_2$, R'$_2$GeCR'$_2$GeR'$_2$, R'$_2$SiGeR'$_2$, R'C=CR'GeR'$_2$, R'B, R'$_2$C—BR', R'$_2$C—BR'—CR'$_2$, R'$_2$C—O—CR'$_2$, R'$_2$CR'$_2$C—O—CR'$_2$CR'$_2$, R'$_2$C—O—CR'$_2$CR'$_2$, R'$_2$C—O—CR'=CR', R'$_2$C—S—CR'$_2$, R'$_2$CR'$_2$C—S—CR'$_2$CR'$_2$, R'$_2$C—S—CR'$_2$CR'$_2$, R'$_2$C—S—CR'=CR', R'$_2$C—Se—CR'$_2$, R'$_2$CR'$_2$C—Se—CR'$_2$CR'$_2$, R'$_2$C—Se—CR'$_2$CR'$_2$, R'$_2$C—Se—CR'=CR', R'$_2$C—N=CR', R'$_2$C—NR'—CR'$_2$, R'$_2$C—NR'—CR'$_2$CR'$_2$, R'$_2$C—NR'—CR'=CR', R'$_2$CR'$_2$C—NR'—CR'$_2$CR'$_2$, R'$_2$C—P=CR', R'$_2$C—PR'—CR'$_2$, O, S, Se, Te, NR', PR', AsR', SbR', O—O, S—S, R'N—NR', R'P—PR', O—S, O—NR', O—PR', S—NR', S—PR', and R'N—PR' where R' is hydrogen or a $C_1$-$C_{20}$ containing hydrocarbyl, substituted hydrocarbyl, halocarbyl, substituted halocarbyl, silylcarbyl or germylcarbyl substituent and optionally two or more adjacent R' may join to form a substituted or unsubstituted, saturated, partially unsaturated or aromatic, cyclic or polycyclic substituent. Preferred examples for the bridging group T include CH$_2$, CH$_2$CH$_2$, SiMe$_2$, SiPh$_2$, SiMePh, Si(CH$_2$)$_3$, Si(CH$_2$)$_4$, O, S, NPh, PPh, NMe, PMe, NEt, NPr, NBu, PEt, PPr, Me$_2$SiOSiMe$_2$, and PBu.

In a preferred embodiment of the invention in any embodiment of any formula described herein, T is represented by the formula $R^a_2J$ or $(R^a_2J)_2$, where J is C, Si, or Ge, and each $R^a$ is, independently, hydrogen, halogen, $C_1$ to $C_{20}$ hydrocarbyl (such as methyl, ethyl, propyl, butyl, pentyl, hexyl, heptyl, octyl, nonyl, decyl, undecyl, or dodecyl) or a $C_1$ to $C_{20}$ substituted hydrocarbyl, and two $R^a$ can form a cyclic structure including aromatic, partially saturated, or saturated cyclic or fused ring system. Preferably, T is a bridging group comprising carbon or silica, such as dialkylsilyl, preferably T is selected from $CH_2$, $CH_2CH_2$, $C(CH_3)_2$, $SiMe_2$, $SiPh_2$, SiMePh, silylcyclobutyl $(Si(CH_2)_3)$, $(Ph)_2C$, $(p-(Et)_3SiPh)_2C$, $Me_2SiOSiMe_2$, and cyclopentasilylene $(Si(CH_2)_4)$.

In at least one embodiment, the catalyst compound has a symmetry that is $C_2$ symmetrical.

The metallocene catalyst component may comprise any combination of any "embodiment" described herein.

Suitable metallocenes useful herein include, but are not limited to, the metallocenes disclosed and referenced in the US patents cited above, as well as those disclosed and referenced in U.S. Pat. Nos. 7,179,876; 7,169,864; 7,157,531; 7,129,302; 6,995,109; 6,958,306; 6,884,748; 6,689,847; US Patent publication 2007/0055028, and published PCT Applications WO 1997/22635; WO 2000/69922; WO 2001/30860; WO 2001/30861; WO 2002/46246; WO 2002/50088; WO 2004/026921; and WO 2006/019494, all fully incorporated herein by reference. Additional catalysts suitable for use herein include those referenced in U.S. Pat. Nos. 6,309,997; 6,265,338; US Patent publication 2006/019925, and the following articles: Resconi, L. et al. (2000) "Selectivity in Propene Polymerization with Metallocene Catalysts," *Chem. Rev.*, v. 100(4), pp. 1253-1346; Gibson, V. C. et al. (2003) "Advances in Non-Metallocene Olefin Polymerization Catalysis," *Chem. Rev.*, v. 103(1), pp. 283-316; *Chem Eur. J.* 2006, v. 12, p. 7546; Nakayama, Y et al. (2004), "Olefin Polymerization Behavior of bis(phenoxy-imine) Zr, Ti, and V complexes with $MgCl_2$-based Cocatalysts," *J. Mol. Catalysis A: Chemical*, v. 213, pp. 141-150; Nakayama, Y. et al. (2005), Propylene Polymerization Behavior of Fluorinated Bis(phenoxy-imine) Ti Complexes with an $MgCl_2$—Based Compound ($MgCl_2$—Supported Ti-Based Catalysts)," *Macromol. Chem. Phys.*, v. 206(18), pp. 1847-1852; and Matsui, S. et al. (2001) "A Family of Zirconium Complexes Having Two Phenoxy-Imine Chelate Ligands for Olefin Polymerization," *J Am. Chem. Soc.*, v. 123(28), pp. 6847-6856.

Exemplary Metallocene Compounds Useful Herein are Include:
bis(cyclopentadienyl)zirconium dichloride,
bis(n-butylcyclopentadienyl)zirconium dichloride,
bis(n-butylcyclopentadienyl)zirconium dimethyl,
bis(pentamethylcyclopentadienyl)zirconium dichloride,
bis(pentamethylcyclopentadienyl)zirconium dimethyl,
bis(pentamethylcyclopentadienyl)hafnium dichloride,
bis(pentamethylcyclopentadienyl)zirconium dimethyl,
bis(1-methyl-3-n-butylcyclopentadienyl)zirconium dichloride,
bis(1-methyl-3-n-butylcyclopentadienyl)zirconium dimethyl,
bis(1-methyl-3-n-butylcyclopentadienyl)hafnium dichloride,
bis(1-methyl-3-n-butylcyclopentadienyl)zirconium dimethyl,
bis(indenyl)zirconium dichloride, bis(indenyl)zirconium dimethyl,
bis(tetrahydro-1-indenyl)zirconium dichloride,
bis(tetrahydro-1-indenyl)zirconium dimethyl,
(n-propyl cyclopentadienyl, pentamethyl cyclopentadienyl) zirconium dichloride, and
(n-propyl cyclopentadienyl, pentamethyl cyclopentadienyl) zirconium dimethyl.

In at least one embodiment, the catalyst compound may be selected from:

dimethylsilylbis(tetrahydroindenyl)$MX_n$,
dimethylsilyl bis(2-methylindenyl)$MX_n$,
dimethylsilyl bis(2-methylfluorenyl)$MX_n$,
dimethylsilyl bis(2-methyl-5,7-propylindenyl)$MX_n$,
dimethylsilyl bis(2-methyl-4-phenylindenyl)$MX_n$,
dimethylsilyl bis(2-ethyl-5-phenylindenyl)$MX_n$,
dimethylsilyl bis(2-methyl-4-biphenylindenyl)$MX_n$,
dimethylsilylene bis(2-methyl-4-carbazolylindenyl)$MX_n$,
rac-dimethylsilyl-bis-(5,6,7,8-tetrahydro-5,5,8,8-tetramethyl-2-methyl-1H-benz(f)indene)$MX_n$,
diphenylmethylene (cyclopentadienyl)(fluorenyl)$MX_n$,
bis(methylcyclopentadienyl)$MX_n$,
rac-dimethylsiylbis(2-methyl,3-propyl indenyl)$MX_n$,
dimethylsilylbis(indenyl)$MX_n$,
Rac-meso-diphenylsilyl-bis(n-propylcyclopentadienyl) $MX_n$,
1,1'-bis(4-triethylsilylphenyl)methylene-(cyclopentadienyl) (3,8-di-tertiary-butyl-1-fluorenyl)$MX_n$ (bridge is considered the 1 position),
bis-trimethylsilylphenyl-methylene(cyclopentadienyl)(di-t-butylfluorenyl)MXn,
bis-trimethylsilylphenyl-methylene(cyclopentadienyl)(fluorenyl)MXn,
bisphenylmethylene(cyclopentadienyl)(dimethylfluorenyl) MXn,
bis(n-propylcyclopentadienyl)$MX_n$,
bis(n-butylcyclopentadienyl)$MX_n$,
bis(n-pentylcyclopentadienyl)$MX_n$,
(n-propyl cyclopentadienyl)(n-butylcyclopentadienyl)$MX_n$,
bis[(2-trimethylsilylethyl)cyclopentadienyl]$MX_n$,
bis(trimethylsilyl cyclopentadienyl)$MX_n$,
dimethylsilylbis(n-propylcyclopentadienyl)$MX_n$,
dimethylsilylbis(n-butylcyclopentadienyl)$MX_n$,
bis(1-n-propyl-2-methylcyclopentadienyl)$MX_n$,
(n-propylcyclopentadienyl)(1-n-propyl-3-n-butylcyclopentadienyl)$MX_n$,
bis(1-methyl, 3-n-butyl cyclopentadienyl)$MX_n$,
bis(indenyl)$MX_n$,
dimethylsilyl (tetramethylcyclopentadienyl)(cyclododecylamido)$MX_n$,
dimethylsilyl (tetramethylcyclopentadienyl)(t-butylamido) $MX_n$,
μ-$(CH_3)_2$Si(cyclopentadienyl)(1-adamantylamido)$MX_n$,
μ-$(CH_3)_2$Si(3-tertbutylcyclopentadienyl)(1-adamantylamido)$MX_n$,
μ-$(CH_3)_2$(tetramethylcyclopentadienyl)(1-adamantylamido) $MX_n$,
μ-$(CH_3)_2$Si(tetramethylcyclopentadienyl)(1-adamantylamido)$MX_n$,
μ-$(CH_3)_2$C(tetramethylcyclopentadienyl)(1-adamantylamido)$MX_n$,
μ-$(CH_3)_2$Si(tetramethylcyclopentadienyl)(1-tertbutylamido) $MX_n$,
μ-$(CH_3)_2$Si(fluorenyl)(1-tertbutylamido)$MX_n$,
μ-$(CH_3)_2$Si(tetramethylcyclopentadienyl)(1-cyclododecylamido)$MX_n$,
μ-$(C_6H_5)_2$C(tetramethylcyclopentadienyl)(1-cyclododecylamido)$MX_n$,
μ-$(CH_3)_2$Si($\eta^5$-2,6,6-trimethyl-1,5,6,7-tetrahydro-s-indacen-1-yl)(tertbutylamido)$MX_n$,
dimethylsilyl-(4-([1,1'-biphenyl]-2-yl)-2-hexyl-1H-inden-1-yl)(4-(3,5-di-tert-butyl-4-methoxyphenyl)-2-methyl-1H-inden-1-yl) $MX_n$,
dimethylsilyl-(4-(4-(tert-butyl)phenyl)-2-isopropyl-1H-inden-1-yl)(4-(4-(tert-butyl)phenyl)-2-methyl-1,5,6,7-tetrahydro-s-indacen-1-yl) $MX_n$ dimethylsilyl-(4-(4-(tert-butyl)phenyl)-2-isopropyl-1H-inden-1-yl)(4-(4-(tert-butyl)phenyl)-2-methyl-1H-inden-1-yl)MX$_n$ tetramethylcyclopentadienyl dimethylsilyl (2-methyl-4-phenyl)-1,5,6,7-tetrahydro-s-indacen-1-yl)MX$_n$ tetramethylcyclopentadienyl dimethylsilyl (2-methyl-4-(4-tertbutylphenyl)-1,5,6,7-tetrahydro-s-indacen-1-yl)MX$_n$ tetramethylcyclopentadienyl dimethylsilyl (2-methyl-4-(o-tolyl)-1,5,6,7-tetrahydro-s-indacen-1-yl)MX$_n$ tetramethylcyclopentadienyl dimethylsilyl (4-([1,1'-biphenyl]-2-yl)-1,5,6,7-tetrahydro-s-indacen-1-yl)MX$_n$ tetramethylcyclopentadienyl dimethylsilyl (4-(2-isopropylphenyl)-2-methyl-1,5,6,7-tetrahydro-s-indacen-1-yl)MX$_n$ tetramethylcyclopentadienyl dimethylsilyl (2-methyl-4-(2,3,4-trimethylphenyl)-1,5,6,7-tetrahydro-s-indacen-1-yl)MX$_n$ tetramethylcyclopentadienyl dimethylsilyl (4-(3,5-di-tert-butyl-4-methoxyphenyl)-2-methyl-1,5,6,7-tetrahydro-s-indacen-1-yl)MX$_n$ tetramethylcyclopentadienyl dimethylsilyl (4-(anthracen-9-yl)-2-methyl-1,5,6,7-tetrahydro-s-indacen-1-yl))MX$_n$ tetramethylcyclopentadienyl dimethylsilyl (2-methyl-4-(3,5-di-trifluoromethylphenyl)-1,5,6,7-tetrahydro-s-indacen-1-yl)MX$_n$ tetramethylcyclopentadienyl dimethylsilyl (4-(1-naphthyl)-2-methyl-1,5,6,7-tetrahydro-s-indacen-1-yl)) MX$_n$ where M is selected from Ti, Zr, and Hf; where X is selected from the group consisting of halogens, hydrides, $C_{1-12}$ alkyls, $C_{2-12}$ alkenyls, $C_{6-12}$ aryls, $C_{7-20}$ alkylaryls, $C_{1-12}$ alkoxys, $C_{6-16}$ aryloxys, $C_{7-18}$ alkylaryloxys, $C_{1-12}$ fluoroalkyls, $C_{6-12}$ fluoroaryls, and $C_{1-12}$ heteroatom-containing hydrocarbons, substituted derivatives thereof, and combinations thereof, and where n is zero or an integer from 1 to 4, preferably X is selected from halogens (such as bromide, fluoride, chloride), or $C_1$ to $C_{20}$ alkyls (such as methyl, ethyl, propyl, butyl, and pentyl) and n is 1 or 2, preferably 2.

In other embodiments of the invention, the catalyst is one or more of:

bis(1-methyl, 3-n-butyl cyclopentadienyl) M(R)$_2$;
dimethylsilyl bis(indenyl)M(R)$_2$;
bis(indenyl)M(R)$_2$;
dimethylsilyl bis(tetrahydroindenyl)M(R)$_2$;
bis(n-propylcyclopentadienyl)M(R)$_2$;
dimethylsilyl (tetramethylcyclopentadienyl)(cyclododecylamido)M(R)$_2$;
dimethylsilyl (tetramethylcyclopentadienyl)(cyclododecylamido)M(R)$_2$;
dimethylsilyl (tetramethylcyclopentadienyl)(t-butylamido) M(R)$_2$;
dimethylsilyl (tetramethylcyclopentadienyl)(t-butylamido) M(R)$_2$;
μ-(CH$_3$)$_2$Si(cyclopentadienyl)(1-adamantylamido)M(R)$_2$;
μ-(CH$_3$)$_2$Si(3-tertbutylcyclopentadienyl)(1-adamantylamido)M(R)$_2$;
μ-(CH$_3$)$_2$(tetramethylcyclopentadienyl)(1-adamantylamido)M(R)$_2$;
μ-(CH$_3$)$_2$Si(tetramethylcyclopentadienyl)(1-adamantylamido)M(R)$_2$;
μ-(CH$_3$)$_2$C(tetramethylcyclopentadienyl)(1-adamantylamido)M(R)$_2$;
μ-(CH$_3$)$_2$Si(tetramethylcyclopentadienyl)(1-tertbutylamido)M(R)$_2$;
μ-(CH$_3$)$_2$Si(fluorenyl)(1-tertbutylamido)M(R)$_2$;
μ-(CH$_3$)$_2$Si(tetramethylcyclopentadienyl)(1-cyclododecylamido)M(R)$_2$;
μ-(C$_6$H$_5$)$_2$C(tetramethylcyclopentadienyl)(1-cyclododecylamido)M(R)$_2$;
μ-(CH$_3$)$_2$Si(η$^5$-2,6,6-trimethyl-1,5,6,7-tetrahydro-s-indacen-1-yl)(tertbutylamido)M(R)$_2$;

where M is selected from Ti, Zr, and Hf; and R is selected from halogen or $C_1$ to $C_5$ alkyl.

In preferred embodiments of the invention, the catalyst compound is one or more of:

dimethylsilyl (tetramethylcyclopentadienyl)(cyclododecylamido)titanium dimethyl;
dimethylsilyl (tetramethylcyclopentadienyl)(cyclododecylamido)titanium dimethyl;
dimethylsilyl (tetramethylcyclopentadienyl)(t-butylamido) titanium dimethyl;
dimethylsilyl (tetramethylcyclopentadienyl)(t-butylamido) titanium dimethyl;
μ-(CH$_3$)$_2$Si(cyclopentadienyl)(1-adamantylamido)titanium dimethyl;
μ-(CH$_3$)$_2$Si(3-tertbutylcyclopentadienyl)(1-adamantylamido)titanium dimethyl;
μ-(CH$_3$)$_2$(tetramethylcyclopentadienyl)(1-adamantylamido) titanium dimethyl;
μ-(CH$_3$)$_2$Si(tetramethylcyclopentadienyl)(1-adamantylamido)titanium dimethyl;
μ-(CH$_3$)$_2$C(tetramethylcyclopentadienyl)(1-adamantylamido)titanium dimethyl;
μ-(CH$_3$)$_2$Si(tetramethylcyclopentadienyl)(1-tertbutylamido) titanium dimethyl$_2$;
μ-(CH$_3$)$_2$Si(fluorenyl)(1-tertbutylamido)titanium dimethyl;
μ-(CH$_3$)$_2$Si(tetramethylcyclopentadienyl)(1-cyclododecylamido)titanium dimethyl;
μ-(C$_6$H$_5$)$_2$C(tetramethylcyclopentadienyl)(1-cyclododecylamido)titanium dimethyl; and/or
μ-(CH$_3$)$_2$Si(η$^5$-2,6,6-trimethyl-1,5,6,7-tetrahydro-s-indacen-1-yl)(tertbutylamido)titanium dimethyl.

In at least one embodiment, the catalyst is rac-dimethylsilyl-bis(indenyl)hafnium dimethyl and or 1,1'-bis(4-triethylsilylphenyl)methylene-(cyclopentadienyl)(3,8-di-tertiary-butyl-1-fluorenyl)hafnium dimethyl.

In at least one embodiment, the catalyst compound is one or more of:

bis(1-methyl, 3-n-butyl cyclopentadienyl)hafnium dimethyl,
bis(1-methyl, 3-n-butyl cyclopentadienyl)zirconium dimethyl,
dimethylsilyl bis(indenyl)zirconium dimethyl,
dimethylsilyl bis(indenyl)hafnium dimethyl,
bis(indenyl)zirconium dimethyl,
bis(indenyl)hafnium dimethyl,
dimethylsilyl bis(tetrahydroindenyl)zirconium dimethyl,
bis(n-propylcyclopentadienyl)zirconium dimethyl,
dimethylsilylbis(tetrahydroindenyl)hafnium dimethyl,
dimethylsilyl bis(2-methylindenyl)zirconium dimethyl,
dimethylsilyl bis(2-methylfluorenyl)zirconium dimethyl,
dimethylsilyl bis(2-methylindenyl)hafnium dimethyl,
dimethylsilyl bis(2-methylfluorenyl)hafnium dimethyl,
dimethylsilyl bis(2-methyl-5,7-propylindenyl)zirconium dimethyl,
dimethylsilyl bis(2-methyl-4-phenylindenyl)zirconium dimethyl,
dimethylsilyl bis(2-ethyl-5-phenylindenyl)zirconium dimethyl,
dimethylsilyl bis(2-methyl-4-biphenylindenyl)zirconium dimethyl,
dimethylsilylene bis(2-methyl-4-carbazolylindenyl)zirconium dimethyl,
rac-dimethylsilyl-bis-(5,6,7,8-tetrahydro-5,5,8,8-tetramethyl-2-methyl-1H-benz(f)indene)hafnium dimethyl, diphenylmethylene (cyclopentadienyl)(fluorenyl)hafnium dimethyl,
bis(methylcyclopentadienyl)zirconium dimethyl,
rac-dimethylsiylbis(2-methyl,3-propyl indenyl)hafnium dimethyl,
dimethylsilylbis(indenyl)hafnium dimethyl,
dimethylsilylbis(indenyl)zirconium dimethyl,
dimethyl rac-dimethylsilyl-bis-(5,6,7,8-tetrahydro-5,5,8,8-tetramethyl-2-methyl-1H-benz(f)indene)hafnium dimethyl,
Rac-meso-diphenylsilyl-bis(n-propylcyclopentadienyl)hafnium dimethyl,
1,1'-bis(4-triethylsilylphenyl)methylene-(cyclopentadienyl)(3,8-di-tertiary-butyl-1-fluorenyl)hafnium XI (bridge is considered the 1 position),
bis-trimethylsilylphenyl-methylene(cyclopentadienyl)(di-t-butylfluorenyl)hafnium dimethyl,
bis-trimethylsilylphenyl-methylene(cyclopentadienyl)(fluorenyl)hafnium dimethyl,
bisphenylmethylene(cyclopentadienyl)(dimethylfluorenyl) hafnium dimethyl,
bis(n-propylcyclopentadienyl)hafnium dimethyl,
bis(n-butylcyclopentadienyl)hafnium dimethyl,
bis(n-pentylcyclopentadienyl)hafnium dimethyl,
(n-propyl cyclopentadienyl)(n-butylcyclopentadienyl)hafnium dimethyl,
bis[(2-trimethylsilylethyl)cyclopentadienyl]hafnium dimethyl,
bis(trimethylsilyl cyclopentadienyl)hafnium dimethyl,
dimethylsilylbis(n-propylcyclopentadienyl)hafnium dimethyl,
dimethylsilylbis(n-butylcyclopentadienyl)hafnium dimethyl,
bis(1-n-propyl-2-methylcyclopentadienyl)hafnium dimethyl, and
(n-propylcyclopentadienyl)(1-n-propyl-3-n-butylcyclopentadienyl)hafnium dimethyl,
bis(n-propylcyclopentadienyl)hafnium dimethyl,
bis(n-butylcyclopentadienyl)hafnium dimethyl,
bis(n-pentylcyclopentadienyl)hafnium dimethyl,
(n-propyl cyclopentadienyl)(n-butylcyclopentadienyl)hafnium dimethyl,
bis[(2-trimethylsilylethyl)cyclopentadienyl]hafnium dimethyl,
bis(trimethylsilyl cyclopentadienyl)hafnium dimethyl,
dimethylsilylbis(n-propylcyclopentadienyl)hafnium dimethyl,
dimethylsilylbis(n-butylcyclopentadienyl)hafnium dimethyl,
bis(1-n-propyl-2-methylcyclopentadienyl)hafnium dimethyl,
(n-propylcyclopentadienyl)(1-n-propyl-3-n-butylcyclopentadienyl)hafnium dimethyl, and
dimethylsilyl(3-n-propylcyclopentadienyl)(tetramethylcyclopentadienyl)zirconium dimethyl.

Post-Metallocene Catalyst Compounds

Transition metal complexes for polymerization processes can include any olefin polymerization catalyst. Suitable catalyst components may include post-metallocene complexes that are transition metal complexes that do not feature a cyclopentadienyl anion or substituted cyclopentadienyl anion donors (e.g., cyclopentadienyl, fluorenyl, indenyl, methylcyclopentadienyl). Examples of families of post-metallocene complexes that may be suitable herein can include late transition metal pyridylbisimines (e.g., U.S. Pat. No. 7,087,686), group 4 pyridyldiamidos (e.g., U.S. Pat. No. 7,973,116), quinolinyldiamidos (e.g., US Pub. No. 2018/0002352 A1), pyridylamidos (e.g., U.S. Pat. No. 7,087,690), phenoxyimines (e.g., Makio, H. et al. (2009) "Development and Application of FI Catalysts for Olefin Polymerization: Unique Catalysis and Distinctive Polymer Formation," *Accounts of Chemical Research*, v. 42(10), pp. 1532-1544), bridged bi-aromatic complexes (e.g., U.S. Pat. No. 7,091,292), pyridyl bisphenolate complexes (e.g., US 2020/0254431, US 2020/0255553, WO 2020/167821; US 2020/0255561), ONNO bisphenolate complexes (e.g., U.S. Pat. No. 10,221,260), and ONYO bisphenolate complexes (e.g., U.S. Pat. No. 9,745,327) the disclosures of which are incorporated herein by reference.

Catalyst complexes that are suitable for use in combination with the activators described herein include: pyridyldiamido complexes; quinolinyldiamido complexes; phenoxyimine complexes; bisphenolate complexes; cyclopentadienyl-amidinate complexes; and iron pyridyl bis (imine) complexes or any combination thereof, including any combination with metallocene complexes.

Useful post-metallocene complexes, as defined herein, can include iron complexes of tridentate pyridylbisimine ligands, zirconium and hafnium complexes of pyridylamido ligands, zirconium and hafnium complexes of tridentate pyridyldiamido ligands, zirconium and hafnium complexes of tridentate quinolinyldiamido ligands, zirconium and hafnium complexes of bidentate phenoxyimine ligands, and zirconium and hafnium complexes of bridged bi-aromatic ligands.

Suitable post-metallocene complexes can include zirconium and hafnium post-metallocene complexes. In at least one embodiment, post-metallocene complexes for the present disclosure include group 4 post-metallocene complexes including two anionic donor atoms and one or two neutral donor atoms. Suitable post-metallocene complexes for the present disclosure include group 4 post-metallocene complexes including an anionic amido donor. Suitable post-metallocene complexes for the present disclosure include group 4 post-metallocene complexes including an anionic aryloxide donor atom. Suitable post-metallocene complexes for the present disclosure include group 4 post-metallocene complexes including two anionic aryloxide donor atoms and two additional neutral donor atoms.

A catalyst compound useful herein can be a quinolinyl-diamido (QDA) transition metal complex represented by Formula (BI), such as by Formula (BII), such as by Formula (BIII):

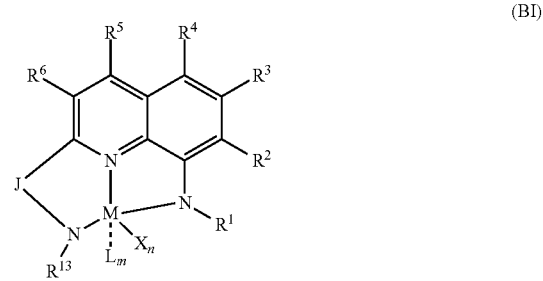

(BI)

-continued (BII)

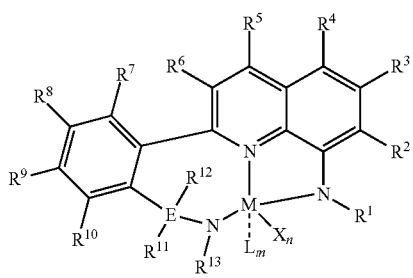

(BIII)

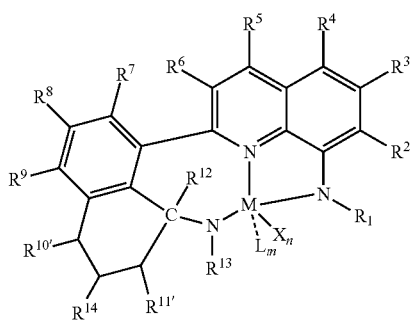

such as J is

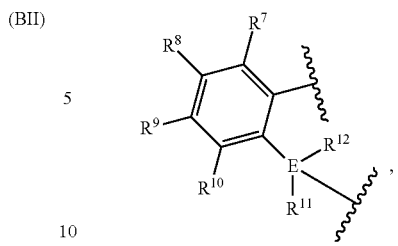,

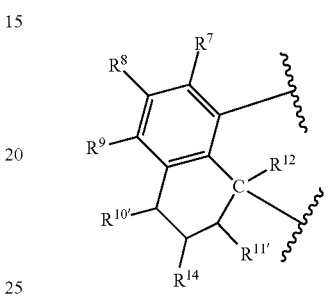

wherein:
M is a group 3, 4, 5, 6, 7, 8, 9, 10, 11, or 12 metal, such as a group 4 metal;
J is group including a three-atom-length bridge between the quinoline and the amido nitrogen, such as a group containing up to 50 non-hydrogen atoms;
E is carbon, silicon, or germanium;
X is an anionic leaving group, (such as a hydrocarbyl group or a halogen);
L is a neutral Lewis base;
$R^1$ and $R^{13}$ are independently selected from the group including of hydrocarbyls, substituted hydrocarbyls, and silyl groups;
$R^2$, $R^3$, $R^4$, $R^5$, $R^6$, $R^7$, $R^8$, $R^9$, $R^{10}$, $R^{10'}$, $R^{11}$, $R^{11'}$, $R^{12}$, and $R^{14}$ are independently hydrogen, hydrocarbyl, alkoxy, silyl, amino, aryloxy, substituted hydrocarbyl, halogen, or phosphino;
n is 1 or 2;
m is 0, 1, or 2, where
n+m is not greater than 4; and
any two R groups (e.g., $R^1$ & $R^2$, $R^2$ & $R^3$, $R^{10}$ and $R^{11}$, etc.) may be joined to form a substituted hydrocarbyl, unsubstituted hydrocarbyl, substituted heterocyclic, or unsubstituted heterocyclic, saturated or unsaturated ring, where the ring has 5, 6, 7, or 8 ring atoms and where substitutions on the ring can join to form additional rings;
any two X groups may be joined together to form a dianionic group;
any two L groups may be joined together to form a bidentate Lewis base; and
any X group may be joined to an L group to form a monoanionic bidentate group.

In at least one embodiment, M is a group 4 metal, such as zirconium or hafnium, such as M is hafnium.

In at least one embodiment, J is an aromatic substituted or unsubstituted hydrocarbyl having from 3 to 30 non-hydrogen atoms, such as J is represented by the formula:

where $R^7$, $R^8$, $R^9$, $R^{10}$, $R^{10'}$, $R^{11}$, $R^{11'}$, $R^{12}$, $R^{14}$ and E are as defined above, and any two R groups (e.g., $R^7$ & $R^8$, $R^8$ & $R^9$, $R^9$ & $R^{10}$, $R^{10}$ & $R^{11}$, etc.) may be joined to form a substituted or unsubstituted hydrocarbyl or heterocyclic ring, where the ring has 5, 6, 7, or 8 ring atoms (such as 5 or 6 atoms), and said ring may be saturated or unsaturated (such as partially unsaturated or aromatic), such as J is an arylalkyl (such as arylmethyl, etc.) or dihydro-1H-indenyl, or tetrahydronaphthalenyl group.

In at least one embodiment, J is selected from the following structures:

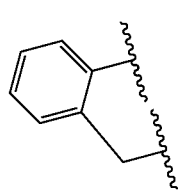 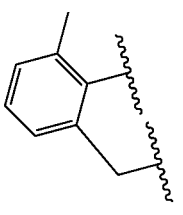

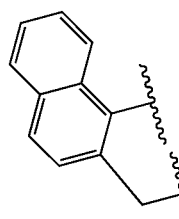

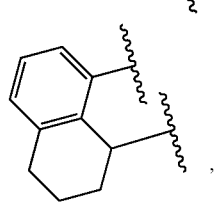, where ⁀ indicates connection to the complex.

In at least one embodiment, E is carbon.

X may be an alkyl (such as alkyl groups having 1 to 10 carbons, such as methyl, ethyl, propyl, butyl, pentyl, hexyl, heptyl, octyl, nonyl, decyl, and isomers thereof), aryl, hydride, alkylsilane, fluoride, chloride, bromide, iodide, triflate, carboxylate, amido (such as $NMe_2$), or alkylsulfonate.

In at least one embodiment, L is an ether, amine or thioether.

In at least one embodiment, $R^7$ and $R^8$ are joined to form a six-membered aromatic ring with the joined $R^7/R^8$ group being —CH=CHCH=CH—.

$R^{10}$ and $R^{11}$ may be joined to form a five-membered ring with the joined $R^{10}R^{11}$ group being —$CH_2CH_2$—.

In at least one embodiment, $R^{10}$ and $R^{11}$ are joined to form a six-membered ring with the joined $R^{10}R^{11}$ group being —$CH_2CH_2CH_2$—.

$R^1$ and $R^{13}$ may be independently selected from phenyl groups that are variously substituted with between zero to five substituents that include F, Cl, Br, I, $CF_3$, $NO_2$, alkoxy, dialkylamino, aryl, and alkyl groups having 1 to 10 carbons, such as methyl, ethyl, propyl, butyl, pentyl, hexyl, heptyl, octyl, nonyl, decyl, and isomers thereof.

In at least one embodiment, the QDA transition metal complex is represented by the Formula (BII) above where:

M is a group 4 metal (such hafnium);

E is selected from carbon, silicon, or germanium (such as carbon);

X is an alkyl, aryl, hydride, alkylsilane, fluoride, chloride, bromide, iodide, triflate, carboxylate, amido, alkoxo, or alkylsulfonate;

L is an ether, amine, or thioether;

$R^1$ and $R^{13}$ are independently selected from the group consisting of hydrocarbyls, substituted hydrocarbyls, and silyl groups (such as aryl);

$R^2$, $R^3$, $R^4$, $R^5$, $R^6$, $R^7$, $R^8$, $R^9$, $R^{10}$, $R^{11}$, and $R^{12}$ are independently hydrogen, hydrocarbyl, alkoxy, silyl, amino, aryloxy, substituted hydrocarbyls, halogen, and phosphino;

n is 1 or 2;

m is 0, 1, or 2;

n+m is from 1 to 4;

two X groups may be joined together to form a dianionic group;

two L groups may be joined together to form a bidentate Lewis base;

an X group may be joined to an L group to form a monoanionic bidentate group;

$R^7$ and $R^8$ may be joined to form a ring (such as an aromatic ring, a six-membered aromatic ring with the joined $R^7R^8$ group being —CH=CHCH=CH—); and $R^{10}$ and $R^{11}$ may be joined to form a ring (such as a five-membered ring with the joined $R^{10}R^{11}$ group being —$CH_2CH_2$—, a six-membered ring with the joined $R^{10}R^{11}$ group being —$CH_2CH_2CH_2$—).

In at least one embodiment of Formula (BI), (BII), and (BIII), $R^4$, $R^5$, and $R^6$ are independently selected from the group including hydrogen, hydrocarbyls, substituted hydrocarbyls, alkoxy, aryloxy, halogen, amino, and silyl, and wherein adjacent R groups ($R^4$ and $R^5$ and/or $R^5$ and $R^6$) are joined to form a substituted hydrocarbyl, unsubstituted hydrocarbyl, unsubstituted heterocyclic ring or substituted heterocyclic ring, where the ring has 5, 6, 7, or 8 ring atoms and where substitutions on the ring can join to form additional rings.

In at least one embodiment of Formula (BI), (BII), and (BIII), $R^7$, $R^8$, $R^9$, and $R^{10}$ are independently selected from the group including hydrogen, hydrocarbyls, substituted hydrocarbyls, alkoxy, halogen, amino, and silyl, and wherein adjacent R groups ($R^7$ and $R^8$ and/or $R^9$ and $R^{10}$) may be joined to form a saturated, substituted hydrocarbyl, unsubstituted hydrocarbyl, unsubstituted heterocyclic ring or substituted heterocyclic ring, where the ring has 5, 6, 7, or 8 ring carbon atoms and where substitutions on the ring can join to form additional rings.

In at least one embodiment of Formula (BI), (BII), and (BIII), $R^2$ and $R^3$ are each, independently, selected from the group including hydrogen, hydrocarbyls, and substituted hydrocarbyls, alkoxy, silyl, amino, aryloxy, halogen, and phosphino, $R^2$ and $R^3$ may be joined to form a saturated, substituted or unsubstituted hydrocarbyl ring, where the ring has 4, 5, 6, or 7 ring carbon atoms and where substitutions on the ring can join to form additional rings, or $R^2$ and $R^3$ may be joined to form a saturated heterocyclic ring, or a saturated substituted heterocyclic ring where substitutions on the ring can join to form additional rings.

In at least one embodiment of Formula (BI), (BII), and (BIII), $R^{11}$ and $R^{12}$ are each, independently, selected from the group including hydrogen, hydrocarbyls, and substituted hydrocarbyls, alkoxy, silyl, amino, aryloxy, halogen, and phosphino, $R^{11}$ and $R^{12}$ may be joined to form a saturated, substituted or unsubstituted hydrocarbyl ring, where the ring has 4, 5, 6, or 7 ring carbon atoms and where substitutions on the ring can join to form additional rings, or $R^{11}$ and $R^{12}$ may be joined to form a saturated heterocyclic ring, or a saturated substituted heterocyclic ring where substitutions on the ring can join to form additional rings, or $R^{11}$ and $R^{10}$ may be joined to form a saturated heterocyclic ring, or a saturated substituted heterocyclic ring where substitutions on the ring can join to form additional rings.

In at least one embodiment of Formula (BI), (BII), and (BIII), $R^1$ and $R^{13}$ are independently selected from phenyl groups that are variously substituted with between zero to five substituents that include F, Cl, Br, I, $CF_3$, $NO_2$, alkoxy, dialkylamino, aryl, and alkyl groups having 1 to 10 carbons, such as methyl, ethyl, propyl, butyl, pentyl, hexyl, heptyl, octyl, nonyl, decyl, and isomers thereof.

In at least one embodiment of Formula (BII), suitable $R^{12}$-E-$R^{11}$ groups include $CH_2$, $CMe_2$, $SiMe_2$, $SiEt_2$, $SiPr_2$, $SiBu_2$, $SiPh_2$, $Si(aryl)_2$, $Si(alkyl)_2$, CH(aryl), CH(Ph), CH(alkyl), and CH(2-isopropylphenyl), where alkyl is a $C_1$ to $C_{40}$ alkyl group (such as $C_1$ to $C_{20}$ alkyl, such as one or more of methyl, ethyl, propyl, butyl, pentyl, hexyl, heptyl, octyl, nonyl, decyl, undecyl, dodecyl, and isomers thereof), aryl is a $C_5$ to $C_{40}$ aryl group (such as a $C_6$ to $C_{20}$ aryl group, such as phenyl or substituted phenyl, such as phenyl, 2-isopropylphenyl, or 2-tertbutylphenyl).

In at least one embodiment of Formula (BIII), $R^{11}$, $R^{12}$, $R^9$, $R^{14}$ and $R^{10}$ are independently selected from the group consisting of hydrogen, hydrocarbyls, substituted hydrocarbyls, alkoxy, halogen, amino, and silyl, and wherein adjacent R groups ($R^{10}$ and $R^{14}$, and/or $R^{11}$ and $R^{14}$, and/or $R^9$ and $R^{10}$) may be joined to form a saturated, substituted hydrocarbyl, unsubstituted hydrocarbyl, unsubstituted heterocyclic ring or substituted heterocyclic ring, where the ring has 5, 6, 7, or 8 ring carbon atoms and where substitutions on the ring can join to form additional rings.

The R groups above (i.e., any of $R^2$ to $R^{14}$) and other R groups mentioned hereafter may contain from 1 to 30, such as 2 to 20 carbon atoms, such as from 6 to 20 carbon atoms. The R groups above (i.e., any of $R^2$ to $R^{14}$) and other R groups mentioned hereafter, may be independently selected from the group including hydrogen, methyl, ethyl, phenyl, isopropyl, isobutyl, trimethylsilyl, and —$CH_2$—$Si(Me)_3$.

In at least one embodiment, the quinolinyldiamide complex is linked to one or more additional transition metal complex, such as a quinolinyldiamide complex or another suitable post-metallocene, through an R group in such a fashion as to make a bimetallic, trimetallic, or multimetallic complex that may be used as a catalyst component for olefin polymerization. The linker R-group in such a complex may contain 1 to 30 carbon atoms.

In at least one embodiment, E is carbon and $R^{11}$ and $R^{12}$ are independently selected from phenyl groups that are substituted with 0, 1, 2, 3, 4, or 5 substituents selected from the group consisting of F, Cl, Br, I, $CF_3$, $NO_2$, alkoxy, dialkylamino, hydrocarbyl, and substituted hydrocarbyl groups with from one to ten carbons.

In at least one embodiment of Formula (BII) or (BIII), $R^{11}$ and $R^{12}$ are independently selected from hydrogen, methyl, ethyl, phenyl, isopropyl, isobutyl, —$CH_2$—$Si(Me)_3$, and trimethylsilyl.

In at least one embodiment of Formula (BII), and (BIII), $R^7$, $R^8$, $R^9$, and $R^{11}$ are independently selected from hydrogen, methyl, ethyl, propyl, isopropyl, phenyl, cyclohexyl, fluoro, chloro, methoxy, ethoxy, phenoxy, —$CH_2$—$Si(Me)_3$, and trimethylsilyl.

In at least one embodiment of Formula (BI), (BII), and (BIII), $R^2$, $R^3$, $R^4$, $R^5$, and $R^6$ are independently selected from the group consisting of hydrogen, hydrocarbyls, alkoxy, silyl, amino, substituted hydrocarbyls, and halogen.

In at least one embodiment of Formula (BIII), $R^{10}R^{11}$ and $R^{14}$ are independently selected from hydrogen, methyl, ethyl, phenyl, isopropyl, isobutyl, —$CH_2$—$Si(Me)_3$, and trimethylsilyl.

In at least one embodiment of Formula (BI), (BII), and (BIII), each L is independently selected from $Et_2O$, MeOtBu, $Et_3N$, $PhNMe_2$, $MePh_2N$, tetrahydrofuran, and dimethylsulfide.

In at least one embodiment of Formula (BI), (BII), and (BIII), each X is independently selected from methyl, benzyl, trimethylsilyl, neopentyl, ethyl, propyl, butyl, phenyl, hydrido, chloro, fluoro, bromo, iodo, dimethylamido, diethylamido, dipropylamido, and diisopropylamido.

In at least one embodiment of Formula (BI), (BII), and (BIII), $R^1$ is 2,6-diisopropylphenyl, 2,4,6-triisopropylphenyl, 2,6-diisopropyl-4-methylphenyl, 2,6-diethylphenyl, 2-ethyl-6-isopropylphenyl, 2,6-bis(3-pentyl)phenyl, 2,6-dicyclopentylphenyl, or 2,6-dicyclohexylphenyl.

In at least one embodiment of Formula (BI), (BII), and (BIII), $R^{13}$ is phenyl, 2-methylphenyl, 2-ethylphenyl, 2-propylphenyl, 2,6-dimethylphenyl, 2-isopropylphenyl, 4-methylphenyl, 3,5-dimethylphenyl, 3,5-di-tert-butylphenyl, 4-fluorophenyl, 3-methylphenyl, 4-dimethylaminophenyl, or 2-phenylphenyl.

In at least one embodiment of Formula (BII), J is dihydro-1H-indenyl and $R^1$ is 2,6-dialkylphenyl or 2,4,6-trialkylphenyl.

In at least one embodiment of Formula (BI), (BII), and (BITT), $R^1$ is 2,6-diisopropylphenyl and $R^{13}$ is a hydrocarbyl group containing 1, 2, 3, 4, 5, 6, or 7 carbon atoms.

An exemplary catalyst used for polymerizations of the present disclosure is (QDA-1)HfMe$_2$, as described in US Pub. No. 2018/0002352 A1.

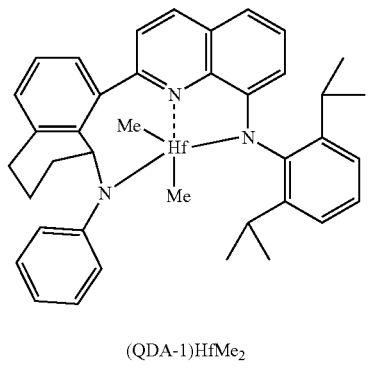

(QDA-1)HfMe$_2$

In at least one embodiment, the catalyst compound is an ONNO bis(phenolate) catalyst compound represented by Formula (I):

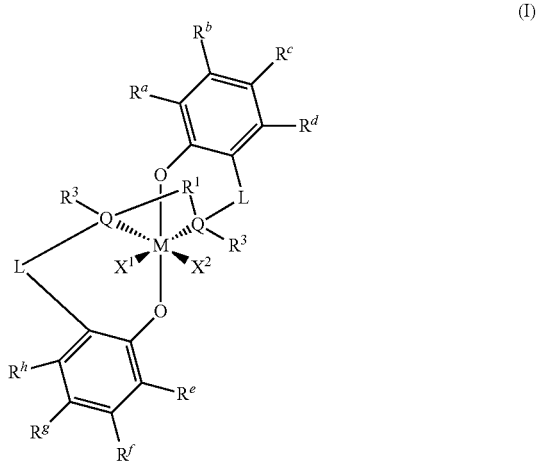

(I)

wherein:

M is a Group 4 transition metal;

each Q is neutral donor group comprising at least one atom from Group 15 or Group 16 (such as O, N, S, or P), and $R^3$ is not present when Q is a Group 16 atom;

each L is independently

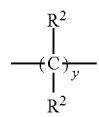

and is not part of an aromatic ring;

y is greater than or equal to 2;

$X^1$ and $X^2$ are, independently, a univalent $C_1$ to $C_{20}$ hydrocarbyl radical, a $C_1$ to $C_{20}$ substituted hydrocarbyl radical, a heteroatom or a heteroatom-containing group, or $X^1$ and $X^2$ join together to form a $C_4$ to $C_{62}$ cyclic, polycyclic or heterocyclic structure;

$R_1$ is a divalent $C_1$-$C_{40}$ hydrocarbyl radical or divalent substituted hydrocarbyl radical comprising a portion that comprises a linker backbone comprising from 1 to 18 carbon atoms linking between the two Q groups;

each $R^a$, $R^b$, $R^c$, $R^d$, $R^e$, $R^f$, $R^g$, and $R^h$ is, independently, a hydrogen, a $C_1$-$C_{60}$ hydrocarbyl radical, a $C_1$-$C_{60}$ substituted hydrocarbyl radical, a heteroatom or a heteroatom-containing group, or two or more of $R^a$ to $R^h$ may independently join together to form a $C_4$ to $C_{62}$ cyclic, polycyclic or heterocyclic structure, or a combination thereof;

each $R^2$ is, independently, a hydrogen, a $C_1$-$C_{40}$ hydrocarbyl radical, a $C_1$-$C_{40}$ substituted hydrocarbyl radical, a heteroatom or a heteroatom-containing group, or two or more adjacent $R^2$ groups may independently join together to form a $C_4$ to $C_{62}$ cyclic or polycyclic ring structure, or a combination thereof, provided that such cyclic or polycyclic ring structure is not aromatic; and each $R^3$ is, independently, a hydrogen, a $C_1$-$C_{40}$ hydrocarbyl radical, a $C_1$-$C_{40}$ substituted hydrocarbyl radical, a heteroatom or a heteroatom-containing group.

In at least one embodiment, the catalyst compound is an ONYO bis(phenolate) catalyst compound represented by Formula (CI):

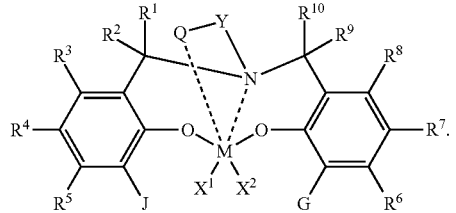

(CI)

M is a Group 4 metal, such as Hf or Zr. $X^1$ and $X^2$ are independently a univalent $C_1$-$C_{20}$ hydrocarbyl, $C_1$-$C_{20}$ substituted hydrocarbyl, a heteroatom or a heteroatom-containing group, or $X^1$ and $X^2$ join together to form a $C_4$-$C_{62}$ cyclic or polycyclic ring structure. $R^1$, $R^2$, $R^3$, $R^4$, $R^5$, $R^6$, $R^7$, $R^8$, $R^9$, and $R^{10}$ is independently hydrogen, $C_1$-$C_{40}$ hydrocarbyl, $C_1$-$C_{40}$ substituted hydrocarbyl, a heteroatom or a heteroatom-containing group, or two or more of $R^1$, $R^2$, $R^3$, $R^4$, $R^5$, $R^6$, $R^7$, $R^8$, $R^9$, or $R^{10}$ are joined together to form a $C_4$-$C_{62}$ cyclic or polycyclic ring structure, or a combination thereof; Q is a neutral donor group; J is heterocycle, a substituted or unsubstituted $C_7$-$C_{60}$ fused polycyclic group, where at least one ring is aromatic and where at least one ring, which may or may not be aromatic, has at least five ring atoms' G is as defined for J or may be hydrogen, $C_2$-$C_{60}$ hydrocarbyl, $C_1$-$C_{60}$ substituted hydrocarbyl, or may independently form a $C_4$-$C_{60}$ cyclic or polycyclic ring structure with $R^6$, $R^7$, or $R^8$ or a combination thereof; Y is divalent $C_1$-$C_{20}$ hydrocarbyl or divalent $C_1$-$C_{20}$ substituted hydrocarbyl or (-Q-Y—) together form a heterocycle; and heterocycle may be aromatic and/or may have multiple fused rings.

In at least one embodiment, the catalyst compound represented by Formula (CI) is represented by Formula (CII) or Formula (CIII):

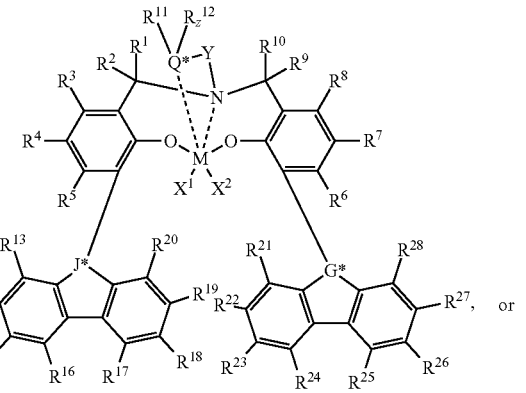

(CII)

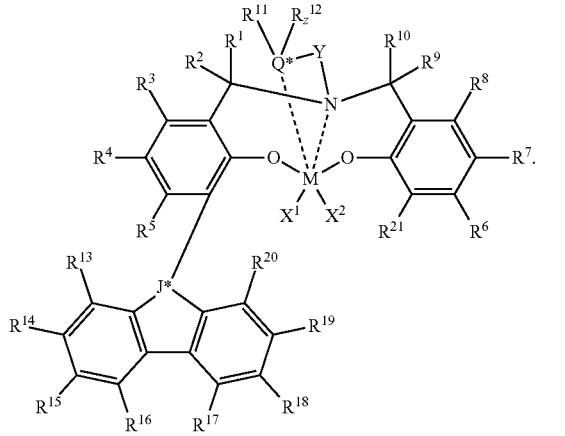

(CIII)

M is Hf, Zr, or Ti. $X^1$, $X^2$, $R^1$, $R^2$, $R^3$, $R^4$, $R^5$, $R^6$, $R^7$, $R^8$, $R^9$, $R^{10}$, and Y are as defined for Formula (CI). $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ is independently a hydrogen, $C_1$-$C_{40}$ hydrocarbyl, $C_1$-$C_{40}$ substituted hydrocarbyl, a functional group comprising elements from Groups 13 to 17, or two or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ may independently join together to form a $C_4$-$C_{62}$ cyclic or polycyclic ring structure, or a combination thereof; $R^{11}$ and $R^{12}$ may join together to form a five- to eight-membered heterocycle; Q* is a group 15 or 16 atom; z is 0 or 1; J* is CR" or N, and G* is CR" or N, where R" is $C_1$-$C_2$ hydrocarbyl or carbonyl-containing $C_1$-$C_{20}$ hydrocarbyl; and z=0 if Q* is a group 16 atom, and z=1 if Q* is a group 15 atom.

In at least one embodiment the catalyst is an iron complex represented by Formula (IV):

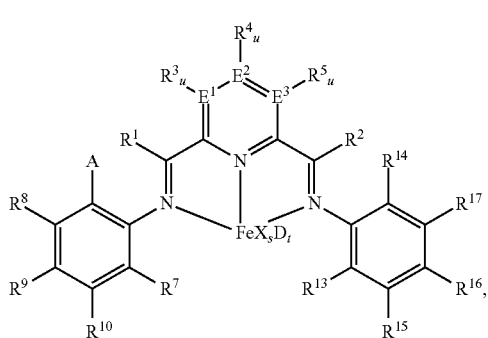

(IV)

wherein:
A is chlorine, bromine, iodine, —$CF_3$ or —$OR^{11}$;
each of $R^1$ and $R^2$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or five-, six- or seven-membered heterocyclyl comprising at least one atom selected from the group consisting of N, P, O and S;
wherein each of $R^1$ and $R^2$ is optionally substituted by halogen, —$NR^{11}_2$, —$OR^{11}$ or —$SiR^{12}_3$;
wherein $R^1$ optionally bonds with $R^3$, and $R^2$ optionally bonds with $R^5$, in each case to independently form a five-, six- or seven-membered ring;
$R^7$ is a $C_1$-$C_{20}$ alkyl;
each of $R^3$, $R^4$, $R^5$, $R^8$, $R^9$, $R^{10}$, $R^{15}$, $R^{16}$, and $R^{17}$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, —$NR^{11}_2$, —$OR^{11}$, halogen, —$SiR^{12}_3$ or five-, six- or seven-membered heterocyclyl comprising at least one atom selected from the group consisting of N, P, O, and S;
wherein $R^3$, $R^4$, $R^5$, $R^7$, $R^8$, $R^9$, $R^{10}$, $R^{15}$, $R^{16}$, and $R^{17}$ are optionally substituted by halogen, —$NR^{11}_2$, —$OR^{11}$ or —$SiR^{12}_3$;
wherein $R^3$ optionally bonds with $R^4$, $R^4$ optionally bonds with $R^5$, $R^7$ optionally bonds with $R^{10}$, $R^{10}$ optionally bonds with $R^9$, $R^9$ optionally bonds with $R^8$, $R^{17}$ optionally bonds with $R^{16}$, and $R^{16}$ optionally bonds with $R^{15}$, in each case to independently form a five-, six- or seven-membered carbocyclic or heterocyclic ring, the heterocyclic ring comprising at least one atom from the group consisting of N, P, O and S;
$R^{13}$ is $C_1$-$C_{20}$-alkyl bonded with the aryl ring via a primary or secondary carbon atom;
$R^{14}$ is chlorine, bromine, iodine, —$CF_3$ or —$OR^{11}$, or $C_1$-$C_{20}$-alkyl bonded with the aryl ring;
each $R^{11}$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or —$SiR^{12}_3$, wherein $R^{11}$ is optionally substituted by halogen, or two $R^{11}$ radicals optionally bond to form a five- or six-membered ring;
each $R^{12}$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or two $R^{12}$ radicals optionally bond to form a five- or six-membered ring;
each of $E^1$, $E^2$, and $E^3$ is independently carbon, nitrogen or phosphorus;
each u is independently 0 if $E^1$, $E^2$, and $E^3$ is nitrogen or phosphorus and is 1 if $E^1$, $E^2$, and $E^3$ is carbon;
each X is independently fluorine, chlorine, bromine, iodine, hydrogen, $C_1$-$C_{20}$-alkyl, $C_2$-$C_{10}$-alkenyl, $C_6$-$C_{20}$-aryl, arylalkyl where alkyl has from 1 to 10 carbon atoms and aryl has from 6 to 20 carbon atoms, —$NR^{18}_2$, —$OR^{18}$, —$SR^{18}$, —$SO_3R^{18}$, —$OC(O)R^{18}$, —CN, —SCN, β-diketonate, —CO, —$BF_4^-$, —$PF_6^-$ or bulky non-coordinating anions, and the radicals X can be bonded with one another;
each $R^{18}$ is independently hydrogen, $C_1$-$C_{20}$-alkyl, $C_2$-$C_{20}$-alkenyl, $C_6$-$C_{20}$-aryl, arylalkyl where alkyl has from 1 to 10 carbon atoms and aryl has from 6 to 20 carbon atoms, or —$SiR^{19}_3$, wherein $R^{18}$ can be substituted by halogen or nitrogen- or oxygen-containing groups and two $R^{18}$ radicals optionally bond to form a five- or six-membered ring;
each $R^{19}$ is independently hydrogen, $C_1$-$C_{20}$-alkyl, $C_2$-$C_{20}$-alkenyl, $C_6$-$C_{20}$-aryl or arylalkyl where alkyl has from 1 to 10 carbon atoms and aryl has from 6 to 20 carbon atoms, wherein $R^{19}$ can be substituted by halogen or nitrogen- or oxygen-containing groups or two $R^{19}$ radicals optionally bond to form a five- or six-membered ring;
s is 1, 2, or 3;
D is a neutral donor; and
t is 0 to 2.

In Embodiments, the Catalyst Compounds is One or More of:
(1E,1'E)-1,1'-(pyridine-2,6-diyl)bis(N-(2-chloro-4,6-dimethylphenyl)ethan-1-imine)$FeCl_3$;
(1E,1'E)-1,1'-(pyridine-2,6-diyl)bis(N-(2-chloro-4,6-dimethylphenyl)ethan-1-imine)$FeCl_2$;
(1E,1'E)-1,1'-(pyridine-2,6-diyl)bis(N-(2-chloro-4,6-isopropylphenyl)ethan-1-imine)$FeCl_2$;
(1E,1'E)-1,1'-(pyridine-2,6-diyl)bis(N-(2-chloro-4-methyl-6-tert-butylphenyl)ethan-1-imine)$FeCl_2$;
(1E,1'E)-1,1'-(pyridine-2,6-diyl)bis(N-(2-chloro-6-methylphenyl)ethan-1-imine)$FeCl_2$; and
(1E,1'E)-1,1'-(pyridine-2,6-diyl)bis(N-(2-chloro-6-methylphenyl)ethan-1-imine)$FeCl_3$.

In another embodiment, the catalyst is a phenoxyimine compound represented by the Formula (VII):

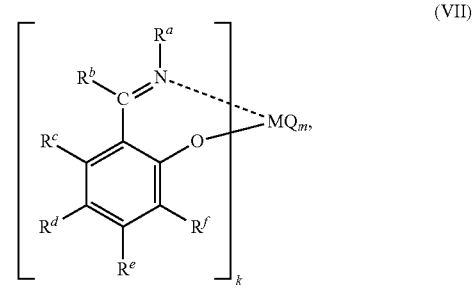

(VII)

wherein M represents a transition metal atom selected from the groups 3 to 11 metals in the periodic table; k is an integer of 1 to 6; m is an integer of 1 to 6; $R^a$ to $R^f$ may be the same or different from one another and each represent a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group or a tin-containing group, among which 2 or more groups may be bound to each other to form a ring; when k is 2 or more, $R^a$ groups, $R^b$ groups, $R^c$ groups, $R^d$ groups, $R^e$ groups, or $R^f$ groups may be the same or different from one another, one group of $R^a$ to $R^f$ contained in one ligand and one group of $R^a$ to $R^f$ contained in another ligand may form a linking group or a single bond, and a heteroatom contained in $R^a$ to $R^f$ may coordinate with or bind to M; m is a number satisfying the valence of M; Q represents a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group; when m is 2 or more, a plurality of groups represented by Q may be the same or different from one another, and a plurality of groups represented by Q may be mutually bound to form a ring.

In another embodiment, the catalyst is a bis(imino)pyridyl of the Formula (VIII):

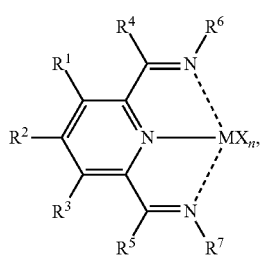

(VIII)

wherein:
M is Co or Fe; each X is an anion; n is 1, 2 or 3, so that the total number of negative charges on said anion or anions is equal to the oxidation state of a Fe or Co atom present in Formula (VIII);
$R^1$, $R^2$ and $R^3$ are each independently hydrogen, hydrocarbyl, substituted hydrocarbyl, or an inert functional group;
$R^4$ and $R^5$ are each independently hydrogen, hydrocarbyl, an inert functional group or substituted hydrocarbyl;
$R^6$ is Formula (IX):

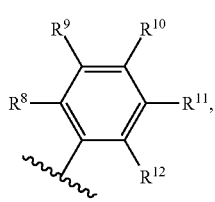

(IX)

and
$R^7$ is Formula (X):

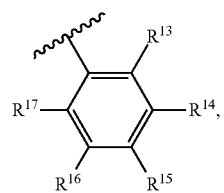

(X)

$R^8$ and $R^{13}$ are each independently hydrocarbyl, substituted hydrocarbyl or an inert functional group;
$R^9 R^{10}$, $R^{11}$, $R^{14}$, $R^{15}$ and $R^{16}$ are each independently hydrogen, hydrocarbyl, substituted hydrocarbyl or an inert functional group;
$R^{12}$ and $R^{17}$ are each independently hydrogen, hydrocarbyl, substituted hydrocarbyl or an inert functional group;
and provided that any two of $R^8$, $R^9$, $R^{10}$, $R^{11}$, $R^{12}$, $R^{13}$, $R^{14}$, $R^{15} R^{16}$ and $R^{17}$ that are adjacent to one another, together may form a ring.

In at least one embodiment, the catalyst compound is represented by the Formula (XI).

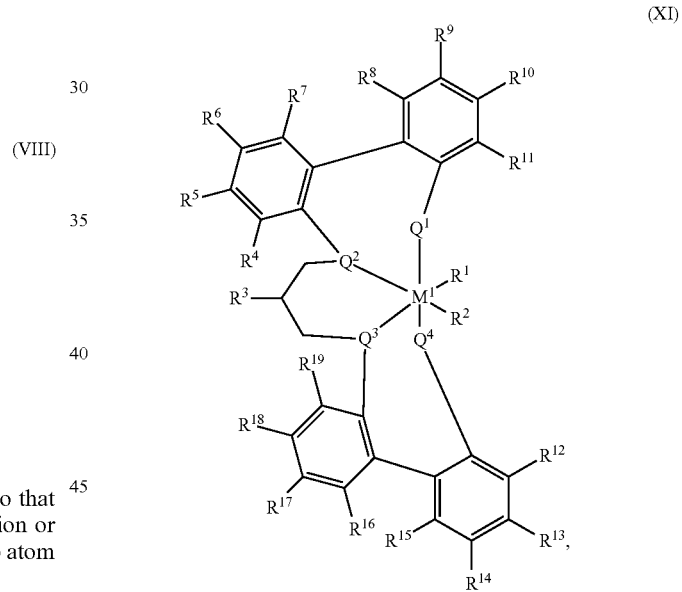

(XI)

$M^1$ is selected from the group consisting of titanium, zirconium, hafnium, vanadium, niobium, tantalum, chromium, molybdenum and tungsten. In at least one embodiment, $M^1$ is zirconium.

Each of $Q^1$, $Q^2$, $Q^3$, and $Q^4$ is independently oxygen or sulfur. In at least one embodiment, at least one of $Q^1$, $Q^2$, $Q^3$, and $Q^4$ is oxygen, alternately all of $Q^1$, $Q^2$, $Q^3$, and $Q^4$ are oxygen.

$R^1$ and $R^2$ are independently hydrogen, halogen, hydroxyl, hydrocarbyl, or substituted hydrocarbyl (such as $C_1$-$C_{10}$ alkyl, $C_1$-$C_{10}$ alkoxy, $C_6$-$C_{20}$ aryl, $C_6$-$C_{10}$ aryloxy, $C_2$-$C_{10}$ alkenyl, $C_2$-$C_{40}$ alkenyl, $C_7$-$C_{40}$ arylalkyl, $C_7$-$C_{40}$ alkylaryl, $C_8$-$C_{40}$ arylalkenyl, or conjugated diene which is optionally substituted with one or more hydrocarbyl, tri(hydrocarbyl) silyl or tri(hydrocarbyl) silylhydrocarbyl, the diene having up to 30 atoms other than hydrogen). $R^1$ and $R^2$ can be a halogen selected from fluorine, chlorine, bromine, or iodine. Preferably, $R^1$ and $R^2$ are chlorine.

Alternatively, $R^1$ and $R^2$ may also be joined together to form an alkanediyl group or a conjugated $C_4$-$C_{40}$ diene ligand which is coordinated to $M^1$. $R^1$ and $R^2$ may also be identical or different conjugated dienes, optionally substituted with one or more hydrocarbyl, tri(hydrocarbyl) silyl or tri(hydrocarbyl) silylhydrocarbyl, the dienes having up to 30 atoms not counting hydrogen and/or forming a π-complex with $M^1$.

Exemplary groups suitable for $R^1$ and or $R^2$ can include 1,4-diphenyl, 1,3-butadiene, 1,3-pentadiene, 2-methyl 1,3-pentadiene, 2,4-hexadiene, 1-phenyl, 1,3-pentadiene, 1,4-dibenzyl, 1,3-butadiene, 1,4-ditolyl-1,3-butadiene, 1,4-bis (trimethylsilyl)-1,3-butadiene, and 1,4-dinaphthyl-1,3-butadiene. $R^1$ and $R^2$ can be identical and are $C_1$-$C_3$ alkyl or alkoxy, $C_6$-$C_{10}$ aryl or aryloxy, $C_2$-$C_4$ alkenyl, $C_7$-$C_{10}$ arylalkyl, $C_7$-$C_{12}$ alkylaryl, or halogen.

Each of $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, and $R^{19}$ is independently hydrogen, halogen, $C_1$-$C_{40}$ hydrocarbyl or $C_1$-$C_{40}$ substituted hydrocarbyl (such as $C_1$-$C_{10}$ alkyl, $C_1$-$C_{10}$ alkoxy, $C_6$-$C_{20}$ aryl, $C_6$-$C_{10}$ aryloxy, $C_2$-$C_{10}$ alkenyl, $C_2$-$C_{40}$ alkenyl, $C_7$-$C_{40}$ arylalkyl, $C_7$-$C_{40}$ alkylaryl, $C_8$-$C_{40}$ arylalkenyl, or conjugated diene which is optionally substituted with one or more hydrocarbyl, tri(hydrocarbyl) silyl or tri(hydrocarbyl) silylhydrocarbyl, the diene having up to 30 atoms other than hydrogen), —$NR'_2$, —$SR'$, —$OR$, —$OSiR'_3$, —$PR'_2$, where each $R'$ is hydrogen, halogen, $C_1$-$C_{10}$ alkyl, or $C_6$-$C_{10}$ aryl, or one or more of $R^4$ and $R^5$, $R^5$ and $R^6$, $R^6$ and $R^7$, $R^8$ and $R^9$, $R^9$ and $R^{10}$, $R^{10}$ and $R^{11}$, $R^{12}$ and $R^{13}$, $R^{13}$ and $R^{14}$, $R^{14}$ and $R^{15}$, $R^{16}$ and $R^{17}$, $R^{17}$ and $R^{18}$, and $R^{18}$ and $R^{19}$ are joined to form a saturated ring, unsaturated ring, substituted saturated ring, or substituted unsaturated ring. In at least one embodiment, $C_1$-$C_{40}$ hydrocarbyl is selected from methyl, ethyl, propyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, and sec-decyl. Preferably, $R^{11}$ and $R^{12}$ are $C_6$-$C_{10}$ aryl such as phenyl or naphthyl optionally substituted with $C_1$-$C_{40}$ hydrocarbyl, such as $C_1$-$C_{10}$ hydrocarbyl. Preferably, $R^6$ and $R^{17}$ are $C_{1-40}$ alkyl, such as $C_1$-$C_{10}$ alkyl.

In at least one embodiment, each of $R^4$, $R^5$, $R^6$, $R^7$, $R^8$, $R^9$, $R^{10}$, $R^{13}$, $R^{14}$, $R^{15}$, $R^{16}$, $R^{17}$, $R^{18}$, and $R^{19}$ is independently hydrogen or $C_1$-$C_{40}$ hydrocarbyl. In at least one embodiment, $C_1$-$C_{40}$ hydrocarbyl is selected from methyl, ethyl, propyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, and sec-decyl. Preferably, each of $R^6$ and $R^{17}$ is $C_1$-$C_{40}$ hydrocarbyl and $R^4$, $R^5$, $R^7$, $R^8$, $R^9$, $R^{10}$, $R^{13}$, $R^{14}$, $R^{15}$, $R^{16}$, $R^{18}$, and $R^{19}$ is hydrogen. In at least one embodiment, $C_1$-$C_{40}$ hydrocarbyl is selected from methyl, ethyl, propyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, and sec-decyl.

$R^3$ is a $C_1$-$C_{40}$ unsaturated alkyl or substituted $C_1$-$C_{40}$ unsaturated alkyl (such as $C_1$-$C_{10}$ alkyl, $C_1$-$C_{10}$ alkoxy, $C_6$-$C_{20}$ aryl, $C_6$-$C_{10}$ aryloxy, $C_2$-$C_{10}$ alkenyl, $C_2$-$C_{40}$ alkenyl, $C_7$-$C_{40}$ arylalkyl, $C_7$-$C_{40}$ alkylaryl, $C_8$-$C_{40}$ arylalkenyl, or conjugated diene which is optionally substituted with one or more hydrocarbyl, tri(hydrocarbyl) silyl or tri(hydrocarbyl) silylhydrocarbyl, the diene having up to 30 atoms other than hydrogen).

Preferably, $R^3$ is a hydrocarbyl comprising a vinyl moiety. As used herein, "vinyl" and "vinyl moiety" are used interchangeably and include a terminal alkene, e.g., represented by the structure

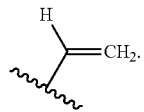

Hydrocarbyl of $R^3$ may be further substituted (such as $C_1$-$C_{10}$ alkyl, $C_1$-$C_{10}$ alkoxy, $C_6$-$C_{20}$ aryl, $C_6$-$C_{10}$ aryloxy, $C_2$-$C_{10}$ alkenyl, $C_2$-$C_{40}$ alkenyl, $C_7$-$C_{40}$ arylalkyl, $C_7$-$C_{40}$ alkylaryl, $C_8$-$C_{40}$ arylalkenyl, or conjugated diene which is optionally substituted with one or more hydrocarbyl, tri(hydrocarbyl) silyl or tri(hydrocarbyl) silylhydrocarbyl, the diene having up to 30 atoms other than hydrogen). Preferably, $R^3$ is $C_1$-$C_{40}$ unsaturated alkyl that is vinyl or substituted $C_1$-$C_{40}$ unsaturated alkyl that is vinyl. $R^3$ can be represented by the structure —$R'CH=CH_2$ where $R'$ is $C_1$-$C_{40}$ hydrocarbyl or $C_1$-$C_{40}$ substituted hydrocarbyl (such as $C_1$-$C_{10}$ alkyl, $C_1$-$C_{10}$ alkoxy, $C_6$-$C_{20}$ aryl, $C_6$-$C_{10}$ aryloxy, $C_2$-$C_{10}$ alkenyl, $C_2$-$C_{40}$ alkenyl, $C_7$-$C_{40}$ arylalkyl, $C_7$-$C_{40}$ alkylaryl, $C_5$-$C_{40}$ arylalkenyl, or conjugated diene which is optionally substituted with one or more hydrocarbyl, tri(hydrocarbyl) silyl or tri(hydrocarbyl) silylhydrocarbyl, the diene having up to 30 atoms other than hydrogen). In at least one embodiment, $C_1$-$C_{40}$ hydrocarbyl is selected from methyl, ethyl, propyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, and sec-decyl.

In at least one embodiment, $R^3$ is 1-propenyl, 1-butenyl, 1-pentenyl, 1-hexenyl, 1-heptenyl, 1-octenyl, 1-nonenyl, or 1-decenyl.

In at least one embodiment, the catalyst is a Group 15-containing metal compound represented by Formulas (XII) or (XIII):

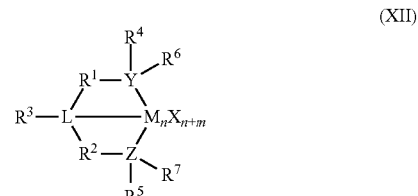

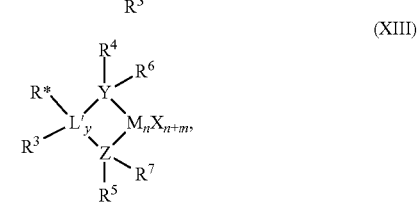

wherein M is a Group 3 to 12 transition metal or a Group 13 or 14 main group metal, a Group 4, 5, or 6 metal. In many embodiments, M is a Group 4 metal, such as zirconium, titanium, or hafnium. Each X is independently a leaving group, such as an anionic leaving group. The leaving group may include a hydrogen, a hydrocarbyl group, a heteroatom, a halogen, or an alkyl; y is 0 or 1 (when y is 0 group L' is absent). The term 'n' is the oxidation state of M. In various embodiments, n is +3, +4, or +5. In many embodiments, n is +4. The term 'm' represents the formal charge of the YZL or the YZL' ligand, and is 0, −1, −2 or −3 in various embodiments. In many embodiments, m is −2. L is a Group 15 or 16 element, such as nitrogen or oxygen; L' is a Group 15 or 16 element or Group 14 containing group, such as carbon, silicon or germanium. Y is a Group 15 element, such as nitrogen or phosphorus. In many embodiments, Y is nitrogen. Z is a Group 15 element, such as nitrogen or phosphorus. In many embodiments, Z is nitrogen. $R^1$ and $R^2$ are, independently, a $C_1$ to $C_{20}$ hydrocarbon group, a heteroatom containing group having up to twenty carbon atoms, silicon, germanium, tin, lead, or phosphorus. In many embodiments, $R^1$ and $R^2$ are a $C_2$ to $C_{20}$ alkyl, aryl or aralkyl group, such as a $C_2$ to $C_{20}$ linear, branched or cyclic alkyl group, or a $C_2$ to $C_{20}$ hydrocarbon group. $R^1$ and $R^2$ may also be interconnected to each other. $R^3$ may be absent or may be a hydrocarbon group, a hydrogen, a halogen, a heteroatom containing group. In many embodiments, $R^3$ is absent, for example, if L is an oxygen, or a hydrogen, or a linear, cyclic, or branched alkyl group having 1 to 20 carbon atoms. $R^4$ and $R^5$ are independently an alkyl group, an aryl group, substituted aryl group, a cyclic alkyl group, a substituted cyclic alkyl group, a cyclic aralkyl group, a substituted cyclic aralkyl group, or multiple ring system, often having up to 20 carbon atoms. In many embodiments, $R^4$ and $R^5$ have between 3 and 10 carbon atoms, or are a $C_1$ to $C_{20}$ hydrocarbon group, a $C_1$ to $C_{20}$ aryl group or a $C_1$ to $C_{20}$ aralkyl group, or a heteroatom containing group. $R^4$ and $R^5$ may be interconnected to each other. $R^6$ and $R^7$ are independently absent, hydrogen, an alkyl group, halogen, heteroatom, or a hydrocarbyl group, such as a linear, cyclic or branched alkyl group having 1 to 20 carbon atoms. In many embodiments, $R^6$ and $R^7$ are absent. R* may be absent, or may be a hydrogen, a Group 14 atom containing group, a halogen, or a heteroatom containing group.

By "formal charge of the YZL or YZL' ligand," it is meant the charge of the entire ligand absent the metal and the leaving groups X. By "$R^1$ and $R^2$ may also be interconnected" it is meant that $R^1$ and $R^2$ may be directly bound to each other or may be bound to each other through other groups. By "$R^4$ and $R^5$ may also be interconnected" it is meant that $R^4$ and $R^5$ may be directly bound to each other or may be bound to each other through other groups. An alkyl group may be linear, branched alkyl radicals, alkenyl radicals, alkynyl radicals, cycloalkyl radicals, aryl radicals, acyl radicals, aroyl radicals, alkoxy radicals, aryloxy radicals, alkylthio radicals, dialkylamino radicals, alkoxycarbonyl radicals, aryloxycarbonyl radicals, carbamoyl radicals, alkyl- or dialkyl-carbamoyl radicals, acyloxy radicals, acylamino radicals, arylamino radicals, straight, branched or cyclic, alkylene radicals, or combination thereof. An aralkyl group is defined to be a substituted aryl group.

In one or more embodiments, $R^4$ and $R^5$ are independently a group represented by structure (XIV):

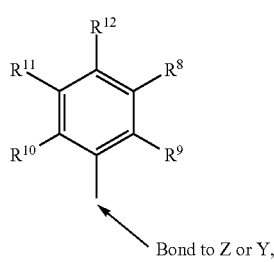

(XIV)

wherein $R^8$ to $R^{12}$ are each independently hydrogen, a $C_1$ to $C_{40}$ alkyl group, a halide, a heteroatom, a heteroatom containing group containing up to 40 carbon atoms. In many embodiments, $R^8$ to $R^{12}$ are a $C_1$ to $C_{20}$ linear or branched alkyl group, such as a methyl, ethyl, propyl, or butyl group. Any two of the R groups may form a cyclic group and/or a heterocyclic group. The cyclic groups may be aromatic. In one embodiment $R^9$, $R^{10}$ and $R^{12}$ are independently a methyl, ethyl, propyl, or butyl group (including all isomers). In another embodiment, $R^9$, $R^{10}$ and $R^{12}$ are methyl groups, and $R^8$ and $R^{11}$ are hydrogen.

In one or more embodiments, $R^4$ and $R^5$ are both a group represented by structure (XV):

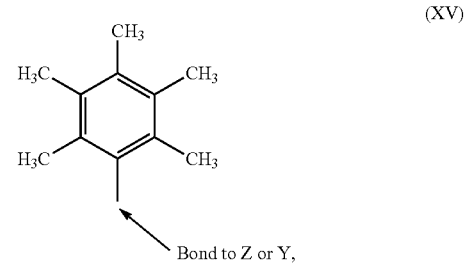

(XV)

wherein M is a Group 4 metal, such as zirconium, titanium, or hafnium. In at least one embodiment, M is zirconium. Each of L, Y, and Z may be a nitrogen. Each of $R^1$ and $R^2$ may be —$CH_2$—$CH_2$—. $R^3$ may be hydrogen, and $R^6$ and $R^7$ may be absent.

In at least one embodiment, the catalyst is a group 4 pyridyl bis(phenolate) complex represented by Formula (A):

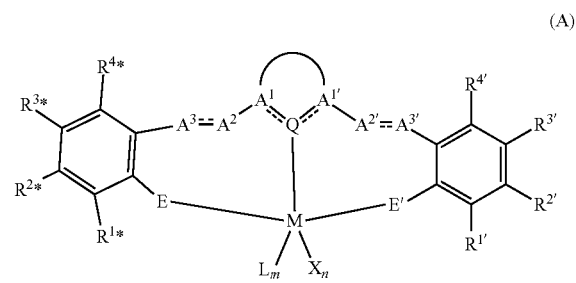

(A)

wherein:
M is a group 3-6 transition metal or Lanthanide;
E and E' are each independently O, S, or $NR^9$, where $R^9$ is independently hydrogen, $C_1$-$C_{40}$ hydrocarbyl, $C_1$-$C_{40}$ substituted hydrocarbyl, or a heteroatom-containing group;
Q is group 14, 15, or 16 atom that forms a dative bond to metal M;
$A^1QA^{1'}$ are part of a heterocyclic Lewis base containing 4 to 40 non-hydrogen atoms that links $A^2$ to $A^{2'}$ via a 3-atom bridge with Q being the central atom of the 3-atom bridge, $A^1$ and $A^{1'}$ are independently C, N, or $C(R^{22})$, where $R^{22}$ is selected from hydrogen, $C_1$-$C_{20}$ hydrocarbyl, $C_1$-$C_{20}$ substituted hydrocarbyl;
$A^3\text{===}A^2$ is a divalent group containing 2 to 40 non-hydrogen atoms that links $A^1$ to the E-bonded aryl group via a 2-atom bridge;
$A^{2'}\text{===}A^{3'}$ is a divalent group containing 2 to 40 non-hydrogen atoms that links $A^{1'}$ to the E'-bonded aryl group via a 2-atom bridge;

L is a neutral Lewis base;

X is an anionic ligand;

n is 1, 2 or 3;

m is 0, 1, or 2;

n+m is not greater than 4;

each of $R^{1*}$, $R^{2*}$, $R^{3*}$, $R^{4*}$, $R^{1'}$, $R^{2'}$, $R^{3'}$, and $R^{4'}$ is independently hydrogen, $C_1$-$C_{40}$ hydrocarbyl, $C_1$-$C_{40}$ substituted hydrocarbyl, a heteroatom or a heteroatom-containing group, or one or more of $R^{1*}$ and $R^{2*}$, $R^{2*}$ and $R^{3*}$, $R^{3*}$ and $R^{4*}$, $R^{1'}$ and $R^{2'}$, $R^{2'}$ and $R^{3'}$, $R^{3'}$ and $R^{4'}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings;

any two L groups may be joined together to form a bidentate Lewis base;

an X group may be joined to an L group to form a monoanionic bidentate group;

any two X groups may be joined together to form a dianionic ligand group.

Catalyst compounds that are particularly useful in this invention include those represented by one or more of the formulas:

Complex 1

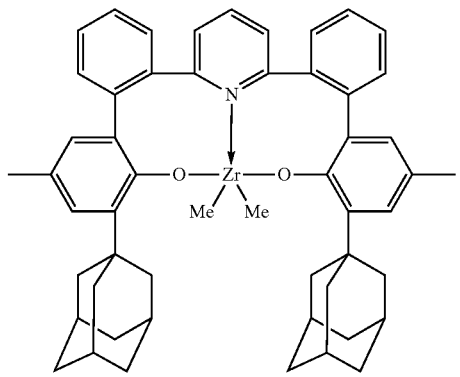

Complex 2

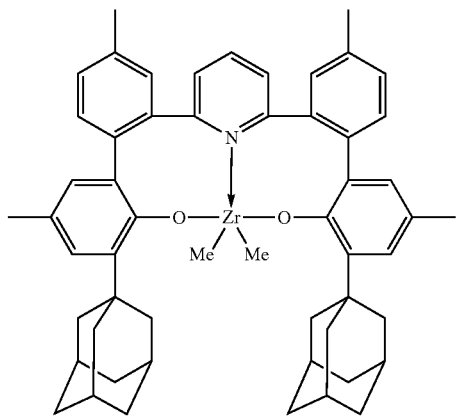

Complex 3

Complex 4

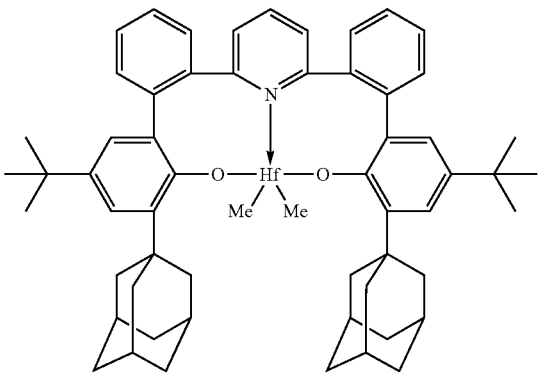

Complex 5

Complex 6

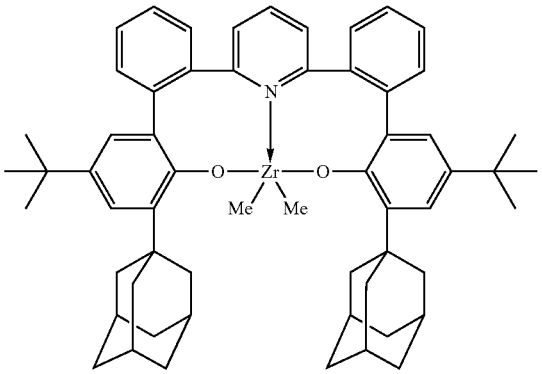

Complex 7
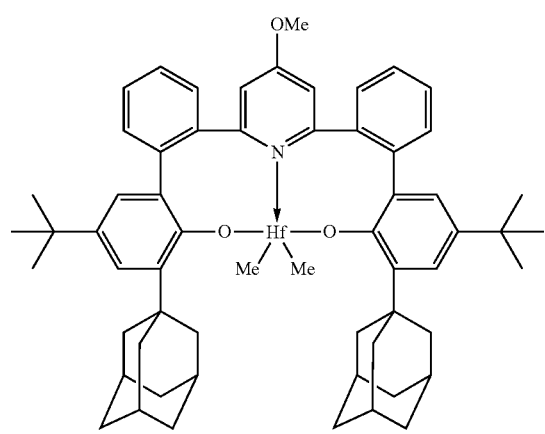
Complex 8
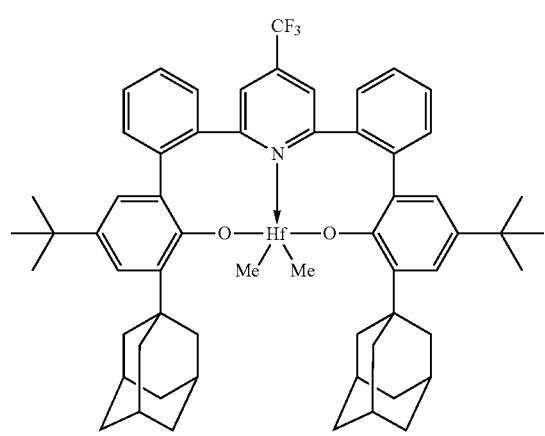
Complex 9
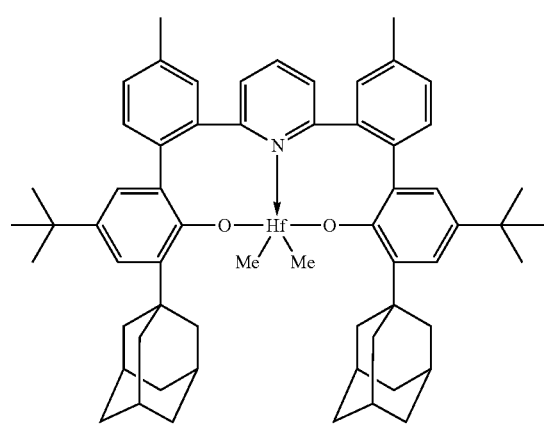
Complex 10
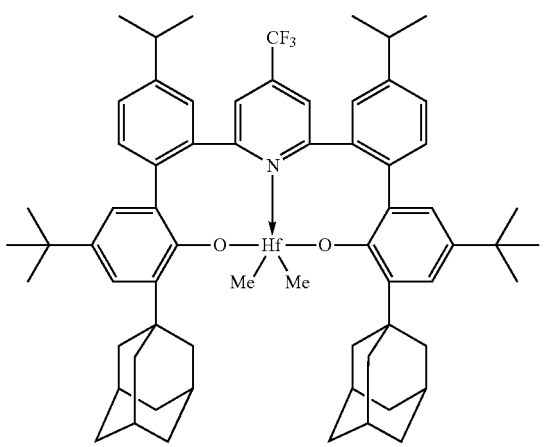
Complex 11
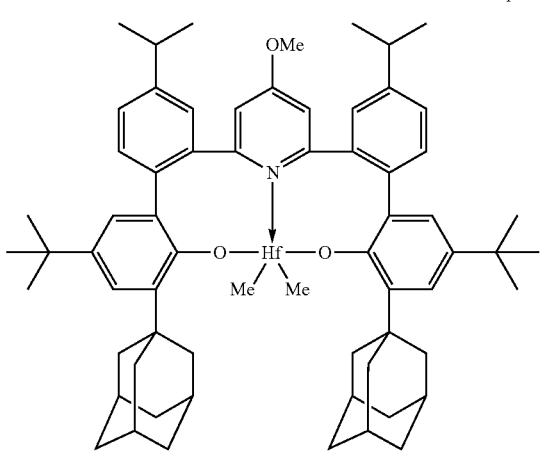
Complex 12
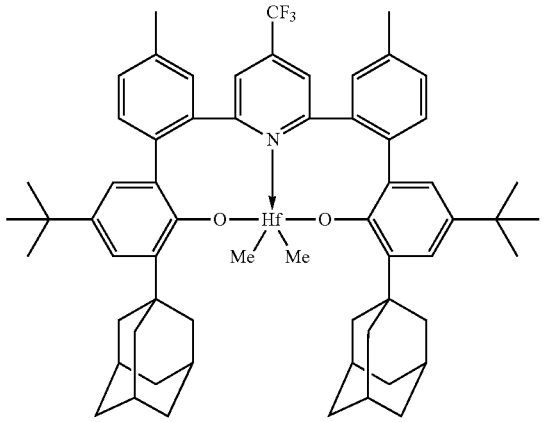

Complex 13
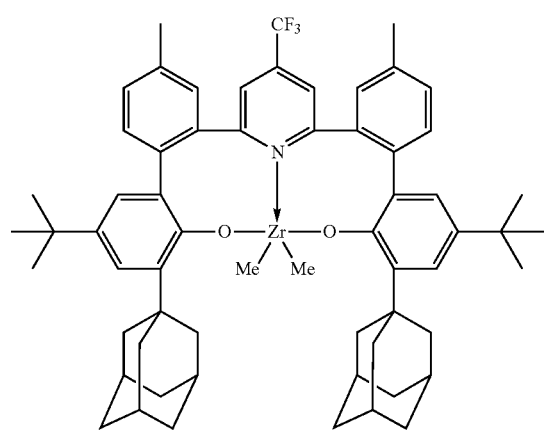
Complex 16
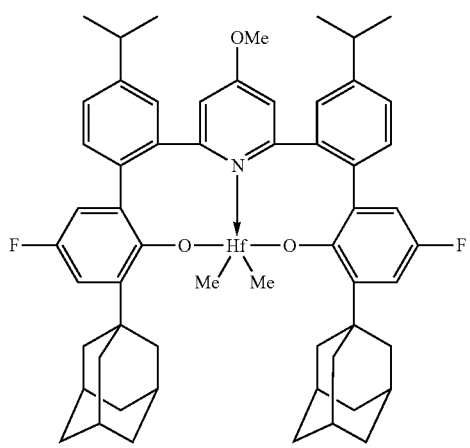
Complex 14
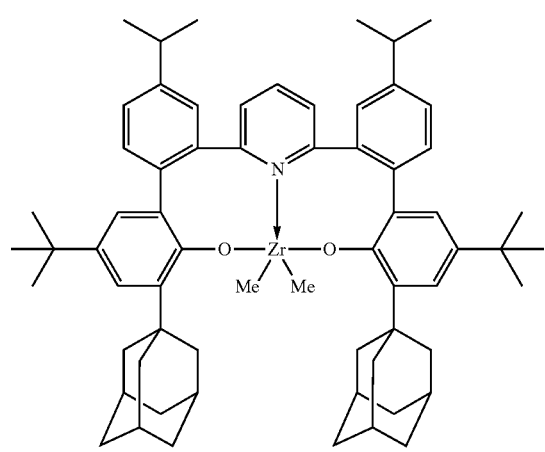
Complex 17
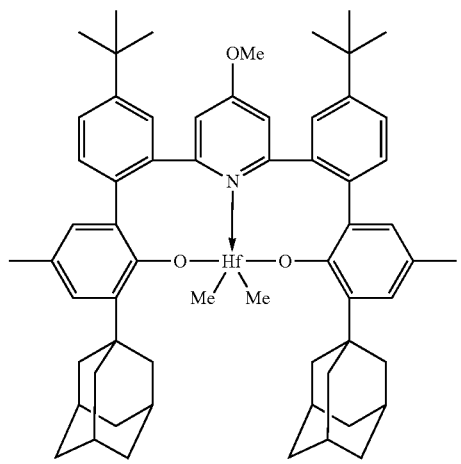
Complex 15
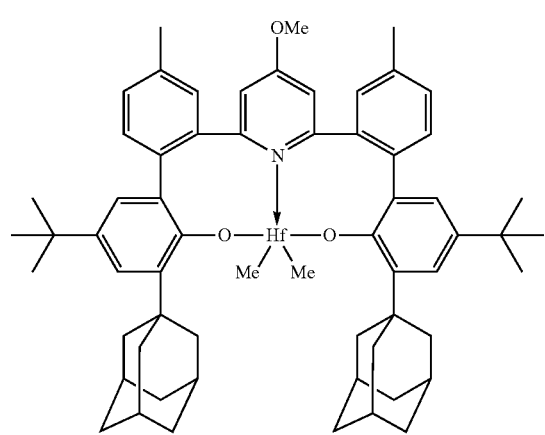
Complex 18
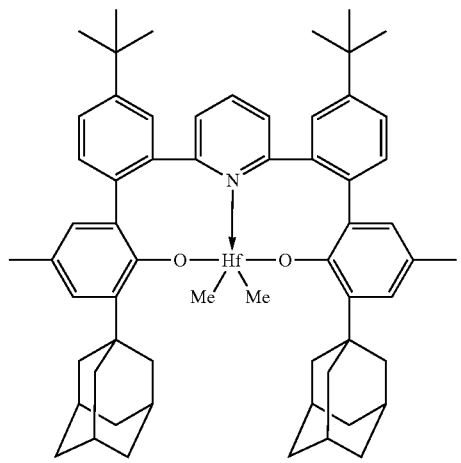

-continued
Complex 19
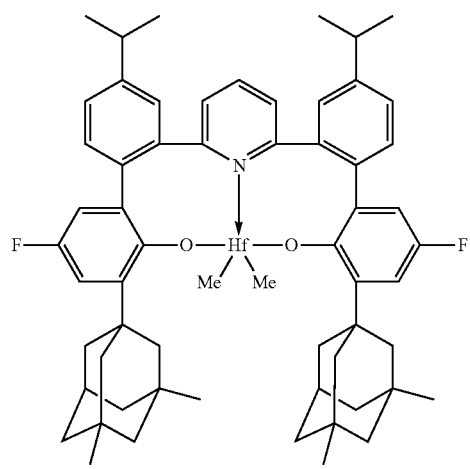
Complex 20
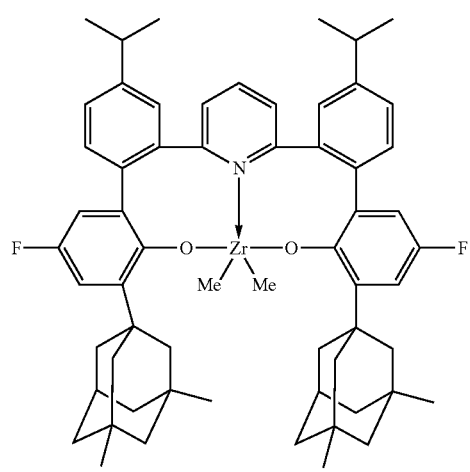
Complex 21
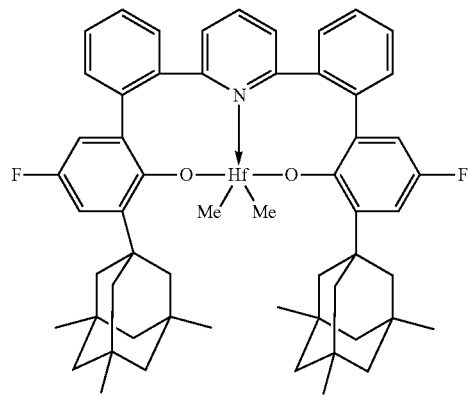
-continued
Complex 22
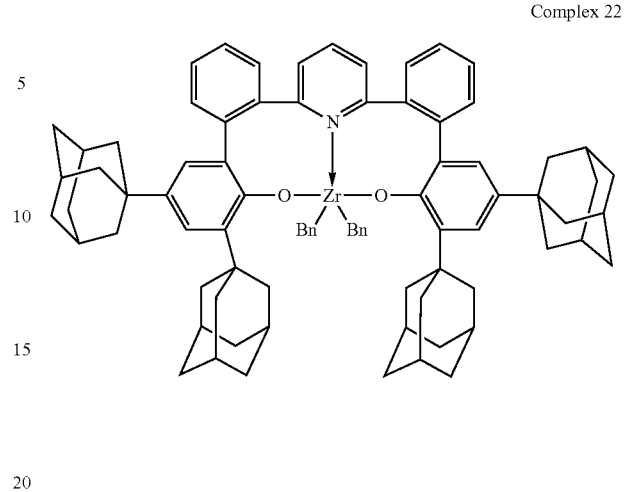
Complex 23
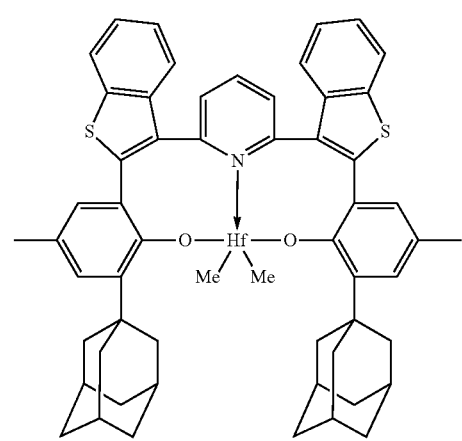
Complex 24
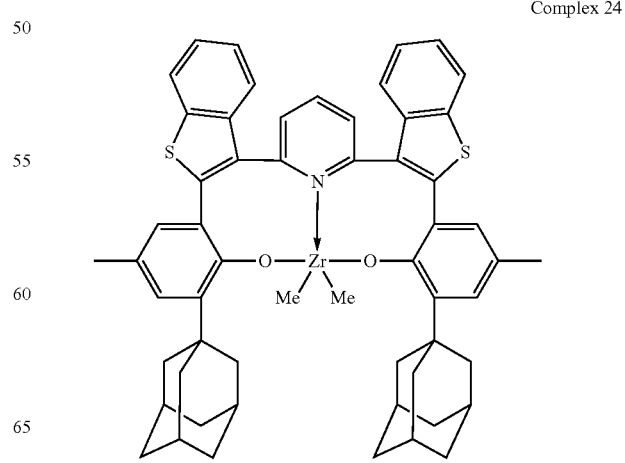

-continued
Complex 25
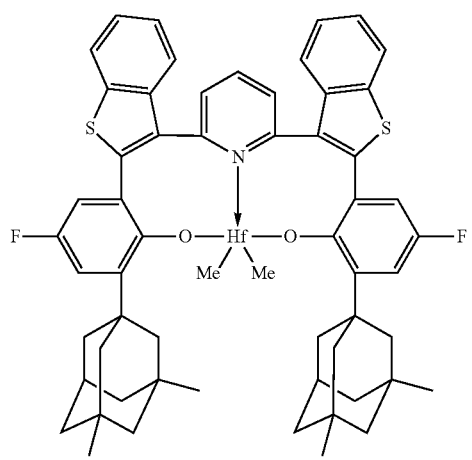
Complex 26
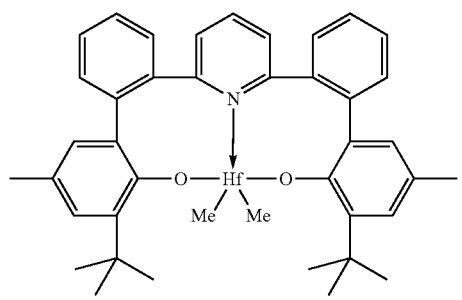
Complex 27
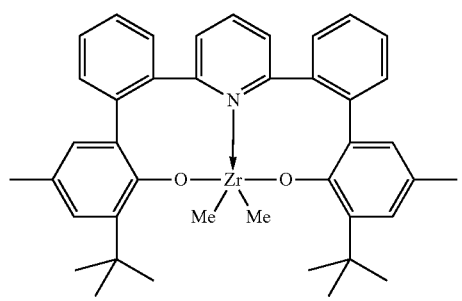
Complex 29
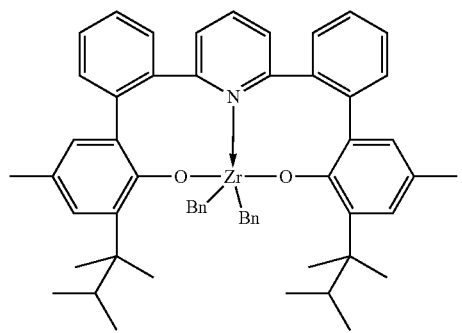
-continued
Complex 30
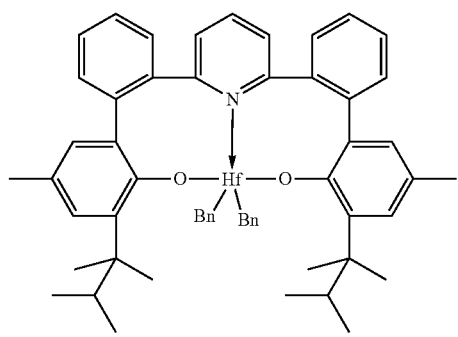
Complex 31
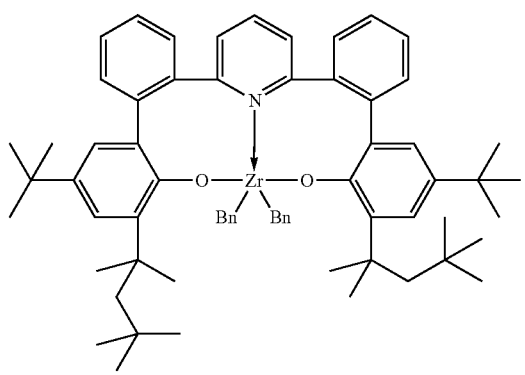
Complex 32
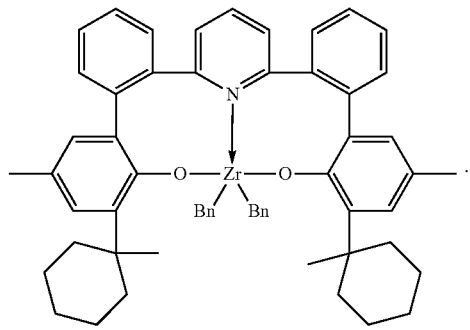
Alternately in at least one embodiment, the catalyst compound is one or more of
1
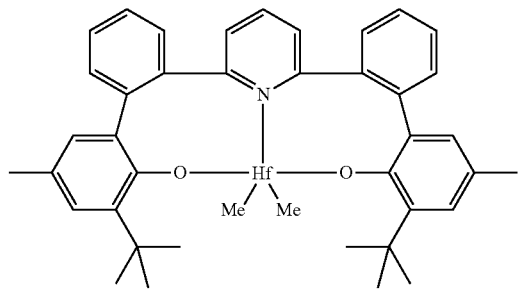

2
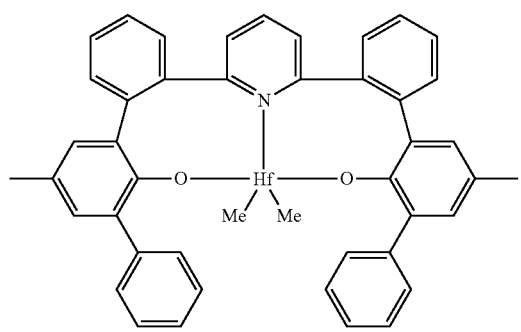
3
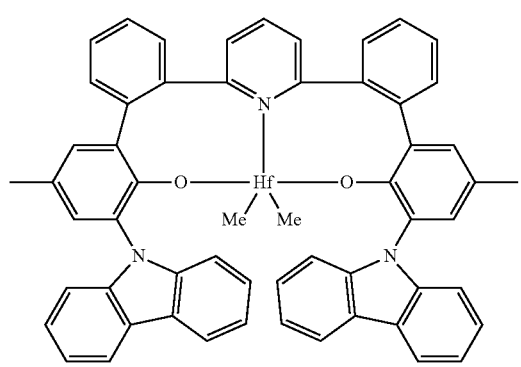
4
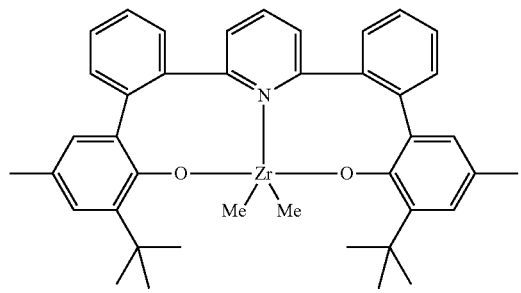
5
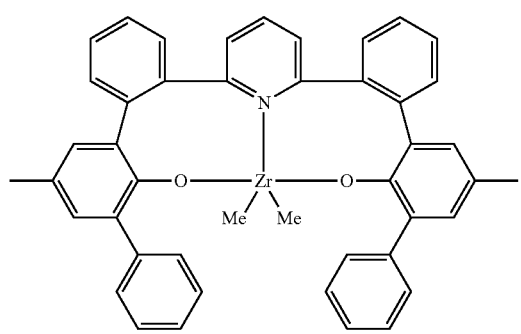
6
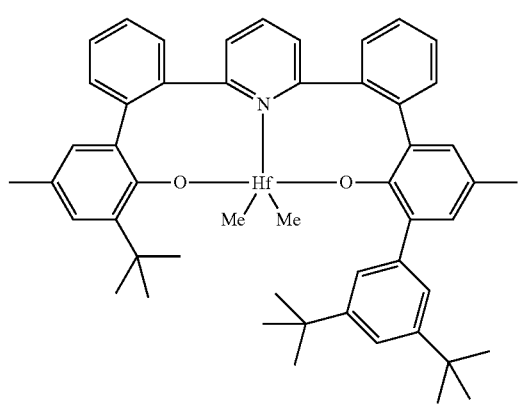
7
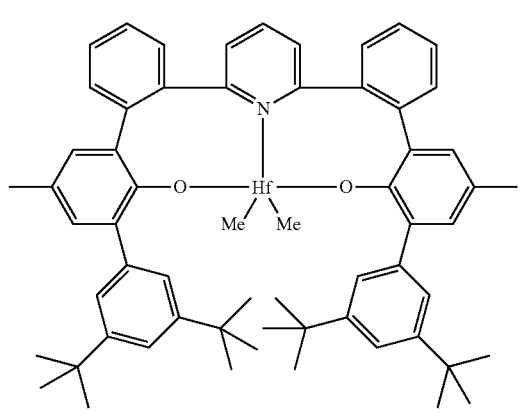
8
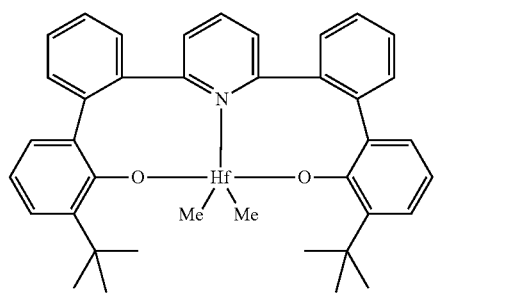
9
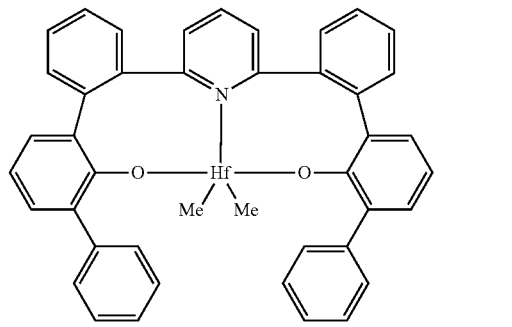

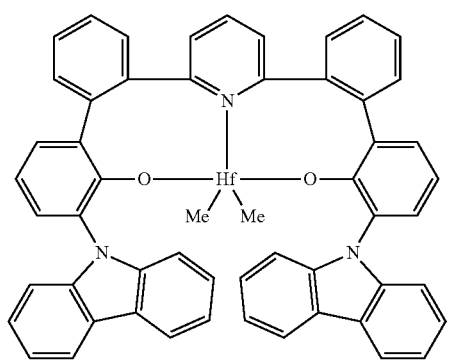
10
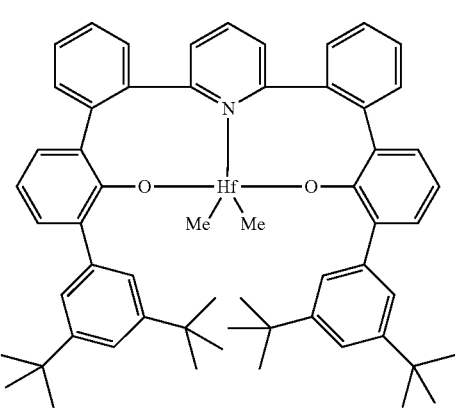
14
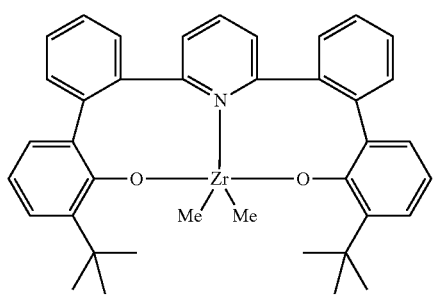
11
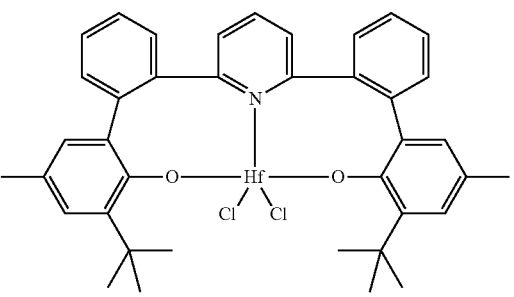
15
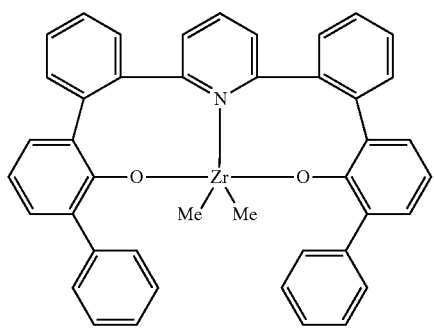
12
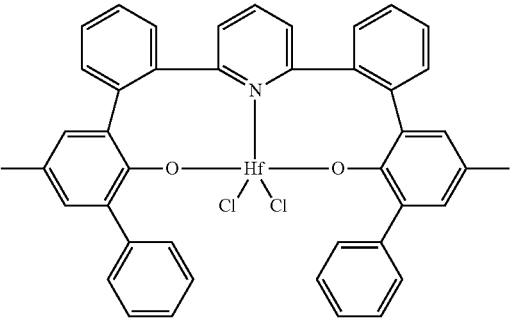
16
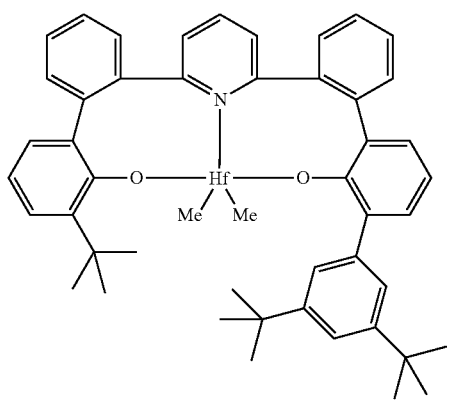
13
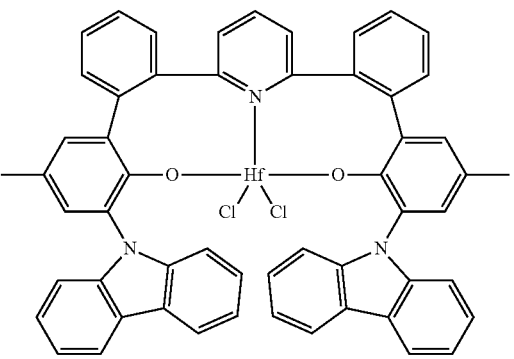
17

18
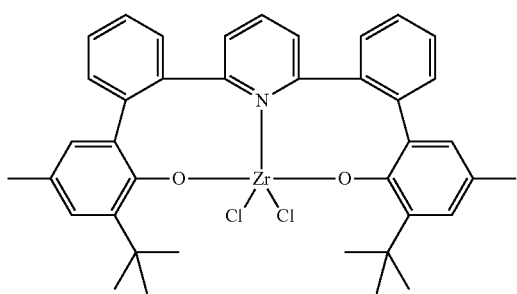
19
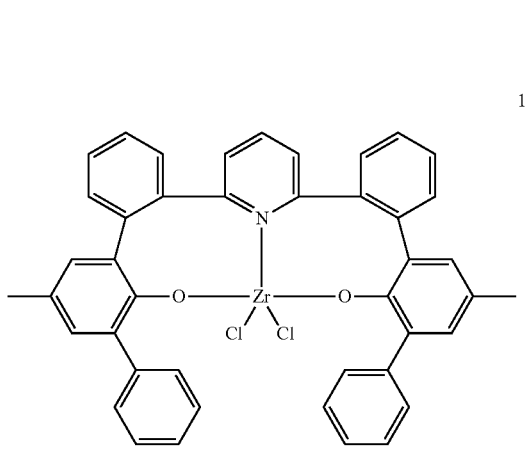
20
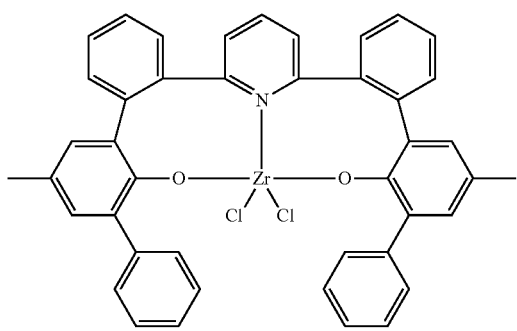
21
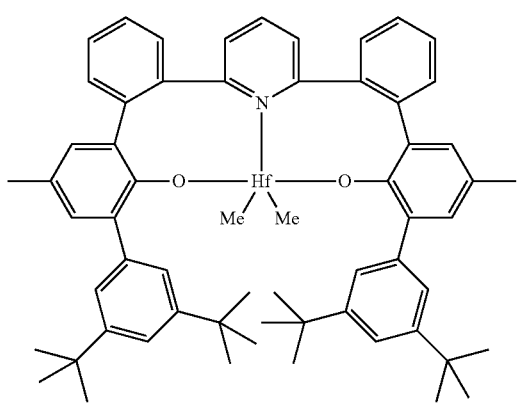
22
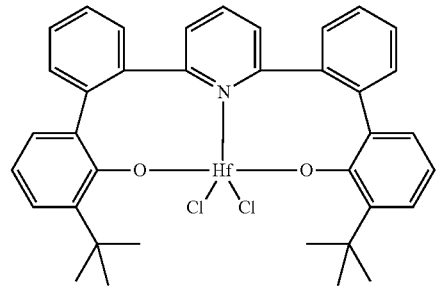
23
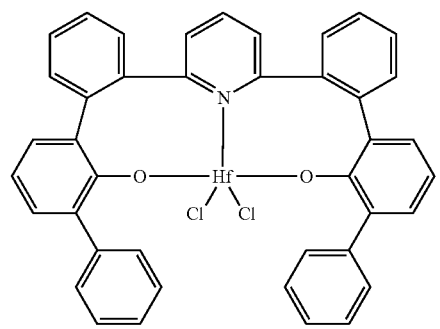
24
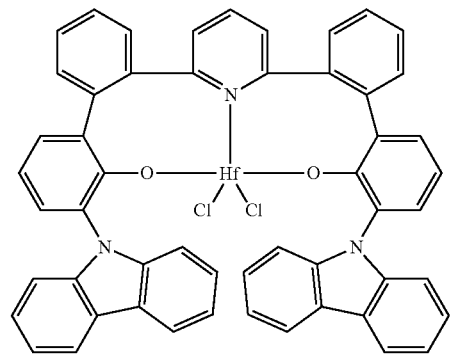
25
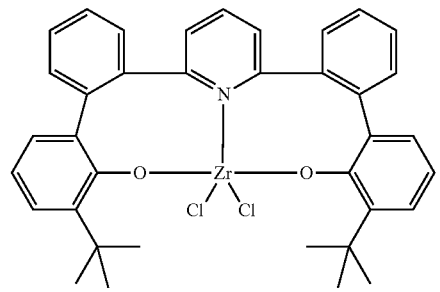
26
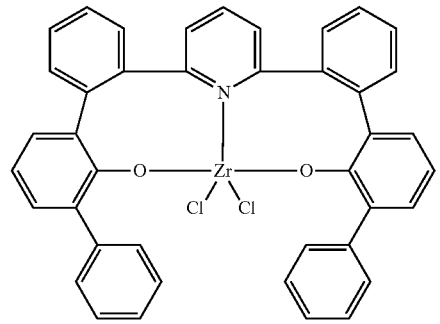

-continued

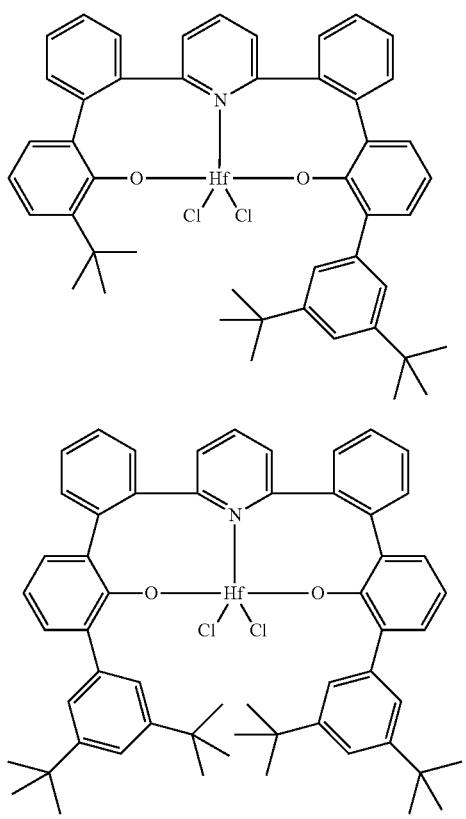

For further information on pyridyl bis phenolate catalysts, see pages 17 to 31 of U.S. Ser. No. 63/064,392, filed Aug. 11, 2020, US 2020/0255555 US 2020/0254431, US 2020/0255553; US 2020/0255556; and US 2020/0255561 which are incorporated by reference herein.

In preferred embodiments, the catalyst compounds described in WO 2019/089144 may be used herein, particularly the catalyst compounds described at page 16 to page 32 of the application as filed.

In an embodiment of any of the processes described herein one catalyst compound is used, e.g. the catalyst compounds are not different. For purposes of this invention one catalyst compound is considered different from another if they differ by at least one atom. For example "bisindenyl zirconium dichloride" is different from (indenyl)(2-methylindenyl) zirconium dichloride" which is different from "(indenyl)(2-methylindenyl)hafnium dichloride." Catalyst compounds that differ only by isomer are considered the same for purposes if this invention, e.g., rac-dimethylsilylbis(2-methyl 4-phenyl)hafnium dimethyl is considered to be the same as meso-dimethylsilylbis(2-methyl 4-phenyl)hafnium dimethyl.

In some embodiments, two or more different catalyst compounds are present in the catalyst system used herein. In some embodiments, two or more different catalyst compounds are present in the reaction zone where the process (es) described herein occur. When two transition metal compound based catalysts are used in one reactor as a mixed catalyst system, the two transition metal compounds are preferably chosen such that the two are compatible. A simple screening method such as by $^1H$ or $^{13}C$ NMR, known to those of ordinary skill in the art, can be used to determine which transition metal compounds are compatible. It is preferable to use the same activator for the transition metal compounds, however, two different activators can be used in combination.

In some embodiments, a co-activator is combined with the catalyst compound (such as halogenated catalyst compounds described above) to form an alkylated catalyst compound. Organoaluminum compounds which may be utilized as co-activators include, for example, trialkyl aluminum compounds, such as trimethylaluminum, triethylaluminum, triisobutylaluminum, tri-n-hexylaluminum, tri-n-octylaluminum, and the like, or alumoxanes.

If one or more transition metal compounds contain an anionic ligand as a leaving group which is not a hydride, hydrocarbyl, or substituted hydrocarbyl, then alumoxane, alkyl aluminum, or co-activator is typically contacted with the transition metal compounds prior to addition of a non-coordinating anion activator.

In embodiments herein, two transition metal compounds (pre-catalysts) may be used in any ratio. Preferred molar ratios of (A) transition metal compound to (B) transition metal compound fall within the range of (A:B) 1:1000 to 1000:1, alternatively 1:100 to 500:1, alternatively 1:10 to 200:1, alternatively 1:1 to 100:1, and alternatively 1:1 to 75:1, and alternatively 5:1 to 50:1. The particular ratio chosen will depend on the exact pre-catalysts chosen, the method of activation, and the end product desired. In a particular embodiment, when using the two pre-catalysts, where both are activated with the same activator, useful mole percents, based upon the molecular weight of the pre-catalysts, are 10 to 99.9% A to 0.1 to 90% B, alternatively 25 to 99% A to 0.5 to 50% B, alternatively 50 to 99% A to 1 to 25% B, and alternatively 75 to 99% A to 1 to 10% B.

Activators

The terms "cocatalyst" and "activator" are used herein interchangeably.

The catalyst systems described herein typically comprises a catalyst complex, such as the metallocene and or post metallocene complexes described above, and an activator such as alumoxane or a non-coordinating anion. These catalyst systems may be formed by combining the catalyst components described herein with activators in any manner known from the literature. The catalyst systems may also be added to or generated in solution polymerization or bulk polymerization (in the monomer). Catalyst systems of the present disclosure may have one or more activators and one, two or more catalyst components. Activators are defined to be any compound which can activate any one of the catalyst compounds described above by converting the neutral metal compound to a catalytically active metal compound cation. Non-limiting activators, for example, include alumoxanes, ionizing activators, which may be neutral or ionic, and conventional-type cocatalysts. Preferred activators typically include alumoxane compounds, modified alumoxane compounds, and ionizing anion precursor compounds that abstract a reactive metal ligand making the metal compound cationic and providing a charge-balancing non-coordinating or weakly coordinating anion, e.g. a non-coordinating anion.

Alumoxane Activators

Alumoxane activators are utilized as activators in the catalyst systems described herein. Alumoxanes are generally oligomeric compounds containing —Al($R^1$)—O— subunits, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584). Another useful alumoxane is solid polymethylaluminoxane as described in U.S. Pat. Nos. 9,340,630; 8,404,880; and 8,975,209.

When the activator is an alumoxane (modified or unmodified), typically the maximum amount of activator is at up to a 5,000-fold molar excess Al/M over the catalyst compound (per metal catalytic site). The minimum activator to catalyst-compound is a 1:1 molar ratio. Alternate preferred ranges include from 1:1 to 500:1, alternately from 1:1 to 200:1, alternately from 1:1 to 100:1, or alternately from 1:1 to 50:1.

In an alternate embodiment, little or no alumoxane is used in the polymerization processes described herein. Preferably, alumoxane is present at zero mole %, alternately the alumoxane is present at a molar ratio of aluminum to catalyst compound transition metal less than 500:1, preferably less than 300:1, preferably less than 100:1, preferably less than 1:1.

Ionizing/Non Coordinating Anion Activators

The term "non-coordinating anion" (NCA) means an anion which either does not coordinate to a cation or which is only weakly coordinated to a cation thereby remaining sufficiently labile to be displaced, typically by a neutral Lewis base. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal cation in the sense of balancing its ionic charge at +1, and yet retain sufficient lability to permit displacement during polymerization. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. Any metal or metalloid that can form a compatible, weakly coordinating complex may be used or contained in the non-coordinating anion. Suitable metals include, but are not limited to, aluminum, gold, and platinum. Suitable metalloids include, but are not limited to, boron, aluminum, phosphorus, and silicon.

It is within the scope of this invention to use an ionizing activator, neutral or ionic. It is also within the scope of this invention to use neutral or ionic activators alone or in combination with alumoxane or modified alumoxane activators.

In embodiments of the invention, the activator is represented by the Formula:

$$Z_d^+(A^{d-})$$

wherein Z is (L-H) or a reducible Lewis Acid, L is an neutral Lewis base; H is hydrogen; (L-H)$^+$ is a Bronsted acid; A$^{d-}$ is a non-coordinating anion having the charge d−; and d is an integer from 1 to 3 (such as 1, 2 or 3).

Optionally, Z is (Ar$_3$C$^+$), where Ar is aryl or aryl substituted with a heteroatom, a $C_1$ to $C_{40}$ hydrocarbyl, or a substituted $C_1$ to $C_{40}$ hydrocarbyl.

Optionally, when Z is the activating cation (L-H), it can be a Bronsted acid, capable of donating a proton to the transition metal catalytic precursor resulting in a transition metal cation, including ammoniums, oxoniums, phosphoniums, sulfoniums, and mixtures thereof, such as ammoniums of methylamine, aniline, dimethylamine, diethylamine, N-methylaniline, N-methyl-4-nonadecyl-N-octadecylaniline, N-methyl-4-octadecyl-N-octadecylaniline, diphenylamine, trimethylamine, triethylamine, N,N-dimethylaniline, methyldiphenylamine, pyridine, p-bromo N,N-dimethylaniline, p-nitro-N,N-dimethylaniline, dioctadecylmethylamine, phosphoniums from triethylphosphine, triphenylphosphine, and diphenylphosphine, oxoniums from ethers such as dimethyl ether, diethyl ether, tetrahydrofuran and dioxane, sulfoniums from thioethers, such as diethyl thioethers, tetrahydrothiophene, and mixtures thereof.

When $Z_d^+$ is the activating cation (L-H)$_d^+$, it can be represented by the formula: [R$^{1'}$ R$^{2'}$ R$^{3'}$ EH]+, wherein: E is nitrogen or phosphorous; d is 1, 2 or 3; R$^{1'}$, R$^{2'}$, and R$^{3'}$ are independently a $C_1$ to $C_{50}$ hydrocarbyl group optionally substituted with one or more alkoxy groups, silyl groups, a halogen atoms, or halogen containing groups, wherein R$^{1'}$, R$^{2'}$, and R$^{3'}$ together comprise 15 or more carbon atoms.

The anion component A$^{d-}$ includes those having the formula [M$^{k+}$Q$_n$]$^{d-}$ wherein k is 1, 2, or 3; n is 1, 2, 3, 4, 5, or 6 (preferably 1, 2, 3, or 4); n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 40 carbon atoms (optionally with the proviso that in not more than 1 occurrence is Q a halide). Preferably, each Q is a fluorinated hydrocarbyl group having 1 to 40 (such as 1 to 30, such as 1 to 20) carbon atoms, more preferably each Q is a fluorinated aryl group, such as a perfluorinated aryl group and most preferably each Q is a pentafluoryl aryl group or perfluoronaphthalenyl group. Examples of suitable A$^{d-}$ also include diboron compounds as disclosed in U.S. Pat. No. 5,447,895, which is fully incorporated herein by reference.

In particularly useful embodiments of the invention, the NCA activator is soluble in non-aromatic-hydrocarbon solvents, such as aliphatic solvents.

In one or more embodiments, a 20 wt % mixture of the NCA activator compound in n-hexane, isohexane, cyclohexane, methylcyclohexane, or a combination thereof, forms a clear homogeneous solution at 25° C., preferably a 30 wt % mixture of the activator compound in n-hexane, isohexane, cyclohexane, methylcyclohexane, or a combination thereof, forms a clear homogeneous solution at 25° C.

In embodiments of the invention, the NCA activators described herein have a solubility of more than 10 mM (or more than 20 mM, or more than 50 mM) at 25° C. (stirred 2 hours) in methylcyclohexane.

Additional useful NCA activators and the synthesis of non-aromatic-hydrocarbon soluble activators, are described in U.S. Ser. No. 16/394,166 filed Apr. 25, 2019, U.S. Ser. No. 16/394,186, filed Apr. 25, 2019, and U.S. Ser. No. 16/394,197, filed Apr. 25, 2019, which are incorporated by reference herein.

Likewise, particularly useful activators also include dimethylaniliniumtetrakis (pentafluorophenyl) borate and dimethyl anilinium tetrakis(heptafluoro-2-naphthalenyl) borate. For a more detailed description of useful activators please see WO 2004/026921 page 72, paragraph [00119] to page 81 paragraph [00151]. A list of additionally particularly useful activators that can be used in the practice of this invention may be found at page 72, paragraph [00177] to page 74, paragraph [00178] of WO 2004/046214.

For descriptions of useful activators please see U.S. Pat. Nos. 8,658,556 and 6,211,105.

Preferred Activators for Use Herein Include:
N-methyl-4-nonadecyl-N-octadecylbenzenaminium tetrakis(pentafluorophenyl)borate,
N-methyl-4-nonadecyl-N-octadecylbenzenaminium tetrakis(perfluoronaphthalenyl)borate,
N,N-dimethylanilinium tetrakis(perfluoronaphthalenyl)borate,
N,N-dimethylanilinium tetrakis(perfluorobiphenyl)borate,
N,N-dimethylanilinium tetrakis(perfluorophenyl)borate,
N,N-dimethylanilinium tetrakis(3,5-bis(trifluoromethyl)phenyl)borate,
triphenylcarbenium tetrakis(perfluoronaphthalenyl)borate,
triphenylcarbenium tetrakis(perfluorobiphenyl)borate,
triphenylcarbenium tetrakis(3,5-bis(trifluoromethyl)phenyl)borate,
triphenylcarbenium tetrakis(perfluorophenyl)borate,
$[Me_3NH^+][B(C_6F_5)_4^-]$;
1-(4-(tris(pentafluorophenyl)borate)-2,3,5,6-tetrafluorophenyl)pyrrolidinium;
4-(tris(pentafluorophenyl)borate)-2,3,5,6-tetrafluoropyridine;
dioctadecylmethylammonium tetrakis(pentafluorophenyl)borate;
dioctadecylmethylammonium tetrakis(perfluoronaphthyl)borate;
N,N-dimethylanilinium tetrakis(pentafluorophenyl)borate;
triphenylcarbenium tetrakis(pentafluorophenyl)borate;
trimethylammonium tetrakis(perfluoronaphthyl)borate;
triethylammonium tetrakis(perfluoronaphthyl)borate;
tripropylammonium tetrakis(perfluoronaphthyl)borate;
tri(n-butyl)ammonium tetrakis(perfluoronaphthyl)borate;
tri(t-butyl)ammonium tetrakis(perfluoronaphthyl)borate;
N,N-dimethylanilinium tetrakis(perfluoronaphthyl)borate;
N,N-diethylanilinium tetrakis(perfluoronaphthyl)borate;
N,N-dimethyl-(2; 4; 6-trimethylanilinium)tetrakis(perfluoronaphthyl)borate;
tropillium tetrakis(perfluoronaphthyl)borate;
triphenylcarbenium tetrakis(perfluoronaphthyl)borate;
triphenylphosphonium tetrakis(perfluoronaphthyl)borate;
triethylsilylium tetrakis(perfluoronaphthyl)borate;
benzene(diazonium)tetrakis(perfluoronaphthyl)borate;
trimethylammonium tetrakis(perfluorobiphenyl)borate;
triethylammonium tetrakis(perfluorobiphenyl)borate;
tripropylammonium tetrakis(perfluorobiphenyl)borate;
tri(n-butyl)ammonium tetrakis(perfluorobiphenyl)borate;
tri(t-butyl)ammonium tetrakis(perfluorobiphenyl)borate;
N,N-dimethylanilinium tetrakis(perfluorobiphenyl)borate;
N,N-diethylanilinium tetrakis(perfluorobiphenyl)borate;
N,N-dimethyl-(2; 4; 6-trimethylanilinium)tetrakis(perfluorobiphenyl)borate;
tropillium tetrakis(perfluorobiphenyl)borate;
triphenylcarbenium tetrakis(perfluorobiphenyl)borate;
triphenylphosphonium tetrakis(perfluorobiphenyl)borate;
triethylsilylium tetrakis(perfluorobiphenyl)borate;
benzene(diazonium)tetrakis(perfluorobiphenyl)borate;
$[4\text{-}t\text{-}butyl\text{-}PhNMe_2H][(C_6F_3(C_6F_5)_2)_4B]$;
trimethylammonium tetraphenylborate;
triethylammonium tetraphenylborate;
tripropylammonium tetraphenylborate;
tri(n-butyl)ammonium tetraphenylborate;
tri(t-butyl)ammonium tetraphenylborate;
N,N-dimethylanilinium tetraphenylborate;
N,N-diethylanilinium tetraphenylborate;
N,N-dimethyl-(2; 4; 6-trimethylanilinium)tetraphenylborate;
tropillium tetraphenylborate;
triphenylcarbenium tetraphenylborate;
triphenylphosphonium tetraphenylborate;
triethylsilylium tetraphenylborate;
benzene(diazonium)tetraphenylborate;
trimethylammonium tetrakis(pentafluorophenyl)borate;
triethylammonium tetrakis(pentafluorophenyl)borate;
tripropylammonium tetrakis(pentafluorophenyl)borate;
tri(n-butyl)ammonium tetrakis(pentafluorophenyl)borate;
tri(sec-butyl)ammonium tetrakis(pentafluorophenyl)borate;
N,N-dimethylanilinium tetrakis(pentafluorophenyl)borate;
N,N-diethylanilinium tetrakis(pentafluorophenyl)borate;
N,N-dimethyl-(2; 4; 6-trimethylanilinium)tetrakis(pentafluorophenyl)borate;
tropillium tetrakis(pentafluorophenyl)borate;
triphenylcarbenium tetrakis(pentafluorophenyl)borate;
triphenylphosphonium tetrakis(pentafluorophenyl)borate;
triethylsilylium tetrakis(pentafluorophenyl)borate;
benzene(diazonium)tetrakis(pentafluorophenyl)borate;
trimethylammonium tetrakis-(2; 3; 4; 6-tetrafluorophenyl)borate;
triethylammonium tetrakis-(2; 3; 4; 6-tetrafluorophenyl)borate;
tripropylammonium tetrakis-(2; 3; 4; 6-tetrafluorophenyl)borate;
tri(n-butyl)ammonium tetrakis-(2; 3; 4; 6-tetrafluoro-phenyl)borate;
dimethyl(t-butyl)ammonium tetrakis-(2; 3; 4; 6-tetrafluorophenyl)borate;
N,N-dimethylanilinium tetrakis-(2; 3; 4; 6-tetrafluorophenyl)borate;
N,N-diethylanilinium tetrakis-(2; 3; 4; 6-tetrafluorophenyl)borate;
N,N-dimethyl-(2; 4; 6-trimethylanilinium)tetrakis-(2; 3; 4; 6-tetrafluorophenyl)borate;
tropillium tetrakis-(2; 3; 4; 6-tetrafluorophenyl)borate;
triphenylcarbenium tetrakis-(2; 3; 4; 6-tetrafluorophenyl)borate;
triphenylphosphonium tetrakis-(2; 3; 4; 6-tetrafluorophenyl)borate;
triethylsilylium tetrakis-(2; 3; 4; 6-tetrafluorophenyl)borate;
benzene(diazonium)tetrakis-(2; 3; 4; 6-tetrafluorophenyl)borate;
trimethylammonium tetrakis(3; 5-bis(trifluoromethyl)phenyl)borate;
triethylammonium tetrakis(3; 5-bis(trifluoromethyl)phenyl)borate;
tripropylammonium tetrakis(3; 5-bis(trifluoromethyl)phenyl)borate;
tri(n-butyl)ammonium tetrakis(3; 5-bis(trifluoromethyl)phenyl)borate;
tri(t-butyl)ammonium tetrakis(3; 5-bis(trifluoromethyl)phenyl)borate;
N,N-dimethylanilinium tetrakis(3; 5-bis(trifluoromethyl)phenyl)borate;
N,N-diethylanilinium tetrakis(3; 5-bis(trifluoromethyl)phenyl)borate;
N,N-dimethyl-(2; 4; 6-trimethylanilinium)tetrakis(3; 5-bis(trifluoromethyl)phenyl)borate;
tropillium tetrakis(3; 5-bis(trifluoromethyl)phenyl)borate;

triphenylcarbenium tetrakis(3; 5-bis(trifluoromethyl)phenyl)borate;
triphenylphosphonium tetrakis(3; 5-bis(trifluoromethyl)phenyl)borate;
triethylsilylium tetrakis(3; 5-bis(trifluoromethyl)phenyl)borate;
benzene(diazonium)tetrakis(3; 5-bis(trifluoromethyl)phenyl)borate;
di-(i-propyl)ammonium tetrakis(pentafluorophenyl)borate;
dicyclohexylammonium tetrakis(pentafluorophenyl)borate;
tri(o-tolyl)phosphonium tetrakis(pentafluorophenyl)borate;
tri(2; 6-dimethylphenyl)phosphonium tetrakis(pentafluorophenyl)borate;
triphenylcarbenium tetrakis(perfluorophenyl)borate;
1-(4-(tris(pentafluorophenyl)borate)-2; 3; 5; 6-tetrafluorophenyl)pyrrolidinium;
tetrakis(pentafluorophenyl)borate;
4-(tris(pentafluorophenyl)borate)-2; 3; 5; 6-tetrafluoropyridine; and
triphenylcarbenium tetrakis(3,5-bis(trifluoromethyl)phenyl) borate).

The typical activator-to-catalyst ratio, e.g., all NCA activators-to-catalyst ratio is about a 1:1 molar ratio. Alternate preferred ranges include from 0.1:1 to 100:1, alternately from 0.5:1 to 200:1, alternately from 1:1 to 500:1 alternately from 1:1 to 1000:1. A particularly useful range is from 0.5:1 to 10:1, preferably 1:1 to 5:1.

It is also within the scope of the present disclosure that the catalyst compounds can be combined with combinations of alumoxanes and NCA's (see for example, U.S. Pat. Nos. 5,153,157; 5,453,410; EP 0 573 120 BT; WO 1994/007928; and WO 1995/014044 (the disclosures of which are incorporated herein by reference in their entirety) which discuss the use of an alumoxane in combination with an ionizing activator).

Particularly useful activators include dimethylaniliniumtetrakis (pentafluorophenyl) borate and dimethyl anilinium tetrakis(heptafluoro-2-naphthyl) borate. For a more detailed description of useful activators please see WO 2004/026921 page 72, paragraph [00119] to page 81 paragraph [00151]. A list of particularly useful activators that can be used in the practice of this invention may be found at page 72, paragraph [00177] to page 74, paragraph [00178] of WO 2004/046214.

Particularly useful activators include those disclosed in US 2019/0330139 and US 2019/0330392.

Optional Scavengers, Co-Activators, Chain Transfer Agents

In addition to activator compounds, scavengers or co-activators may be used. A scavenger is a compound that is typically added to facilitate polymerization by scavenging impurities. Some scavengers may also act as activators and may be referred to as co-activators. A co-activator, that is not a scavenger, may also be used in conjunction with an activator in order to form an active catalyst. In some embodiments a co-activator can be pre-mixed with the transition metal compound to form an alkylated transition metal compound. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and diethyl zinc.

Chain transfer agents may be used in the compositions and or processes described herein. Useful chain transfer agents are typically alkylalumoxanes, a compound represented by the formula $AlR_3$, $ZnR_2$ (where each R is, independently, a $C_1$-$C_8$ aliphatic radical, preferably methyl, ethyl, propyl, butyl, phenyl, hexyl octyl or an isomer thereof) or a combination thereof, such as diethyl zinc, methylalumoxane, trimethylaluminum, triisobutylaluminum, trioctylaluminum, or a combination thereof.

Optional Support Materials

In embodiments herein, the catalyst system may comprise an inert support material. Preferably the supported material is a porous support material, for example, talc, and inorganic oxides. Other support materials include zeolites, clays, organoclays, or any other organic or inorganic support material and the like, or mixtures thereof.

Preferably, the support material is an inorganic oxide in a finely divided form. Suitable inorganic oxide materials for use in catalyst systems herein include Groups 2, 4, 13, and 14 metal oxides, such as silica, alumina, and mixtures thereof. Other inorganic oxides that may be employed either alone or in combination with the silica, or alumina are magnesia, titania, zirconia, and the like. Other suitable support materials, however, can be employed, for example, finely divided functionalized polyolefins, such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Preferred support materials include $Al_2O_3$, $ZrO_2$, $SiO_2$, and combinations thereof, more preferably $SiO_2$, $Al_2O_3$, or $SiO_2/Al_2O_3$.

It is preferred that the support material, most preferably an inorganic oxide, has a surface area in the range of from about 10 to about 700 $m^2/g$, pore volume in the range of from about 0.1 to about 4.0 cc/g and average particle size in the range of from about 5 to about 500 μm. More preferably, the surface area of the support material is in the range of from about 50 to about 500 $m^2/g$, pore volume of from about 0.5 to about 3.5 cc/g and average particle size of from about 10 to about 200 m. Most preferably the surface area of the support material is in the range is from about 100 to about 400 $m^2/g$, pore volume from about 0.8 to about 3.0 cc/g and average particle size is from about 5 to about 100 μm. The average pore size of the support material useful in the invention is in the range of from 10 to 1000 Å, preferably 50 to about 500 Å, and most preferably 75 to about 350 Å. In some embodiments, the support material is a high surface area, amorphous silica (surface area=300 $m^2$/gm; pore volume of 1.65 $cm^3$/gm).

The support material should be dry, that is, free of absorbed water. Drying of the support material can be effected by heating or calcining at about 100° C. to about 1,000° C., preferably at least about 600° C. When the support material is silica, it is heated to at least 200° C., preferably about 200° C. to about 850° C., and most preferably at about 600° C.; and for a time of about 1 minute to about 100 hours, from about 12 hours to about 72 hours, or from about 24 hours to about 60 hours. The calcined support material must have at least some reactive hydroxyl (OH) groups to produce supported catalyst systems of this invention. The calcined support material is then contacted with at least one polymerization catalyst comprising at least one catalyst compound and an activator.

The support material, having reactive surface groups, typically hydroxyl groups, is slurried in a non-polar solvent and the resulting slurry is contacted with a solution of a catalyst compound and an activator. In some embodiments, the slurry of the support material is first contacted with the activator for a period of time in the range of from about 0.5 hours to about 24 hours, from about 2 hours to about 16 hours, or from about 4 hours to about 8 hours. The solution of the catalyst compound is then contacted with the isolated support/activator. In some embodiments, the supported catalyst system is generated in situ. In alternate embodiment, the slurry of the support material is first contacted with the catalyst compound for a period of time in the range of from about 0.5 hours to about 24 hours, from about 2 hours to about 16 hours, or from about 4 hours to about 8 hours. The slurry of the supported catalyst compound is then contacted with the activator solution.

The mixture of the catalyst, activator and support is heated to about 0° C. to about 70° C., preferably to about 23° C. to about 60° C., preferably at room temperature. Contact times typically range from about 0.5 hours to about 24 hours, from about 2 hours to about 16 hours, or from about 4 hours to about 8 hours.

Suitable non-polar solvents are materials in which all of the reactants used herein, i.e., the activator, and the catalyst compound, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

Polymerization Processes

In embodiments herein, the invention relates to polymerization processes where monomer (such as ethylene, propylene, 4-substituted hexadiene, and the like), and optionally comonomer, are contacted with a catalyst system comprising an activator and at least one catalyst compound, as described above. The catalyst compound and activator may be combined in any order, and are combined typically prior to contacting with the monomer.

Monomers useful herein include substituted or unsubstituted $C_2$ to $C_{40}$ alpha olefins, preferably $C_2$ to $C_{20}$ alpha olefins, preferably $C_2$ to $C_{12}$ alpha olefins, preferably ethylene, propylene, butene, pentene, hexene, heptene, octene, nonene, decene, undecene, dodecene, isomers thereof and 4-substituted 1,4-hexadiene (such as 4-methyl-1,4-hexadiene). In embodiments of the invention, the monomer comprises 4-substituted 1,4-hexadiene (such as 4-$C_1$ to $C_{12}$ alkyl 1,4-hexadiene (where the alkyl is methyl, ethyl, propyl, butyl, pentyl, hexyl, heptyl, octyl, nonyl, decyl, undecyl, dodecyl, or an isomer thereof), such as 4-methyl-1,4-hexadiene).

In embodiments of the invention, the monomers comprises propylene, 4-substituted hexadiene and optionally one or more of ethylene or $C_4$ to $C_{40}$ olefins, preferably $C_4$ to $C_{20}$ olefins, or preferably $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups.

In another embodiment, the monomers comprise ethylene, 4-substituted hexadiene and optionally one or more one or more $C_3$ to $C_{40}$ olefins, preferably $C_4$ to $C_{20}$ olefins, or preferably $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

In another embodiment, the monomers comprise ethylene, propylene, 4-substituted hexadiene and optionally one or more $C_4$ to $C_{40}$ olefins, preferably $C_4$ to $C_{20}$ olefins, or preferably $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene.

Exemplary 4 substituted 1,4 hexadienes are represented by the formula:

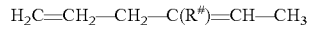

wherein $R^\#$ is a $C_1$ to $C_{20}$ hydrocarbyl group, such as $C_1$ to $C_{20}$ alkyl group (alternately a $C_1$ to $C_{12}$ alkyl group, such as such as methyl, ethyl, propyl, butyl, pentyl, hexyl, heptyl, octyl, nonyl, decyl, undecyl, dodecyl, or an isomer thereof, such as n-isomers thereof), and/or a $C_6$ to $C_{20}$ aryl group (such as phenyl, benzyl naphthyl, styryl, xylyl or an isomer) or substituted variant thereof. Useful 4 substituted 1,4 hexadienes include methyl-1,4-hexadiene, 4-ethyl-1,4-hexadiene, 4-n-propyl-1,4-hexadiene, 4-n-butyl-1,4-hexadiene, 4-aryl-1,4-hexadiene (such as 4-phenyl-1,4-hexadiene, 4-methyl-phenyl-1,4-hexadiene).

In a preferred embodiment one or more dienes such as: 5-ethylidene-2-norbornene, 5-vinyl-2-norbornene, butadiene or isoprene are present in the feed at up to 10 weight %, preferably at 0.00001 to 1.0 weight %, preferably 0.002 to 0.5 weight %, even more preferably 0.003 to 0.2 weight %, based upon the total weight of all monomer/comonomer feeds. In some embodiments 500 ppm or less of diene is added to the polymerization, preferably 400 ppm or less, preferably or 300 ppm or less. In other embodiments at least 50 ppm of diene is added to the polymerization, or 100 ppm or more, or 150 ppm or more. In a preferred embodiment less than 5 wt % (less than 1 wt %, preferably 0 wt %, based upon weight of the dienes present) of 5-methyl, 1,4-hexadiene is present in the feed, based upon the weight of all monomer/comonomer feeds. Alternately less than 20 wt % (such as less than 15 wt %, such as less than 10 wt %, such as less than 5 wt %, such as less than 1 wt %, preferably 0 wt %, based upon weight of the dienes present) of 5-substituted-1,4-hexadiene (such as 5-methyl-1,4-hexadiene) is present in the feed, based upon the weight of all monomer/comonomer feeds.

Preferred diene (also referred to as diolefin) diolefin monomers useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e. di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadien, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1,000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

Polymerization processes of this invention can be carried out in any manner known in the art. Any suspension, homogeneous, bulk, solution, slurry, or gas phase polymerization process known in the art can be used. Such processes can be run in a batch, semi-batch, or continuous mode. The term "continuous" means a system that operates without interruption or cessation. For example a continuous process to produce a polymer would be one where the reactants are continually introduced into one or more reactors and polymer product is continually withdrawn.

Homogeneous polymerization processes are useful herein. A homogeneous polymerization is one where polymer product is dissolved in the polymerization medium, typically at least 90 wt % of the product is soluble in the polymerization media. Such systems are preferably not turbid as described in J. Vladimir Oliveira et al., *Ind. Eng. Chem. Res*. v. 29, 2000, pg. 4627. A solution polymerization is a polymerization process in which the polymer product is dissolved in a liquid polymerization medium, such as an inert solvent or monomer(s) or their blends. A solution polymerization is typically homogeneous.

Bulk homogeneous processes are useful herein. A bulk polymerization is typically a polymerization process in which the monomers and/or comonomers being polymerized are used as a solvent or diluent using little or no inert solvent as a solvent or diluent. A small fraction of inert solvent might be used as a carrier for catalyst and scavenger. A bulk polymerization system contains less than 25 wt % of inert solvent or diluent, preferably less than 10 wt %, preferably less than 1 wt %, preferably 0 wt %. Alternately, no solvent or diluent is present or added in the reaction medium, (except for the small amounts used as the carrier for the catalyst system or other additives, or amounts typically found with the monomer; e.g., propane in propylene). A bulk process preferably is a process where monomer concentration in all feeds to the reactor is 70 volume % or more.

In another embodiment, the polymerization process is a slurry process. A slurry polymerization process is typically a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™ fluids); perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably less than 0.5 wt %, preferably less than 0 wt % based upon the weight of the solvents.

In a preferred embodiment, the feed concentration of the solvent for the polymerization is 60 vol % solvent or less, preferably 40 vol % or less, or preferably 20 vol % or less, based on the total volume of the feedstream. Preferably the polymerization is run in a bulk process. In a preferred embodiment, the feed concentration of the monomers and comonomers for the polymerization is 20 vol % solvent or more, preferably 40 vol % or more, or preferably 60 vol % or more, based on the total volume of the feedstream. Preferably the polymerization is run in a bulk process.

It is desirable that the monomers and solvents employed be of sufficiently purity that catalyst deactivation not occur. Any suitable technique for monomer/solvent purification such as contacting with molecular sieves or high surface area alumina may be employed.

A useful advantage of the 4 substituted 1,4 hexadienes (such as 4-methyl, 1,4 hexadiene) is that they are typically lighter than cyclic dienes such a 5-vinyl-2-norbornene (VNB) and 5-ethylidene-2-norbornene.

Preferred polymerizations can be run at any temperature and/or pressure suitable to obtain the desired polymers. Typical temperatures and/or pressures include a temperature in the range of from about 0° C. to about 300° C., preferably about 20° C. to about 200° C., preferably about 35° C. to about 180° C., preferably from about 40° C. to about 180° C., preferably from about 45° C. to about 180° C.; and at a pressure in the range of from about 0.1 MPa to about 15 MPa, preferably from about 0.35 MPa to about 10 MPa, or preferably from about 0.5 MPa to about 8 MPa.

In a typical polymerization, the run time (or residence time) of the reaction is up to 300 minutes, preferably in the range of from about 5 to 250 minutes, or preferably from about 10 to 120 minutes.

In some embodiments hydrogen is present in the polymerization reactor at a partial pressure of 0.001 to 50 psig (0.007 to 345 kPa), preferably from 0.01 to 25 psig (0.07 to 172 kPa), more preferably 0.1 to 10 psig (0.7 to 70 kPa). Alternately, the concentration of hydrogen in the reaction mixture may range up to about 5,000 ppm, or up to about 4,000 ppm, or up to about 3,000 ppm, or up to about 2,000 ppm, or up to about 1,000 ppm, or up to about 500 ppm, or up to about 400 ppm, or up to about 300 ppm, or up to about 200 ppm, or up to about 100 ppm, or up to about 50 ppm, or up to about 10 ppm, or up to about 1 ppm.

"Catalyst productivity" Alternately, "Catalyst productivity" is a measure of the mass of polymer produced using a known quantity of polymerization catalyst. Typically, "catalyst productivity" is expressed in units of (weight of the polymer)/(weight or moles of catalyst)(e.g., (g of polymer)/(g of catalyst) or (g of polymer)/(mmols of catalyst)). For calculating catalyst productivity only the weight of the transition metal component of the catalyst is used (i.e. the activator and/or co-catalyst is omitted). In an alternate embodiment, the catalyst productivity is at least 5,000 kg of polymer per kg of catalyst, preferably at least 10,000 kg of polymer per kg of catalyst, more preferably at least 20,000 kg of polymer per kg of catalyst, even more preferably at least 50,000 kg of polymer per kg of catalyst.

"Conversion" is the amount of monomer that is converted to polymer product, and is reported as mol % and is calculated based on the polymer yield and the amount of monomer fed into the reactor. In an alternate embodiment, the conversion of 4-methyl-1,4-hexadiene monomer is at least mol 10%, based upon polymer yield and the weight of the monomer entering the reaction zone, preferably 15% or more, preferably 20% or more, preferably 30% or more, preferably 50% or more.

"Catalyst activity" is a measure of how active the catalyst is and is reported as the mass of product polymer (P) produced per mole of catalyst (cat) used (kgP/molcat). For calculating catalyst activity, also referred to as catalyst productivity, only the weight of the transition metal component of the catalyst is used. In an alternate embodiment, the activity of the catalyst is at least 50 g/mmol/hour, preferably 500 or more g/mmol/hour, preferably 5,000 or more g/mmol/hr, preferably 50,000 or more g/mmol/hr. In an alternate embodiment, the conversion of olefin monomer is at least 10%, based upon polymer yield and the weight of the monomer entering the reaction zone, preferably 20% or more, preferably 30% or more, preferably 50% or more, preferably 80% or more.

In a preferred embodiment, little or no alumoxane is used in the process to produce the polymers. Preferably, alumoxane is present at zero mol %, alternately the alumoxane is present at a molar ratio of aluminum to transition metal less than 500:1, preferably less than 300:1, preferably less than 100:1, preferably less than 1:1.

In a preferred embodiment, little or no scavenger is used in the process to produce the polymer. Preferably, scavenger (such as tri alkyl aluminum) is present at zero mol %, alternately the scavenger is present at a molar ratio of scavenger metal to transition metal of less than 100:1, preferably less than 50:1, preferably less than 15:1, preferably less than 10:1.

In a preferred embodiment, the polymerization: 1) is conducted at temperatures of 0 to 300° C. (preferably 25 to 200° C., preferably 40 to 180° C., preferably 45 to 180° C.); 2) is conducted at a pressure of atmospheric pressure to 15 MPa (preferably 0.35 to 10 MPa, preferably from 0.45 to 8 MPa, preferably from 0.5 to 6 MPa); 3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; preferably where aromatics are preferably present in the solvent at less than 1 wt %, preferably less than 0.5 wt %, preferably at 0 wt % based upon the weight of the solvents); 4) wherein the catalyst system used in the polymerization comprises less than 0.5 mol %, preferably 0 mol % alumoxane, alternately the alumoxane is present at a molar ratio of aluminum to transition metal less than 500:1, preferably less than 300:1, preferably less than 100:1, preferably less than 1:1; 5) the polymerization preferably occurs in one reaction zone; 6) the productivity of the catalyst compound is at least 5,000 kg of polymer per kg of catalyst, preferably at least 10,000 kg of polymer per kg of catalyst, more preferably at least 20,000 kg of polymer per kg of catalyst, even more preferably at least 50,000 kg of polymer per kg of catalyst; 7) optionally scavengers (such as trialkyl aluminum compounds) are absent (e.g. present at zero mol %, alternately the scavenger is present at a molar ratio of scavenger metal to transition metal of less than 100:1, preferably less than 50:1, preferably less than 15:1, preferably less than 10:1); and 8) optionally hydrogen is present in the polymerization reactor at a concentration in the reaction mixture of 5,000 ppm or less, or 4,000 ppm or less, or 3,000 ppm or less, or 2,000 ppm or less, or 1,000 ppm or less, or 500 ppm or less, or 400 ppm or less, or 300 ppm or less, or 200 ppm or less, or 100 ppm or less, or 50 ppm or less, or 10 ppm or less, or 1 ppm or less. In a preferred embodiment, the catalyst system used in the polymerization comprises no more than one catalyst compound. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In a preferred embodiment, the polymerization occurs in one reaction zone. Room temperature is 23° C. unless otherwise noted.

Other additives may also be used in the polymerization, as desired, such as one or more scavengers, promoters, modifiers, reducing agents, oxidizing agents, hydrogen, aluminum alkyls, silanes, or chain transfer agents (such as alkylalumoxanes, a compound represented by the formula $AlR_3$ or $ZnR_2$ (where each R is, independently, a $C_1$-$C_5$ aliphatic radical, preferably methyl, ethyl, propyl, butyl, phenyl, hexyl octyl or an isomer thereof) or a combination thereof, such as diethyl zinc, methylalumoxane, trimethylaluminum, triisobutylaluminum, trioctylaluminum, or a combination thereof).

Polyolefin Products

This invention also relates to compositions of matter produced by the methods described herein.

This invention relates to homopolymers and copolymers comprising one or more dienes comprising 4 substituted 1,4 hexadiene represented by the Formula:

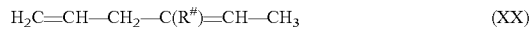

$$H_2C\!\!=\!\!CH\!\!-\!\!CH_2\!\!-\!\!C(R^\#)\!\!=\!\!CH\!\!-\!\!CH_3 \qquad (XX)$$

wherein $R^\#$ is a $C_1$ to $C_{20}$ hydrocarbyl group, such as $C_1$ to $C_{20}$ alkyl group (alternately a $C_1$ to $C_{12}$ alkyl group, such as such as methyl, ethyl, propyl, butyl, pentyl, hexyl, heptyl, octyl, nonyl, decyl, undecyl, dodecyl, or an isomer thereof, such as n-isomers thereof), and/or a $C_6$ to $C_{20}$ aryl group (such as phenyl, benzyl naphthyl, styryl, xylyl or an isomer) or substituted variant thereof.

Alternately the diene consists essentially of 4 substituted 1,4 hexadiene (such as 4-methyl-1,4-hexadiene) represented by the Formula (XX):

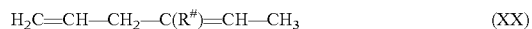

$$H_2C\!\!=\!\!CH\!\!-\!\!CH_2\!\!-\!\!C(R^\#)\!\!=\!\!CH\!\!-\!\!CH_3 \qquad (XX)$$

wherein $R^\#$ is a $C_1$ to $C_{20}$ hydrocarbyl group, such as $C_1$ to $C_{20}$ alkyl group (alternately a $C_1$ to $C_{12}$ alkyl group, such as such as methyl, ethyl, propyl, butyl, pentyl, hexyl, heptyl, octyl, nonyl, decyl, undecyl, dodecyl, or an isomer thereof, such as n-isomers thereof), and/or a $C_6$ to $C_{20}$ aryl group (such as phenyl, benzyl naphthyl, styryl, xylyl or an isomer) or substituted variant thereof.

Alternately the diene comprises less than 20 wt % (such as less than 15 wt %, such as less than 10 wt %, such as less than 5 wt %, such as less than 1 wt %, preferably 0 wt %, based upon weight of the dienes present) of 5-substituted-1,4-hexadiene (such as 5-methyl-1,4-hexadiene) represented by the Formula (XX-A):

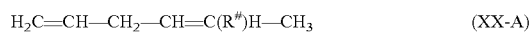

$$H_2C\!\!=\!\!CH\!\!-\!\!CH_2\!\!-\!\!CH\!\!=\!\!C(R^\#)H\!\!-\!\!CH_3 \qquad (XX\text{-}A)$$

wherein R# is a $C_1$ to $C_{20}$ hydrocarbyl group, such as a $C_1$ to $C_{20}$ alkyl group, alternately a $C_1$ to $C_{12}$ alkyl group, such as such as methyl, ethyl, propyl, butyl, pentyl, hexyl, heptyl, octyl, nonyl, decyl, undecyl, dodecyl, or an isomer thereof. Alternately the diene comprises less than 5 wt % (alternately less than 1 mol % (alternately less than 0.1 mol %, alternately less than 0.01 mol %, alternately zero mol %) based upon the weight of the diene, of diene represented by Formula (XX-A).

Alternately the diene represented by Formula (XX-A) is 5-methyl, 1,4-hexadiene.

Alternately copolymers described herein are absent 5-methyl, 1,4-hexadiene.

Alternately the diene comprises a single isomer of dienes represented by Formula (XX). Alternately the diene comprises 100 mol % of a single isomer.

Alternately the diene comprises two or more isomers of one, two, three or more dienes represented by Formula (XX).

Alternately the diene represented by Formula (XX) comprises at least 40 mol %, alternately at least 50 mol %, alternately at least 60 mol %, alternately at least 70 mol %, alternately at least 80 mol %, alternately at least 90 mol %, alternately at least 95 mol %, alternately at least 98 mol %, alternately at least 99 mol %, of a single isomer of a diene represented by Formula (XX), such the z isomer of the dienes represented by Formula (XX), such as the z isomer of 4-methyl-1,4-hexadiene.

Alternately the diene comprises at least 40 mol %, alternately at least 50 mol %, alternately at least 60 mol %, alternately at least 70 mol %, alternately at least 80 mol %, alternately at least 90 mol %, alternately at least 95 mol %, alternately at least 98 mol %, alternately at least 99 mol %, of single isomers of two or more dienes represented by Formula (XX).

This invention further relates to homopolymers comprising diene (optionally single isomers of such diene) represented by Formula (XX):

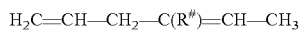

wherein R# is a $C_1$ to $C_{20}$ hydrocarbyl group, such as $C_1$ to $C_{20}$ alkyl group (alternately a $C_1$ to $C_{12}$ alkyl group, such as such as methyl, ethyl, propyl, butyl, pentyl, hexyl, heptyl, octyl, nonyl, decyl, undecyl, dodecyl, or an isomer thereof, such as n-isomers thereof), and/or a $C_6$ to $C_{20}$ aryl group (such as phenyl, benzyl naphthyl, styryl, xylyl or an isomer) or substituted variant thereof.

This invention further relates to homopolymers of 4 substituted 1,4 hexadienes, such as 4-methyl-1,4-hexadiene, 4-ethyl-1,4-hexadiene, 4-n-propyl-1,4-hexadiene, 4-n-butyl-1,4-hexadiene, particularly homopolymers of a single isomer.

This invention further relates to copolymers comprising 4 substituted 1,4 hexadienes, including but not limited to, 4-methyl-1,4-hexadiene, 4-ethyl-1,4-hexadiene, 4-n-propyl-1,4-hexadiene, 4-n-butyl-1,4-hexadiene, 4-aryl-1,4-hexadiene (such as 4-phenyl-1,4-hexadiene, and 4-methyl-phenyl-1,4-hexadiene).

This invention further relates to homopolymers of 4-methyl-1,4-hexadiene.

This invention further relates to copolymers comprising two, three or more dienes (optionally single isomers of such dienes) represented by Formula (XX):

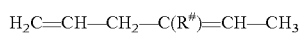

wherein R# is a $C_1$ to $C_{20}$ hydrocarbyl group, such as $C_1$ to $C_{20}$ alkyl group (alternately a $C_1$ to $C_{12}$ alkyl group, such as such as methyl, ethyl, propyl, butyl, pentyl, hexyl, heptyl, octyl, nonyl, decyl, undecyl, dodecyl, or an isomer thereof, such as n-isomers thereof), and/or a $C_6$ to $C_{20}$ aryl group (such as phenyl, benzyl naphthyl, styryl, xylyl or an isomer) or substituted variant thereof. This invention further relates to copolymers of 4 substituted 1,4 hexadienes, such as (z)-4-methyl-1,4-hexadiene, (e)-4-methyl-1,4-hexadiene, 4-ethyl-1,4-hexadiene, 4-n-propyl-1,4-hexadiene, and/or 4-n-butyl-1,4-hexadiene.

This invention further relates to copolymers of 4-methyl-1,4-hexadiene and ethylene or propylene.

Homopolymers and copolymers prepared herein can be semi-crystalline or amorphous.

Unless otherwise indicated, melting temperature (Tm) and glass transition temperature (Tg) are determined according to the differential scanning calorimetry (DSC-2) procedure in the Experimental section below.

Homopolymers may have a melting point (Tm) of 250° C. or less, such as 100 to 230° C., such as 150 to 225° C. (as determined by differential scanning calorimetry, DSC-2, as described in the Experimental section below). Alternately the homopolymers prepared herein may have a glass transition temperature (Tg) of 50° C. or less, such as 40° C. or less, such as 30° C. or less (as determined by differential scanning calorimetry, DSC-2, as described in the Experimental section below).

Copolymers may have a melting point (Tm) of 155° C. or less, such as 140° C. or less, such as 100° C. or less (as determined by differential scanning calorimetry, DSC-2, as described in the Experimental section below). Alternately the copolymers prepared herein may have a glass transition temperature (Tg) of glass transition temperature (Tg) of 50° C. or less, such as 40° C. or less, such as 30° C. or less (as determined by differential scanning calorimetry, DSC-2, as described in the Experimental section below).

Copolymers prepared herein can be curable.

This invention further relates to copolymers comprising one, two or more dienes (optionally single isomers of such dienes) represented by Formula (XX) and one, two or more olefins (alternately one, two or more $C_2$ or $C_{40}$ olefins). Alternately the olefin monomers are selected from the group consisting of $C_2$ to $C_{40}$ alpha olefins and $C_6$ to $C_{40}$ vinyl aromatics, alternately $C_2$ to $C_{20}$ alpha olefins and $C_6$ to $C_{20}$ vinyl aromatics, preferably $C_2$ to $C_{12}$ alpha olefins and $C_6$ to $C_{12}$ vinyl aromatics, preferably ethylene, propylene, butene, pentene, hexene, heptene, octene, nonene, decene, undecene, dodecene, styrene, paramethylstyrene and isomers thereof. Typically the olefin(s) is present at 1 wt %, alternately 2 wt %, alternately 10 wt % and the diene(s) is present at 1 wt %, alternately 2 wt %, alternately 10 wt %, based upon the weight of the copolymer.

This invention further relates to copolymers comprising one, two or more dienes (optionally single isomers of such dienes) represented by Formula (XX)(optionally absent 5-methyl, 1,4 hexadiene) and one, two or more olefins (alternately one, two or more $C_2$ or $C_{40}$ olefins). Alternately the olefin monomers are selected from the group consisting of $C_2$ to $C_{40}$ alpha olefins and $C_6$ to $C_{40}$ vinyl aromatics, alternately $C_2$ to $C_{20}$ alpha olefins and $C_6$ to $C_{20}$ vinyl aromatics, preferably $C_2$ to $C_{12}$ alpha olefins and $C_6$ to $C_{12}$ vinyl aromatics, preferably ethylene, propylene, butene, pentene, hexene, heptene, octene, nonene, decene, undecene, dodecene, styrene, 4-methyl-styrene and isomers thereof. Typically the olefin(s) is present at 1 to 99.9 wt %, alternately 60 to 98 wt %, alternately 70 to 96 wt % and the diene(s) is present at 0.1 to 99 wt %, alternately 2 to 40 wt %, alternately 4 to 30 wt %, based upon the weight of the copolymer.

This invention further relates to copolymers comprising one, two or more dienes (optionally single isomers of such dienes) represented by Formula (XX)(optionally the z isomer of the dienes) represented by Formula (XX) and one, two or more olefins (alternately one, two or more $C_2$ or $C_{40}$ olefins). Alternately the olefin monomers are selected from the group consisting of $C_2$ to $C_{40}$ alpha olefins and $C_6$ to $C_{40}$ vinyl aromatics, alternately $C_2$ to $C_{20}$ alpha olefins and $C_6$ to $C_{20}$ vinyl aromatics, preferably $C_2$ to $C_{12}$ alpha olefins and $C_6$ to $C_{12}$ vinyl aromatics, preferably ethylene, propylene, butene, pentene, hexene, heptene, octene, nonene, decene, undecene, dodecene, styrene, 4-methyl styrene and isomers thereof. Typically the olefin(s) are present at 1 to 99.9 wt %, alternately 60 to 98 wt %, alternately 70 to 96 wt % and the diene(s) is present at 0.1 to 99 wt %, alternately 2 to 40 wt %, alternately 4 to 30 wt %, based upon the weight of the copolymer.

This invention further relates to copolymers comprising ethylene and 4 substituted 1,4-hexadiene (such as those represented by Formula (XX), such as 4-methyl-1,4-hexadiene). Typically the ethylene is present at 5 to 99 wt %, alternately 50 to 98 wt %, alternately 75 to 95 wt %, and the 4 substituted 1,4-hexadiene is present at 1 to 95 wt %, alternately 2 to 50 wt %, alternately 5 to 25 wt %, based upon the weight of the copolymer. The copolymers may have a melting point (Tm) of 75° C. or more, alternately 150° C. or more, alternately 200° C. or more (as determined by differential scanning calorimetry, DSC-2, as described in the Experimental section below). Alternately the copolymers prepared herein may have a glass transition temperature (Tg) of 30° C. or less, such as −20° C. or less (as determined by differential scanning calorimetry, DSC-2, as described in the Experimental section below).

This invention further relates to copolymers comprising propylene and 4 substituted 1,4-hexadiene (such as those represented by Formula (XX), such as 4-methyl-1,4-hexadiene). Typically the propylene is present at 10 to 99 wt %, alternately 50 to 98 wt %, alternately 75 to 95 wt %, and the 4 substituted 1,4-hexadiene is present at 1 to 90 wt %, alternately 2 to 50 wt %, alternately 5 to 25 wt %, based upon the weight of the copolymer. The copolymers may have a melting point (Tm) of 50° C. or more, alternately 100° C. or more, alternately 150° C. or more (as determined by differential scanning calorimetry, DSC-2, as described in the Experimental section below). Alternately the copolymers prepared herein may have a glass transition temperature (Tg) of 40° C. or less, such as 30° C. or less. (as determined by differential scanning calorimetry, DSC-2, as described in the Experimental section below).

This invention further relates to copolymers comprising ethylene, propylene, and 4 substituted 1,4-hexadiene (such as those represented by Formula (XX), such as 4-methyl-1,4-hexadiene). Typically the ethylene is present at 50 to 89 wt %, such as 60 to 85 wt %, such as 70 to 80 wt %, the propylene is present at 10 to 49 wt %, alternately 15 to 40 wt %, alternately 20 to 30 wt %, and the 4 substituted 1,4-hexadiene is present at 1 to 30 wt %, alternately 10 to 25 wt %, alternately 10 to 20 wt %, based upon the weight of the copolymer. The copolymers may have a melting point (Tm) of 20° C. or more, alternately 50° C. or more, alternately 100° C. or more (as determined by differential scanning calorimetry, DSC-2, as described in the Experimental section below). Alternately the copolymers prepared herein may have a glass transition temperature (Tg) of 0° C. or less, alternately −25° C., alternately −50° C. or less (as determined by differential scanning calorimetry, DSC-2, as described in the Experimental section below).

This invention further relates to copolymers comprising ethylene-propylene-4 substituted 1,4-hexadiene (such as 4-methyl-1,4-hexadiene), and vinyl aromatic such as styrene. Typically the ethylene is present at 50 to 88 wt %, such as 60 to 85 wt %, such as 70 to 80 wt %; the propylene is present at 10 to 49 wt %, alternately 15 to 40 wt %, alternately 20 to 30 wt %; the vinyl aromatic is present at 1 to 30 wt %, alternately 10 to 25 wt %, alternately 10 to 20 wt %, and the 4 substituted 1,4-hexadiene is present at 1 to 30 wt %, alternately 10 to 25 wt %, alternately 10 to 20 wt %, based upon the weight of the copolymer. The copolymers may have a melting point (Tm) of 20° C. or more, alternately 50° C. or more, alternately 100° C. or more (as determined by differential scanning calorimetry, DSC-2, as described in the Experimental section below). Alternately the copolymers prepared herein may have a glass transition temperature (Tg) of 0° C. or less, alternately −25° C., alternately −50° C. or less (as determined by differential scanning calorimetry, DSC-2, as described in the Experimental section below).

This invention further relates to copolymers comprising vinyl aromatic and 4 substituted 1,4-hexadiene (such as those represented by Formula (XX), such as 4-methyl-1,4-hexadiene). Typically the vinyl aromatic (such as styrene) is present at 1 wt %, alternately 50 wt %, alternately 99 wt %, and the 4 substituted 1,4-hexadiene is present at 99 wt %, alternately 50 wt %, alternately 1 wt %, based upon the weight of the copolymer. The copolymers may have a melting point (Tm) of 20° C. or more, alternately 50° C. or more, alternately 100° C. or more (as determined by differential scanning calorimetry, DSC-2, as described in the Experimental section below). Alternately the copolymers prepared herein may have a glass transition temperature (Tg) of 0° C. or less, alternately −25° C., alternately −50° C. or less (as determined by differential scanning calorimetry, DSC-2, as described in the Experimental section below).

Exemplary olefins useful in the copolymers herein include $C_2$ or $C_{40}$ olefins such as $C_2$ to $C_{40}$ alpha olefins and $C_6$ to $C_{40}$ vinyl aromatics, alternately $C_2$ to $C_{20}$ alpha olefins and $C_6$ to $C_{20}$ vinyl aromatics, alternately $C_2$ to $C_{12}$ alpha olefins and $C_6$ to $C_{12}$ vinyl aromatics, such as ethylene, propylene, butene, pentene, hexene, heptene, octene, nonene, decene, undecene, dodecene, styrene, para methylstyrene and isomers thereof.

In another embodiment, the copolymer comprises ethylene, 4-substituted hexadiene and optionally one or more one or more $C_3$ to $C_{40}$ olefins, preferably $C_4$ to $C_{20}$ olefins, or preferably $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

In another embodiment, the copolymer comprises ethylene, propylene, 4-substituted hexadiene and optionally one or more $C_4$ to $C_{40}$ olefins, preferably $C_4$ to $C_{20}$ olefins, or preferably $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups.

Exemplary $C_2$ to $C_{40}$ olefins include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene.

Exemplary vinyl aromatics useful in the copolymers herein include styrene, paramethylstyrene, and the like.

Exemplary 4 substituted 1,4 hexadienes useful herein are represented by the formula:

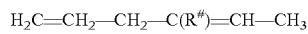

wherein $R^\#$ is a $C_1$ to $C_{20}$ hydrocarbyl group, such as $C_1$ to $C_{20}$ alkyl group (alternately a $C_1$ to $C_{12}$ alkyl group, such as such as methyl, ethyl, propyl, butyl, pentyl, hexyl, heptyl, octyl, nonyl, decyl, undecyl, dodecyl, or an isomer thereof, such as n-isomers thereof), and/or a $C_6$ to $C_{20}$ aryl group (such as phenyl, benzyl naphthyl, styryl, xylyl or an isomer) or substituted variant thereof. Examples include 4-methyl-1,4-hexadiene, 4-ethyl-1,4-hexadiene, 4-n-propyl-1,4-hexadiene, 4-n-butyl-1,4-hexadiene, and the like.

In an alternate embodiments one or more dienes (other than 4 substituted 1,4 hexadienes represented by Formula (XX)) are present in the polymer produced herein at up to 10 weight %, preferably at 0.00001 to 1.0 weight %, preferably 0.002 to 0.5 weight %, even more preferably 0.003 to 0.2 weight %, based upon the total weight of the composition. In some embodiments 500 ppm or less of diene is added to the polymerization, preferably 400 ppm or less, preferably or 300 ppm or less. In other embodiments at least 50 ppm of diene is added to the polymerization, or 100 ppm or more, or 150 ppm or more.

Exemplary diolefin monomer, other than 4 substituted 1,4 hexadienes represented by Formula (XX), useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). The diolefin monomers may be selected from alpha, omega-diene monomers (i.e. di-vinyl monomers). More typically, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadien, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

In a preferred embodiment one or more dienes such as: 5-ethylidene-2-norbornene, 5-vinyl-2-norbornene, butadiene or isoprene are present in the polymer at up to 10 weight %, preferably at 0.00001 to 1.0 weight %, preferably 0.002 to 0.5 weight %, even more preferably 0.003 to 0.2 weight %, based upon the total weight of the polymer. In some embodiments 500 ppm or less of diene is added to the polymerization, preferably 400 ppm or less, preferably or 300 ppm or less. In other embodiments at least 50 ppm of diene is added to the polymerization, or 100 ppm or more, or 150 ppm or more. In a preferred embodiment less than 20 wt % (such as less than 15 wt %, such as less than 10 wt %, such as less than 5 wt %, such as less than 1 wt %, preferably 0 wt %) of 5-substituted-1,4-hexadiene (such as 5-methyl-1,4-hexadiene) is present in the polymer, based upon the weight of the polymer.

Typically, the polymers produced herein have an Mw of 1,000 to 2,000,000 g/mol (alternately 25,000 to 1,500,000 g/mol, alternately 50,000 to 1,000,000 g/mol alternately 50,000 to 750,000 g/mol), as determined by GPC-4D as described in the Experimental section below.

Typically, the polymers produced herein have an Mn of 1,000 to 1,000,000 g/mol (alternately 25,000 to 900,000 g/mol, alternately 50,000 to 800,000 g/mol alternately 50,000 to 750,000 g/mol), as determined by GPC-4D as described in the Experimental section below.

Typically, the polymers produced herein have an Mz of 20,000 to 4,000,000 g/mol (alternately 50,000 to 2,500,000 g/mol, alternately 100,000 to 1,500,000 g/mol alternately 50,000 to 750,000 g/mol), as determined by GPC-4D as described in the Experimental section below.

Typically, the polymers produced herein may have a melt-flow rate (MFR) of from about 0.1 dg/min to about 1,500 dg/min, such as from about 1 dg/min to about 100 dg/min, such as from about 10 to about 50 dg/min as determined by ASTM D1238 (230° C., 2.16 kg).

Typically, the polymers produced herein have an Mw/Mn of greater than 1 to 20 (alternately 1.2 to 10, alternately 1.3 to 6, alternately 1.4 to 5, 1.5 to 4.5, alternately 1.5 to 4) as determined by GPC-4D as described in the Experimental section below.

In embodiments, the polymers produced herein may have a branching index ($g'_{vis}$) of 0.9 or more, alternately 0.95 or more, alternately 0.97 or more, as determined by GPC-4D as described in the Experimental section below.

In embodiments the polymer produced herein has a unimodal or multimodal molecular weight distribution as determined by Gel Permeation Chromatography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versus).

Unless otherwise indicated Mw, Mn, Mz, MWD are determined by GPC-4D as described in the Experimental section below.

The copolymers may have Mooney viscosity ML (1+4 at 125° C.) ranging from a low of any one of about 20, 30 and 40 MU (Mooney units) to a high of any one of about 70, 80, 90, 100, 110, 120, 130, 140, 150, 160, 170, and 180 MU. Mooney viscosity in terms of MST (5+4 at 200° C.) may range from a low of any one of about 10, 20, and 30 MU to a high of any one of about 40, 50, 60, 70 80, 90, and 100 MU, as determined by the test method described in the Experimental section below.

The copolymers may have MLRA ranging from a low of any one of about 300, 400, 500, 600, and 700 mu*sec to a high of any one of about, 800, 900, 1000, 1150, 1200, 1250, 1300, 1350, 1400, 1450, 1500, 1550, 1600, 1650, 1700, 1750, 1800, 1850, 1900, 1950, and 2000 mu*sec. For instance, MLRA may be within the range of about 500 to about 2000 mu*sec, or from about 500 to about 1500 mu*sec, or from about 600 to about 1200 mu*sec, etc. In certain embodiments, MLRA may be at least 500 mu*sec, or at least 600 mu*sec, or at least 700 mu*sec, as determined by the test method described in the Experimental section below.

Alternatively, the copolymers may have cMLRA at Mooney Large Viscosity ML=80 mu (Mooney units) ranging from a low of any one of about 300, 400, 500, 600 and 700 mu*sec to a high of any one of about 800, 900, 1000, 1150, 1200, 1250, 1300, 1350, 1400, 1450, 1500, 1550, 1600, 1650, 1700, 1750, 1800, 1850, 1900, 1950, and 2000 mu*sec. For instance, cMLRA may be within the range of about 400 to about 2000 mu*sec, or from about 500 to about 1500 mu*sec, or from about 700 to about 1200 mu*sec, etc. In certain embodiments, cMLRA may be at least 400 mu*sec (without a necessary upper boundary), or at least 500 mu*sec, or at least 600 mu*sec, as determined by the test method described in the Experimental section below.

In any embodiment of the invention described herein the copolymers may have a complex viscosity at 0.1 rad/sec and a temperature of 125° C. of at least 100,000 Pa·sec (preferably at least 200,000 Pa·sec, preferably from 50,000 to 1,000,000 Pa·sec, preferably from 100,000 to 1,000,000 Pa·sec). The complex viscosity is measured using RPA using the procedure described in the Experimental section below.

Blends

In another embodiment, the polymer (preferably the polyethylene or polypropylene) produced herein is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In a preferred embodiment, the polymer (preferably the polyethylene or polypropylene) is present in the above blends, at from 10 to 99 wt %, based upon the weight of the polymers in the blend, preferably 20 to 95 wt %, even more preferably at least 30 to 90 wt %, even more preferably at least 40 to 90 wt %, even more preferably at least 50 to 90 wt %, even more preferably at least 60 to 90 wt %, even more preferably at least 70 to 90 wt %.

The blends described above may be produced by mixing the polymers of the invention with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

The polymer of some embodiments of this invention may be formulated and/or processed with any one or more various additives (e.g., curatives or cross-linking agents, fillers, process oils, and the like) to form rubber compounds suitable for making articles of manufacture. For instance, rubber compounds according to some such embodiments include, in addition to the polymer composition, any components suitable for an ethylene-propylene-diene monomer (EPDM) rubber formulation. For example, any of various known additives (fillers, plasticizers, compatibilizers, cross-linkers, and the like) may be formulated with the polymer produced herein, providing a rubber compound or rubber formulation.

Where curatives, i.e., cross-linking agents or vulcanizing agents, are utilized, the polymer produced herein may be present in the rubber compound in at least partially cross-linked form (that is, at least a portion of the polymer chains of the devolatilized elastomer composition are cross-linked with each other, e.g., as a result of a curing process typical for EPDM rubbers).

Accordingly, particular embodiments provide for an at least partially cross-linked rubber compound made by mixing a formulation comprising: (a) a polymer produced herein; (b) one or more vulcanization activators; (c) one or more vulcanizing agents; and (d) optionally, one or more further additives.

Suitable vulcanization activators include one or more of zinc oxide, stearic acid, and the like. These activators may be mixed in amounts ranging from about 0 to 20 phr. As used herein, "phr" means parts per hundred parts rubber, where the "rubber" is taken as the polymer in the formulation. Thus, for activator to be formulated with polymer at 15 phr, one would add 15 g activator to 100 g polymer. Unless specified otherwise, phr should be taken as phr on a weight basis. Different vulcanization activators may be employed in different amounts. For instance, where the vulcanization activator includes zinc oxide, the zinc oxide may be employed at amounts ranging from 1 to 20 phr, such as 2.5 to 10 phr (e.g., about 5 phr), while stearic acid may preferably be employed in amounts ranging from 0.1 to 5 phr, such as 0.1 to 2.0 phr (e.g., about 1.0 or 1.5 phr). In some embodiments, multiple vulcanization activators may be utilized (e.g., both ZnO and stearic acid).

Any vulcanizing agent known in the art may be used. Of particular note are curing agents as described in Col. 19, line 35 to Col. 20, line 30 of U.S. Pat. No. 7,915,354, which description is hereby incorporated by reference (e.g., sulfur, peroxide-based curing agents, resin curing agents, silanes, and hydrosilane curing agents). Other examples include phenolic resin curing agents (e.g., as described in U.S. Pat. No. 5,750,625, also incorporated by reference herein). Cure co-agents may also be employed (e.g., as described in the already-incorporated description of U.S. Pat. No. 7,915,354).

Dual cure systems may be used. In dual cure systems, a combination of heat, moisture cure, and radiation may be effectively employed. For instance, it may be desirable to employ peroxide crosslinking agents in conjunction with silane crosslinking agents, peroxide crosslinking agents in conjunction with radiation, sulfur-containing crosslinking agents in conjunction with silane crosslinking agents, etc.

The further additives (used in any compound and/or in an at least partially cross-linked rubber compound according to various embodiments) may be chosen from any known additives useful for EPDM formulations, and include, among others, one or more of Process oil, such as API Group I, II, or III base oils, including aromatic, naphthenic, paraffinic, and/or isoparaffinic process oil (examples including Sunpar™ 2280 (available from HollyFrontier Refining & Marketing LLC, Tulsa, Oklahoma); as well as Flexon™ 876, CORE™ 600 base stock oil, Flexon™ 815, and CORE™ 2500 base stock oil, available from ExxonMobil Chemical Company, Baytown, Texas. Process oil may be present in the formulation at 1-150 phr (when present), and preferred process oils have viscosity at 40° C. ranging from 80 to 600 CSt. The ordinarily skilled artisan will understand that, for applications requiring a color other than black, and/or in which color of the final article is important, a paraffinic or isoparaffinic oil (e.g., having aromatic and/or heteroatom content less than 1 wt % total, preferably less than 0.1 wt % total), sometimes referred to as "white oils," may be particularly preferred. Many API Group II and/or III base oils may satisfy such applications.

Vulcanization accelerators, present in the formulation at 0 to 15 phr total, such as 1-5, or 2-4 phr, with examples including one or more of: thiazoles such as 2-mercaptobenzothiazole or mercaptobenzothiazol disulfide (MBTS); guanidines such as diphenylguanidine; sulfenamides such as N-cyclohexylbenzothiazol-sulfenamide; dithiocarbamates such as zinc dimethyl dithiocarbamate, zinc diethyl dithiocarbamate, zinc dibenzyl dithiocarbamate (ZBEC); and zincdibutyldithiocarbamate, thioureas such as 1,3-diethylthiourea, thiophosphates and others.

Processing aids (e.g., aromatic or paraffinic oil, polyethylene glycol or zinc soap).

Carbon black (e.g., having particle size from 20 nm to 600 nm and structure having DBPA (dibutyl phthalate absorption number) within the range from 0 to 150, as measured by the DBP method described in ASTM D2414), which may be present in the formulation at 0-500 phr, preferably 0-200 phr, such as within the range of 50-150 phr.

Mineral fillers (talc, calcium carbonate, clay, silica, aluminum trihydrate, and the like), which may be present in the formulation from 0 to 200 phr, preferably from 20 to 100 phr, such as in the range of 30 to 60 phr.

Various other additives, such as antioxidants, stabilizers, anticorrosion agents, UV absorbers, antistatics, slip agents, moisture absorbents (e.g., calcium oxide), and pigments, dyes and other colorants.

As noted, the at least partially cross-linked rubber compounds of some embodiments are formed by mixing the above-described formulations. Mixing in these embodiments may include any one or more of typical mixing processes for EPDM compositions, such as open mill mixing, mixing using internal mixers or kneaders, and extrusion (e.g., through an extruder, such as a twin-screw or other multi-screw extruder).

The compound viscosity (Mooney Viscosity of the compound) of at least partially cross-linked rubber compounds in accordance with some embodiments is within the range from 20 to 100 MU, preferably 50 to 85 MU, or 50 to 70 MU, such as from 65 to 90 MU (ML, 1+4 @ 100° C.), with ranges from any of the foregoing lows to any of the foregoing highs also contemplated in various embodiments.

Any of the foregoing polymers and compositions may be used in a variety of end-use applications according to methods known in the art. Exemplary end use applications include films, film-based products, diaper backsheets, housewrap, wire and cable coating compositions, articles formed by molding techniques (e.g., injection or blow molding, extrusion coating, foaming, casting, and combinations thereof). End uses also include products made from films, e.g., bags, packaging, and personal care films, pouches, medical products, such as for example, medical films and intravenous (IV) bags.

Any of the foregoing polymers or blends thereof, may be used in a variety of end-use film applications. Such applications include, for example, mono- or multi-layer blown, extruded, and/or shrink films. These films may be formed by any number of well-known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxially orientation can be accomplished using typical cold drawing or hot drawing methods. Biaxial orientation can be accomplished using tenter frame equipment or a double bubble processes and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically the films are oriented in the Machine Direction (MD) at a ratio of up to 15, preferably between 5 and 7, and in the Transverse Direction (TD) at a ratio of up to 15, preferably 7 to 9. However, in another embodiment the film is oriented to the same extent in both the MD and TD directions.

The films may vary in thickness depending on the intended application; however, films of a thickness from 1 to 50 m are usually suitable. Films intended for packaging are usually from 10 to 50 m thick. The thickness of the sealing layer is typically 0.2 to 50 m. There may be a sealing layer on both the inner and outer surfaces of the film or the sealing layer may be present on only the inner or the outer surface.

In another embodiment, one or more layers may be modified by corona treatment, electron beam irradiation, gamma irradiation, flame treatment, or microwave. In a preferred embodiment, one or both of the surface layers is modified by corona treatment.

Any of the foregoing polymers or blends thereof, may be used in a variety of end-use elastomeric applications. Semi-crystalline or amorphous compositions containing 4-methyl-1,4-hexadiene may be used to produce ethylene-propylene-diene (EPDM) elastomers. The ability of 4-methyl-1,4-hexadiene to facilitate cure, enables their use as curable rubbers with useful attributes such as: ozone resistance, UV resistance, compression set, low-temperature flexibility, good insulating properties and elasticity.

Depending on molecular weight, crystallinity and diene content the EPDM materials containing MHD may be tailored for use in a number of applications by varying the Mooney viscosity ML (1+4) at 125° C., ethylene content (wt %) and MHD wt %. They may be used as components in thermoplastic vulcanizates, used directly, or combined with fillers, oils or cure packages.

Compositions can be made that are suitable for applications including extruded profiles and molding applications where rate of extrusion, cure rate and compression set are important performance parameters. Key end-use applications include heat insulation seals, roofing, air-conditioners and other appliance or durable good sealing application. Compositions can be made that are suitable for dense profiles found in automotive or building profiles.

Other applications include: tires, such as tire sidewalls and tire treads; thermoplastic elastomers and thermoplastic vulcanizates; foamed articles such as seals, hoses and insulating coatings; non-foamed hose, belts such as banded v-belt and those used in conveyor systems, seals, gaskets, pads, roofing, sheeting, and electricals such as wire and cable coatings.

In another embodiment, this invention relates to:
1. A polymer comprising one or more dienes comprising: 1) 4 substituted 1,4 hexadiene and less than 20 wt % 5-methyl-1,4-hexadiene based upon the weight of the polymer, and 2) optionally, one or more olefins.
2. The polymer of paragraph 1 wherein the one or more dienes consist essentially of 4 substituted 1,4-hexadiene.
3. The polymer of paragraph 1 wherein the diene is represented by the formula:

$$H_2C=CH-CH_2-C(R^4)=CH-CH_3$$

wherein $R^\#$ is a $C_1$ to $C_{20}$ hydrocarbyl group, preferably $R^\#$ is one or more of phenyl, benzyl naphthyl, styryl, xylyl, methyl, ethyl, propyl, butyl, pentyl, hexyl, heptyl, octyl, nonyl, decyl, undecyl, dodecyl, or an isomer thereof.
4. The polymer of paragraph 1 wherein the diene is 4-methyl-1,4-hexadiene, 4-ethyl-1,4-hexadiene, 4-n-propyl-1,4-hexadiene, 4-n-butyl-1,4-hexadiene, 4-phenyl-1,4-hexadiene, or 4-methyl-phenyl-1,4-hexadiene.
5. The polymer of paragraph 1, 2, 3, or 4 wherein the olefins comprise one or more of ethylene, propylene, butene, pentene, hexene, heptene, octene, nonene, decene, undecene, dodecene, norbornene, cyclopentene, cycloheptene, cyclooctene, cyclooctadiene, cyclododecene, 7-oxanorbornene, styrene, methyl-styrene, substituted derivatives thereof, and isomers thereof.
6. The polymer of paragraph 1 wherein the polymer consists essentially of diene represented by the formula:

$$H_2C=CH-CH_2-C(R^4)=CH-CH_3$$

wherein $R^\#$ is a $C_1$ to $C_{20}$ hydrocarbyl, preferably $R^\#$ is a $C_1$ to $C_{20}$ alkyl group or a $C_6$ to $C_{20}$ aryl group.

7. The polymer of paragraph 1 wherein the polymer is a copolymer of one or more $C_2$ to $C_{40}$ olefins and one or more dienes represented by the formula:

$$H_2C=CH-CH_2-C(R^\#)=CH-CH_3$$

wherein $R^\#$ is a $C_1$ to $C_{20}$ hydrocarbyl group, preferably $R^\#$ is a $C_1$ to $C_{20}$ alkyl group or a $C_6$ to $C_{20}$ aryl group.
8. The polymer of paragraph 1 wherein the polymer is a copolymer of at least one $C_2$ to $C_{40}$ alpha olefin, a vinyl aromatic, and one or more dienes represented by the formula:

$$H_2C=CH-CH_2-C(R^\#)=CH-CH_3$$

wherein $R^\#$ is a $C_1$ to $C_{20}$ hydrocarbyl group, preferably $R^\#$ is a $C_1$ to $C_{20}$ alkyl group or a $C_6$ to $C_{20}$ aryl group.
9. The polymer of paragraph 1 wherein the olefins comprise ethylene, propylene, ethylene and propylene, and optional vinyl aromatic, such as styrene.
10. The polymer of paragraph 1 wherein the polymer has an Mw of 70,000 g/mol or more and a Mooney (ML 1+4, 125° C.) value greater than 20 MU.
11. The polymer of paragraph 1 wherein the polymer has a $T_g$ of −40° C. or less.
12. A process to produce polymer, such as polymer of any of claims 1 to 11, comprising contacting: 1) diene comprising 4 substituted 1,4 hexadiene and 20 wt % or less of 5-methyl-1,4-hexadiene, and 2) optionally one or more olefins, with 3) a catalyst system comprising single site coordination polymerization catalyst and activator (such as alumoxane and or non-coordination anion activator).
13. The process of paragraph 12, wherein the single site coordination polymerization catalyst comprises metallocene and or post metallocene catalyst compound or a combination thereof.
14. The process of paragraph 12, wherein the single site coordination polymerization catalyst is selected from the group consisting of metallocene complexes, pyridyldiamido complexes, quinolinyldiamido complexes, phenoxyimine complexes, bisphenolate complexes, cyclopentadienyl-amidinate complexes, iron pyridyl bis(imine) complexes, FI catalysts, PI catalysts, pyridyl bisphenolate complex, ONNO bisphenolate complex, ONYO bisphenolate complex, or mixtures thereof.
15. The process of paragraph 12, wherein the catalyst system further comprises a support material, preferably selected from $Al_2O_3$, $ZrO_2$, $SiO_2$, $SiO_2/Al_2O_3$, $SiO_2/TiO_2$, silica clay, silicon oxide-clay, or mixtures thereof.
16. The process of paragraph 12 or 15, wherein the single site coordination polymerization catalyst is one or more of:
dimethylsilyl (tetramethylcyclopentadienyl)(cyclododecylamido)titanium dimethyl;
dimethylsilyl (tetramethylcyclopentadienyl)(cyclododecylamido)titanium dimethyl;
dimethylsilyl (tetramethylcyclopentadienyl)(t-butylamido) titanium dimethyl;
dimethylsilyl (tetramethylcyclopentadienyl)(t-butylamido) titanium dimethyl;
µ-(CH$_3$)$_2$Si(cyclopentadienyl)(1-adamantylamido)titanium dimethyl;
µ-(CH$_3$)$_2$Si(3-tertbutylcyclopentadienyl)(1-adamantylamido)titanium dimethyl;
µ-(CH$_3$)$_2$(tetramethylcyclopentadienyl)(1-adamantylamido) titanium dimethyl;
µ-(CH$_3$)$_2$Si(tetramethylcyclopentadienyl)(1-adamantylamido)titanium dimethyl;
µ-(CH$_3$)$_2$C(tetramethylcyclopentadienyl)(1-adamantylamido)titanium dimethyl;

μ-(CH$_3$)$_2$Si(tetramethylcyclopentadienyl)(1-tertbutylamido) titanium dimethyl$_2$;
μ-(CH$_3$)$_2$Si(fluorenyl)(1-tertbutylamido)titanium dimethyl;
μ-(CH$_3$)$_2$Si(tetramethylcyclopentadienyl)(1-cyclododecylamido)titanium dimethyl;
μ-(C$_6$H$_5$)$_2$C(tetramethylcyclopentadienyl)(1-cyclododecylamido)titanium dimethyl;
μ-(CH$_3$)$_2$Si(η$^5$-2,6,6-trimethyl-1,5,6,7-tetrahydro-s-indacen-1-yl)(tertbutylamido)titanium dimethyl;
bis(1-methyl, 3-n-butyl cyclopentadienyl)hafnium dimethyl;
bis(1-methyl, 3-n-butyl cyclopentadienyl)zirconium dimethyl;
dimethylsilyl bis(indenyl)zirconium dimethyl;
dimethylsilyl bis(indenyl)hafnium dimethyl;
bis(indenyl)zirconium dimethyl;
bis(indenyl)hafnium dimethyl;
dimethylsilyl bis(tetrahydroindenyl)zirconium dimethyl;
bis(n-propylcyclopentadienyl)zirconium dimethyl;
dimethylsilylbis(tetrahydroindenyl)hafnium dimethyl;
dimethylsilyl bis(2-methylindenyl)zirconium dimethyl;
dimethylsilyl bis(2-methylfluorenyl)zirconium dimethyl;
dimethylsilyl bis(2-methylindenyl)hafnium dimethyl;
dimethylsilyl bis(2-methylfluorenyl)hafnium dimethyl;
dimethylsilyl bis(2-methyl-5,7-propylindenyl)zirconium dimethyl;
dimethylsilyl bis(2-methyl-4-phenylindenyl)zirconium dimethyl;
dimethylsilyl bis(2-ethyl-5-phenylindenyl)zirconium dimethyl;
dimethylsilyl bis(2-methyl-4-biphenylindenyl)zirconium dimethyl;
dimethylsilylene bis(2-methyl-4-carbazolylindenyl)zirconium dimethyl;
rac-dimethylsilyl-bis-(5,6,7,8-tetrahydro-5,5,8,8-tetramethyl-2-methyl-1H-benz(f)indene)hafnium dimethyl;
diphenylmethylene (cyclopentadienyl)(fluorenyl)hafnium dimethyl;
bis(methylcyclopentadienyl)zirconium dimethyl;
rac-dimethylsiylbis(2-methyl,3-propyl indenyl)hafnium dimethyl;
dimethylsilylbis(indenyl)hafnium dimethyl;
dimethylsilylbis(indenyl)zirconium dimethyl,
dimethyl rac-dimethylsilyl-bis-(5,6,7,8-tetrahydro-5,5,8,8-tetramethyl-2-methyl-1H-benz(f)indene)hafnium dimethyl;
Rac-meso-diphenylsilyl-bis(n-propylcyclopentadienyl)hafnium dimethyl;
1,1'-bis(4-triethylsilylphenyl)methylene-(cyclopentadienyl)(3,8-di-tertiary-butyl-1-fluorenyl)hafnium Cl$_2$ (bridge is considered the 1 position);
1,1'-bis(4-triethylsilylphenyl)methylene-(cyclopentadienyl)(3,8-di-tertiary-butyl-1-fluorenyl)hafnium Me$_2$ (bridge is considered the 1 position);
bis-trimethylsilylphenyl-methylene(cyclopentadienyl)(di-t-butylfluorenyl)hafnium dimethyl;
bis-trimethylsilylphenyl-methylene(cyclopentadienyl)(fluorenyl)hafnium dimethyl;
bisphenylmethylene(cyclopentadienyl)(dimethylfluorenyl) hafnium dimethyl,
bis(n-propylcyclopentadienyl)hafnium dimethyl;
bis(n-butylcyclopentadienyl)hafnium dimethyl;
bis(n-pentylcyclopentadienyl)hafnium dimethyl;
(n-propyl cyclopentadienyl)(n-butylcyclopentadienyl)hafnium dimethyl;
bis[(2-trimethylsilylethyl)cyclopentadienyl]hafnium dimethyl;
bis(trimethylsilyl cyclopentadienyl)hafnium dimethyl;
dimethylsilylbis(n-propylcyclopentadienyl)hafnium dimethyl;
dimethylsilylbis(n-butylcyclopentadienyl)hafnium dimethyl;
bis(1-n-propyl-2-methylcyclopentadienyl)hafnium dimethyl;
(n-propylcyclopentadienyl)(1-n-propyl-3-n-butylcyclopentadienyl)hafnium dimethyl;
bis(n-propylcyclopentadienyl)hafnium dimethyl;
bis(n-butylcyclopentadienyl)hafnium dimethyl;
bis(n-pentylcyclopentadienyl)hafnium dimethyl;
(n-propyl cyclopentadienyl)(n-butylcyclopentadienyl)hafnium dimethyl;
bis[(2-trimethylsilylethyl)cyclopentadienyl]hafnium dimethyl;
bis(trimethylsilyl cyclopentadienyl)hafnium dimethyl;
dimethylsilylbis(n-propylcyclopentadienyl)hafnium dimethyl;
dimethylsilylbis(n-butylcyclopentadienyl)hafnium dimethyl;
bis(1-n-propyl-2-methylcyclopentadienyl)hafnium dimethyl;
(n-propylcyclopentadienyl)(1-n-propyl-3-n-butylcyclopentadienyl)hafnium dimethyl;
dimethylsilyl(3-n-propylcyclopentadienyl)(tetramethylcyclopentadienyl)zirconium dimethyl;
dimethylsilyl bis(2-methyl-4-phenyl)indenyl zirconium dichloride;
dimethylsilyl bis(2-methyl-4-phenyl)indenyl zirconium dimethyl;
dimethylsilyl bis(2-methyl-4-(4-tertbutylphenyl)indenyl zirconium dichloride;
dimethylsilyl bis(2-methyl-4-(4-tertbutylphenyl)indenyl zirconium dimethyl;
dimethylsilyl bis(2-methyl-4-(4-(1-naphthyl))indenyl zirconium dichloride;
dimethylsilyl bis(2-methyl-4-(4-(1-naphthyl))indenyl zirconium dimethyl;
dimethylsilyl bis(2-methyl-4-(4-(3,5-ditertbutylphenyl))indenyl zirconium dichloride;
dimethylsilyl bis(2-methyl-4-(4-(3,5-ditertbutylphenyl))indenyl zirconium dimethyl;
dimethylsilyl-(4-([1,1'-biphenyl]-2-yl)-2-hexyl-1H-inden-1-yl)(4-(3,5-di-tert-butyl-4-methoxyphenyl)-2-methyl-1H-inden-1-yl)zirconium dichloride;
dimethylsilyl-(4-([1,1'-biphenyl]-2-yl)-2-hexyl-1H-inden-1-yl)(4-(3,5-di-tert-butyl-4-methoxyphenyl)-2-methyl-1H-inden-1-yl)zirconium dimethyl;
dimethylsilyl-(4-(4-(tert-butyl)phenyl)-2-isopropyl-1H-inden-1-yl)(4-(4-(tert-butyl)phenyl)-2-methyl-1,5,6,7-tetrahydro-s-indacen-1-yl)zirconium dichloride;
dimethylsilyl-(4-(4-(tert-butyl)phenyl)-2-isopropyl-1H-inden-1-yl)(4-(4-(tert-butyl)phenyl)-2-methyl-1,5,6,7-tetrahydro-s-indacen-1-yl)zirconium dimethyl;
dimethylsilyl-(4-(4-(tert-butyl)phenyl)-2-isopropyl-1H-inden-1-yl)(4-(4-(tert-butyl)phenyl)-2-methyl-1H-inden-1-yl)zirconium dichloride;
dimethylsilyl-(4-(4-(tert-butyl)phenyl)-2-isopropyl-1H-inden-1-yl)(4-(4-(tert-butyl)phenyl)-2-methyl-1H-inden-1-yl)zirconium dimethyl;
tetramethylcyclopentadienyl dimethylsilyl (2-methyl-4-phenyl)-1,5,6,7-tetrahydro-s-indacen-1-yl)zirconium dichloride;

tetramethylcyclopentadienyl dimethylsilyl (2-methyl-4-phenyl)-1,5,6,7-tetrahydro-s-indacen-1-yl)zirconium dimethyl;

tetramethylcyclopentadienyl dimethylsilyl (2-methyl-4-(4-tertbutylphenyl)-1,5,6,7-tetrahydro-s-indacen-1-yl)zirconium dichloride;

tetramethylcyclopentadienyl dimethylsilyl (2-methyl-4-(4-tertbutylphenyl)-1,5,6,7-tetrahydro-s-indacen-1-yl)zirconium dimethyl;

tetramethylcyclopentadienyl dimethylsilyl (2-methyl-4-(o-tolyl)-1,5,6,7-tetrahydro-s-indacen-1-yl)zirconium dichloride;

tetramethylcyclopentadienyl dimethylsilyl (2-methyl-4-(o-tolyl)-1,5,6,7-tetrahydro-s-indacen-1-yl)zirconium dimethyl;

tetramethylcyclopentadienyl dimethylsilyl (4-([1,1'-biphenyl]-2-yl)-1,5,6,7-tetrahydro-s-indacen-1-yl)zirconium dichloride;

tetramethylcyclopentadienyl dimethylsilyl (4-([1,1'-biphenyl]-2-yl)-1,5,6,7-tetrahydro-s-indacen-1-yl)zirconium dimethyl;

tetramethylcyclopentadienyl dimethylsilyl (4-(2-isopropylphenyl)-2-methyl-1,5,6,7-tetrahydro-s-indacen-1-yl)zirconium dichloride;

tetramethylcyclopentadienyl dimethylsilyl (4-(2-isopropylphenyl)-2-methyl-1,5,6,7-tetrahydro-s-indacen-1-yl)zirconium dimethyl;

tetramethylcyclopentadienyl dimethylsilyl (2-methyl-4-(2,3,4-trimethylphenyl)-1,5,6,7-tetrahydro-s-indacen-1-yl)zirconium dichloride;

tetramethylcyclopentadienyl dimethylsilyl (2-methyl-4-(2,3,4-trimethylphenyl)-1,5,6,7-tetrahydro-s-indacen-1-yl)zirconium dimethyl;

tetramethylcyclopentadienyl dimethylsilyl (4-(3,5-di-tert-butyl-4-methoxyphenyl)-2-methyl-1,5,6,7-tetrahydro-s-indacen-1-yl)zirconium dichloride;

tetramethylcyclopentadienyl dimethylsilyl (4-(3,5-di-tert-butyl-4-methoxyphenyl)-2-methyl-1,5,6,7-tetrahydro-s-indacen-1-yl)zirconium dimethyl;

tetramethylcyclopentadienyl dimethylsilyl (4-(anthracen-9-yl)-2-methyl-1,5,6,7-tetrahydro-s-indacen-1-yl))zirconium dichloride;

tetramethylcyclopentadienyl dimethylsilyl (4-(anthracen-9-yl)-2-methyl-1,5,6,7-tetrahydro-s-indacen-1-yl))zirconium dimethyl;

tetramethylcyclopentadienyl dimethylsilyl (2-methyl-4-(3,5-di-trifluoromethylphenyl)-1,5,6,7-tetrahydro-s-indacen-1-yl)zirconium dichloride;

tetramethylcyclopentadienyl dimethylsilyl (2-methyl-4-(3,5-di-trifluoromethylphenyl)-1,5,6,7-tetrahydro-s-indacen-1-yl)zirconium dimethyl;

tetramethylcyclopentadienyl dimethylsilyl (4-(1-naphthyl)-2-methyl-1,5,6,7-tetrahydro-s-indacen-1-yl))zirconium dichloride; and tetramethylcyclopentadienyl dimethylsilyl (4-(1-naphthyl)-2-methyl-1,5,6,7-tetrahydro-s-indacen-1-yl))zirconium dimethyl.

17. The process of paragraph 12, wherein the single site coordination polymerization catalyst comprises one or more of:

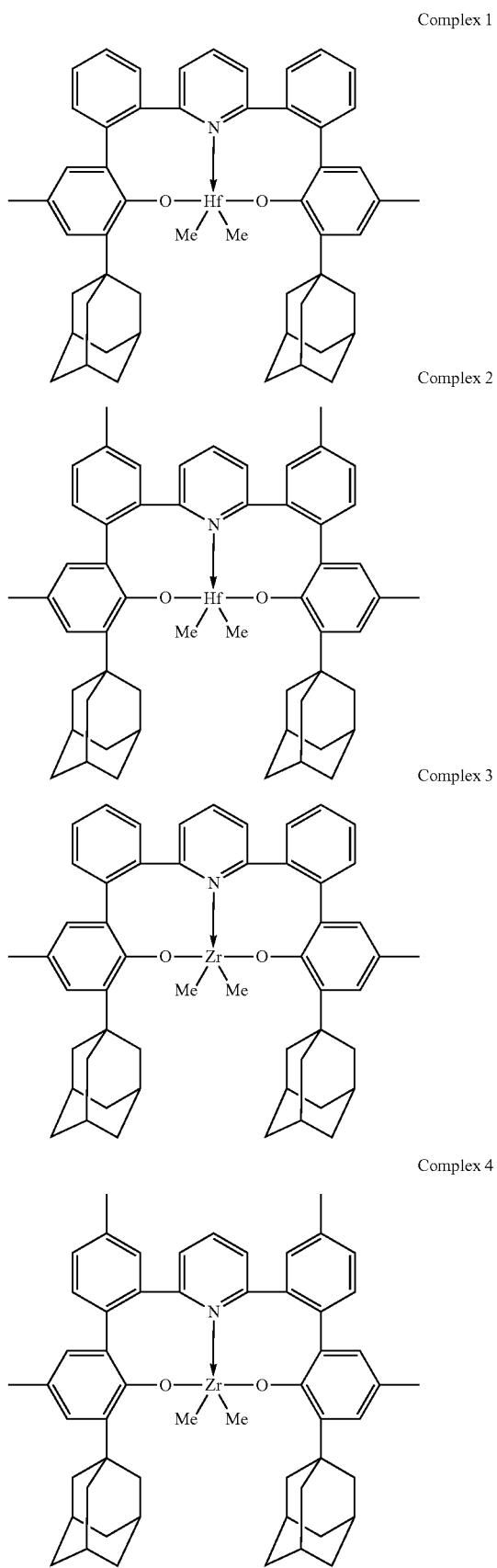

Complex 1

Complex 2

Complex 3

Complex 4

Complex 5
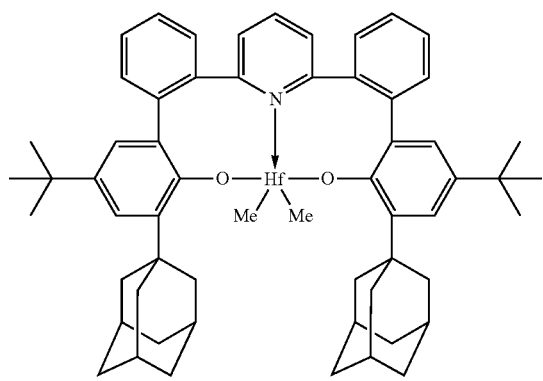
Complex 8
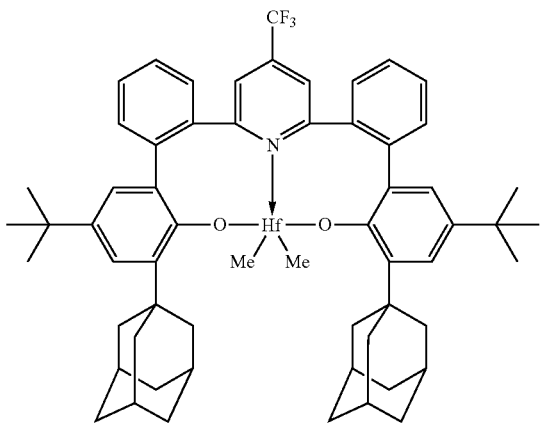
Complex 6
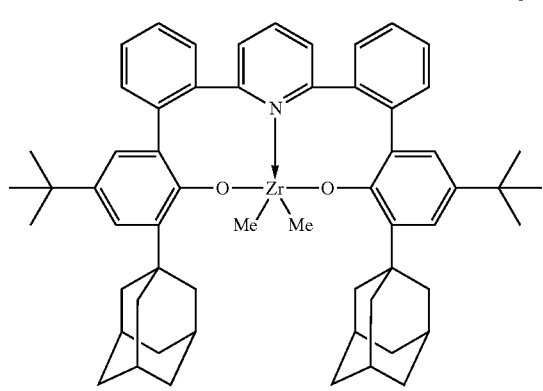
Complex 9
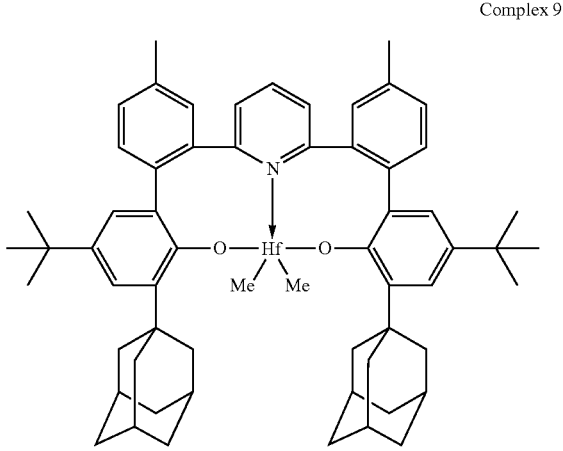
Complex 7
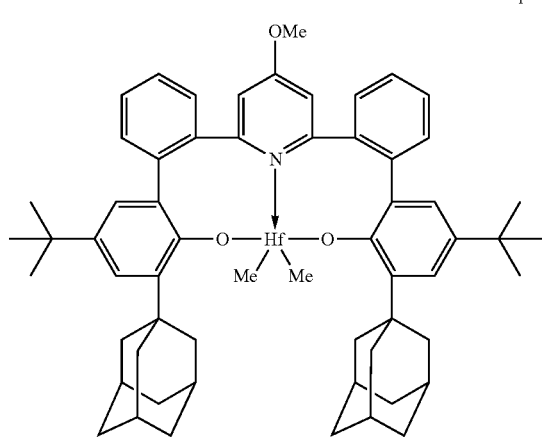
Complex 10
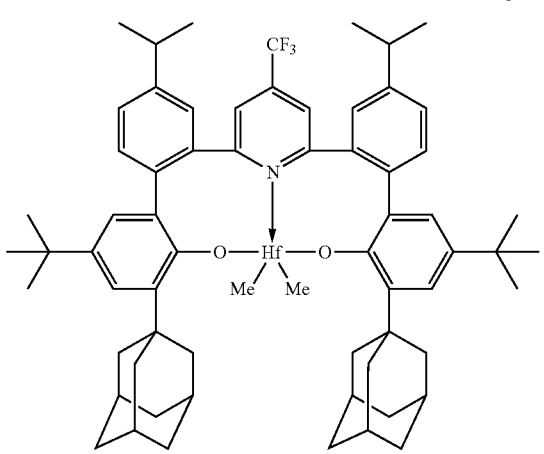

Complex 11
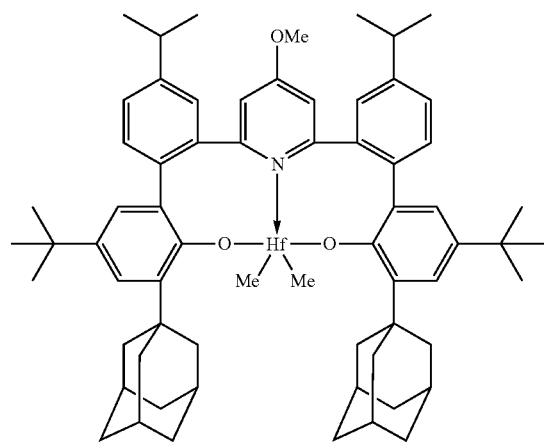
Complex 14
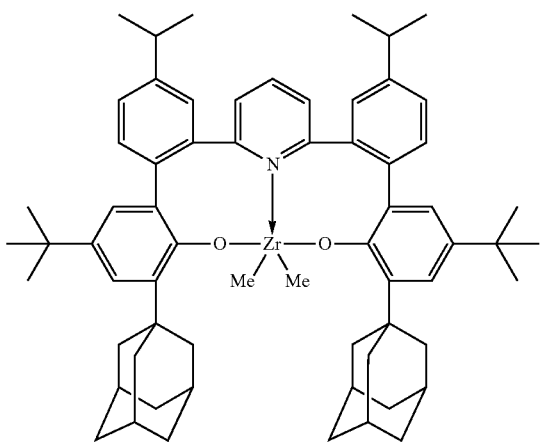
Complex 12
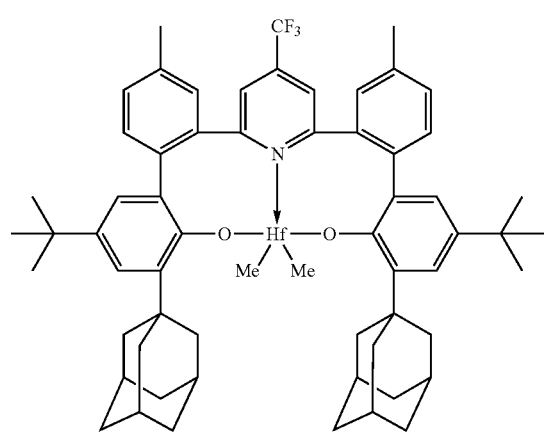
Complex 15
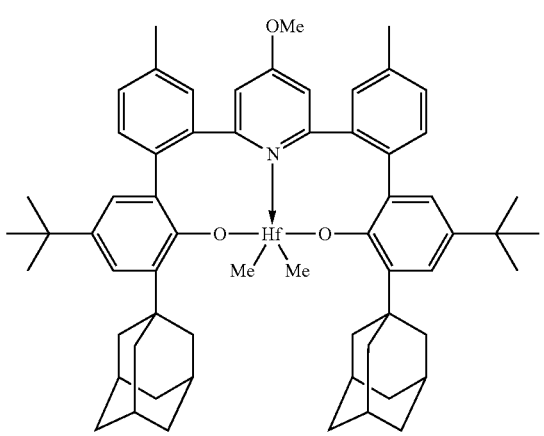
Complex 13
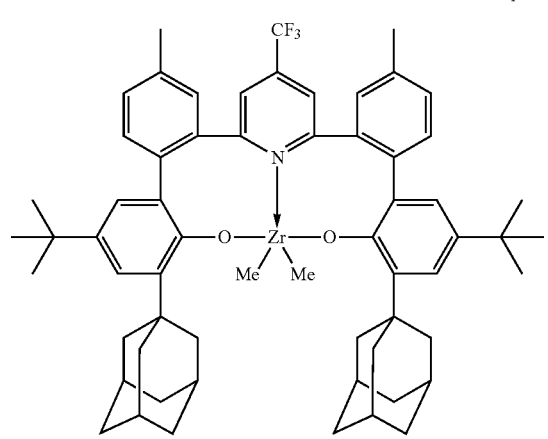
Complex 16
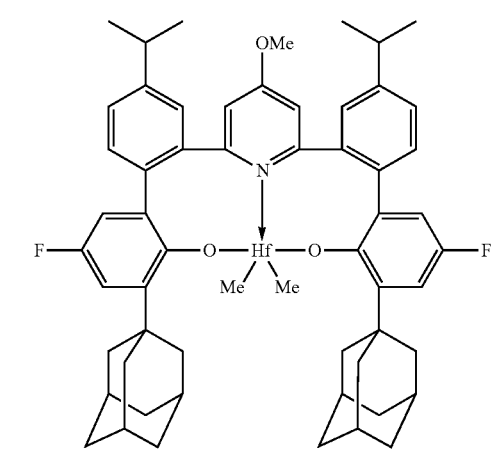

Complex 17
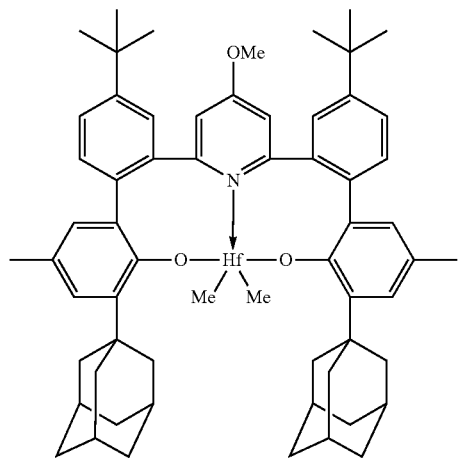
Complex 18
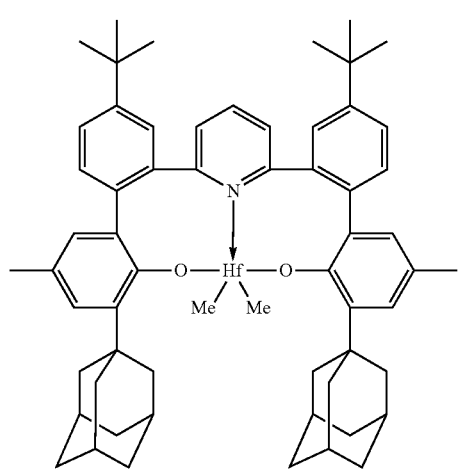
Complex 19
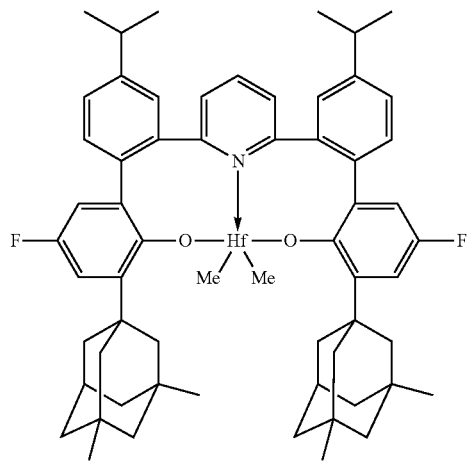
Complex 20
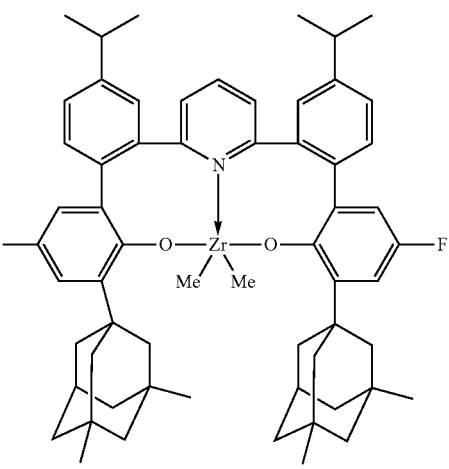
Complex 21
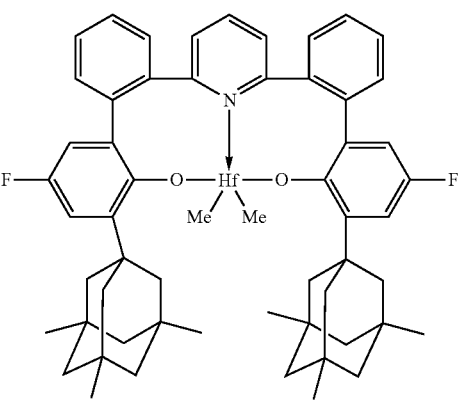
Complex 22
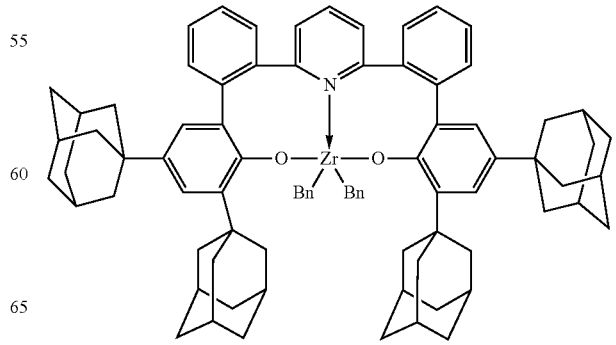

Complex 23
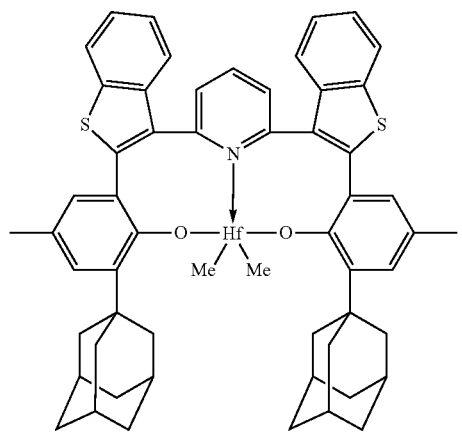
Complex 24
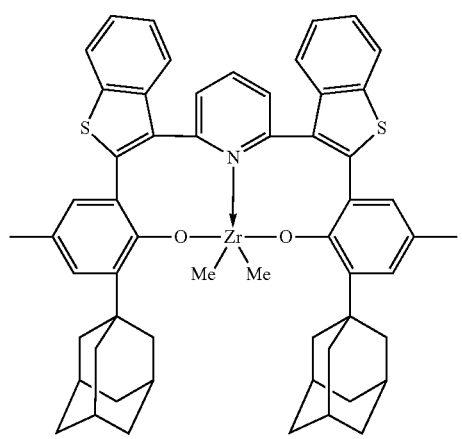
Complex 25
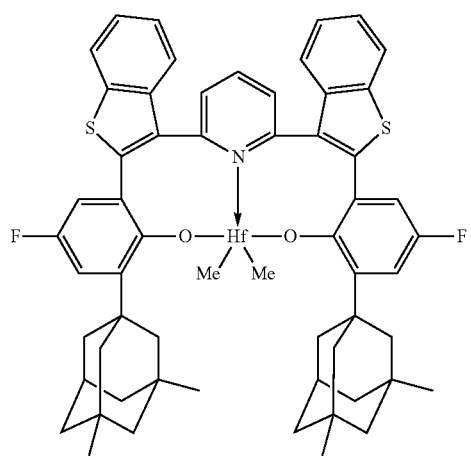
Complex 26
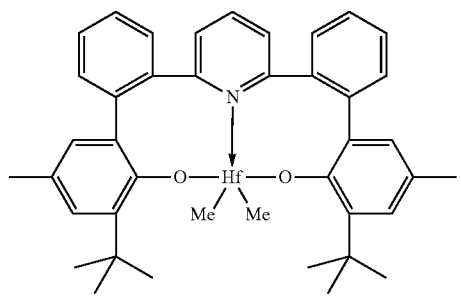
Complex 27
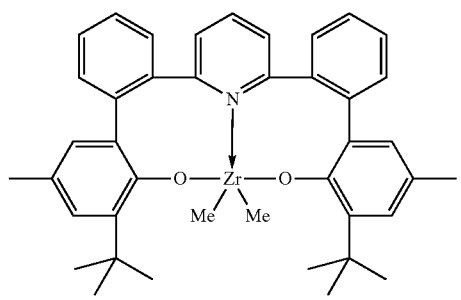
Complex 29
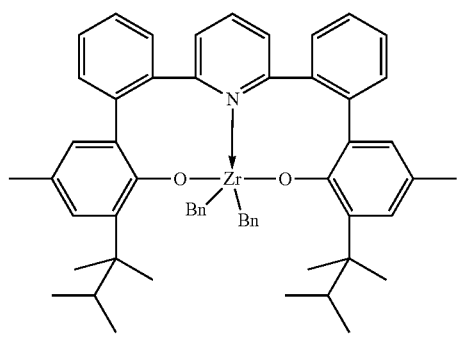
Complex 30
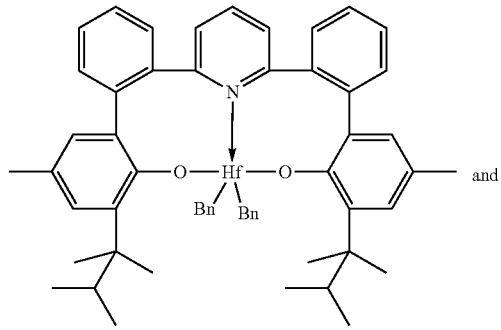
and Complex 31

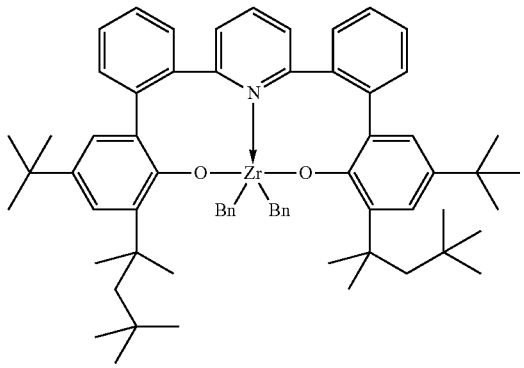

Complex 32

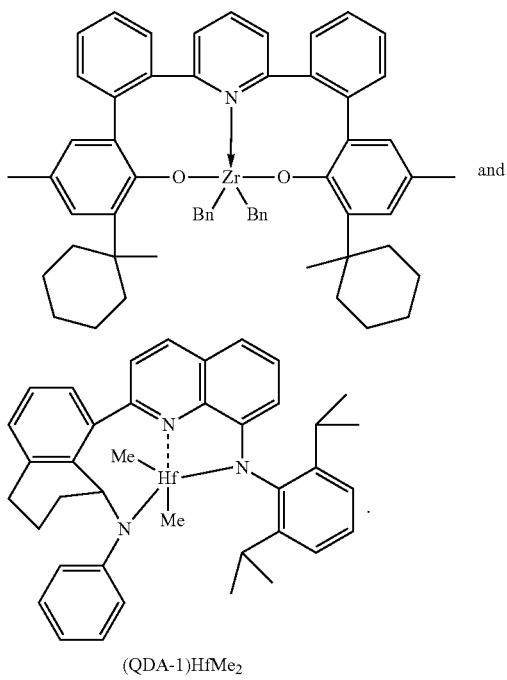

and (QDA-1)HfMe₂

18. The process of any of paragraphs 12 to 17 wherein the activator is one or more of.
N-methyl-4-nonadecyl-N-octadecylbenzenaminium tetrakis(pentafluorophenyl)borate,
N-methyl-4-nonadecyl-N-octadecylbenzenaminium tetrakis(perfluoronaphthalenyl)borate,
dioctadecylmethylammonium tetrakis(pentafluorophenyl)borate,
dioctadecylmethylammonium tetrakis(perfluoronaphthyl)borate,
N,N-dimethylanilinium tetrakis(pentafluorophenyl)borate,
N,N-dimethylanilinium tetrakis(perfluoronaphthyl)borate,
triphenylcarbenium tetrakis(pentafluorophenyl)borate,
trimethylammonium tetrakis(perfluoronaphthyl)borate,
triethylammonium tetrakis(perfluoronaphthyl)borate,
tripropylammonium tetrakis(perfluoronaphthyl)borate,
tri(n-butyl)ammonium tetrakis(perfluoronaphthyl)borate,
tri(t-butyl)ammonium tetrakis(perfluoronaphthyl)borate,
N,N-diethylanilinium tetrakis(perfluoronaphthyl)borate,
N,N-dimethyl-(2,4,6-trimethylanilinium)tetrakis(perfluoronaphthyl)borate,
tropillium tetrakis(perfluoronaphthyl)borate,
triphenylcarbenium tetrakis(perfluoronaphthyl)borate,
triphenylphosphonium tetrakis(perfluoronaphthyl)borate,
triethylsilylium tetrakis(perfluoronaphthyl)borate,
benzene(diazonium)tetrakis(perfluoronaphthyl)borate,
trimethylammonium tetrakis(perfluorobiphenyl)borate,
triethylammonium tetrakis(perfluorobiphenyl)borate,
tripropylammonium tetrakis(perfluorobiphenyl)borate,
tri(n-butyl)ammonium tetrakis(perfluorobiphenyl)borate,
tri(t-butyl)ammonium tetrakis(perfluorobiphenyl)borate,
N,N-dimethylanilinium tetrakis(perfluorobiphenyl)borate,
N,N-diethylanilinium tetrakis(perfluorobiphenyl)borate,
N,N-dimethyl-(2,4,6-trimethylanilinium)tetrakis(perfluorobiphenyl)borate,
tropillium tetrakis(perfluorobiphenyl)borate,
triphenylcarbenium tetrakis(perfluorobiphenyl)borate,
triphenylphosphonium tetrakis(perfluorobiphenyl)borate,
triethylsilylium tetrakis(perfluorobiphenyl)borate,
benzene(diazonium)tetrakis(perfluorobiphenyl)borate,
[4-t-butyl-PhNMe₂H][(C₆F₃(C₆F₅)₂)₄B],
trimethylammonium tetraphenylborate,
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
N,N-dimethyl-(2,4,6-trimethylanilinium)tetraphenylborate,
tropillium tetraphenylborate,
triphenylcarbenium tetraphenylborate,
triphenylphosphonium tetraphenylborate,
triethylsilylium tetraphenylborate,
benzene(diazonium)tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-diethylanilinium tetrakis(pentafluorophenyl)borate,
N,N-dimethyl-(2,4,6-trimethylanilinium)tetrakis(pentafluorophenyl)borate,
tropillium tetrakis(pentafluorophenyl)borate,
triphenylcarbenium tetrakis(pentafluorophenyl)borate,
triphenylphosphonium tetrakis(pentafluorophenyl)borate,
triethylsilylium tetrakis(pentafluorophenyl)borate,
benzene(diazonium)tetrakis(pentafluorophenyl)borate,
trimethylammonium tetrakis-(2,3,4,6-tetrafluorophenyl)borate,
triethylammonium tetrakis-(2,3,4,6-tetrafluorophenyl)borate,
tripropylammonium tetrakis-(2,3,4,6-tetrafluorophenyl)borate,
tri(n-butyl)ammonium tetrakis-(2,3,4,6-tetrafluoro-phenyl)borate,
dimethyl(t-butyl)ammonium tetrakis-(2,3,4,6-tetrafluorophenyl)borate,
N,N-dimethylanilinium tetrakis-(2,3,4,6-tetrafluorophenyl)borate,
N,N-diethylanilinium tetrakis-(2,3,4,6-tetrafluorophenyl)borate,
N,N-dimethyl-(2,4,6-trimethylanilinium)tetrakis-(2,3,4,6-tetrafluorophenyl)borate,
tropillium tetrakis-(2,3,4,6-tetrafluorophenyl)borate,
triphenylcarbenium tetrakis-(2,3,4,6-tetrafluorophenyl)borate,
triphenylphosphonium tetrakis-(2,3,4,6-tetrafluorophenyl)borate, triethylsilylium tetrakis-(2,3,4,6-tetrafluorophenyl)borate,
benzene(diazonium)tetrakis-(2,3,4,6-tetrafluorophenyl)borate,
trimethylammonium tetrakis(3,5-bis(trifluoromethyl)phenyl)borate,
triethylammonium tetrakis(3,5-bis(trifluoromethyl)phenyl)borate,
tripropylammonium tetrakis(3,5-bis(trifluoromethyl)phenyl)borate,
tri(n-butyl)ammonium tetrakis(3,5-bis(trifluoromethyl)phenyl)borate,
tri(t-butyl)ammonium tetrakis(3,5-bis(trifluoromethyl)phenyl)borate,
N,N-dimethylanilinium tetrakis(3,5-bis(trifluoromethyl)phenyl)borate,
N,N-diethylanilinium tetrakis(3,5-bis(trifluoromethyl)phenyl)borate,
N,N-dimethyl-(2,4,6-trimethylanilinium)tetrakis(3,5-bis(trifluoromethyl)phenyl)borate,
tropillium tetrakis(3,5-bis(trifluoromethyl)phenyl)borate,
triphenylcarbenium tetrakis(3,5-bis(trifluoromethyl)phenyl)borate,
triphenylphosphonium tetrakis(3,5-bis(trifluoromethyl)phenyl)borate,
triethylsilylium tetrakis(3,5-bis(trifluoromethyl)phenyl)borate,
benzene(diazonium)tetrakis(3,5-bis(trifluoromethyl)phenyl)borate,
di-(i-propyl)ammonium tetrakis(pentafluorophenyl)borate,
dicyclohexylammonium tetrakis(pentafluorophenyl)borate,
tri(o-tolyl)phosphonium tetrakis(pentafluorophenyl)borate,
tri(2,6-dimethylphenyl)phosphonium tetrakis(pentafluorophenyl)borate,
triphenylcarbenium tetrakis(perfluorophenyl)borate,
1-(4-(tris(pentafluorophenyl)borate)-2,3,5,6-tetrafluorophenyl)pyrrolidinium,
tetrakis(pentafluorophenyl)borate,
4-(tris(pentafluorophenyl)borate)-2,3,5,6-tetrafluoropyridine, and
triphenylcarbenium tetrakis(3,5-bis(trifluoromethyl)phenyl)borate).

19. The process of paragraph 12 wherein the process occurs at a temperature of from about 0° C. to about 300° C., at a pressure in the range of from about 0.35 MPa to about 10 MPa, and at a time up to 300 minutes.

20. The process of any paragraphs 12 to 19 further comprising obtaining homopolymer of diene represented by the formula (6): $H_2C=CH-CH_2-C(R^{\#})=CH-CH_3$, wherein $R^{\#}$ is a $C_1$ to $C_{20}$ hydrocarbyl group; a copolymer of one or more $C_2$ to $C_{40}$ olefins and one or more dienes represented by the Formula (6).

21. A polymer comprising: 1) 4 substituted 1,4 hexadiene and less than 5 wt % 5-substituted-1,4-hexadiene based upon the weight of the polymer, and 2) optionally, one or more olefins.

EXPERIMENTAL

A variety of polymeric compositions were produced using 4-methyl-1,4-hexadiene (MHD) as a monomer or comonomer with a variety of single-site catalyst systems. These tests were conducted in a variety of reactor configurations and scales. The details of which are provided, below.

General Considerations and Analytical Methods

Unless otherwise stated, materials were handled using standard chemical techniques. All potentially air-sensitive materials (i.e. catalysts, activators, solvents) were manipulated under anhydrous conditions with dry dinitrogen. Reagent grade or better starting materials were purchased from commercial venders and used as received or purified according to standard procedures. Commercially sourced materials were utilized as received or purified according to standard procedures (Anarego, W. L.; Chair, C. L. *Purification of Laboratory Chemicals;* 5 ed.; Elsevier: Oxford, 2003). All solvents and monomers were subjected to standard procedures to dry and degass the materials. NMR data for catalysts and chemical precursors were recorded on Bruker 400 MHz and 500 MHz NMR Spectrometers. $^1$H and $^{13}$C{$^1$H} chemical shifts are reported in ppm relative to SiMe$_4$ ($^1$H and $^{13}$C{$^1$H} $\delta$=0.0 ppm) using residual protio resonances.

Pre-Catalysts for the Preparation of 4-methyl-1,4-hexadiene
Synthesis of $Mg(C_4H_6)(THF)_2$ A method was adapted from ("*Magnesium butadiene as a reagent for the preparation of transition-metal butadiene complexes: molecular structure of bis(η-butadiene)[1,2-bis (dimethylphosphine)ethane]hafnium*" Inorg. Chem. v. 20, pp. 3918-3924). Butadiene (100 g) was condensed at −30° C. and then vacuum transferred to a thick-walled flask containing calcium hydride powder. It was allowed to stir for 24 hours at −30° C. The butadiene was then cold filtered (−30° C.) through a chilled, glass fritted funnel packed with calcium hydride.

A 500 mL thick-walled flask was fitted with a PTFE-coated magnetic stirbar. It was then charged with magnesium filings (~24 g), THF (300 mL), and an alligoute of iodobenzene (~0.5 mL). The mixture was cooled to −60° C. using cold-bath. Liquid butadiene (25 mL) was then added. The flask was sealed and allowed to warm to room temperature to react while stirring. After 16 hours, a pale yellow suspension had formed. At this time, the flask was opened and additional liquid butadiene (~30 mL) was quickly added along with THF (100 mL). The additional THF was added to ensure efficient mixing of the, now thick, suspension. After an additional 18 hours, the flask was unsealed and the reaction mixture passed through a successive series of aluminum mesh sieves to remove unreacted magnesium particulates. Additional THF (~200 mL) was used to help carry the product through the mesh. Final mesh size was 0.025 inches. The sieved suspension (i.e. filtrate) was collected and filtered through a medium porosity glass fritted funnel. This afforded a pale-yellow/off-white solid that was washed with THF (100 mL) and Et$_2$O (3×200 mL). Washes were continued until the filtrate ran colorless. The filter cake was then dried under reduced pressure (200 mTorr) for several hours. This afforded 90.01 g of the desired product which was used without further purification. ATR-IR (powder): 2955 (m), 2885 (m), 2846 (m), 2785 (w), 2750 (w), 1579 (m), 1552 (w, sh), 1456 (w), 1404 (w), 1358 (m), 1340 (w), 1244 (vw), 1159 (m), 1027 (s), 943 (m), 899 (m, sh), 870 (vs), 739 (s), 698 (sh), 650 (s), 547 (s) 520 (vs), 502 (vs), 457 (s) cm$^1$.

Preparation of N,N-dimesitylbutane-2,3-diimine ($^{Mes}$DI)

A 500 mL round-bottom flask was fitted with PTFE coated stir-bar and Dean Stark apparatus. The flask was charged with 2,3-butanedione (15.00 g, 0.174 mol), 2,4-6-trimethylaniline (49.36 g, 0.365 mol., 2.095 equiv.), toluene (400 mL) and a catalytic quantity of para-toluenesulfonic acid (0.5 g). The reaction flask atmosphere was then purged with nitrogen and the mixture heated to 80° C. for 4 hours. The temperature was first held at 80° C. to form the mono-substituted imine-one. This was done to reduce the quantity of 2,3-butanedione that condenses in the Dean Stark, once toluene was brought to reflux. After 4 hours, the reaction mixture was brought to reflux and allowed to react for 36 hours; during which time 6.1 mL of water was collected in the Dean Stark. The reaction mixture was then cooled to room temperature and reduced in volume under gentle nitrogen flow to remove volatiles. Crystalline $^{Mes}$DI grew from the non-volatile brown reaction mixture over ~3 hours. Chilled (0-5° C.) acetone was then added (200 mL) and the suspension filtered. This afforded a filter-cake of crystalline $^{Mes}$DI which was washed with additional portions of chilled acetone until bright yellow. Yield 45.1 g, 88.83% $^1$H NMR (400.1 MHz, benzene-d$_6$, 20° C.): δ=6.84 (s, 4H, o-Mes), 2.23 (s, 6H, p-Mes) ppm. $^{13}$C{$^1$H} NMR (120.2 MHz, benzene-d$_6$, 20° C.): δ=168.4, 146.8, 132.4, 129.1, 124.6, 20.9, 18.0, 15.8 ppm.

Preparation of N,N-dimesitylbutane-2,3-diimine iron(II) dibromide ($^{Mes}$DIFeBr$_2$)

In a 1 liter round-bottom flask, iron(II) dibromide (14.13 g, 65.5 mmol) was combined with THF (800 mL) in the presence of a magnetic stir bar. $^{Mes}$DI (20.00 g, 62.38 mmol) was added as a solid in a single portion. The resulting mixture was heated to 50° C. and allowed to react for 24 hours. The resulting mixture was then concentrated to a solid under reduced pressure. The solid was then suspended in Et$_2$O (200 mL) and filtered. The maroon colored filter cake was washed with addition portions of Et$_2$O (3×200 mL) then dried under reduced pressure (200 mTorr). The product is maroon in the solid-state and green in THF solution. Yield: 31.00 g, 92.65% $^1$H NMR (400.1 MHz, THF-d$_8$, 20° C.): δ=110.67, 15.24, 8.99, 5.16 ppm.

Preparation of 4-methyl-1,4-hexadiene (Parr Autoclave)

The methodology described in (Schmidt, V. A., et. al. (2018) "Selective [1.4]-Hydrovinylation of 1,3-dienes With Unactivated Olefins Enabled by Irone Diimine Catalysts" *J Am. Chem. Soc.* v. 140(9), pp 3443-3453) was adapted to enable use in larger scale units.

In a glovebox, a 0.6 L Parr autoclave fitted with mechanical stirring, temperature control and glass liner was charged with a −60° C. isoprene (50.8 g, 75 mL) and $^{Mes}$DIFeBr$_2$ (0.400 g, 20 mL). The mixture was stirred for 20 minutes. Thereafter, Mg(C$_4$H$_6$)THF$_2$ (0.199 g) was added. The Parr reactor was then sealed, removed from glovebox and connected to cooling, HMI interface, and ethylene gas supply. During this time (~20 minutes) the temperature of the reactor contents gradually rose to 14° C. The unit was then pressurized to 700 PSIG (ethylene) and allowed to warm to 50° C. where the temperature was maintained. After 40 minutes, the reactor was cooled to ~20° C. and vented. The liquid contents were filtered through basic alumina to remove catalyst residue. This afforded a colorless liquid which $^1$H and $^{13}$C{$^1$H} NMR spectroscopy showed to be (z)-4-methyl-1,4-hexadiene (MHD) containing ultra trace (<1%) quantities of 5-methyl-1,4-hexadiene. For use in polymerization reactions, MHD was distilled off of calcium hydride at atmospheric pressure (90-91° C.) then allowed to stand on in the presence of alkali metal to remove ultra-trace (<10 ppm or below) quantities of isoprene whereupon the mixture was then filtered through basic alumina. $^1$H NMR (400.1 MHz, chloroform-d$_1$, 20° C.): δ=5.84-5.74 (m, $^1$H, Hb vinyl CH), 5.37-5.32 (q, $^1$H, Hd trisub), 5.11-5.06 (dd, $^1$H, Ha vinyl CH$_2$ cis to vinyl CH), 5.06-5.02 (dd, $^1$H, He vinyl CH$_2$ trans to vinyl CH), 2.82 (d, J=4 Hz, 2H, CH$_2$) 1.73 (s, 3H, 4-CH$_3$), 1.63 (d, 3H, CH$_3$) ppm. $^{13}$C{$^1$H} NMR (120.2 MHz, chloroform-d$_1$, 20° C.): δ=135.9, 133.7, 120.0, 115.0, 36.2, 23.4, 13.2 ppm.

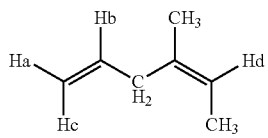

(z)-4-methyl-1,4-hexadiene

Polymer Characterization

Unless stated otherwise (i.e., high throughput methodology, propylene slurry results) the following procedures were utilized to characterize polymer samples.

NMR Methodology

NMR Data for Homopolymer of 4-Methyl-1,4-Hexadiene (See Example 1, Below)

For $^{13}$C NMR of MHD homopolymer, samples were dissolved in deuterated 1,1,2,2-tetrachloroethane (tce-d$_2$) at a concentration of 67 mg/mL at 140° C. Spectra were recorded at 120° C. using a Bruker NMR spectrometer of at least 600 MHz with a 10 mm cryoprobe. A 90° pulse, 10 second delay, at least 512 transients, and gated decoupling were used for measuring the $^{13}$C NMR. Chemical shift was referenced to the residual solvent peak at 74.07 ppm. Reported assignments were confirmed with HSQC, HMBC and DEPT-135 experiments. Assignments:

| Carbon Number | Assignment | Chemical Shift |
|---|---|---|
| 2 | αα CH$_2$ | 40.73 ppm |
| 3 | CH branch | 31.11 ppm |
| 5 | CH$_2$ | 37.41 ppm |
| 6 | Quaternary carbon | 134.95 ppm |
| 7 | Double bond CH | 120.39 ppm |
| 8 | CH$_3$ | 13.33 ppm |
| 9 | CH$_3$ | 23.82 ppm |

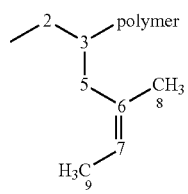

NMR Data for Ethylene Copolymers of 4-methyl-1,4-hexadiene (for Examples 2-6)

For ethylene-4-methyl-1,4-hexadiene copolymers (E-MHD) of Examples 2-6, $^{13}$C NMR samples were dissolved in deuterated 1,1,2,2-tetrachloroethane (tce-d2) at a concentration of 67 mg/mL at 140° C. Spectra were recorded at 120° C. using a Bruker NMR spectrometer of at least 600 MHz with a 10 mm cryoprobe. A 90° pulse, 10 second delay, at least 512 transients, and gated decoupling were used for measuring the $^{13}$C NMR. Polymer resonance peaks are referenced to Polyethylene main peak at 29.98 ppm.

Composition was Determined by:

| Region | Chemical shift (ppm) | Assignments | Triads |
|---|---|---|---|
| A | 42-38 | αα | MMM + 1/2MME |
| B | 38-37 | br($CH_2$)-MMM, MME | MMM + MME |
| C | 37-36 | br($CH_2$)-EME, CH (EME) | 2EME |
| misinsertion | 35.8-35 | $CH_2$ (αβ) | Aβ |
| D | 35-33.4 | αγ + α + CH(MME) | MEM + 1/2MEE + EME + 3/2EMM |
| E | 32.3-30.82 | CH (MMM) | MMM |
| F | 30.82-29.01 | γγ (MEEM), γ, δ | 2EEE + 1/2MEE |
| G | 27-26.5 | β | MEE |
| H | 25.4-24.1 | ββ (MEM) | MEM |
| I | 24.1-21 | $CH_3$(MMM, MME, EME) | MMM + MME + EME |
| J | 15.2-10 | $CH_3$(MMM, MME, EME) | MMM + MME + EME |

M = MHD,
E = Ethylene;

Calculation of Triad Composition
MMM=E
MME=B-E
EME=C/2
MEM=H
EEM=G
EEE=(F−0.5*G)/2
Misinsertions=αβ/2
Total=MMM+MME+EME+MEM+EEM+EEE
Mole % M=(MMM+MME+EME)/Total
Mole % E=(EEE+EEM+MEM)/Total
Weight % M=M*96*100/(M*96+E*28)
Weight % E=E*28*100/(M*96+E*28)

Copolymers Containing 4-methyl-1,4-hexadiene (for Examples 7-24)

For ethylene-propylene-4-methyl-1,4-hexadiene copolymers (EP-MHD), propylene-4-methyl-1,4-hexadiene copolymers (PP-MHD), ethylene-styrene-4-methyl-1,4-hexadiene copolymers (E-MHD-St), and ethylene-propylene-sytrene-4-methyl-1,4-hexadiene copolymers (EP-MHD-St), $^{13}C$ NMR samples were dissolved in deuterated 1,1,2,2-tetrachloroethane (tce-d2) at a concentration of 67 mg/mL at 140° C. Spectra were recorded at 120° C. using a Bruker NMR spectrometer of at least 600 MHz with a 10 mm cryoprobe. A 90° pulse, 20 second delay, at least 512 transients, and inverse gated decoupling were used for measuring the $^{13}C$ NMR. For ethylene based polymers peaks are referenced to Polyethylene main peak at 29.98 ppm and for propylene based polymers peaks are referenced to the propylene $CH_3$ peak at 21.83 ppm.

EP-MHD Composition was Determined by:

| Assignment | Chemical Shift (ppm) | Calculation | Mole % | Weight % |
|---|---|---|---|---|
| Aliphatic | 23-50 | E = (aliphatic-2*P-4*MHD)/2 | E*100/Total | E*28/weight total |
| Propylene $CH_3$ | 23-18 | =P | P*100/Total | P*42/weight total |
| MHD $CH_3$ | 13.33 | =MHD | MHD*100/Total | MHD*96/weight total |
| Total | | E + P + MHD | Weight Total= | E*28 + P*42 + MHD*96 |

Composition for PP-MHD was Determined by:

| Assignment | Chemical Shift (ppm) | Calculation | Mole% | Weight % |
|---|---|---|---|---|
| Propylene $CH_3$ | 22-18 | =P | P*100/Total | P*42/weight total |
| MHD $CH_3$ | 13.33 | =MHD | MHD*100/Total | MHD*96/weight total |
| Total | | P + MHD | Weight Total= | P*42 + MHD*96 |

Composition for E-MHD-St was Determined by:

| Assignment | Chemical Shift (ppm) | Calculation | Mole % | Weight % |
|---|---|---|---|---|
| Styrene (St) | 128-124 | St/5 | St*100/Total | St*104/weight total |
| Aliphatic | 23-50 | E = (aliphatic-4*MHD-2*St)/2 | E*100/Total | E*28/weight total |
| MHD $CH_3$ | 13.33 | =MHD | MHD*100/Total | MHD*96/weight total |
| Total | | E + MHD + St | Weight Total= | E*28 + MHD*96 + St*104 |

Composition for EP-MHD-St was Determined by:

| Assignment | Chemical Shift (ppm) | Calculation | Mole % | Weight % |
|---|---|---|---|---|
| Styrene (St) | 128-124 | St/5 | St*100/Total | St*104/weight total |
| Aliphatic | 23-50 | E = (aliphatic-2*P-4*MHD-2*St) | E*100/Total | E*28/weight total |
| Propylene (P) $CH_3$ | 23-18 | =P | P*100/Total | P*42/weight total |
| MHD $CH_3$ | 13.33 | =MHD | MHD*100/Total | MHD*96/weight total |

-continued

| Assignment | Chemical Shift (ppm) | Calculation | Mole % | Weight % |
|---|---|---|---|---|
| Total | | E + P + MHD + St | Weight Total= | E*28 + P*42 + MHD*96 + St*104 |

For E-MHD and PP-MHD, $^1$H NMR samples were dissolved in deuterated 1,1,2,2-tetrachloroethane (tce-d2) at a concentration of 30 mg/mL at 140° C. Spectra were recorded at 120° C. using a Bruker NMR spectrometer of at least 600 MHz with a 10 mm cryoprobe. A 300 pulse, 5 second delay, and at least 512 transients were used for measuring the $^1$H NMR. Chemical shift was referenced using residual solvent peak at 5.98 ppm.

Calculations for E-MHD

| Assignment | Chemical Shift (ppm) | # protons | Calculation | Mole % |
|---|---|---|---|---|
| MHD tri-sub | 5.37-5.10 | 1 | (MHD/1) | MHD*100/Total |
| Aliphatic | 2.95-0 | 4 | E = (aliphatic-11*MHD)/4 | E*100/Total |
| Total | | | MHD + E | |

Tri-sub = tri-substituted double bond

Calculations for PP-MHD

| Assignment | Chemical Shift (ppm) | # protons | Calculation | Mole % | weight % |
|---|---|---|---|---|---|
| MHD tri-sub | 5.37-5.10 | 1 | (MHD/1) | MHD*100/Total | MHD*96*100/weight total |
| Aliphatic | 2.95-0 | 6 | PP= (aliphatic-11*MHD)/6 | PP*100/Total | pp*42*100/weight total |
| Total | | | MHD + PP | Weight total= | MHD*96 + PP*42 |

Tri-sub = tri-substituted double bond

FTIR Methodology

Fourier Transform Infrared (FT-IR) Spectroscopy was used to determine the ethylene, propylene, and 4-methyl-1,4-hexadiene (MHD) content of polymer compositions produced in continuous polymerization units (vide supra). The FT-IR method was calibrated with standards of ethylene, propylene, and MHD contents ranging from 15.3 to 82.8 wt %, 15.1 to 84.7 wt %, and 0.1 to 25.5 wt % respectively. Calibration standards were quantified using $^1$H and $^{13}$C{$^1$H} NMR spectroscopy described previously. Some calibration standards used in the model did not contain MHD and were added to span a wider range of ethylene and propylene content.

Prior to collecting FT-IR spectra, polymer samples were prepared by cutting a small piece of sample and placing it between two potassium bromide (KBr) salt plates, which were compressed in a cell to yield a polymer film between ~50 to 250 μm in thickness. The polymer film between the KBr plates of the microcompression cell was measured using the Continuum FT-IR microscope system in transmission mode to produce an FT-IR spectrum. Polymer samples were also prepared by compression molding films between ~100 to 250 μm in thickness using a Wabash press set to 204° C. (400° F.) at 10 tons of force for 1 minute. Following compression molding, samples were cooled between water circulating platens at 10 tons of force for 4 minutes before acquiring an FT-IR transmission measurement in a Nicolet iS50 bench spectrometer.

Figure 5:
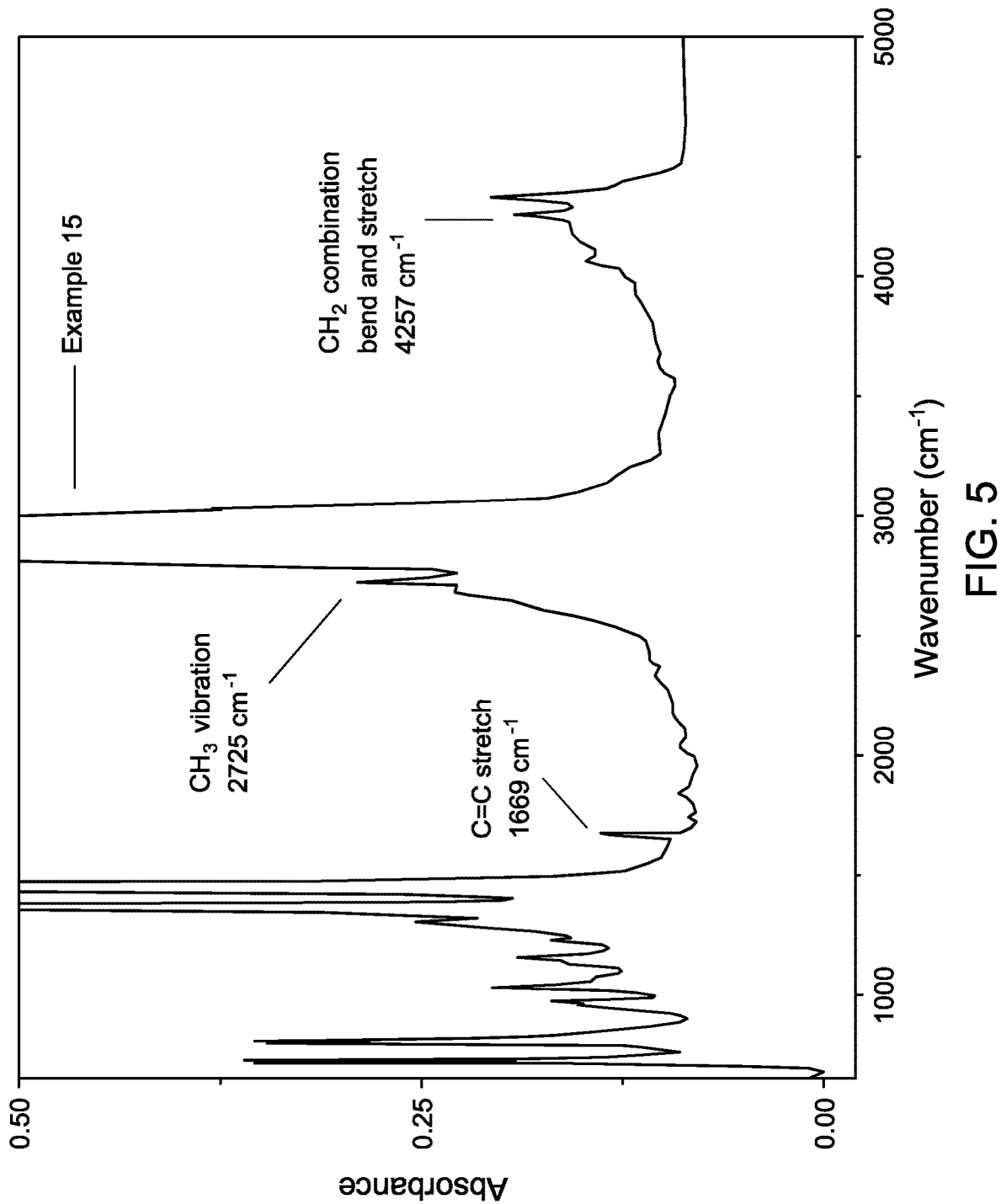
FIG. 5 (FIG. 5) is an FT-IR spectrum of Example 15 with relevant peak assignments for the C=C stretch (1669 cm$^{-1}$), CH$_3$ vibration (2724 cm$^{-1}$), and CH$_2$ combination band (4257 cm$^{-1}$).

FT-IR spectral data was collected on a Thermo Fisher Scientific Nicolet iS50 spectrometer and Continuum microscope system equipped with both a deuterated L-alanine doped triglycine sulphate (DLaTGS) and mercuric cadmium telluride (MCT-A) detector. Collection parameters for FT-IR spectra utilized in the calibration were a resolution of 4, data spacing of 0.9642 cm$^{-1}$, and a spectral range of 650 to 5,000 cm$^{-1}$ on either the Nicolet iS50 bench spectrometer or Continuum FTIR microscope. An FT-IR spectrum of a terpolymer (Example 15) of ethylene, propylene, and MHD can be seen in FIG. 5, with relevant peak assignments. Important spectral features of interest in the infrared spectrum (FIG. 5) are the C=C stretch (~1669 cm$^{-1}$), CH$_3$ vibration (~2725 cm$^{-1}$), and the CH$_2$ bend\stretch combination band (~4257 cm$^{-1}$). Regions of interest associated with the CH$_2$ methylene, CH$_3$ methyl, and C=C double bond functional groups in the FT-IR spectrum of the terpolymer were used in a partial least squares (PLS) regression model to predict the ethylene, propylene, and MHD content.

Figure 6A:
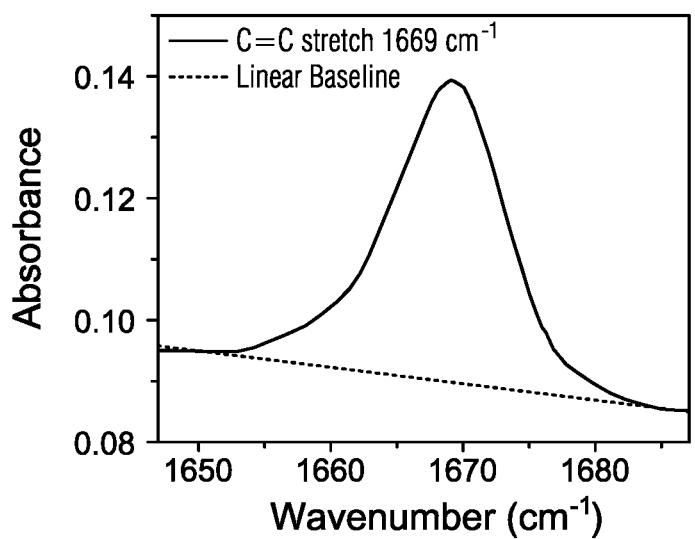
FIGS. 6A, 6B, 6C, 6D, 6E, and 6F are FT-IR spectra of Example 15 showing regions of interest included in the partial least squares (PLS) regression model. a) Linear baseline fit of the C=C double bond stretch region and b) baseline corrected C=C double stretch peak. c) CH$_3$ vibration region and d) first derivative spectrum. e) CH$_2$ combination band and f) first derivative spectrum.
Figure 6B:
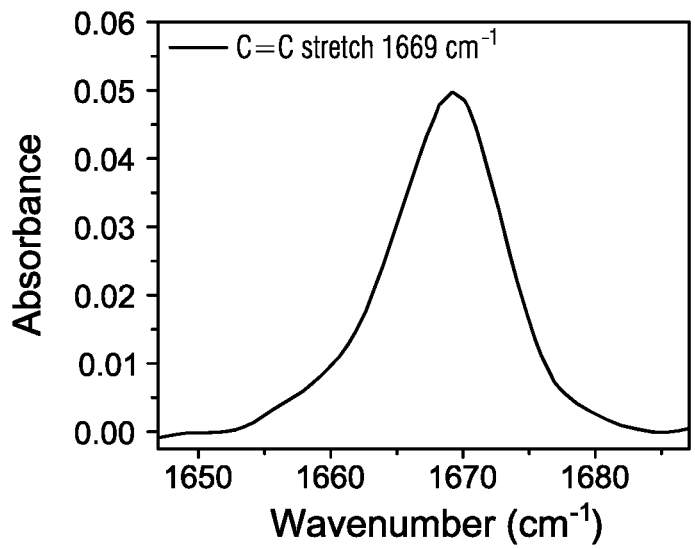
Figure 6C:
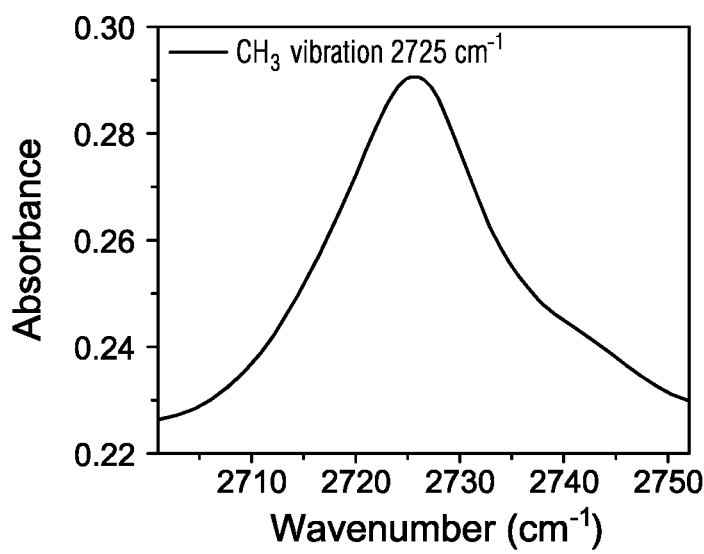
Figure 6D:
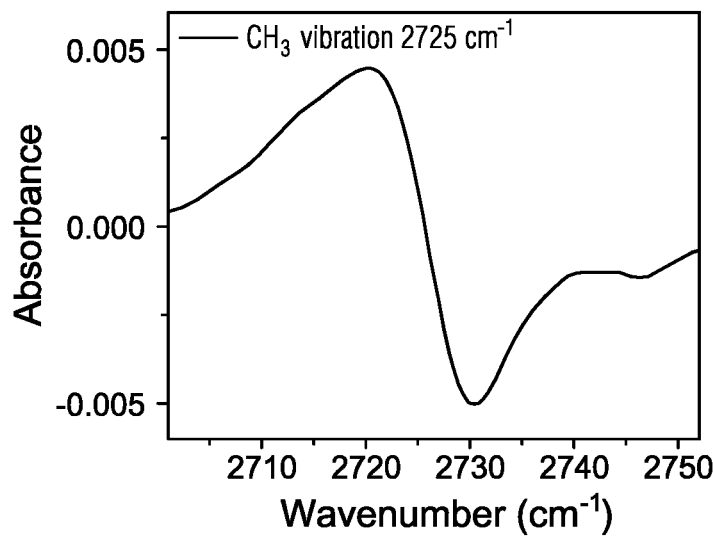
Figure 6E:
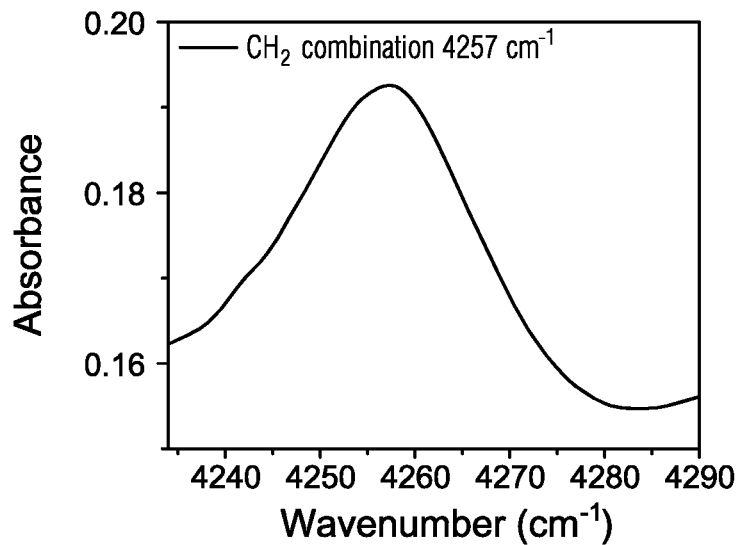
Figure 6F:
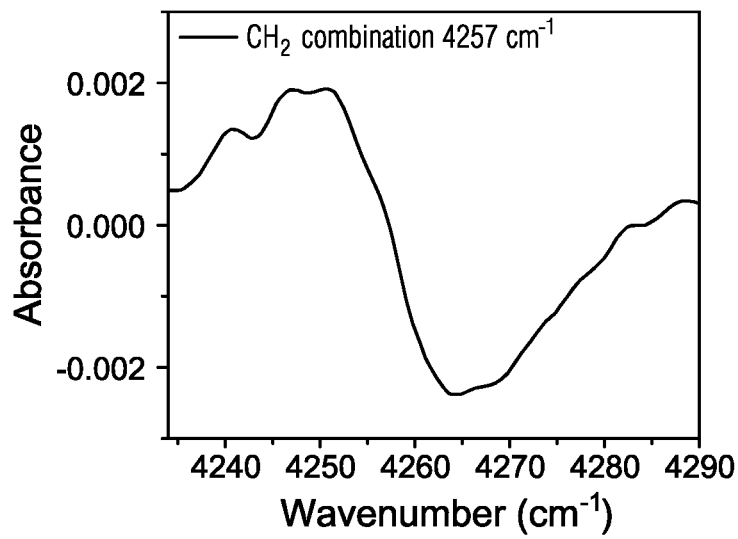
Figure 7:
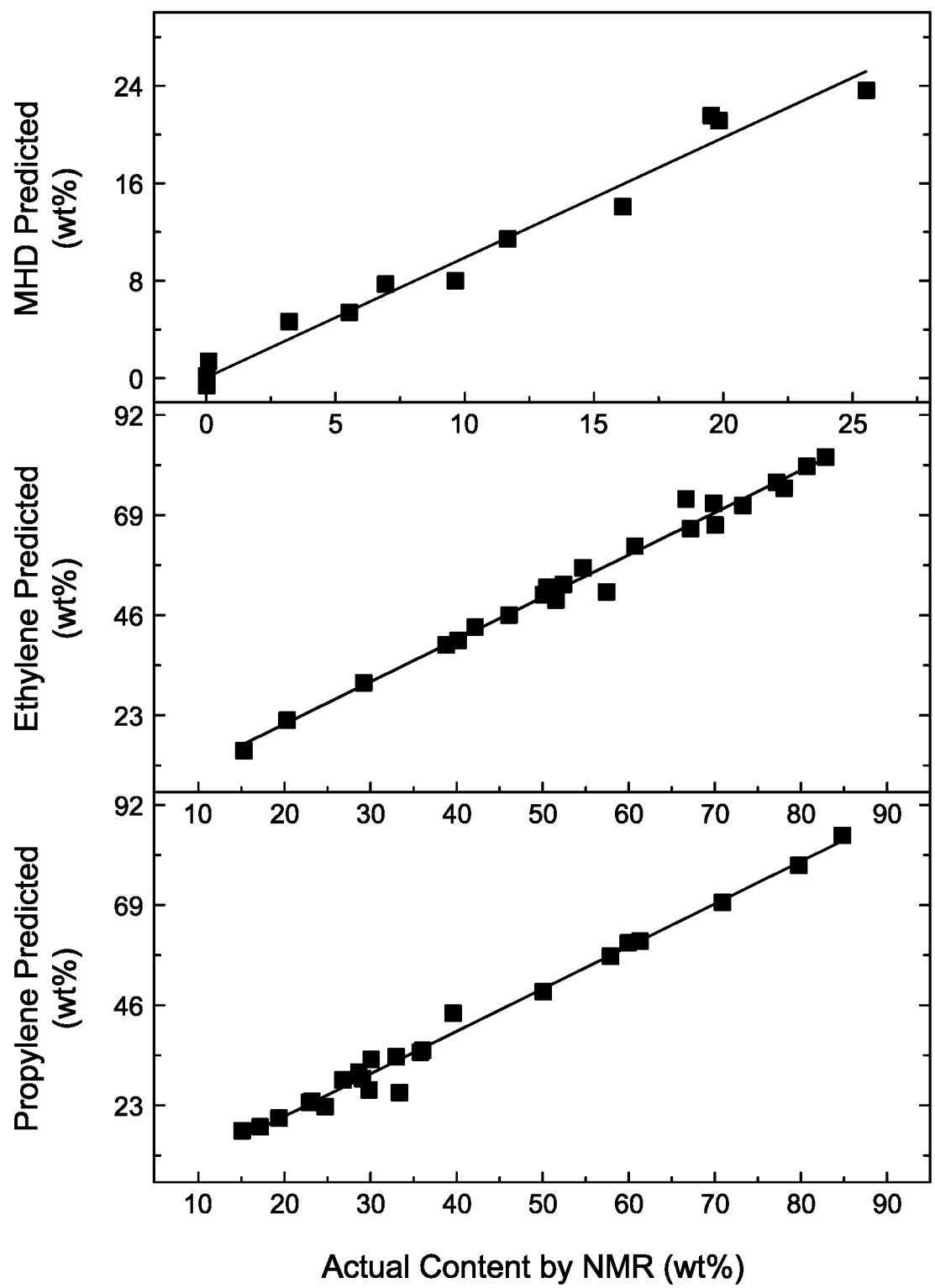
FIG. 7 (FIG. 7) displays plots of actual MHD, ethylene, and propylene content in weight percent determined by NMR versus the partial least squares (PLS) regression model predicted content.

A partial least squares (PLS) regression model was developed in the Thermo Fisher Scientific TQ Analyst software package (TQ Analyst 9, version 9.8.220) to predict the MHD, propylene, and ethylene content of a terpolymer by using the C=C double bond stretch (1647-1687 cm$^{-1}$), CH$_3$ vibration (2701-2752 cm$^{-1}$), and CH$_2$ combination band (4234-4290 cm$^{-1}$), where the sum of the predicted components was equal 100 weight percent. First, FT-IR spectra were corrected for differences in path length using the standard normal variate over the spectral range of 2500-2600 cm$^{-1}$, which subtracts the mean of the spectral range from the spectrum and divides by the standard deviation. After path length correction, each spectral region of interest was preprocessed before the regression, which are herein described. The C=C double bond stretch region was corrected using a linear baseline with end points obtained from the minimum between 1,647 to 1,658 cm$^{-1}$ and the minimum between 1,678 to 1,687 cm$^{-1}$, which was applied before computing the area of the ~1,669 cm$^{-1}$ peak between the specified end points (FIG. 6a-b). Peak area of the C=C double bond stretch at ~1669 cm$^{-1}$ was correlated with the MHD content of the terpolymer. Furthermore, the CH$_3$ vibration (2701-2752 cm$^{-1}$) and the CH$_2$ combination band (4234-4290 cm$^{-1}$) regions specified were preprocessed using the 1st derivative (FIG. 6 c-f). First derivatives of the CH$_3$ (2701-2752 cm$^{-1}$) and CH$_2$ (4234-4290 cm$^{-1}$) regions were correlated with the propylene and ethylene contents respectively. FT-IR spectral data was mean centered and variance scaled before the method was calibrated. Results of the partial least squares (PLS) regression model calibration can be seen in FIG. 7, where the Root Mean Squared Error of Correlation (RMSEC) for MHD, ethylene, and propylene content are 0.954, 2.33, and 2.30 weight percent respectively.

Differential Scanning Calorimetry ("DSC" or "DSC-2")

Thermoanalysis of polymer samples generated in solution and slurry polymerization reactions were performed in order to estimated glass transition temperatures (T$_g$) and melting temperatures (T$_m$). Data was obtained using a TA Instruments Discovery 2500. Pre-weighed samples (2-10 mg)

were placed in a hermetically sealed aluminum pan and loaded into instrument. In a typical experiment, the sample is heated to 220° C. at a ramp-rate of 10° C.·min$^{-1}$, equilibrated for 5 minutes then cooled at 10° C.·min$^{-1}$ to −90° C. where the sample was held for 5 minutes then warmed back to 25° C. at a rate of 10° C.·min$^{-1}$. This first cycle was used to provide uniform thermal history. The thermal cycle was then repeated to obtain data suitable for determination of $T_g$ and $T_m$ values. Data analysis was performed with TA Instruments TRIOS software.

Melt-flow rate (MFR) was determined according to ASTM D1238 (230° C., 2.16 kg).

Gel Permeation Chromotography (GPC 4-D)

Unless otherwise indicated, the distribution and the moments of molecular weight (Mw, Mn, Mz, Mw/Mn, etc.), the comonomer content and the branching index (g') are determined by using a high temperature Gel Permeation Chromatography (Polymer Char GPC-IR) equipped with a multiple-channel band-filter based Infrared detector IR5 with a multiple-channel band filter based infrared detector ensemble IR5 with band region covering from about 2,700 cm$^{-1}$ to about 3,000 cm$^{-1}$ (representing saturated C—H stretching vibration), an 18-angle light scattering detector and a viscometer. Three Agilent PLgel 10-µm Mixed-B LS columns are used to provide polymer separation. Reagent grade 1,2,4-trichlorobenzene (TCB)(from Sigma-Aldrich) comprising ~300 ppm antioxidant BHT can be used as the mobile phase at a nominal flow rate of ~1.0 mL/min and a nominal injection volume of ~200 µL. The whole system including transfer lines, columns, and detectors can be contained in an oven maintained at ~145° C. A given amount of sample can be weighed and sealed in a standard vial with ~10 µL flow marker (heptane) added thereto. After loading the vial in the auto-sampler, the oligomer or polymer may automatically be dissolved in the instrument with ~8 mL added TCB solvent at ~160° C. with continuous shaking. The sample solution concentration can be from ~0.2 to ~2.0 mg/ml, with lower concentrations used for higher molecular weight samples. The concentration, c, at each point in the chromatogram can be calculated from the baseline-subtracted IR5 broadband signal, I, using the equation: c=αI, where α is the mass constant determined with polyethylene or polypropylene standards. The mass recovery can be calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10 M gm/mole. The MW at each elution volume is calculated with following equation:

$$\log M = \frac{\log(K_{PS}/K)}{\alpha+1} + \frac{\alpha_{PS}+1}{\alpha+1}\log M_{PS}$$

where the variables with subscript "PS" stand for polystyrene while those without a subscript are for the test samples. In this method, $\alpha_{PS}$=0.67 and $K_{PS}$=0.000175, α and K for other materials are as calculated by GPC ONE™ software (Polymer Characterization, S.A., Valencia, Spain). Concentrations are expressed in g/cm³, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR. In particular, this provides the methyls per 1,000 total carbons ($CH_3$/1000TC) as a function of molecular weight. The short-chain branch (SCB) content per 1,000TC (SCB/1000TC) is then computed as a function of molecular weight by applying a chain-end correction to the $CH_3$/1000TC function, assuming each chain to be linear and terminated by a methyl group at each end. The weight % comonomer is then obtained from the following expression in which f is 0.3, 0.4, 0.6, 0.8, and so on for $C_3$, $C_4$, $C_6$, $C_8$, and so on co-monomers, respectively:

$$w2=f*SCB/1000TC.$$

The bulk composition of the polymer from the GPC-IR and GPC-4D analyses is obtained by considering the entire signals of the $CH_3$ and $CH_2$ channels between the integration limits of the concentration chromatogram. First, the following ratio is obtained $$\text{Bulk } IR \text{ ratio} = \frac{\text{Area of } CH_3 \text{ signal within integration limits}}{\text{Area of } CH_2 \text{ signal within integration limits}}.$$

Then the same calibration of the $CH_3$ and $CH_2$ signal ratio, as mentioned previously in obtaining the $CH_3$/1000TC as a function of molecular weight, is applied to obtain the bulk $CH_3$/1000TC. A bulk methyl chain ends per 1,000TC (bulk $CH_3$end/1000TC) is obtained by weight-averaging the chain-end correction over the molecular-weight range. Then $$w2b=f*\text{bulk } CH3/1000TC$$

bulk SCB/1000TC=bulk CH3/1000TC−bulk CH3end/1000TC and bulk SCB/1000TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (Light Scattering from Polymer Solutions; Huglin, M. B., Ed.; Academic Press, 1972):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle θ, c is the polymer concentration determined from the IR5 analysis, $A_2$ is the second virial coefficient, $P(\theta)$ is the form factor for a monodisperse random coil, and $K_O$ is the optical constant for the system:

$$K_o = \frac{4\pi^2 n^2 (dn/dc)^2}{\lambda^4 N_A}$$

where $N_A$ is Avogadro's number, (dn/dc) is the refractive index increment for the system, n=1.500 for TCB at 145° C., and λ=665 nm. For analyzing polyethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1−0.00126*w2) ml/mg and $A_2$=0.0015 where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, $[\eta]$, at each point in the chromatogram is calculated from the equation $[\eta]=\eta_s/c$, where c is concentration and is determined from the IR5 broadband channel output. The viscosity MW at each point is calculated as $M=K_{PS} M^{\alpha_{PS}+1}/[\eta]$, where $\alpha_{ps}$ is 0.67 and $K_{ps}$ is 0.000175.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits. The branching index $g'_{vis}$ is defined as $$g'_{vis} = \frac{[\eta]_{avg}}{KM_v^\alpha},$$

where $M_V$ is the viscosity-average molecular weight based on molecular weights determined by LS analysis and the K and $\alpha$ are for the reference linear polymers are calculated by GPC ONE™ software (Polymer Characterization, S.A., Valencia, Spain). Concentrations are expressed in g/cm³, molecular weight is expressed in g/mole, and intrinsic viscosity (hence K in the Mark-Houwink equation) is expressed in dL/g unless otherwise noted. Calculation of the w2b values is as discussed above.

Mooney Viscosity Measurements ML(1+4)

ML and MLRA were measured using a Mooney viscometer according to ASTM D-1646, modified as detailed in the following description. A square sample was placed on either side of the rotor of the Mooney viscometer. The cavity was filled by pneumatically lowering the upper platen. The upper and lower platens were electrically heated and controlled at 125° C. The torque required to turn the rotor at 2 rpm was measured by a torque transducer. The Mooney viscometer was operated at an average shear rate of 2 s⁻¹. The sample was pre-heated for 1 minute after the platens were closed. The motor was then started and the torque was recorded for a period of 4 minutes. The results are reported as ML (1+4) at 125° C., where M is the Mooney viscosity number, L denotes large rotor, 1 is the pre-heat time in minutes, 4 is the sample run time in minutes after the motor starts, and 125° C. is the test temperature.

The torque limit of a Mooney viscometer is about 100 Mooney units. Mooney viscosity values greater than about 100 Mooney units cannot generally be measured under these conditions. In this event, a non-standard rotor design is employed with a change in the Mooney scale, which allows the same Mooney viscometer instrumentation to be used for more viscous polymers. The modified rotor that is both smaller in diameter and thinner than the standard Mooney Large (ML) rotor is termed MST (Mooney Small Thin). Typically when an MST rotor is employed, the test is also run over a different time and at a different temperature. For example, the pre-heat time is changed from the standard 1 minute to 5 minutes and the test is run at 200° C. instead of the standard 125° C. Thus, the Mooney viscosity value reported under these conditions is MST (5+4) at 200° C. The run time of 4 minutes at the end of which the Mooney viscosity reading is taken remains the same as for measurements made under standard conditions. According to EP 1 519 967, incorporated herein by reference, one MST point is approximately 5 ML points when MST is measured at (5+4@200° C.) and ML is measured at (1+4@125° C.).

Preparation of the MST Rotor May Take Place as Follows:

a. The rotor has a diameter of 30.48+/−0.03 mm and a thickness of 2.8+/−0.03 mm (tops of serrations) and a shaft of 11 mm or less in diameter.

b. The rotor should have a serrated face and edge, with square grooves of 0.8 mm width and a depth of 0.25-0.38 mm cut on 1.6 mm centers. The serrations include two sets of grooves at right angles to each other (form a square crosshatch).

c. The rotor is positioned in the center of the die cavity such that the centerline of the rotor disk coincides with the centerline of the die cavity to within a tolerance of +/−0.25 mm. A spacer or a shim may be used to raise the shaft to the midpoint.

d. The wear point (cone shaped protuberance located at the center of the top face of the rotor) is machined off flat with the face of the rotor.

The MLRA data was obtained from the Mooney viscosity measurement when the rubber relaxes once the rotor has been stopped. The MLRA was calculated as the integrated area under the Mooney torque-relaxation time curve from 1 to 100 seconds. The MLRA is a measure of chain relaxation in molten polymer and can be regarded as a stored energy term, which suggests that, after the removal of an applied strain, the longer or branched polymer chains can store more energy and require a longer time to relax. Therefore, the MLRA value of a rubber having a bimodal molecular weight distribution or a long chain branched rubber is larger than that of a rubber having a broad or a narrow molecular weight distribution when compared at the same Mooney viscosity values.

Mooney Relaxation Area is dependent on the Mooney viscosity of the polymer, and increases with increasing Mooney viscosity. In order to remove the dependence on polymer Mooney Viscosity, a corrected MLRA (cMLRA) parameter is used, where the MLRA of the polymer is normalized to a reference of 80 Mooney viscosity. The formula for cMLRA is provided below in Equation 3, $$cMLRA = MLRA\left(\frac{80}{ML}\right)^{1.44}$$

where MLRA and ML are the Mooney Relaxation Area and the Mooney viscosity of the polymer sample measured at 125° C.

Rubber process analyzer (RPA): Dynamic shear melt rheological data was measured using the ATD @ 1000 Rubber Process Analyzer from Alpha Technologies. A sample of approximately 4.5 gm weight is mounted between the parallel plates of the ATD @1000. A nitrogen stream was circulated through the sample oven during the experiments. The test temperature is 125° C., the applied strain is 14% and the frequency was varied from 0.1 rad/s to 385 rad/s. The complex modulus (G*), complex viscosity (η*) and the phase angle (δ) are measured at each frequency. A sinusoidal shear strain is applied to the material. If the strain amplitude is sufficiently small the material behaves linearly. As those of ordinary skill in the art will be aware, the resulting steady-state stress will also oscillate sinusoidally at the same frequency but will be shifted by a phase angle δ with respect to the strain wave. For purely elastic materials δ=0° (stress is in phase with strain) and for purely viscous materials, δ=90°. For viscoelastic materials, 0<δ<90. Complex viscosity, loss modulus (G") and storage modulus (G') as function of frequency are provided by the small amplitude oscillatory shear test. Dynamic viscosity is also referred to as complex viscosity or dynamic shear viscosity. The phase or the loss angle (δ), is the inverse tangent of the ratio of G" (shear loss modulus) to G' (shear storage modulus).

Catalyst Systems

Catalysts 1 to 8 were obtained from commercial sources. Catalysts 11 was obtained in a similar manner as described in US 2015/0119539. Catalyst 9 and 10 were prepared as described below.

Activator-A is N,N-dimethylanilinium tetrakis(perfluorophenyl)borate ([PhNMe$_2$H][B(C$_6$F$_5$)$_4$]).

Activator-B is N,N-dimethylanilinium tetrakis(perfluoronaphthalenyl) borate, ([PhNMe$_2$H][B(C$_{10}$F$_7$)$_4$]).

| Catalyst Structure |
|---|
| 1 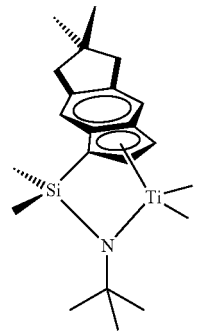 |
| 2 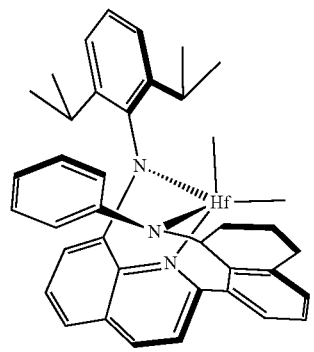 |

| Catalyst Structure |
|---|
| 3 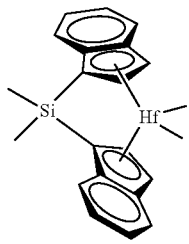 |
| 4 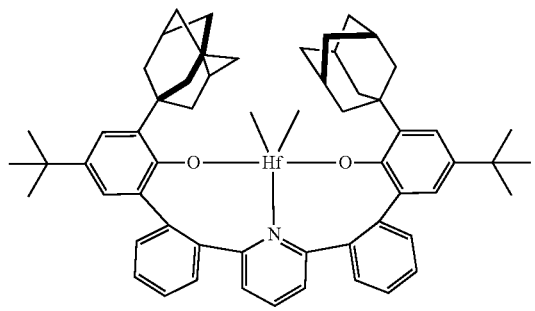 |
| 5 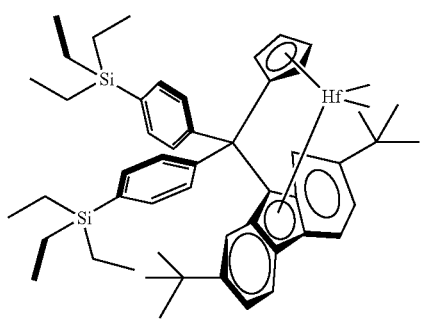 |
| 6 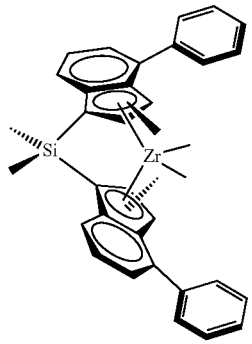 |

| Catalyst Structure | | Catalyst Structure | |
|---|---|---|---|
| 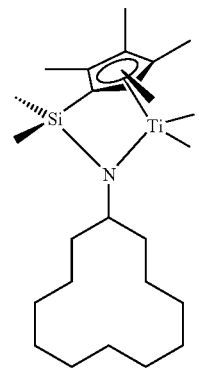 | 7 | 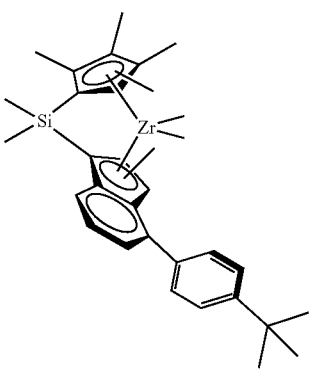 | 11 |
| 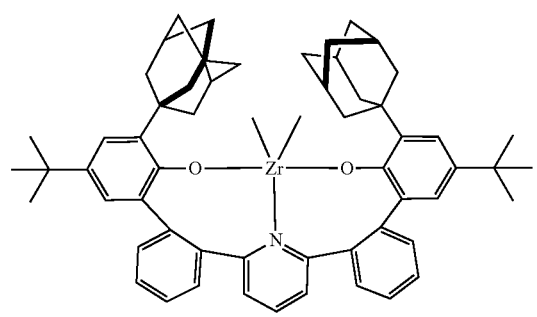 | 8 | 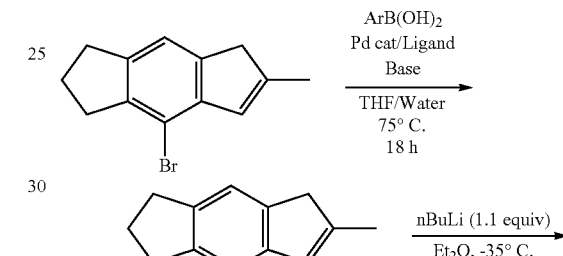<br>a<br>1a, Ar = 4-tBu-phenyl<br>2a, Ar = 2-biphenyl<br><br>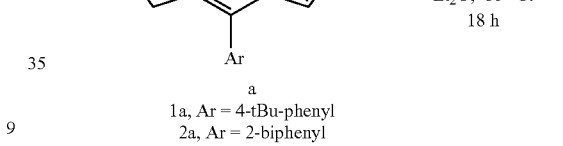\<br>b<br>1b, Ar = 4-tBu-phenyl<br>2b, Ar = 2-biphenyl | |
| 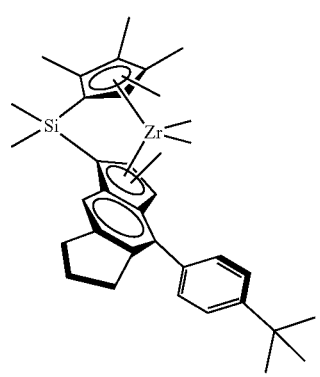 | 9 | | |
| 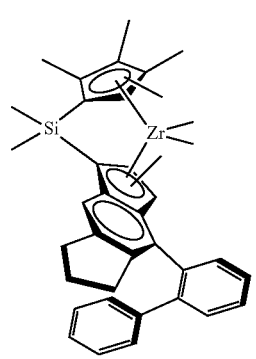 | 10 | 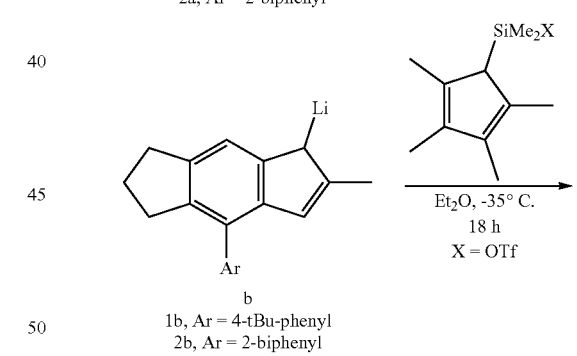<br>c<br>1c, Ar = 4-tBu-phenyl<br>2c, Ar = 2-biphenyl | |
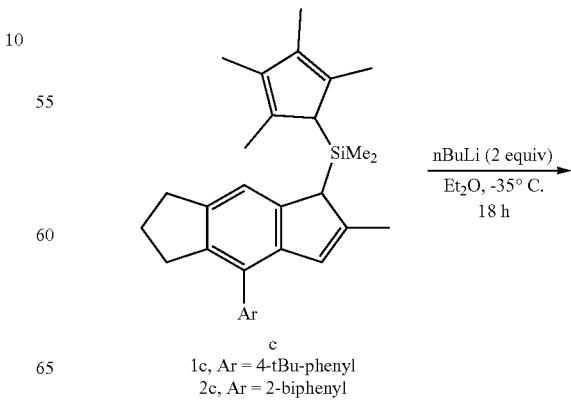

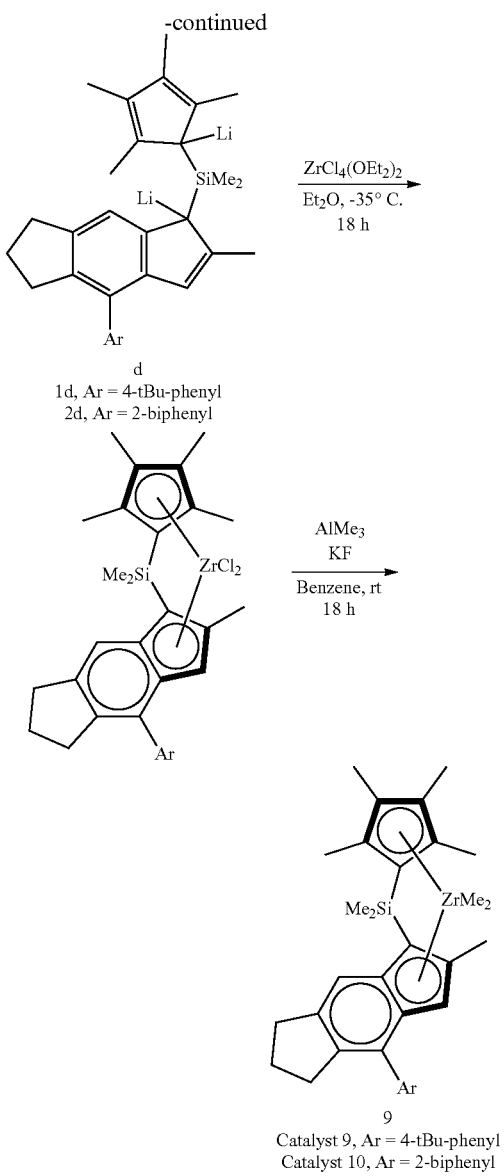

1d, Ar = 4-tBu-phenyl
2d, Ar = 2-biphenyl

Catalyst 9, Ar = 4-tBu-phenyl
Catalyst 10, Ar = 2-biphenyl

Procedure to Form Indacene Compound 1a Using Aryl Boronic Acid.

6-methyl-1,2,3,5-tetrahydro-8-bromo-s-indacene (1 equiv), 4-tBu-phenyl boronic acid, (1.1 equiv.), bis(dibenzylideneacetone)palladium(0)(Pd(dba)$_2$, (1.3 mol %), 1,3,5,7-Tetramethyl-6-phenyl-2,4,8-trioxa-6-phosphaadamantane (3.3 mol %), and potassium phosphate (K$_3$PO$_4$, 2.2 equiv.) were put in a 40 mL vial and suspended in 12.5 mL of THF. Water (2.5 mL) was then quickly added, the vial was sealed and heated to 75° C. for about 20 hours. After about 20 hours, the mixture was concentrated under N$_2$ stream and diluted with 10 mL of water. The aqueous layer was extracted with ether (3×15 mL). The organic layer was washed with water (2×20 mL) and brine (1×20 mL) and was concentrated in vacuo to give an orange oil. The resulting oil was chromatographed (Biotage gradient 5% hexane/EtOAc for 5 CV) to afford the final product which was immediately used in the next step. 8-(4-(tert-butyl)phenyl)-6-methyl-1,2,3,5-tetrahydro-s-indacene (96% yield)$^1$H NMR (400 MHz, C$_6$D6) δ 7.38 (s, 4H), 6.46 (s, 1H), 3.04 (s, 2H), 2.84 (m, 4H), 1.84 (m, 5H), 1.54 (m, 2H), 1.28 (s, 9H).

Procedure to Form Lithium Indacene Compound 1b.

Indacene A was suspended in 20 mL of diethyl ether and cooled to about −35° C. While stirring, a solution of n-butyllithium (n-BuLi, 1.1 equiv.) was added dropwise, which resulted in instant color change from colorless to yellow. Almost immediately, the solid began to precipitate out of solution. The mixture was stirred at room temperature for about 18 hours. After about 18 hours, a copious amount of tan precipitate formed. Solvent was evaporated under N$_2$ stream and the resulting solid was washed with pentane (1×10 mL) and dried in vacuo to give a desired product in quantitative yield. (4-(4-(tert-butyl)phenyl)-2-methyl-1,5,6,7-tetrahydro-s-indacen-1-yl)lithium (99% yield)$^1$H NMR $^1$H NMR (400 MHz, THF-d8) 7.89 (d, 2H), 7.53 (s, 1H), 7.48 (d, 2H), 5.75 (s, 1H) 5.73 (s, 1H) 3.12 (m, 4H), 2.56 (s, 3H), 2.04 (m, 2H), 1.33 (s, 9H).

Procedure to Form Ligand 1c.

Dimethyl(2,3,4,5-tetramethyl-2,4-cyclopentadiene-1-yl) silyl triflate CpMe$_4$Si(Me)$_2$OTf (1 equiv.) were dissolved in 15 mL of diethylether in a small round bottom flask with a stir bar. The corresponding lithium indacene 2b (1 equiv.) was dissolved in a 5 mL of 1:1 mixture of ether/THF. Both solutions were chilled to about −35° C. in a glove box freezer. After cooling to about −35° C., a solution of lithium indacene was added dropwise to the solution of silyl chloride. After the addition was complete, the reaction mixture became cloudy yellow. The resulting mixture was allowed to warm up to about room temperature and was stirred for about 18 hours. The solvent was removed in vacuo and the residue was extracted with 15 mL of pentane and filtered. Solvent removal under reduced pressure gave the desired compounds as off-white foamy solids in quantitative yield. The crude product was used without further purification.

Procedure to Form Lithiated Ligand 1d.

To a stirred solution of 1c in diethylether was slowly added n-BuLi (2.1 equiv.) at about −35° C. The solution was then stirred at about room temperature for about 20 hours. After about 20 hours, the solution was orange with some yellow precipitate. The solvent was removed under vacuum and the orange residue was washed with pentane (2×30 mL) and dried under vacuum to give a product as an ether adduct. Dilithium-dimethyl(2-methyl-4-(4-tertbutylphenyl)-1,5,6,7-tetrahydro-s-indacen-1-yl)(2,3,4,5-tetramethylcyclopenta-2,4-dien-1-yl)silane (100% yield)$^1$H NMR (400 MHz, THF) δ 7.59 (m, 1H), 7.52 (d, 2H), 7.39 (d, 2H), 5.87 (s, 1H), 2.89 (m, 6H), 2.15 (s, 3H), 1.94 (overlapping s, 8H), 1.41 (s, 9H), 0.63 (bs, 6H).

Procedure to Form Metallocene Dichloride Precursor (Catalyst 9).

ZrCl$_4$(OEt$_2$)$_2$ was added slowly to a stirred solution of 2 equivalents of dilithium species 1d in about 40 mL of diethyl ether at about −35° C. The mixture initially darkened, and after about 1 hour regained the yellow color with a copious amount of white precipitate. The reaction was stirred for about 20 hours at about room temperature, after which time the reaction mixture was concentrated, and the residue was extracted with methylene chloride. The resulting bright yellow solution was filtered through celite and concentrated to give a yellow residue. Excess hexane (25 mL) was added which resulted in further precipitation of white product. The solution was filtered, concentrated to about 5 mL and placed in the freezer. The metallocene catalyst C was obtained from hexane solution as yellow powder. (46% yield) $^1$H NMR (400 MHz, Benzene-d$_6$) δ 7.89 (s, 2H), 7.45-7.40 (m, 2H), 7.38 (s, 1H), 7.07 (s, 1H), 3.03-2.88 (m, 2H), 2.88-2.67 (m, 2H), 2.03 (s, 3H), 1.98 (s, 3H), 1.92 (s, 3H), 1.88 (s, 6H), 1.85-1.75 (m, 2H), 1.24 (s, 9H), 0.86 (s, 3H). 0.66 (s, 3H).

Procedure to Form Metallocene Dimethyl Precursor of Catalyst 9.

To a stirring mixture of dichloride catalyst 9 and KF (8 equiv.) in benzene was added neat AlMe$_3$ (3 equiv.). No initial color change is observed. The mixture was allowed to react for 16 hours. After 16 hours, the mixture was concentrated in vacuo and extracted into 10 mL of benzene. The solution was filtered onto additional KF (8-10 equiv.), filtered over celite again and concentrated to give a dialkylated catalyst 9. (91% yield) $^1$H NMR (500 MHz, Benzene-d$_6$) δ 7.80 (m, 2H), 7.47 (m, 2H) 7.35 (m, 1H), 7.13 (m, 1H), 2.94-2.73 (m, 4H), 1.95 (s, 6H), 1.91 (s, 3H), 1.87 (s, 3H) 1.86 (s, 3H) 1.81 (s, 3H) 1.27 (m, 9H), 0.84 (s, 3H), 0.64 (s, 3H), −0.07 (s, 3H), −1.03 (s, 3H).

Procedure to Form Indacene Compound 2a Using Aryl Boronic Acid.

6-methyl-1,2,3,5-tetrahydro-8-bromo-s-indacene (1 equiv.), 1.1'-biphenylboronic acid, (1.1 equiv.), bis(dibenzylideneacetone)palladium(0)(Pd(dba)$_2$, 2 mol %), SPhos (4 mol %), and sodium tert-butoxide (NaOtBu, 2.2 equiv.) were put in a 40 mL vial and suspended in 12.5 mL of THF. Water (2.5 mL) was then quickly added, the vial was sealed and heated to 75° C. for about 20 hours. After about 20 hours, the mixture was concentrated under N$_2$ stream and diluted with 10 mL of water. The aqueous layer was extracted with ether (3×15 mL). The organic layer was washed with water (2×20 mL) and brine (1×20 mL) and was concentrated in vacuo to give an orange oil. The resulting oil was chromatographed (Biotage gradient 5% hexane/EtOAc for 5 CV) to afford the final product 8-([1,1'-biphenyl]-2-yl)-6-methyl-1,2,3,5-tetrahydro-s-indacene (62% yield) which was immediately used in the next step. The molecule was isolated as a 65:35 ratio of indacene double bond isomers. 8-([1,1'-biphenyl]-2-yl)-6-methyl-1,2,3,5-tetrahydro-s-indacene $^1$H NMR (400 MHz, CDCl$_3$) δ 7.44 (overlapping m, both isomers 5H) 7.14 (overlapping m, 3H both isomers), 7.05 (s, 1H) 6.41-6.24 (two singlets, 1H, both isomers 3.28 (s, 1H), 3.13 (m, 1H) 2.79 (m, 2H) 2.47 (m, 2H) 2.25-2.12 (m, 1H) 2.08-2.03 (two singlets, 3H each, both isomers) 1.83 (m, 2H).

Procedure to Form Lithium Indacene Compound 2b.

Indacene 1a was suspended in 20 mL of diethyl ether and cooled to about −35° C. While stirring, a solution of n-butyllithium (n-BuLi, 1.1 equiv.) was added dropwise, which resulted in instant color change from colorless to yellow. Almost immediately, the solid began to precipitate out of solution. The mixture was stirred at room temperature for about 18 hours. After about 18 hours, a copious amount of tan precipitate formed. Solvent was evaporated under N$_2$ stream and the resulting solid was washed with pentane (1×10 mL) and dried in vacuo to give a desired product in quantitative yield. (4-([1,1'-biphenyl]-2-yl)-2-methyl-1,5,6,7-tetrahydro-s-indacen-1-yl)lithium (96% Yield)$^1$H NMR (400 MHz, THF-d8) δ 7.49 (m, 2H), 7.37 (m, 2H), 7.20 (m, 2H), 7.00 (m, 4H), 5.73 (s, 1H), 5.58 (s, 1H), 2.64 (m, 2H), 2.35 (s, 3H), 2.19 (m, 1H), 1.99 (m, 1H), 1.55 (m, 2H).

Procedure to Form Ligand 2c.

Dimethyl(2,3,4,5-tetramethyl-2,4-cyclopentadien-1-yl)silyl chloride CpMe$_4$Si(Me)$_2$Cl (1 equiv.) were dissolved in 15 mL of diethylether in a small round bottom flask with a stir bar. The corresponding lithium indacene (1 equiv.) was dissolved in a 5 mL of 1:1 mixture of ether/THF. Both solutions were chilled to about −35° C. in a glove box freezer. After cooling to about −35° C., a solution of lithium indacene was added dropwise to the solution of silyl chloride. After the addition was complete, the reaction mixture became cloudy yellow. The resulting mixture was allowed to warm up to about room temperature and was stirred for about 18 hours. The solvent was removed in vacuo and the residue was extracted with 15 mL of pentane and filtered. Solvent removal under reduced pressure gave the desired compounds as off-white foamy solids in quantitative yield. The crude products were used without further purification.

Procedure to Form Lithiated Ligand 2d.

To a stirred solution of 2c in diethylether was slowly added n-BuLi (2.1 equiv.) at about −35° C. The solution was then stirred at about room temperature for about 20 hours. After about 20 hours, the solution was orange with some yellow precipitate. The solvent was removed under vacuum and the orange residue was washed with pentane (2×30 mL) and dried under vacuum to give a product as an ether adduct. Dilithium-(4-([1,1'-biphenyl]-2-yl)-2-methyl-1,5,6,7-tetrahydro-s-indacen-1-yl)dimethyl(2,3,4,5-tetramethylcyclopenta-2,4-dien-1-yl)silane (100% yield)$^1$H NMR (400 MHz, THF) δ 7.53 (m, 3H), 7.24 (m, 4H), 7.00 (m, 3H), 5.73 (s, 1H), 2.47 (m, 2H), 2.38 (s, 3H), 2.16 (m, 2H), 1.95 (overlapping s, 12H), 1.60-1.49 (m, 2H), 0.65 (d, 6H).

Procedure to Form Metallocene Dichloride Precursor (Catalyst 10).

ZrCl$_4$(OEt$_2$)$_2$ was added slowly to a stirred solution of 2 equivalents of dilithium species 4a in about 40 mL of diethyl ether at about −35° C. The mixture initially darkened, and after about 1 hour regained the yellow color with a copious amount of white precipitate. The reaction was stirred for about 20 hours at about room temperature, after which time the reaction mixture was concentrated, and the residue was extracted with methylene chloride. The resulting bright yellow solution was filtered through celite and concentrated to give a yellow residue. Excess hexane (25 mL) was added which resulted in further precipitation of white product. The solution was filtered, concentrated to about 5 mL and placed in the freezer. The metallocene catalyst C was obtained from hexane solution as yellow powder. (4-([1,1'-biphenyl]-2-yl)-2-methyl-1,5,6,7-tetrahydro-s-indacen-1-yl)dimethyl(2,3,4,5-tetramethylcyclopenta-2,4-dien-1-yl)silane zirconium dichloride (44% yield, 90:10 isomer ratio)$^1$H NMR (400 MHz, Benzene-d$_6$) δ 8.47 (s, 1H), 7.45 (s, 1H), 7.32 (s, 1H), 7.24 (s, 2H), 7.12 (s, 2H), 6.88 (d, 4H), 2.68 (s, 1H), 2.52 (d, 3H), 2.30 (s, 1H), 2.02 (s, 3H), 1.97 (s, 3H), 1.92 (s, 3H), 1.87 (s, 3H), 1.81 (s, 3H), 1.69 (s, 2H), 1.44 (s, 2H), 0.76 (s, 3H), 0.62 (s, 3H).

Procedure to Form Metallocene Dimethyl Precursor of Catalyst 10.

To a stirring mixture of dichloride catalyst C and KF (8 equiv.) in benzene was added neat AlMe$_3$ (3 equiv.). No initial color change is observed. The mixture was allowed to react for 16 hours. After 16 hours, the mixture was concentrated in vacuo and extracted into 10 mL of benzene. The solution was filtered onto additional KF (8-10 equiv.), filtered over celite again and concentrated to give a dialkylated catalyst C.(4-([1,1'-biphenyl]-2-yl)-2-methyl-1,5,6,7-tetrahydro-s-indacen-1-yl)dimethyl(2,3,4,5-tetramethylcyclopenta-2,4-dien-1-yl)silane dimethyl zirconium (89% yield)$^1$H NMR (500 MHz, Benzene-d$_6$) δ 8.04 (d, 1H), 7.52 (m, 1H) 7.26-7.21 (overlapping m, 5H), 6.93 (m, 3H), 6.83 (s, 1H), 2.68 (m, 1H) 2.54 (m, 2H), 2.30 (m, 1H), 1.93 (s, 6H), 1.89 (s, 3H), 1.81 (s, 6H) 1.51 (m, 2H), 0.75 (s, 3H), 0.60 (s, 3H), −0.06 (s, 3H), −1.05 (s, 3H).

High Throughput Polymerization Studies

A variety of polymerization conditions (i.e., pressure and co-monomer loading) were screened with different polymerization systems in high throughput reactors to demonstrate that copolymers of ethylene and 4-methyl-1,4-hexadiene could be produced. High throughput screening was used to demonstrate that terpolymerizations involving ethylene, alpha olefins (1-hexene) and 4-methyl-1,4-hexadiene may be performed.

High Throughput Parallel Polymerization Reactor and Description

High throughput screening polymerizations were carried out in a parallel, pressure reactor, as generally described in U.S. Pat. Nos. 6,306,658; 6,455,316; 6,489,168; WO 2000/09255; and Murphy et al., *J. Am. Chem. Soc.*, 2003, v. 125, pp. 4306-4317, each of which is fully incorporated herein by reference. The experiments were conducted in an inert atmosphere ($N_2$) drybox using autoclaves equipped with an external heater for temperature control, glass inserts (internal volume of reactor=23.5 mL for $C_2$ and $C_2/C_8$; 22.5 mL for $C_3$ runs), septum inlets, regulated supply of nitrogen, ethylene and propylene, and equipped with disposable PEEK mechanical stirrers (800 RPM). The autoclaves were prepared by purging with dry nitrogen at 110° C. or 115° C. for 5 hours and then at 25° C. for 5 hours. Although the specific quantities, temperatures, solvents, reactants, reactant ratios, pressures, and other variables are frequently changed from one polymerization run to the next, the following describes a typical polymerization performed in a parallel, pressure reactor.

In atypical procedure, a pre-weighed glass vial insert and disposable stirring paddle were fitted to each reaction vessel of the reactor, which contains 48 individual reaction vessels. The reactor was then closed and purged with ethylene. Each vessel was charged with enough solvent (typically isohexane) to bring the total reaction volume, including the subsequent additions, to the desired volume, typically 5 mL. Comonomer(s), if required, are injected into the reaction vessel and the reactor was heated to the set temperature and pressurized to the predetermined pressure of ethylene, while stirring at 800 rpm. The aluminum compound (typically dissolved in toluene, isohexane, or methylcyclohexane), was then injected typically as scavenger followed by addition of a catalyst solution (typically in toluene, methylcyclohexane or isohexane), followed by a solution of activator (typically 1.0-1.2 molar equivalents relative to catalyst in toluene, methylcyclohexane or isohexane).

The catalyst solution (typically 0.020-0.080 µmol of metal complex) was injected into the reaction vessel and the polymerization was allowed to proceed until a pre-determined amount of ethylene (quench value typically 20 psi) had been used up by the reaction. Alternatively, the reaction may be allowed to proceed for a set amount of time (maximum reaction time typically 30 to 60 minutes). Ethylene was added continuously (through the use of computer controlled solenoid valves) to the autoclaves during polymerization to maintain reactor gauge pressure (+/−2 psig) and the reactor temperature was monitored and typically maintained within +/−1° C. The reaction was quenched by pressurizing the vessel with compressed air. After the reactor was vented and cooled, the glass vial insert containing the polymer product and solvent was removed from the pressure cell and the inert atmosphere glove box, and the volatile components were removed using a Genevac HT-12 centrifuge and Genevac VC3000D vacuum evaporator operating at elevated temperature and reduced pressure. The vial was then weighed to determine the yield of the polymer product. The resultant polymer was analyzed by Rapid GPC (see below) to determine the molecular weight.

Each polymerization was conducted using a parallel polymerization reactor as described above. In a typical experiment an automated syringe was used to introduce into the reactor the following reagents, if utilized, in the following order: isohexane (0.35 mL), an isohexane solution of tri-n-octyl-aluminum (TNOAL) scavenger (200 µL, 5 mM), additional isohexane (0.35 mL), a toluene solution of the respective polymerization catalyst (150 µL, 0.4 mM), additional isohexane (0.35 mL), a toluene solution of Activator-A ([PhNMe$_2$H][B(C$_6$F$_5$)$_4$])(150 µL, 0.4 mM), then additional isohexane so that the total solvent volume for each run was 5 mL. Each reaction was performed at a specified temperature range between 50 and 120° C., typically 80° C., while applying about 200 psig of ethylene (monomer) gas. Each reaction was allowed to run for about 1 hour (~3,600 seconds) or until approximately 20 psig of ethylene gas uptake was observed, at which point the reactions were quenched with air (~300 psig).

General Procedure for Solution Propylene-MHD Polymerizations.

Unless stated otherwise, propylene homopolymerizations and propylene-4-methyl-1,4-hexadiene polymerizations were carried out in a parallel, pressure reactor, as generally described in U.S. Pat. Nos. 6,306,658; 6,455,316; 6,489,168; WO 2000/009255; and Murphy et al., *J. Am. Chem. Soc.*, 2003, v. 125, pp. 4306-4317, each of which is fully incorporated herein by reference for US purposes. Although the specific quantities, temperatures, solvents, reactants, reactant ratios, pressures, and other variables may have changed from one polymerization run to the next, the following describes a typical polymerization performed in a parallel, pressure reactor.

A pre-weighed glass vial insert and disposable stirring paddle were fitted to each reaction vessel of the reactor, which contains 48 individual reaction vessels. The reactor was then closed and propylene was introduced to each vessel as a condensed gas liquid (typically 1 mL). Then solvent (typically the isohexane) and a dilute scavenger solution (typically tri-n-octyl aluminum, TNOAL) was added to bring the total reaction volume, including the subsequent additions, to 5 mL and the reactor vessels were heated to their set temperature (usually from about 50° C. to about 110° C.). The contents of the vessel were stirred at 800 rpm. An activator solution (typically 1.1 molar equivalents N,N-dimethylanilinium tetrakis(perfluoronaphthyl)borate) was then injected into the reaction vessel along with 500 microliters of toluene, and a desired amount of MHD comonomer (typically 50-300 µL). A toluene solution of catalyst (typically 0.50 mM in toluene, such as 20-40 nmol of catalyst) and another aliquot of toluene (500 µL) were added to initiate polymerization. Equivalence is determined based on the mol equivalents relative to the moles of the transition metal in the catalyst complex. The reaction was then allowed to proceed until a pre-determined amount of pressure had been taken up by the reaction. Alternatively, the reaction may be allowed to proceed for a set amount of time. At this point, the reaction was quenched by pressurizing the vessel with compressed air. After the polymerization reaction, the glass vial insert containing the polymer product and solvent was removed from the pressure cell and the inert atmosphere glove box, and the volatile components were removed using a Genevac HT-12 centrifuge and Genevac VC3000D vacuum evaporator operating at elevated temperature and reduced pressure. The vial was then weighed to determine the yield of the polymer product. The resultant polymer was analyzed by Rapid GPC (see below) to determine the molecular weight and by DSC (see below) to determine melting point When sufficient polymer yield was attained (e.g., at least ~10 mg), the polyethylene product was analyzed by GPC using an automated "Rapid GPC" system as generally described in U.S. Pat. Nos. 6,491,816; 6,491,823; 6,475,391; 6,461,515; 6,436,292; 6,406,632; 6,175,409; 6,454,947; 6,260,407; and 6,294,388; each of which is fully incorporated herein by reference for US purposes. This apparatus has a series of three 30 cm×7.5 mm linear columns, each containing PLgel 10 μm, Mix B. The GPC system was calibrated using polystyrene standards ranging from 580-3,390,000 g/mol. The system was operated at an eluent flow rate of 2.0 mL/minutes and an oven temperature of 165° C. 1,2,4-trichlorobenzene was used as the eluent. The polymer samples were dissolved in 1,2,4-trichlorobenzene at a concentration of 0.28 mg/mL and 400 uL of a polymer solution was injected into the system. The concentration of the polymer in the eluent was monitored using an evaporative light scattering detector. The molecular weights presented are relative to linear polystyrene standards and are uncorrected, unless indicated otherwise.

Rapid Differential Scanning Calorimetry ("Rapid DSC") measurements were performed on a TA-Q100 instrument to determine the melting point of the polymers. Samples were pre-annealed at 220° C. for 15 minutes and then allowed to cool to room temperature overnight. The samples were then heated to 220° C. at a rate of 100° C./minute and then cooled at a rate of 50° C./minute. Melting points were collected during the heating period.

High Throughput Screens Involving 4-methyl-1,4-hexadiene

Copolymerization of Ethylene and 4-methyl-1,4-hexadiene: copolymerizations involving 4-methyl-1,4-hexadiene and ethylene were performed at various ethylene pressures and 4-methyl-1,4-hexadiene concentrations. These reactions were conducted with various polymerization systems (i.e., catalyst families) and characterized by Rapid DSC and Rapid GPC. Note polymer melting temperature ($T_m°$ C.) values are lower than those of typical of LLDPE (~120-135° C.).

TABLE 1.0

| Catalyst | pressure set point | 4-methyl-1-4-hexadiene (mmol) | Avg. Activity (g/mmol h) | Avg. Yield (mg) | Avg. Quench time (s) | Avg. Mn (g/mol) | Avg. Mw (g/mol) | Avg. Mz (g/mol) | Avg. Mw/Mn | Avg. Tm (° C.) | Number of Replicates |
|---|---|---|---|---|---|---|---|---|---|---|---|
| 1 | 50 | 375 | 1,950 | 30 | 3055 | 388,052 | 587,719 | 1,148,680 | 1.51 | 98.2 | 7 |
| 1 | 50 | 750 | 1,216 | 24 | 3601 | 264,825 | 421,886 | 844,878 | 1.61 | 80.7 | 6 |
| 1 | 50 | 1500 | 780 | 16 | 3601 | 187,738 | 285,688 | 538,050 | 1.56 | 42.6 | 5 |
| 1 | 150 | 375 | 104,290 | 72 | 134 | 602,685 | 1,045,181 | 2,417,851 | 1.74 | 115.9 | 8 |
| 1 | 150 | 750 | 52,811 | 48 | 166 | 519,652 | 863,853 | 1,922,330 | 1.66 | 108.4 | 8 |
| 1 | 150 | 1500 | 29,405 | 42 | 298 | 392,270 | 653,159 | 1,356,851 | 1.65 | 98.1 | 8 |
| 2 | 150 | 375 | 7,558 | 35 | 860 | 684,235 | 1,172,776 | 2,538,658 | 1.71 | 110.7 | 4 |
| 2 | 150 | 750 | 2,783 | 31 | 2098 | 334,352 | 489,929 | 782,824 | 1.47 | 98.8 | 4 |
| 2 | 150 | 1500 | 947 | 18 | 3362 | 131,603 | 220,264 | 440,715 | 1.68 | 83.7 | 4 |
| 7 | 50 | 375 | 1,676 | 32 | 3491 | 57,835 | 110,321 | 320,130 | 1.88 | 90.5 | 3 |
| 7 | 50 | 750 | 1,337 | 27 | 3601 | 28,942 | 46,941 | 85,267 | 1.65 | 110.1 | 4 |
| 7 | 50 | 1500 | 750 | 15 | 3602 | 14,999 | 23,821 | 41,321 | 1.61 | 98.1 | 3 |
| 7 | 150 | 375 | 121,739 | 58 | 89 | 335,498 | 561,974 | 1,034,284 | 1.69 | 112.8 | 4 |
| 7 | 150 | 750 | 44,650 | 45 | 194 | 255,227 | 490,597 | 1,932,492 | 1.91 | 101.8 | 4 |
| 7 | 150 | 1500 | 7,469 | 40 | 1573 | 128,991 | 239,342 | 582,477 | 1.86 | 111.2 | 4 |
| 3 | 50 | 375 | 3,432 | 38 | 2104 | 198,288 | 344,273 | 755,380 | 1.77 | 106.8 | 4 |
| 3 | 50 | 750 | 1,829 | 34 | 3426 | 123,440 | 209,675 | 433,241 | 1.70 | 97.8 | 4 |
| 3 | 50 | 1500 | 862 | 17 | 3601 | 51,028 | 91,021 | 226,805 | 1.79 | 80.7 | 4 |
| 3 | 150 | 375 | 109,230 | 74 | 134 | 718,115 | 1,305,347 | 3,173,764 | 1.82 | 118.4 | 4 |
| 3 | 150 | 750 | 41,818 | 46 | 1033 | 517,137 | 878,298 | 1,990,850 | 1.70 | 112.3 | 4 |
| 3 | 150 | 1500 | 13,662 | 41 | 646 | 324,900 | 489,677 | 792,602 | 1.52 | 102.4 | 4 |
| 4 | 50 | 375 | 5,035 | 36 | 1327 | 212,543 | 576,326 | 1,946,407 | 2.69 | 122.0 | 4 |
| 4 | 50 | 750 | 4,023 | 39 | 1751 | 285,197 | 499,840 | 1,131,409 | 1.77 | 115.9 | 4 |
| 4 | 50 | 1500 | 1,850 | 33 | 3307 | 317,989 | 489,054 | 962,346 | 1.54 | 105.4 | 3 |
| 4 | 150 | 375 | 203,403 | 57 | 52 | 383,295 | 641,892 | 1,416,342 | 1.66 | 128.9 | 4 |
| 4 | 150 | 750 | 100,689 | 45 | 87 | 328,124 | 543,669 | 1,173,563 | 1.65 | 125.6 | 4 |
| 4 | 150 | 1500 | 66,040 | 37 | 118 | 337,428 | 528,512 | 1,019,139 | 1.56 | 121.3 | 4 |
| 5 | 50 | 375 | 140,365 | 53 | 70 | 100,736 | 186,811 | 420,721 | 1.89 | 93.3 | 4 |
| 5 | 50 | 750 | 141,893 | 62 | 80 | 80,263 | 143,152 | 311,148 | 1.79 | 78.2 | 4 |
| 5 | 50 | 1500 | 101,040 | 69 | 125 | 55,730 | 94,202 | 199,303 | 1.69 | 41.7 | 4 |
| 5 | 150 | 375 | 526,997 | 108 | 76 | 367,764 | 901,066 | 2,584,042 | 2.62 | 113.1 | 4 |
| 5 | 150 | 750 | 482,054 | 126 | 66 | 256,451 | 678,762 | 1,881,882 | 2.85 | 103.4 | 4 |
| 5 | 150 | 1500 | 566,290 | 145 | 48 | 118,161 | 398,039 | 1,334,640 | 3.55 | 88.2 | 4 |
| 8 | 50 | 375 | 206,303 | 63 | 56 | 111,301 | 337,703 | 1,238,519 | 3.06 | 98.9 | 4 |
| 8 | 50 | 750 | 196,331 | 63 | 58 | 116,625 | 243,499 | 679,361 | 2.08 | 86.9 | 4 |
| 8 | 50 | 1500 | 135,470 | 68 | 91 | 84,121 | 150,032 | 337,160 | 1.79 | 68.7 | 4 |
| 8 | 150 | 375 | 836,625 | 138 | 31 | 605,453 | 1,434,572 | 3,907,332 | 2.38 | 117.9 | 3 |
| 8 | 150 | 750 | 530,528 | 138 | 49 | 512,077 | 1,126,751 | 3,165,526 | 2.20 | 110.8 | 4 |
| 8 | 150 | 1500 | 440,376 | 138 | 57 | 270,760 | 796,190 | 2,250,995 | 3.31 | 97.5 | 3 |

Temperature: 50° C.; Total Liquid volume = 5000 μL. Components: TNOAL (0.134 μL); toluene (200 μL); isohexane volume adjusted to give a total liquid volume of 5000 μL. Catalyst solution 0.2 mM in toluene; TNOAL solution 0.2 mM in isohexane, Activator-A 0.2 mM in toluene.

Equivalence is determined based on the mole equivalents relative to the moles of the transition metal in the catalyst complex.

Ethylene/1-hexene/4-methyl-1,4-hexadiene Terpolymers

Terpolymerizations using a 1:1 v/v ratio of 1-hexene and 4-methyl-1,4-hexadiene were performed and characterized by Rapid DSC and Rapid GPC. Note polymer melting temperature ($T_m°$ C.) values are lower than those of typical of LLDPE (~120-135° C.).

TABLE 2.0

| Catalyst | Pressure (psig) | Productivity (g[polym] · mmol[cat]$^{-1}$ · h$^{-1}$) | Reaction Time (s) | Yield (mg) | $T_m$ (° C.) | Mn (g/mol) | Mw (g/mol) | Mz (g/mol) | Mw/Mn |
|---|---|---|---|---|---|---|---|---|---|
| 1 | 40 | 825 | 4801 | 22 | 59 | 347,013 | 653,758 | 1,468,758 | 1.88 |
| 1 | 40 | 825 | 4800 | 22 | 55 | 367,026 | 643,140 | 1,329,663 | 1.75 |
| 1 | 80 | 262 | 4801 | 7 | N/A | N/A | N/A | N/A | N/A |
| 1 | 80 | 65285 | 212 | 77 | 83 | 536,551 | 970,481 | 2,148,849 | 1.81 |
| 2 | 40 | 337 | 4800 | 9 | N/A | N/A | N/A | N/A | N/A |
| 2 | 40 | 487 | 4800 | 13 | N/A | N/A | N/A | N/A | N/A |
| 2 | 80 | 3499 | 1904 | 37 | 73 | 432,964 | 807,674 | 1,720,213 | 1.87 |
| 2 | 80 | 3816 | 1368 | 29 | 76 | 469,259 | 862,281 | 1,990,463 | 1.84 |
| 3 | 40 | 6464 | 1086 | 39 | 75 | 359,316 | 717,251 | 1,625,440 | 2.00 |
| 3 | 40 | 8798 | 818 | 40 | 78 | 465,916 | 867,197 | 1,810,243 | 1.86 |
| 3 | 80 | 1237 | 4800 | 33 | 95 | 1,060,498 | 2,250,035 | 5,529,642 | 2.12 |
| 3 | 80 | 15811 | 444 | 39 | 93 | 1,077,485 | 2,255,510 | 5,615,011 | 2.09 |
| 4 | 40 | 825 | 4801 | 22 | 113 | 103,707 | 200,990 | 459,286 | 1.94 |
| 4 | 40 | 3773 | 1622 | 34 | 114 | 147,982 | 277,784 | 646,470 | 1.88 |
| 4 | 80 | 112 | 4801 | 3 | N/A | N/A | N/A | N/A | N/A |
| 4 | 80 | 112 | 4800 | 3 | N/A | N/A | N/A | N/A | N/A |
| 5 | 40 | 24988 | 418 | 58 | 61 | 450,143 | 793,784 | 1,682,576 | 1.76 |
| 5 | 40 | 24556 | 389 | 53 | 62 | 561,428 | 1,005,976 | 2,155,995 | 1.79 |
| 5 | 80 | 45713 | 366 | 93 | 80 | 807,121 | 1,540,713 | 3,461,122 | 1.91 |
| 5 | 80 | 64875 | 327 | 118 | 80 | 751,006 | 1,530,972 | 3,985,773 | 2.04 |
| 6 | 40 | 131126 | 91 | 66 | 55 | 236,418 | 448,321 | 983,670 | 1.90 |
| 6 | 40 | 144266 | 81 | 65 | 52 | 227,426 | 446,986 | 959,712 | 1.97 |
| 6 | 80 | 275654 | 76 | 117 | 82 | 291,420 | 547,664 | 1,201,643 | 1.88 |
| 6 | 80 | 279474 | 76 | 118 | 81 | 237,074 | 517,651 | 1,351,135 | 2.18 |

Temperature: 50° C.; Total Liquid volume = 5000 µL. Components: 1-hexene (50 µL); 4-methyl-1,4-hexadiene (50 µL); TNOAL (0.134 µL); toluene (200 µL); isohexane (4700 µL). Catalyst solution 0.2 mM in toluene; TNOAL solution 0.2 mM in isohexane, Activator-A 0.2 mM in toluene.

Solution Polymerization Studies

Solution polymerizations were conducted in a nitrogen filled glovebox using standard laboratory glassware in the absence of oxygen (<1 ppm) and moisture (<1 ppm).

Homopolymerization of 4-methyl-1,4-hexadiene (MHD)

Example 1. To a 100 mL round bottom flask under an $N_2$ atmosphere was added 4 mL hexane, 2 mL MHD, 0.23 mL of bis(diisobutylaluminum) oxide (DIBALO, 2 wt % hexane solution; purchased from Nouryon), and a magnetic stir bar. In a separate vial, 1 mL of Catalyst-6 toluene solution (1 mM) and 1 mL of Activator-B ([PhNMe$_2$H][B(C$_{10}$F$_7$)$_4$]) toluene solution (1 mM) were mixed. To initiate the polymerization, the mixture of Catalyst 6 and Activator-B was added to the flask containing MHD. The polymerization was allowed to stir at ambient temperature for 1 hour. The reaction was quenched by addition of 20 mL methanol, resulting in the precipitation of poly-MHD which was isolated by filtration, washed with additional methanol (10 mL), and dried under vacuum at 70° C. for 12 hours. Yield: 0.41 g.

Copolymerization of Ethylene and 4-methyl-1,4-hexadiene (MHD)

Example 2. In the glovebox, to a 250 mL round bottom flask under an $N_2$ atmosphere was added 20 mL hexane, 10 mL MHD, 1.139 mL of bis(diisobutylaluminum) oxide (DIBALO, 2 wt % hexane solution; purchased from Nouryon), and a magnetic stir bar. Ethylene was introduced to the reaction mixture through a needle (bubbling at 1 mL/sec). In a separate vial, Catalyst-6 (5 mL, 1 mM toluene solution) and Activator-A ([PhNMe$_2$H][B(C$_6$F$_5$)$_4$])(5 mL, 1 mM toluene solution) were dissolved in 20 mL toluene. To initiate the polymerization, the mixture of Catalyst 6 and Activator-A was added to the flask containing MHD. The polymerization was allowed to stir at ambient temperature for 15 minutes. The reaction was quenched by pouring into a beaker containing 100 mL methanol, resulting in the precipitation of poly-MHD which was isolated by filtration, washed with additional methanol (30 mL), and dried under vacuum at 70° C. for 12 hours. Yield: 6 g.

Example 3. In the glovebox, to a 500 mL round bottom flask under an $N_2$ atmosphere was added 200 mL hexane, 100 mL MHD, 0.956 mL of bis(diisobutylaluminum) oxide (DIBALO, 20 wt % hexane solution; purchased from Nouryon), and a magnetic stir bar. Ethylene was introduced to the reaction mixture through a needle (bubbling at 1 mL/sec). In a separate vial, Catalyst-6 (42.1 mg) and Activator-A ([PhNMe$_2$H][B(C$_6$F$_5$)$_4$])(33.6 mg) were dissolved in 20 mL toluene. To initiate the polymerization, the mixture of Catalyst-6 and Activator-A was added to the flask containing MHD. The polymerization was allowed to stir at ambient temperature for 15 minutes. The reaction was quenched by pouring into a beaker containing 300 mL methanol, resulting in the precipitation of poly-MHD which was isolated by filtration, washed with additional methanol (50 mL), stabilized by addition of around 1,000 ppm Irganox 1076 (50 mg), and dried under vacuum at 70° C. for 12 hours. Yield: 51.2 g.

Solution Batch Autoclave Studies

Unit Description

Autoclave polymerizations were conducted using a solution polymerization process in a 2.0-Liter stirred-tank reactor (autoclave reactor). The autoclave was equipped with an air-driven stirrer, a water-cooling/steam-heating element with a temperature controller, and a pressure controller. Ethylene flow (if utilized) was introduced through a mass flow controller. Solvents and monomers were purified as described above or by purification columns. In a typical procedure, the reactor was heated above 100° C. under dry dinitrogen purge for >1 hour. It was then cooled to room-temperature (or desired process temperature) and solvent (typically, isohexane was introduced). The reactor was then charged with monomers, scavengers and catalyst.

Copolymerization of Ethylene and 4-methyl-1,4-hexadiene (MHD)

Example 4. A 2 L autoclave reactor was charged with 200 mL isohexane. To the reactor was added MHD (100 mL), and tri-n-octyl aluminum (TNOAL, 2 mL of 25 wt % hexane solution; purchased from Sigma Aldrich). The reactor was brought to 65° C., and ethylene was introduced to the reactor (5 psig). At 65° C., a 20 mL toluene solution of Catalyst-6 (30 mg) and Activator-B ([PhNMe$_2$H][B(C$_{10}$F$_7$)$_4$])(37.8 mg) was injected, along with 100 mL of isohexane, to initiate the polymerization. Immediately after the catalyst injection, an additional 5 psig ethylene was added to maintain a steady-state 10 psig ethylene pressure and a temperature of 70° C. The polymerization was stirred at 650 rpm. After 120 minutes, reaction was cooled to 40° C., and the pressure was released from vent valves. The polymerization was terminated by exposure to air. Evaporation of volatiles afforded polymers which were stabilized by addition of around 1,000 ppm Irganox™ 1076, and dried under vacuum at 70° C. for 12 hours. Yield: 47.5 g.

Example 5. A 2 L autoclave reactor was charged with 200 mL isohexane. To the reactor was added MHD (100 mL), and tri-n-octyl aluminum (TNOAL, 2 mL of 25 wt % hexane solution; purchased from Sigma Aldrich). The reactor was brought to 65° C., and ethylene was introduced to the reactor (80 psig). At 65° C., a 20 mL toluene solution of Catalyst-6 (20 mg) and Activator-B ([PhNMe$_2$H][B(C$_{10}$F$_7$)$_4$])(25.2 mg) was injected, along with 100 mL of isohexane, to initiate the polymerization. Immediately after the catalyst injection, an additional 20 psig ethylene was added to maintain a steady-state 100 psig ethylene pressure and a temperature of 70° C. The polymerization was stirred at 650 rpm. After 30 minutes, reaction was cooled to 40° C., and the pressure was released from vent valves. The polymerization was terminated by exposure to air. Evaporation of volatiles afforded polymers which were stabilized by addition of around 1,000 ppm Irganox 1076, and dried under vacuum at 70° C. for 12 hours. Yield: 85.48 g.

Example 6. A 2 L autoclave reactor was charged with 200 mL isohexane. To the reactor was added MHD (100 mL), and tri-n-octyl aluminum (TNOAL, 2 mL of 25 wt % hexane solution; purchased from Sigma Aldrich). The reactor was brought to 65° C., and ethylene was introduced to the reactor (230 psig). At 65° C., a 20 mL toluene solution of Catalyst-8 (20 mg) and Activator-B ([PhNMe$_2$H][B(C$_{10}$F$_7$)$_4$])(25.2 mg) was injected, along with 100 mL of isohexane, to initiate the polymerization. Immediately after the catalyst injection, an additional 20 psig ethylene was added to maintain a steady-state 250 psig ethylene pressure and a temperature of 70° C. The polymerization was stirred at 650 rpm. After 30 minutes, reaction was cooled to 40° C., and the pressure was released from vent valves. The polymerization was terminated by exposure to air. Evaporation of volatiles afforded polymers which were stabilized by addition of around 1,000 ppm Irganox 1076, and dried under vacuum at 70° C. for 12 hours. Yield: 129.56 g.

Copolymerization of Propylene and 4-methyl-1,4-hexadiene (MHD)

Example 7. A 2 L autoclave reactor was charged with 500 mL isohexane. To the reactor was added propylene (100 mL), MHD (40 mL), and tri-n-octyl aluminum (TNOAL, 2 mL of 25 wt % hexane solution; purchased from Sigma Aldrich). The reactor was brought to 70° C., a 20 mL toluene solution of Catalyst-6 (10 mg) and Activator-B ([PhNMe$_2$H][B(C$_{10}$F$_7$)$_4$])(12.6 mg) was injected, along with 300 mL of isohexane, to initiate the polymerization. The polymerization was stirred at 650 rpm. After 30 minutes, reaction was cooled to 40° C., and the pressure was released from vent valves. The polymerization was terminated by exposure to air. Evaporation of volatiles afforded polymers which were stabilized by addition of around 1,000 ppm Irganox 1076, and dried under vacuum at 70° C. for 12 hours. Yield: 52.38 g.

Terpolymerization of Ethylene, Styrene and 4-methyl-1,4-hexadiene (MHD)

Example 8. A 2 L autoclave reactor was charged with 200 mL isohexane. To the reactor was added MHD (100 mL), styrene (10 mL, destabilized, purchased from Sigma Aldrich), and tri-n-octyl aluminum (TNOAL, 2 mL of 25 wt % hexane solution; purchased from Sigma Aldrich). The reactor was brought to 65° C., and ethylene was introduced to the reactor (230 psig). At 65° C., a 20 mL toluene solution of Catalyst-6 (20 mg) and Activator-B ([PhNMe$_2$H][B(C$_{10}$F$_7$)$_4$])(25.2 mg) was injected, along with 100 mL of isohexane, to initiate the polymerization. Immediately after the catalyst injection, an additional 20 psig ethylene was added to maintain a steady-state 250 psig ethylene pressure and a temperature of 70° C. The polymerization was stirred at 650 rpm. After 30 minutes, reaction was cooled to 40° C., and the pressure was released from vent valves. The polymerization was terminated by exposure to air. Evaporation of volatiles afforded polymers which were washed with methanol (100 mL), stabilized by addition of around 1,000 ppm Irganox 1076, and dried under vacuum at 70° C. for 12 hours. Yield: 60.35 g.

Terpolymerization of Ethylene, Propylene and 4-methyl-1,4-hexadiene (MHD)

Example 9. A 2 L autoclave reactor was charged with 600 mL isohexane. To the reactor was added propylene (50 mL), MHD (20 mL), and tri-n-octyl aluminum (TNOAL, 2 mL of 25 wt % hexane solution; purchased from Sigma Aldrich). The reactor was brought to 65° C., and ethylene was introduced to the reactor (60 psig). At 65° C., a 20 mL toluene solution of Catalyst-3 (5 mg) and Activator-B ([PhNMe$_2$H][B(C$_{10}$F$_7$)$_4$])(15.7 mg) was injected, along with 200 mL of isohexane, to initiate the polymerization. Immediately after the catalyst injection, an additional 15 psig ethylene was added to maintain a steady-state 75 psig ethylene pressure and a temperature of 70° C. The polymerization was stirred at 650 rpm. After 15 minutes, reaction was cooled to 40° C., and the pressure was released from vent valves. The polymerization was terminated by exposure to air. Evaporation of volatiles afforded polymers which were stabilized by addition of around 1,000 ppm Irganox 1076, and dried under vacuum at 70° C. for 12 hours. Yield: 55.2 g.

Example 10. A 2 L autoclave reactor was charged with 600 mL isohexane. To the reactor was added propylene (50 mL), MHD (40 mL), and tri-n-octyl aluminum (TNOAL, 2 mL of 25 wt % hexane solution; purchased from Sigma Aldrich). The reactor was brought to 65° C., and ethylene was introduced to the reactor (60 psig). At 65° C., a 20 mL toluene solution of Catalyst-3 (5 mg) and Activator-B ([PhNMe$_2$H][B(C$_{10}$F$_7$)$_4$])(15.7 mg) was injected, along with 200 mL of isohexane, to initiate the polymerization. Immediately after the catalyst injection, an additional 15 psig ethylene was added to maintain a steady-state 75 psig ethylene pressure and a temperature of 70° C. The polymerization was stirred at 650 rpm. After 15 minutes, reaction was cooled to 40° C., and the pressure was released from vent valves. The polymerization was terminated by exposure to air. Evaporation of volatiles afforded polymers which were stabilized by addition of around 1,000 ppm Irganox 1076, and dried under vacuum at 70° C. for 12 hours. Yield: 24.74 g.

Example 11. A 2 L autoclave reactor was charged with 600 mL isohexane. To the reactor was added propylene (50 mL), MHD (20 mL), and tri-n-octyl aluminum (TNOAL, 2 mL of 25 wt % hexane solution; purchased from Sigma Aldrich). The reactor was brought to 65° C., and ethylene was introduced to the reactor (60 psig). At 65° C., a 20 mL toluene solution of Catalyst-8 (5 mg) and Avtivator-B ([PhNMe$_2$H][B(C$_{10}$F$_7$)$_4$])(6.9 mg) was injected, along with 200 mL of isohexane, to initiate the polymerization. Immediately after the catalyst injection, an additional 15 psig ethylene was added to maintain a steady-state 75 psig ethylene pressure and a temperature of 70° C. The polymerization was stirred at 650 rpm. After 15 minutes, reaction was cooled to 40° C., and the pressure was released from vent valves. The polymerization was terminated by exposure to air. Evaporation of volatiles afforded polymers which were stabilized by addition of around 1,000 ppm Irganox 1076, and dried under vacuum at 70° C. for 12 hours. Yield: 30.0 g.

Example 12. A 2 L autoclave reactor was charged with 600 mL isohexane. To the reactor was added propylene (75 mL), MHD (40 mL), and tri-n-octyl aluminum (TNOAL, 2 mL of 25 wt % hexane solution; purchased from Sigma Aldrich). The reactor was brought to 65° C., and ethylene was introduced to the reactor (100 psig). At 65° C., a 20 mL toluene solution of Catalyst-3 (5 mg) and Activator-B ([PhNMe$_2$H][B(C$_{10}$F$_7$)$_4$])(15.7 mg) was injected, along with 200 mL of isohexane, to initiate the polymerization. Immediately after the catalyst injection, an additional 20 psig ethylene was added to maintain a steady-state 120 psig ethylene pressure and a temperature of 70° C. The polymerization was stirred at 650 rpm. After 15 minutes, reaction was cooled to 40° C., and the pressure was released from vent valves. The polymerization was terminated by exposure to air. Evaporation of volatiles afforded polymers which were stabilized by addition of around 1,000 ppm Irganox 1076, and dried under vacuum at 70° C. for 12 hours. Yield: 67.58 g.

Example 13. A 2 L autoclave reactor was charged with 600 mL isohexane. To the reactor was added propylene (150 mL), MHD (40 mL), and tri-n-octyl aluminum (TNOAL, 2 mL of 25 wt % hexane solution; purchased from Sigma Aldrich). The reactor was brought to 65° C., and ethylene was introduced to the reactor (30 psig). At 65° C., a 20 mL toluene solution of Catalyst-3 (10 mg) and Activator-B ([PhNMe$_2$H][B(C$_{10}$F$_7$)$_4$])(31.3 mg) was injected, along with 200 mL of isohexane, to initiate the polymerization. Immediately after the catalyst injection, an additional 20 psig ethylene was added to maintain a steady-state 50 psig ethylene pressure and a temperature of 70° C. The polymerization was stirred at 650 rpm. After 15 minutes, reaction was cooled to 40° C., and the pressure was released from vent valves. The polymerization was terminated by exposure to air. Evaporation of volatiles afforded polymers which were stabilized by addition of around 1,000 ppm Irganox 1076, and dried under vacuum at 70° C. for 12 hours. Yield: 95.82 g.

Example 14. A 2 L autoclave reactor was charged with 600 mL isohexane. To the reactor was added propylene (75 mL), MHD (80 mL), and tri-n-octyl aluminum (TNOAL, 2 mL of 25 wt % hexane solution; purchased from Sigma Aldrich). The reactor was brought to 65° C., and ethylene was introduced to the reactor (100 psig). At 65° C., a 20 mL toluene solution of Catalyst-3 (5 mg) and Activator-B ([PhNMe$_2$H][B(C$_{10}$F$_7$)$_4$])(15.7 mg) was injected, along with 200 mL of isohexane, to initiate the polymerization. Immediately after the catalyst injection, an additional 20 psig ethylene was added to maintain a steady-state 120 psig ethylene pressure and a temperature of 70° C. The polymerization was stirred at 650 rpm. After 15 minutes, reaction was cooled to 40° C., and the pressure was released from vent valves. The polymerization was terminated by exposure to air. Evaporation of volatiles afforded polymers which were stabilized by addition of around 1,000 ppm Irganox 1076, and dried under vacuum at 70° C. for 12 hours. Yield: 58.2 g.

Example 15. A 2 L autoclave reactor was charged with 600 mL isohexane. To the reactor was added propylene (75 mL), MHD (120 mL), and tri-n-octyl aluminum (TNOAL, 2 mL of 25 wt % hexane solution; purchased from Sigma Aldrich). The reactor was brought to 65° C., and ethylene was introduced to the reactor (100 psig). At 65° C., a 20 mL toluene solution of Catalyst-3 (5 mg) and Activator-B ([PhNMe$_2$H][B(C$_{10}$F$_7$)$_4$])(15.7 mg) was injected, along with 200 mL of isohexane, to initiate the polymerization. Immediately after the catalyst injection, an additional 20 psig ethylene was added to maintain a steady-state 120 psig ethylene pressure and a temperature of 70° C. The polymerization was stirred at 650 rpm. After 15 minutes, reaction was cooled to 40° C., and the pressure was released from vent valves. The polymerization was terminated by exposure to air. Evaporation of volatiles afforded polymers which were stabilized by addition of around 1,000 ppm Irganox 1076, and dried under vacuum at 70° C. for 12 hours. Yield: 22.74 g.

Example 16. A 2 L autoclave reactor was charged with 600 mL isohexane. To the reactor was added propylene (75 mL), MHD (40 mL), and tri-n-octyl aluminum (TNOAL, 2 mL of 25 wt % hexane solution; purchased from Sigma Aldrich). The reactor was brought to 65° C., and ethylene was introduced to the reactor (100 psig). At 65° C., a 20 mL toluene solution of Catalyst-1 (5 mg) and Activator-B ([PhNMe$_2$H][B(C$_{10}$F$_7$)$_4$])(12.8 mg) was injected, along with 200 mL of isohexane, to initiate the polymerization. Immediately after the catalyst injection, an additional 20 psig ethylene was added to maintain a steady-state 120 psig ethylene pressure and a temperature of 70° C. The polymerization was stirred at 650 rpm. After 15 minutes, reaction was cooled to 40° C., and the pressure was released from vent valves. The polymerization was terminated by exposure to air. Evaporation of volatiles afforded polymers which were stabilized by addition of around 1,000 ppm Irganox 1076, and dried under vacuum at 70° C. for 12 hours. Yield: 26.1 g.

Example 17. A 2 L autoclave reactor was charged with 600 mL isohexane. To the reactor was added propylene (75 mL), MHD (80 mL), and tri-n-octyl aluminum (TNOAL, 2 mL of 25 wt % hexane solution; purchased from Sigma Aldrich). The reactor was brought to 65° C., and ethylene was introduced to the reactor (100 psig). At 65° C., a 20 mL toluene solution of Catalyst-1 (5 mg) and Activator-B ([PhNMe$_2$H][B(C$_{10}$F$_7$)$_4$])(12.8 mg) was injected, along with 200 mL of isohexane, to initiate the polymerization. Immediately after the catalyst injection, an additional 20 psig ethylene was added to maintain a steady-state 120 psig ethylene pressure and a temperature of 70° C. The polymerization was stirred at 650 rpm. After 15 minutes, reaction was cooled to 40° C., and the pressure was released from vent valves. The polymerization was terminated by exposure to air. Evaporation of volatiles afforded polymers which were stabilized by addition of around 1,000 ppm Irganox 1076, and dried under vacuum at 70° C. for 12 hours. Yield: 15.75 g.

Example 18. A 2 L autoclave reactor was charged with 600 mL isohexane. To the reactor was added propylene (75 mL), MHD (40 mL), and tri-n-octyl aluminum (TNOAL, 2 mL of 25 wt % hexane solution; purchased from Sigma Aldrich). The reactor was brought to 65° C., and ethylene was introduced to the reactor (100 psig). At 65° C., a 20 mL toluene solution of Catalyst-6 (5 mg) and Activator-B ([PhNMe$_2$H][B(C$_{10}$F$_7$)$_4$])(6.3 mg) was injected, along with 200 mL of isohexane, to initiate the polymerization. Immediately after the catalyst injection, an additional 20 psig ethylene was added to maintain a steady-state 120 psig ethylene pressure and a temperature of 70° C. The polymerization was stirred at 650 rpm. After 15 minutes, reaction was cooled to 40° C., and the pressure was released from vent valves. The polymerization was terminated by exposure to air. Evaporation of volatiles afforded polymers which were stabilized by addition of around 1,000 ppm Irganox 1076, and dried under vacuum at 70° C. for 12 hours. Yield: 33.9 g.

Example 19. A 2 L autoclave reactor was charged with 600 mL isohexane. To the reactor was added propylene (75 mL), MHD (80 mL), and tri-n-octyl aluminum (TNOAL, 2 mL of 25 wt % hexane solution; purchased from Sigma Aldrich). The reactor was brought to 65° C., and ethylene was introduced to the reactor (100 psig). At 65° C., a 20 mL toluene solution of Catalyst-6 (5 mg) and Activator-B ([PhNMe$_2$H][B(C$_{10}$F$_7$)$_4$])(6.3 mg) was injected, along with 200 mL of isohexane, to initiate the polymerization. Immediately after the catalyst injection, an additional 20 psig ethylene was added to maintain a steady-state 120 psig ethylene pressure and a temperature of 70° C. The polymerization was stirred at 650 rpm. After 15 minutes, reaction was cooled to 40° C., and the pressure was released from vent valves. The polymerization was terminated by exposure to air. Evaporation of volatiles afforded polymers which were stabilized by addition of around 1,000 ppm Irganox 1076, and dried under vacuum at 70° C. for 12 hours. Yield: 67.9 g.

Example 20. A 2 L autoclave reactor was charged with 600 mL isohexane. To the reactor was added propylene (75 mL), MHD (40 mL), and tri-n-octyl aluminum (TNOAL, 2 mL of 25 wt % hexane solution; purchased from Sigma Aldrich). The reactor was brought to 65° C., and ethylene was introduced to the reactor (100 psig). At 65° C., a 20 mL toluene solution of Catalyst-8 (5 mg) and Activator-B ([PhNMe$_2$H][B(C$_{10}$F$_7$)$_4$])(6.9 mg) was injected, along with 200 mL of isohexane, to initiate the polymerization. Immediately after the catalyst injection, an additional 20 psig ethylene was added to maintain a steady-state 120 psig ethylene pressure and a temperature of 70° C. The polymerization was stirred at 650 rpm. After 15 minutes, reaction was cooled to 40° C., and the pressure was released from vent valves. The polymerization was terminated by exposure to air. Evaporation of volatiles afforded polymers which were stabilized by addition of around 1,000 ppm Irganox 1076, and dried under vacuum at 70° C. for 12 hours. Yield: 113.5 g.

Example 21. A 2 L autoclave reactor was charged with 600 mL isohexane. To the reactor was added propylene (75 mL), MHD (80 mL), and tri-n-octyl aluminum (TNOAL, 2 mL of 25 wt % hexane solution; purchased from Sigma Aldrich). The reactor was brought to 65° C., and ethylene was introduced to the reactor (100 psig). At 65° C., a 20 mL toluene solution of Catalyst-8 (5 mg) and Activator-B ([PhNMe$_2$H][B(C$_{10}$F$_7$)$_4$])(6.9 mg) was injected, along with 200 mL of isohexane, to initiate the polymerization. Immediately after the catalyst injection, an additional 20 psig ethylene was added to maintain a steady-state 120 psig ethylene pressure and a temperature of 70° C. The polymerization was stirred at 650 rpm. After 15 minutes, reaction was cooled to 40° C., and the pressure was released from vent valves. The polymerization was terminated by exposure to air. Evaporation of volatiles afforded polymers which were stabilized by addition of around 1,000 ppm Irganox 1076, and dried under vacuum at 70° C. for 12 hours. Yield: 144.1 g.

Example 22. A 2 L autoclave reactor was charged with 600 mL isohexane. To the reactor was added propylene (75 mL), MHD (10 mL), and tri-n-octyl aluminum (TNOAL, 2 mL of 25 wt % hexane solution; purchased from Sigma Aldrich). The reactor was brought to 65° C., and ethylene was introduced to the reactor (100 psig). At 65° C., a 20 mL toluene solution of Catalyst-2 (5 mg) and Activator-B ([PhNMe$_2$H][B(C$_{10}$F$_7$)$_4$])(6.7 mg) was injected, along with 200 mL of isohexane, to initiate the polymerization. Immediately after the catalyst injection, an additional 20 psig ethylene was added to maintain a steady-state 120 psig ethylene pressure and a temperature of 70° C. The polymerization was stirred at 650 rpm. After 15 minutes, reaction was cooled to 40° C., and the pressure was released from vent valves. The polymerization was terminated by exposure to air. Evaporation of volatiles afforded polymers which were stabilized by addition of around 1,000 ppm Irganox 1076, and dried under vacuum at 70° C. for 12 hours. Yield: 14.25 g.

Tetrapolymerization of Ethylene, Propylene, Styrene and 4-methyl-1,4-hexadiene (MHD)

Example 23. A 2 L autoclave reactor was charged with 600 mL isohexane. To the reactor was added propylene (75 mL), MHD (40 mL), styrene (10 mL, destabilized, purchased from Sigma Aldrich), and tri-n-octyl aluminum (TNOAL, 2 mL of 25 wt % hexane solution; purchased from Sigma Aldrich). The reactor was brought to 65° C., and ethylene was introduced to the reactor (100 psig). At 65° C., a 20 mL toluene solution of Catalyst-3 (5 mg) and Activator-B ([PhNMe$_2$H][B(C$_{10}$F$_7$)$_4$])(15.7 mg) was injected, along with 200 mL of isohexane, to initiate the polymerization. Immediately after the catalyst injection, an additional 20 psig ethylene was added to maintain a steady-state 120 psig ethylene pressure and a temperature of 70° C. The polymerization was stirred at 650 rpm. After 15 minutes, reaction was cooled to 40° C., and the pressure was released from vent valves. The polymerization was terminated by exposure to air. Evaporation of volatiles afforded polymers which were washed with methanol (100 mL), stabilized by addition of around 1,000 ppm Irganox 1076, and dried under vacuum at 70° C. for 12 hours. Yield: 84.7 g.

Example 24. A 2 L autoclave reactor was charged with 600 mL isohexane. To the reactor was added propylene (150 mL), MHD (40 mL), styrene (10 mL, destabilized, purchased from Sigma Aldrich), and tri-n-octyl aluminum (TNOAL, 2 mL of 25 wt % hexane solution; purchased from Sigma Aldrich). The reactor was brought to 65° C., and ethylene was introduced to the reactor (30 psig). At 65° C., a 20 mL toluene solution of Catalyst-3 (10 mg) and Activator-B ([PhNMe$_2$H][B(C$_{10}$F$_7$)$_4$])(31.3 mg) was injected, along with 200 mL of isohexane, to initiate the polymerization. Immediately after the catalyst injection, an additional 20 psig ethylene was added to maintain a steady-state 50 psig ethylene pressure and a temperature of 70° C. The polymerization was stirred at 650 rpm. After 15 minutes, reaction was cooled to 40° C., and the pressure was released from vent valves. The polymerization was terminated by exposure to air. Evaporation of volatiles afforded polymers which were washed with methanol (100 mL), stabilized by addition of around 1,000 ppm Irganox 1076, and dried under vacuum at 70° C. for 12 hours. Yield: 72.3 g.

ditions. Tables 5 and 6 report α-MHD polymerization in slurry with silica supported Catalyst-9.

A 1 liter autoclave reactor equipped with a mechanical stirrer was used for polymer preparation. Prior to the run, the reactor was placed under nitrogen purge while maintaining 90° C. temperature for 30 minutes. Upon cooling back to

TABLE 4.0

Summary of Solution Batch Autoclave Studies with MHD

| Example | Polymer types | $M_w$ (g/mol) (LS) | $M_n$ (g/mol) (LS) | PDI ($M_w/M_n$) (LS) | C2 wt % (NMR) | C3 wt % (NMR) | MHD wt % (NMR) | Styrene wt % (NMR) | $T_m$ (° C.) (DSC) | $T_g$ (° C.) (DSC) |
|---|---|---|---|---|---|---|---|---|---|---|
| 1 | Poly-MHD | 3,393 | 2,165 | 1.6 | — | — | 100% | — | — | 25 |
| 3 | E-MHD | 9,186 | 2,122 | 4.3 | 5.5% | — | 94.5% | — | — | 16.2 |
| 2 | E-MHD | 20,685 | 11,492 | 1.8 | | — | | — | — | 4.6 |
| 4 | E-MHD | 3,103 | 1,695 | 1.8 | 6.2% | — | 93.8% | — | — | 4.3 |
| 5 | E-MHD | 30,607 | 14,942 | 2.0 | 42.7% | — | 57.3% | — | — | −46 |
| 6 | E-MHD | 107,502 | 21,490 | 5.0 | 60.9% | — | 39.1% | — | — | −52.7 |
| 7 | P-MHD | 77,670 | 40,433 | 1.9 | — | 80.6% | 19.4% | — | 54.4 | −12.9 |
| 8 | E-MHD-S | 32,550 | 8,618 | 3.8 | 49.8% | — | 45.8% | 4.4% | — | −45.5 |
| 9 | E-P-MHD | 232,291 | 100,151 | 2.3 | 51.0% | 43.0% | 6.00% | — | −19 | −51 |
| 10 | E-P-MHD | 174,667 | 85,031 | 2.1 | 53.9% | 33.7% | 12.50% | — | | −51 |
| 11 | E-P-MHD | 73,585 | 32,389 | 2.3 | 49.1% | 41.2% | 9.80% | — | | −48 |
| 12 | E-P-MHD | 233,240 | 93,619 | 2.5 | 57.8% | 35.8% | 6.40% | — | −6.9 | −50.2 |
| 13 | E-P-MHD | 203,418 | 90,717 | 2.2 | 36.5% | 56.2% | 7.20% | — | | −43 |
| 14 | E-P-MHD | 217,467 | 98,461 | 2.2 | 51.8% | 28.1% | 20.10% | — | −14.7 | −50.2 |
| 15 | E-P-MHD | 149,242 | 66,432 | 2.2 | 46.0% | 28.6% | 25.50% | — | NA | −50 |
| 16 | E-P-MHD | 203,445 | 102,779 | 2.0 | 54.6% | 35.8% | 9.60% | — | −21.9 | −55.4 |
| 17 | E-P-MHD | 212,744 | 103,760 | 2.1 | 51.8% | 31.8% | 16.40% | — | −23.9 | −54.7 |
| 18 | E-P-MHD | 195,215 | 101,971 | 1.9 | 52.4% | 36.0% | 11.60% | — | −22 | −53 |
| 19 | E-P-MHD | 170,147 | 81,659 | 2.1 | 51.5% | 29.0% | 19.50% | — | −16.6 | −50.8 |
| 20 | E-P-MHD | 96,701 | 40,013 | 2.4 | 60.7% | 23.2% | 16.10% | — | 4.8 | −49.8 |
| 21 | E-P-MHD | 74,413 | 28,401 | 2.6 | 50.4% | 29.8% | 19.80% | — | NA | −50 |
| 22 | E-P-MHD | 386,940 | 187,846 | 2.1 | 57.4% | 39.5% | 3.20% | — | −32.5 | −57.7 |
| 23 | E-P-MHD-S | 183,992 | 80,069 | 2.3 | 72.1% | 23.6% | 1.8% | 2.60% | −13.4 | −49.6 |
| 24 | E-P-MHD-S | 120,489 | 58,892 | 2.0 | 54.3% | 37.6% | 2.8% | 5.20% | — | −41 |

Solution Polymerization of Propylene and MHD

Catalysts 9-11 were tested for high-throughput solution polymerization of propylene and MHD. The data presented in Table 5.0 highlights excellent activities and incorporation rates of $C_1$ symmetric catalysts 9-11. In some examples, propylene-MHD copolymers were obtained with high MHD content (up to 10 wt %).

ambient temperature, propylene feed (500 mL), scavenger (0.2 mL of 1 M TIBAL, triisobutylaluminum), MHD (2-20 mL) and optionally hydrogen (charged from a 25 mL bomb at a desired pressure) were introduced to the reactor and were allowed to mix for 5 minutes. Desired amount of supported catalyst (typically 12.5-25.0 mg) was then introduced to the reactor by flushing the pre-determined amount

TABLE 5.0

Solution polymerization of propylene and MHD using catalysts 9-11.

| Example | Catalyst | MHD (μL) | $T_p$ (° C.) | Catalyst acivity (kg/mmol · h) | $M_w$ (g/mol) | PDI | $T_m$ (° C.) | MHD in polymer (wt %) |
|---|---|---|---|---|---|---|---|---|
| 1 | 11 | 0 | 70 | 878.6 | 64,824 | 2.8 | 143.6 | — |
| 2 | 11 | 100 | 70 | 408.9 | 86,723 | 2.0 | 127.6 | 3.9 |
| 3 | 11 | 200 | 70 | 218.1 | 113,477 | 1.9 | 116.0 | 8.1 |
| 4 | 11 | 300 | 70 | 158.3 | 124,157 | 1.8 | 100.7 | 10.9 |
| 5 | 9 | 0 | 70 | 735.5 | 59,129 | 2.9 | 148.4 | — |
| 6 | 9 | 100 | 70 | 408.6 | 89,122 | 2.2 | 134.6 | 3.2 |
| 7 | 9 | 200 | 70 | 212.3 | 107,724 | 1.9 | 125.9 | 6.1 |
| 8 | 9 | 300 | 70 | 153.7 | 122,238 | 1.9 | 118.2 | 8.5 |
| 9 | 10 | 0 | 70 | 638.3 | 80,251 | 2.1 | 155.5 | — |
| 10 | 10 | 50 | 70 | 413.3 | 89,255 | 2.1 | 143.1 | 1.8 |
| 11 | 10 | 100 | 70 | 315.7 | 102,866 | 1.9 | 134.3 | 1.9 |
| 12 | 10 | 50 | 100 | 263.7 | 22,067 | 1.8 | 134.6 | 3.7 |
| 13 | 10 | 100 | 100 | 197.9 | 22,234 | 2.0 | 127.6 | 3.9 |

Conditions: [Cat] = 30 nmol, 1 mL of liquid propylene, 4 mL isohexane, 1.1 equiv of N,N-dimethylanilinium tetrakis(perfluoronaphthyl)borate) (relative to catalyst).

Slurry Polymerization Studies

Propylene copolymers of 4-methyl-1,4-hexadiene were prepared with supported catalyst systems under slurry conof catalyst slurry (5 wt % in mineral oil) from a catalyst tube with 100 mL of liquid propylene. The reactor was kept for 5 minutes at room temperature (pre-poly stage), before raising the temperature to 70° C. The reaction was allowed to proceed at that temperature for a desired time period (typically 15-30 minutes). After the given time, the temperature was reduced to 25° C., the excess propylene was vented off and the polymer granules were collected, and dried under vacuum at 60° C. overnight.

Preparation of silica supported MAO (SMAO): In a celstir bottle, 20.0 g of silica (DM-L402, AGC Chemicals Americas, Inc., calcined at 200° C. for 3 days under $N_2$ flow) and 91.2 g of toluene were mixed. The silica slurry was then allowed to cool in the freezer for 30 minutes. In a square bottle, 31.8 g MAO (30% toluene solution, W.R. GRACE & Co. Conn.), based on 7.5 mmol Al/g silica) was charged in and also cooled down in the freezer for 30 minutes (−35° C.). After 30 minutes, the cold MAO solution was added slowly into the silica slurry bottle by pipette. The solution was allowed to stir at room temperature for 1 hour. After 1 hour, the oil bath was heated up to 100° C. and the solution stirred at 100° C. for 3 hours. After 2.5 hours of stirring, the celstir bottle was taken off the heat and continued to stir for another 30 minutes. The mixture was then filtered, washed 2×20 g toluene and 2×20 g isohexane. The product was dried under vacuum overnight.

Preparation of silica supported Catalyst-9: 1 g of SMAO (prepared according to above described procedure) was suspended in 5 mL of toluene and placed on a shaker. TIBAL (0.35 mL of 1 M hexane solution) was added, and the resulting mixture was allowed to shake for 15 minutes. After 15 minutes, metallocene Catalyst-9 (21.1 mg, corresponding to 0.3 wt % Zr) was added as a toluene solution (2 mL) to the silica mixture. This resulted in rapid color change to dark red. The mixture was allowed to react for 3 hours. After 3 hours, the mixture was filtered and the solid was washed with toluene (5 mL) and hexane (2×5 mL) and dried in vacuo to give a supported Catalyst-9 as an orange solid in quantitative yield. The solid was suspended in degassed mineral oil to make 5 wt % slurry.

According to Tables 5 and 6, a variety of P-MHD copolymer compositions can be prepared in bulk propylene with high activities. The incorporation levels (based on $^1$H NMR analysis) reach up to 1.7 wt % without major penalties in catalyst activity. The observed MHD content (wt %) correlates well with experimental melting points of prepared polypropylenes. More importantly, crosslinking was not observed in all samples (based on near quantitative GPC-4D recovery).

Continuous Unit Polymerization Studies

Methodology and Unit Description

Polymerizations were carried out in a continuous stirred tank reactor system. A 1-liter autoclave reactor was equipped with a stirrer, a pressure controller, and a water cooling/steam heating element with a temperature controller. The reactor was operated in liquid fill condition at a reactor pressure in excess of the bubbling point pressure of the reactant mixture, keeping the reactants in liquid phase. Isohexane and propylene were pumped into the reactors by Pulsa feed pumps, and their flow rates were controlled using Coriolis mass flow controller (Quantim series from Brooks). 4-methyl-1,4-hexadiene (MHD) was fed into the reactor using a metering pump. Ethylene flowed as a gas under its own pressure through a Brooks flow controller. Monomers (e.g., ethylene and propylene) were combined into one stream and then mixed with a pre-chilled isohexane stream that had been cooled to at least 0° C. The mixture was then fed to the reactor through a single line. Scavenger solution was also added to the combined solvent and monomer stream just before it entered the reactor to further reduce any catalyst poisons. Similarly, catalyst solution was fed to the reactor using an ISCO syringe pump through a separated line. Isohexane (used as solvent), and monomers (e.g., ethylene and propylene) were purified over beds of alumina and molecular sieves. Toluene for preparing catalyst solutions was purified by the same technique. All the reactions were carried out at a pressure of about 2.75 MPa/g unless otherwise noted.

An isohexane solution of tri-n-octyl aluminum (TNOA) (25 wt % in hexane, Sigma Aldrich) was used as scavenger solution. Catalyst-3/Activator-B and Catalyst-6/Activator-A combinations were used. The catalyst solution was prepared by combining the complex Catalyst-6 with Activator-A at a molar ratio of about 1:1 in 900 ml of toluene, or by combining the complex Catalyst-3 with Activator-B at a molar ratio of about 1:1 in 900 ml of toluene.

The polymer produced in the reactor exited through a back pressure control valve that reduced the pressure to atmospheric. This caused the unconverted monomers in the solution to flash into a vapor phase which was vented from

TABLE 5.0

Slurry polymerization of propylene and MHD with supported catalyst 9

| Example | MHD (mL) | Hydrogen (mmol) | Supported catalyst (mg) | Run time (min) | Yield (g) | Catalyst productivity (g/g · h) |
|---|---|---|---|---|---|---|
| 25 | 0 | 2 | 12.5 | 15 | 50.1 | 16,027 |
| 26 | 2 | 2 | 25.4 | 30 | 117.4 | 9,240 |
| 27 | 5 | 2 | 12.6 | 30 | 54.4 | 8,614 |
| 28 | 10 | 2 | 12.4 | 30 | 67.3 | 10,846 |
| 29 | 20 | 2 | 12.5 | 30 | 54.7 | 8,723 |

Conditions: 600 mL of liquid propylene, 70° C.

TABLE 6.0

Characterization of P-MHD copolymers prepared in slurry with supported catalyst 9.

| Example | MFR (dg/min) | $M_n$ (g/mol) | $M_w$ (g/mol) | $M_z$ (g/mol) | PDI (Mw/Mn) | $g'_{vis}$ | $T_m$ (°C.) | MHD (wt %) in polymer |
|---|---|---|---|---|---|---|---|---|
| 25 | 73 | 37,859 | 146,064 | 286,284 | 3.86 | 0.947 | 156.0 | 0 |
| 26 | 19 | 68,138 | 223,685 | 422,755 | 3.28 | 0.970 | 153.1 | 0.3 |
| 27 | 65 | 42,884 | 150,997 | 284,755 | 3.52 | 0.976 | 151.2 | 0.5 |
| 28 | 63 | 47,156 | 159,068 | 312,200 | 3.37 | 0.976 | 147.1 | 1.0 |
| 29 | 50 | 42,645 | 158,458 | 306,599 | 3.71 | 0.964 | 142.4 | 1.7 |

Note:
$M_n$, $M_w$, $M_z$ taken from GPC-4D, $T_m$ measured according to DSC-2 procedure, MHD content determined by $^1$H NMR analysis.

the top of a vapor liquid separator. The liquid phase, comprising mainly polymer and solvent, was collected for polymer recovery. The collected samples were first air-dried in a hood to evaporate most of the solvent, and then dried in a vacuum oven at a temperature of about 90° C. for about 12 hours. The vacuum oven dried samples were weighed to obtain yields. The detailed polymerization condition and some characterization data are listed in Table 7. All polymerization reactions were conducted with TNOA scavenger. The compositional analysis was performed by FTIR as described in the "General considerations and analytical methods" section above.

TABLE 7.0

Selected Continuous Unit Polymerization Conditions

| Example | 30 | 31 | 32 | 33 | 34 | 35 |
|---|---|---|---|---|---|---|
| Polymerization temperature (° C.) | 110 | 110 | 110 | 100 | 90 | 90 |
| Ethylene feed rate (g/min) | 7.57 | 7.57 | 7.57 | 7.57 | 7.57 | 7.57 |
| Propylene feed rate (g/min) | 10 | 10 | 10 | 8 | 8 | 8 |
| MHD feed rate (g/min) | 0.71 | 1.42 | 2.84 | 1.42 | 1.42 | 1.42 |
| Isohexane feed rate (g/min) | 57.4 | 58.0 | 59.3 | 58.0 | 58.0 | 60.3 |
| Catalyst | Catalyst-3 | Catalyst-3 | Catalyst-3 | Catalyst-3 | Catalyst-3 | Catalyst-3 |
| Catalyst feed rate (mol/min) | 1.34E−07 | 1.34E−07 | 1.34E−07 | 1.34E−07 | 1.34E−07 | 1.34E−07 |
| Scavenger feed rate (mol/min) | 7.40E−06 | 7.40E−06 | 7.40E−06 | 7.40E−06 | 7.40E−06 | 1.40E−05 |
| Polymer yield (g/min) | 2.48 | 2.25 | 1.60 | 1.98 | 1.98 | 1.95 |
| Conversion (%) | 13.5% | 11.8% | 7.8% | 11.6% | 11.6% | 11.5% |
| Ethylene content (mol %) | 68.4% | 68.9% | 68.2% | 72.3% | 72.1% | 71.4% |
| Propylene content (mol %) | 31.2% | 30.5% | 30.9% | 27.0% | 27.2% | 27.8% |
| MHD content (mol %) | 0.40% | 0.60% | 0.90% | 0.70% | 0.70% | 0.80% |
| ML(1 + 4)@ 125° C. (mu) | 71.6 | 71.0 | 63.0 | 59.0 | 59.9 | 53.0 |
| MLRA (mu · s) | | | | | | |

| Example | 36 | 37 | 38 | 39 | 40 | 41 |
|---|---|---|---|---|---|---|
| Polymerization temperature (° C.) | 90 | 110 | 110 | 110 | 110 | 110 |
| Ethylene feed rate (g/min) | 7.57 | 7.57 | 5.05 | 7.57 | 4.04 | 3.03 |
| Propylene feed rate (g/min) | 10 | 10 | 10 | 10 | 8 | 4 |
| MHD feed rate (g/min) | 2.84 | 2.84 | 2.84 | 2.84 | 2.27 | 2.58 |
| Isohexane feed rate (g/min) | 59.3 | 59.3 | 59.6 | 59.3 | 47.7 | 26.7 |
| Catalyst | Catalyst-3 | Catalyst-3 | Catalyst-3 | Catalyst-3 | Catalyst-3 | Catalyst-3 |
| Catalyst feed rate (mol/min) | 2.68E−07 | 5.35E−07 | 5.35E−07 | 2.68E−07 | 4.28E−07 | 5.35E−07 |
| Scavenger feed rate (mol/min) | 7.40E−06 | 7.40E−06 | 8.20E−06 | 7.40E−06 | 6.60E−06 | 7.40E−06 |
| Polymer yield (g/min) | 0.95 | 1.88 | 3.45 | 2.83 | 3.08 | 2.77 |
| Conversion (%) | 4.7% | 9.2% | 19.3% | 13.8% | 21.5% | 28.8% |
| Ethylene content (mol %) | 69.0% | 60.6% | 58.3% | 66.1% | 57.9% | 59.8% |
| Propylene content (mol %) | 29.7% | 38.1% | 40.2% | 32.5% | 40.5% | 37.2% |
| MHD content (mol %) | 1.20% | 1.30% | 1.60% | 1.30% | 1.60% | 3.10% |
| ML(1 + 4)@ 125° C. (mu) | 95.0 | 143.9 | 51.9 | 143.1 | 50.9 | 21.7 |
| MLRA (mu · s) | | | | | | |

| Example | 42 | 43 | 44 | 45 | 46 |
|---|---|---|---|---|---|
| Polymerization temperature (° C.) | 110 | 90 | 110 | 85 | 85 |
| Ethylene feed rate (g/min) | 3.03 | 7.57 | 7.57 | 3.03 | 3.41 |
| Propylene feed rate (g/min) | 4 | 10 | 10 | 4 | 4 |
| MHD feed rate (g/min) | 5.64 | 2.84 | 2.84 | 5.64 | 5.64 |

TABLE 7.0-continued

| Selected Continuous Unit Polymerization Conditions | | | | | |
|---|---|---|---|---|---|
| Isohexane feed rate (g/min) | 29.5 | 59.3 | 59.3 | 28.8 | 22.7 |
| Catalyst | Catalyst-3 | Catalyst-6 | Catalyst-6 | Catalyst-3 | Catalyst-3 |
| Catalyst feed rate (mol/min) | 5.35E−07 | 2.14E−07 | 2.14E−07 | 5.35E−07 | 2.68E−07 |
| Scavenger feed rate (mol/min) | 7.40E−06 | 7.40E−06 | 7.40E−06 | 5.50E−06 | 5.50E−06 |
| Polymer yield (g/min) | 2.27 | 8.70 | 9.40 | 2.87 | 2.62 |
| Conversion (%) | 17.9% | 42.6% | 46.1% | 22.6% | 20.1% |
| Ethylene content (mol %) | 60.8% | 58.8% | 59.4% | 56.1% | 60.5% |
| Propylene content (mol %) | 34.5% | 39.3% | 38.6% | 38.3% | 34.3% |
| MHD content (mol %) | 4.70% | 2.00% | 2.00% | 5.60% | 5.20% |
| ML(1 + 4)@ 125° C. (mu) MLRA (mu · s) | 11.7 | 41.8 | 12.0 | 28.3 | 71.2 |

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including." Likewise whenever a composition, an element or a group of elements is preceded with the transitional phrase "comprising", it is understood that we also contemplate the same composition or group of elements with transitional phrases "consisting essentially of," "consisting of", "selected from the group of consisting of," or "is" preceding the recitation of the composition, element, or elements and vice versa.

What is claimed is:

1. A polymer comprising: 1) one or more dienes that include at least 11 wt % 4-substituted 1,4 hexadiene and less than 1 wt % 5-methyl-1,4-hexadiene based upon a weight of the polymer, and 2) one or more olefins comprising ethylene, ethylene and propylene, or ethylene, propylene and styrene, and the polymer has a glass transition temperature of −40° C. or less.

2. The polymer of claim 1, wherein the one or more dienes is represented by the formula:

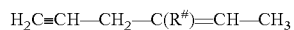

wherein $R^{\#}$ is a $C_1$ to $C_{20}$ hydrocarbyl group.

3. The polymer of claim 2, wherein R" is one or more of phenyl, benzyl, naphthyl, styryl, xylyl, methyl, ethyl, propyl, butyl, pentyl, hexyl, heptyl, octyl, nonyl, decyl, undecyl, dodecyl, or an isomer thereof.

4. The polymer of claim 1, wherein the one or more dienes is 4-methyl-1,4-hexadiene, 4-ethyl-1,4-hexadiene, 4-n-propyl-1,4-hexadiene, 4-n-butyl-1,4-hexadiene, 4-phenyl-1,4-hexadiene, or 4-methylphenyl-1,4-hexadiene.

5. The polymer of claim 1, wherein the one or more olefins comprise ethylene, butene, pentene, hexene, heptene, octene, nonene, decene, undecene, dodecene, norbornene, cyclopentene, cycloheptene, cyclooctene, cyclooctadiene, cyclododecene, 7-oxanorbornene, styrene, methylstyrene, substituted derivatives thereof, or isomers thereof.

6. The polymer of claim 1, wherein the polymer is a copolymer of at least one $C_2$ to $C_{40}$ alpha olefin, a vinyl aromatic, and one or more dienes represented by the formula:

wherein $R^{\#}$ is a $C_1$ to $C_{20}$ hydrocarbyl group.

7. A polymer comprising: 1) one or more dienes that include 11-30 wt % 4-substituted 1,4 hexadiene and less than 20 wt % 5-methyl-1,4-hexadiene based upon the weight of the polymer, and 2) one or more olefins, wherein propylene is not included in the polymer unless there are at least two olefins in the polymer and the polymer is a terpolymer of ethylene, propylene, and 4-substituted 1,4 hexadiene, the polymer has a Mw of 70,000 g/mol or more, the polymer has a Mooney (ML 1+4, 125° C.) value greater than 20 MU, the polymer has a glass transition temperature of −40° C. or less.

8. A polymer comprising: 1) one or more dienes that include 0.1 to 10 wt % 4-substituted 1,4 hexadiene and less than 0.5 wt % 5-methyl-1,4-hexadiene based upon a weight of the polymer, and 2) one or more olefins that at least includes propylene.

9. The polymer of claim 8, wherein the polymer is a copolymer of the propylene and the 4-substituted 1,4 hexadiene, the copolymer has an isotactic propylene backbone, the copolymer has a melting point ranging from 140° C. to 160° C. as measured according to DSC-2, and the isotactic propylene backbone has a meso pentad ranging from 0.650 to 0.985 as measured by $^{13}$C NMR spectroscopy.

10. A process to produce polymer comprising: contacting 1) diene comprising 4-substituted 1,4 hexadiene and 1 wt % or less of 5-methyl-1,4-hexadiene, and 2) one or more olefins, with 3) a catalyst system comprising single site coordination polymerization catalyst and activator and the contacting includes using propylene as the one or more olefins, and the contacting is performed in solution, gas phase, slurry, or bulk-slurry, and wherein the polymer is a copolymer of the propylene and the 4-substituted 1,4 hexadiene, the copolymer has an isotactic propylene backbone, the copolymer has a melting point ranging from 80° C. to 155° C., the isotactic propylene backbone has a meso pentad ranging from 0.650 to 0.985 as measured by $^{13}$C NMR spectroscopy, and the polymer includes 0.1-10 wt % of the 4-substituted 1,4 hexadiene based upon weight of the polymer.

11. The process of claim 10, wherein the polymer is a terpolymer of ethylene, propylene and 4-substituted 1,4 hexadiene, the terpolymer is amorphous, the polymer has a Tg of less than −40° C., Mooney (M+L 125° C.) greater than 20, and the polymer contains 4-substituted 1,4 hexadiene content between 11-30% by weight.

12. The process of claim 10, wherein the diene is represented by the formula:

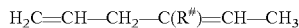

$H_2C=CH—CH_2—C(R^\#)=CH—CH_3$ wherein $R^\#$ is a C to $C_{20}$ hydrocarbyl group.

13. The process of claim 10, wherein the diene is one or more of 4-methyl-1,4-hexadiene, 4-ethyl-1,4-hexadiene, 4-n-propyl-1,4-hexadiene, 4-n-butyl-1,4-hexadiene, 4-phenyl-1,4-hexadiene, and 4-methyl-phenyl-1,4-hexadiene; and the one or more olefins are selected from the group consisting of: ethylene, propylene, butene, pentene, hexene, heptene, octene, nonene, decene, undecene, dodecene, norbornene, cyclopentene, cycloheptene, cyclooctene, cyclooctadiene, cyclododecene, 7-oxanorbornene, styrene, methyl-styrene, and isomers thereof.

14. The process of claim 10, wherein the single site coordination polymerization catalyst includes a metallocene complex, pyridyldiamido complex, quinolinyldiamido complex, phenoxyimine complex, bisphenolate complex, cyclopentadienyl-amidinate complex, iron pyridyl bis(imine) complex, FI catalyst, or PI catalyst.

15. The process of claim 10, wherein the single site coordination polymerization catalyst is one or more of:
dimethylsilyl (tetramethylcyclopentadienyl)(cyclododecylamido)titanium dimethyl;
dimethylsilyl (tetramethylcyclopentadienyl)(t-butylamido)titanium dimethyl;
μ-$(CH_3)_2$Si(cyclopentadienyl)(1-adamantylamido)titanium dimethyl;
μ-$(CH_3)_2$Si(3-tertbutylcyclopentadienyl)(1-adamantylamido)titanium dimethyl;
μ-$(CH_3)_2$Si(tetramethylcyclopentadienyl)(1-adamantylamido)titanium dimethyl;
μ-$(CH_3)_2$C(tetramethylcyclopentadienyl)(1-adamantylamido)titanium dimethyl;
μ-$(CH_3)_2$Si(tetramethylcyclopentadienyl)(1-tertbutylamido)titanium dimethyl;
μ-$(CH_3)_2$Si(fluorenyl)(1-tertbutylamido)titanium dimethyl;
μ-$(CH_3)_2$Si(tetramethylcyclopentadienyl)(1-cyclododecylamido)titanium dimethyl;
μ-$(C_6H_5)_2$C(tetramethylcyclopentadienyl)(1-cyclododecylamido)titanium dimethyl;
μ-$(CH_3)_2$Si($\eta^5$-2,6,6-trimethyl-1,5,6,7-tetrahydro-s-indacen-1-yl)(tertbutylamido)titanium dimethyl;
bis(1-methyl, 3-n-butyl cyclopentadienyl)hafnium dimethyl;
bis(1-methyl, 3-n-butyl cyclopentadienyl)zirconium dimethyl;
dimethylsilyl bis(indenyl)zirconium dimethyl;
dimethylsilyl bis(indenyl)hafnium dimethyl;
bis(indenyl)zirconium dimethyl;
bis(indenyl)hafnium dimethyl;
dimethylsilyl bis(tetrahydroindenyl)zirconium dimethyl;
bis(n-propylcyclopentadienyl)zirconium dimethyl;
dimethylsilylbis(tetrahydroindenyl)hafnium dimethyl;
dimethylsilyl bis(2-methylindenyl)zirconium dimethyl;
dimethylsilyl bis(2-methylfluorenyl)zirconium dimethyl;
dimethylsilyl bis(2-methylindenyl)hafnium dimethyl;
dimethylsilyl bis(2-methylfluorenyl)hafnium dimethyl;
dimethylsilyl bis(2-methyl-4-phenylindenyl)zirconium dimethyl;
dimethylsilyl bis(2-ethyl-5-phenylindenyl)zirconium dimethyl;
dimethylsilyl bis(2-methyl-4-biphenylindenyl)zirconium dimethyl;
dimethylsilylene bis(2-methyl-4-carbazolylindenyl)zirconium dimethyl;
rac-dimethylsilyl-bis-(5,6,7,8-tetrahydro-5,5,8,8-tetramethyl-2-methyl-1H-benz[f]indenyl)hafnium dimethyl;
diphenylmethylene (cyclopentadienyl)(fluorenyl)hafnium dimethyl;
bis(methylcyclopentadienyl)zirconium dimethyl;
rac-dimethylsiylbis(2-methyl,3-propyl indenyl)hafnium dimethyl;
rac/meso-diphenylsilyl-bis(n-propylcyclopentadienyl) hafnium dimethyl;
1,1'-bis(4-triethylsilylphenyl)methylene-(cyclopentadienyl)(3,8-di-tertiary-butyl-1-fluorenyl)hafnium $Cl_2$ (bridge is considered the 1 position);
1,1'-bis(4-triethylsilylphenyl)methylene-(cyclopentadienyl)(3,8-di-tertiary-butyl-1-fluorenyl)hafnium $Me_2$ (bridge is considered the 1 position);
bis-trimethylsilylphenyl-methylene (cyclopentadienyl)(di-t-butylfluorenyl)hafnium dimethyl;
bis-trimethylsilylphenyl-methylene (cyclopentadienyl)(fluorenyl)hafnium dimethyl;
bisphenylmethylene (cyclopentadienyl)(dimethylfluorenyl)hafnium dimethyl;
bis(n-propylcyclopentadienyl)hafnium dimethyl;
bis(n-butylcyclopentadienyl)hafnium dimethyl;
bis(n-pentylcyclopentadienyl)hafnium dimethyl;
(n-propyl cyclopentadienyl)(n-butylcyclopentadienyl) hafnium dimethyl;
bis[(2-trimethylsilylethyl)cyclopentadienyl]hafnium dimethyl;
bis(trimethylsilyl cyclopentadienyl)hafnium dimethyl;
dimethylsilylbis(n-propylcyclopentadienyl)hafnium dimethyl;
dimethylsilylbis(n-butylcyclopentadienyl)hafnium dimethyl;
bis(1-n-propyl-2-methylcyclopentadienyl)hafnium dimethyl;
(n-propylcyclopentadienyl)(1-n-propyl-3-n-butylcyclopentadienyl)hafnium dimethyl;
dimethylsilyl (3-n-propylcyclopentadienyl)(tetramethylcyclopentadienyl)zirconium dimethyl;
dimethylsilyl bis(2-methyl-4-phenyl) indenyl zirconium dichloride;
dimethylsilyl bis(2-methyl-4-phenyl) indenyl zirconium dimethyl;
dimethylsilyl bis(2-methyl-4-(4-tertbutylphenyl) indenyl zirconium dichloride;
dimethylsilyl bis(2-methyl-4-(4-tertbutylphenyl) indenyl zirconium dimethyl;
dimethylsilyl bis(2-methyl-4-(4-(1-naphthyl)) indenyl zirconium dichloride;
dimethylsilyl bis(2-methyl-4-(4-(1-naphthyl)) indenyl zirconium dimethyl;
dimethylsilyl bis(2-methyl-4-(4-(3,5-ditertbutylphenyl) indenyl zirconium dichloride;
dimethylsilyl bis(2-methyl-4-(4-(3,5-ditertbutylphenyl) indenyl zirconium dimethyl;
dimethylsilyl-(4-([1,1'-biphenyl]-2-yl)-2-hexyl-1H-inden-1-yl)(4-(3,5-di-tert-butyl-4-methoxyphenyl)-2-methyl-1H-inden-1-yl)zirconium dichloride;

dimethylsilyl-(4-([1,1'-biphenyl]-2-yl)-2-hexyl-1H-inden-1-yl)(4-(3,5-di-tert-butyl-4-methoxyphenyl)-2-methyl-1H-inden-1-yl)zirconium dimethyl;

dimethylsilyl-(4-(4-(tert-butyl)phenyl)-2-isopropyl-1H-inden-1-yl)(4-(4-(tert-butyl)phenyl)-2-methyl-1,5,6,7-tetrahydro-s-indacen-1-yl)zirconium dichloride;

dimethylsilyl-(4-(4-(tert-butyl)phenyl)-2-isopropyl-1H-inden-1-yl)(4-(4-(tert-butyl)phenyl)-2-methyl-1,5,6,7-tetrahydro-s-indacen-1-yl)zirconium dimethyl;

dimethylsilyl-(4-(4-(tert-butyl)phenyl)-2-isopropyl-1H-inden-1-yl)(4-(4-(tert-butyl)phenyl)-2-methyl-1H-inden-1-yl)zirconium dichloride;

dimethylsilyl-(4-(4-(tert-butyl)phenyl)-2-isopropyl-1H-inden-1-yl)(4-(4-(tert-butyl)phenyl)-2-methyl-1H-inden-1-yl)zirconium dimethyl;

tetramethylcyclopentadienyl dimethylsilyl (2-methyl-4-phenyl)-1,5,6,7-tetrahydro-s-indacen-1-yl)zirconium dichloride;

tetramethylcyclopentadienyl dimethylsilyl (2-methyl-4-phenyl)-1,5,6,7-tetrahydro-s-indacen-1-yl)zirconium dimethyl;

tetramethylcyclopentadienyl dimethylsilyl (2-methyl-4-(4-tertbutylphenyl)-1,5,6,7-tetrahydro-s-indacen-1-yl)zirconium dichloride;

tetramethylcyclopentadienyl dimethylsilyl (2-methyl-4-(4-tertbutylphenyl)-1,5,6,7-tetrahydro-s-indacen-1-yl)zirconium dimethyl;

tetramethylcyclopentadienyl dimethylsilyl (2-methyl-4-(o-tolyl)-1,5,6,7-tetrahydro-s-indacen-1-yl)zirconium dichloride;

tetramethylcyclopentadienyl dimethylsilyl (2-methyl-4-(o-tolyl)-1,5,6,7-tetrahydro-s-indacen-1-yl)zirconium dimethyl;

tetramethylcyclopentadienyl dimethylsilyl (4-([1,1'-biphenyl]-2-yl)-1,5,6,7-tetrahydro-s-indacen-1-yl)zirconium dichloride;

tetramethylcyclopentadienyl dimethylsilyl (4-([1,1'-biphenyl]-2-yl)-1,5,6,7-tetrahydro-s-indacen-1-yl)zirconium dimethyl;

tetramethylcyclopentadienyl dimethylsilyl (4-(2-isopropylphenyl)-2-methyl-1,5,6,7-tetrahydro-s-indacen-1-yl)zirconium dichloride;

tetramethylcyclopentadienyl dimethylsilyl (4-(2-isopropylphenyl)-2-methyl-1,5,6,7-tetrahydro-s-indacen-1-yl)zirconium dimethyl;

tetramethylcyclopentadienyl dimethylsilyl (2-methyl-4-(2,3,4-trimethylphenyl)-1,5,6,7-tetrahydro-s-indacen-1-yl)zirconium dichloride;

tetramethylcyclopentadienyl dimethylsilyl (2-methyl-4-(2,3,4-trimethylphenyl)-1,5,6,7-tetrahydro-s-indacen-1-yl)zirconium dimethyl;

tetramethylcyclopentadienyl dimethylsilyl (4-(3,5-di-tert-butyl-4-methoxyphenyl)-2-methyl-1,5,6,7-tetrahydro-s-indacen-1-yl)zirconium dichloride;

tetramethylcyclopentadienyl dimethylsilyl (4-(3,5-di-tert-butyl-4-methoxyphenyl)-2-methyl-1,5,6,7-tetrahydro-s-indacen-1-yl)zirconium dimethyl;

tetramethylcyclopentadienyl dimethylsilyl (4-(anthracen-9-yl)-2-methyl-1,5,6,7-tetrahydro-s-indacen-1-yl))zirconium dichloride;

tetramethylcyclopentadienyl dimethylsilyl (4-(anthracen-9-yl)-2-methyl-1,5,6,7-tetrahydro-s-indacen-1-yl))zirconium dimethyl;

tetramethylcyclopentadienyl dimethylsilyl (2-methyl-4-(3,5-di-trifluoromethylphenyl)-1,5,6,7-tetrahydro-s-indacen-1-yl)zirconium dichloride;

tetramethylcyclopentadienyl dimethylsilyl (2-methyl-4-(3,5-di-trifluoromethylphenyl)-1,5,6,7-tetrahydro-s-indacen-1-yl)zirconium dimethyl;

tetramethylcyclopentadienyl dimethylsilyl (4-(1-naphthyl)-2-methyl-1,5,6,7-tetrahydro-s-indacen-1-yl))zirconium dichloride; and tetramethylcyclopentadienyl dimethylsilyl (4-(1-naphthyl)-2-methyl-1,5,6,7-tetrahydro-s-indacen-1-yl))zirconium dimethyl.

16. The process of claim 10, wherein the single site coordination polymerization catalyst comprises one or more of:

Complex 1

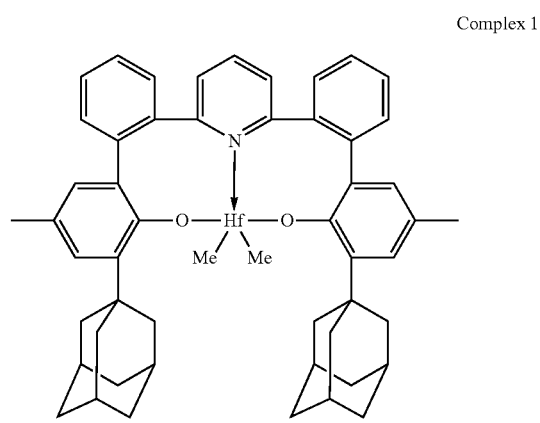

Complex 2

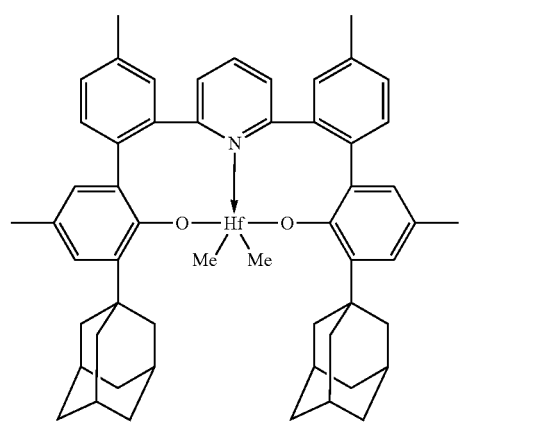

Complex 3

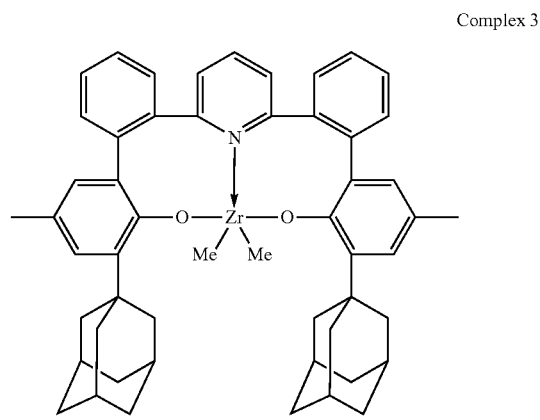

Complex 4
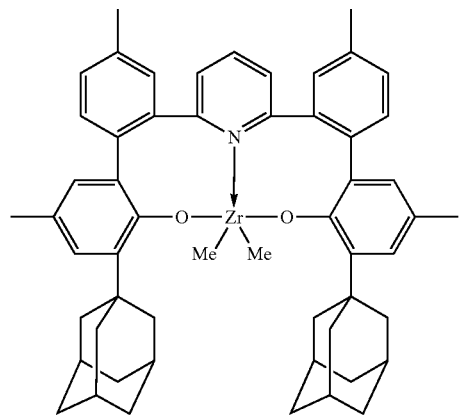
Complex 5
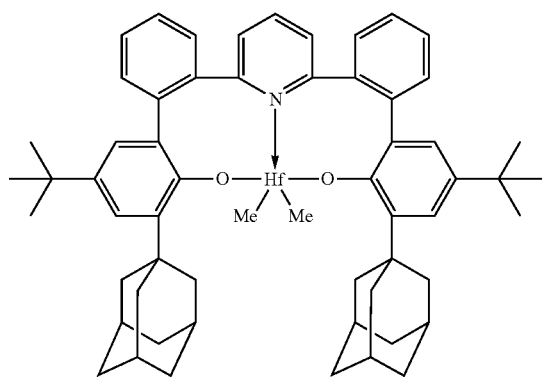
Complex 6
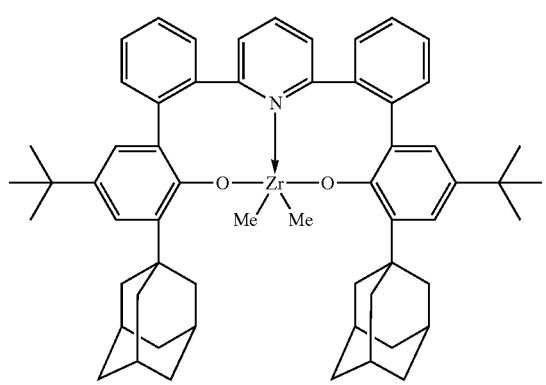
Complex 7
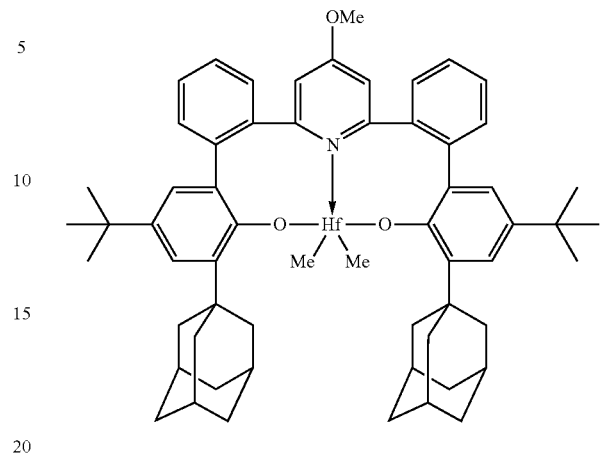
Complex 8
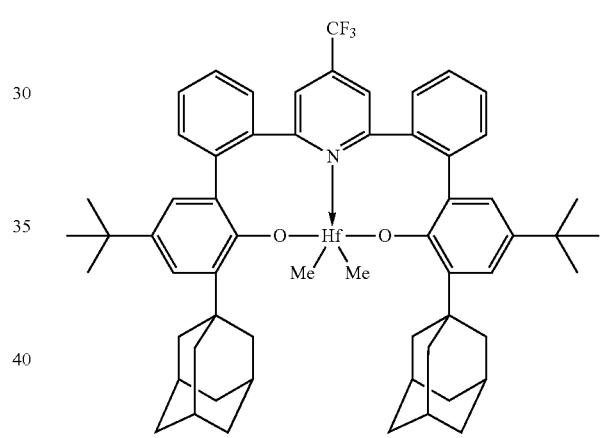
Complex 9
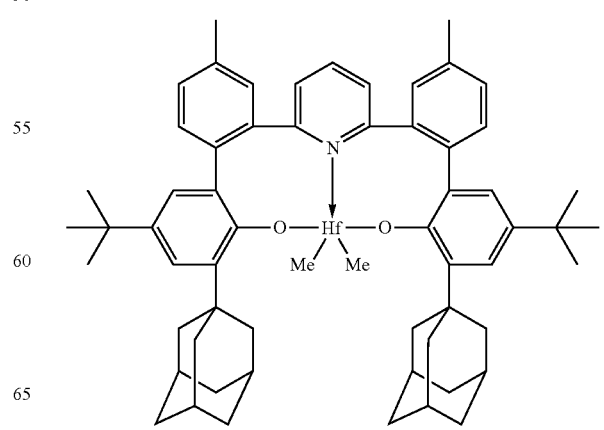

Complex 10
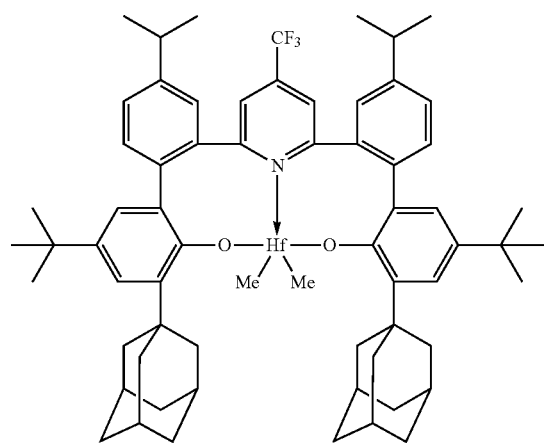
Complex 11
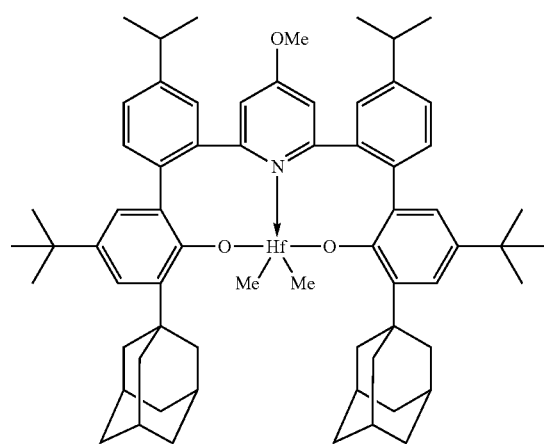
Complex 12
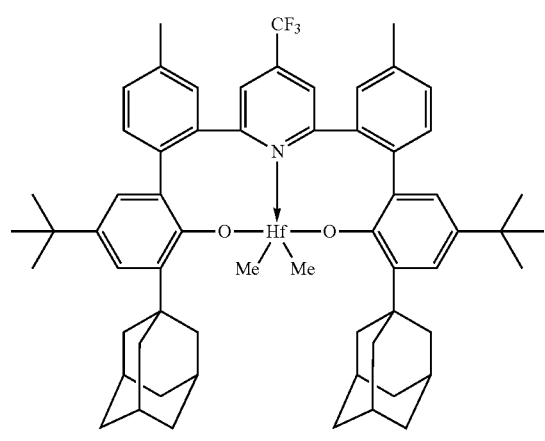
Complex 13
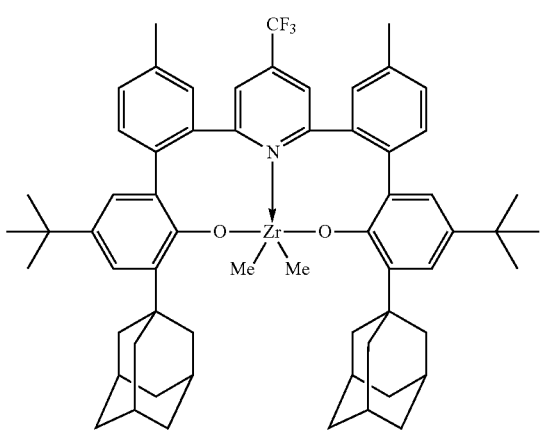
Complex 14
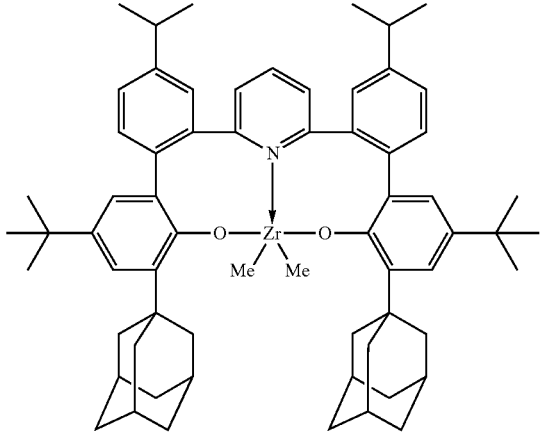
Complex 15
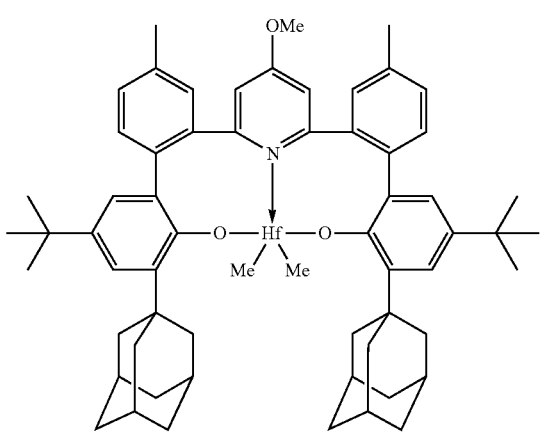

Complex 16
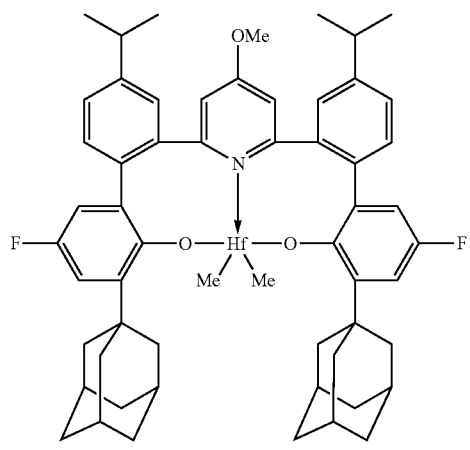
Complex 17
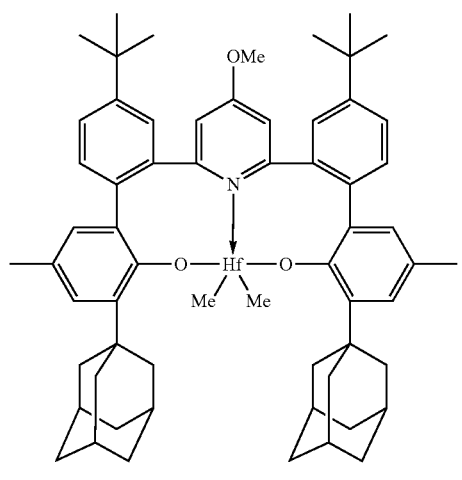
Complex 18
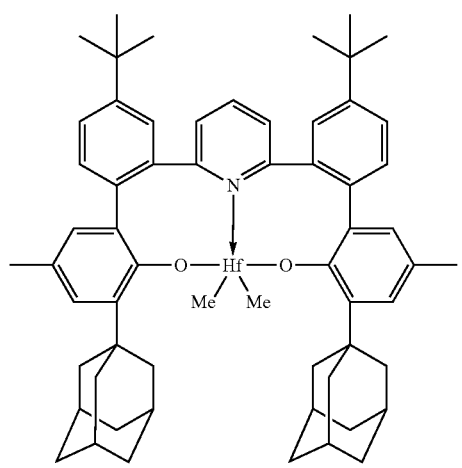
Complex 19
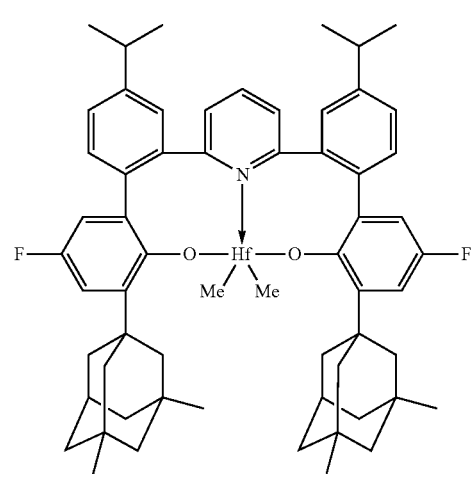
Complex 20
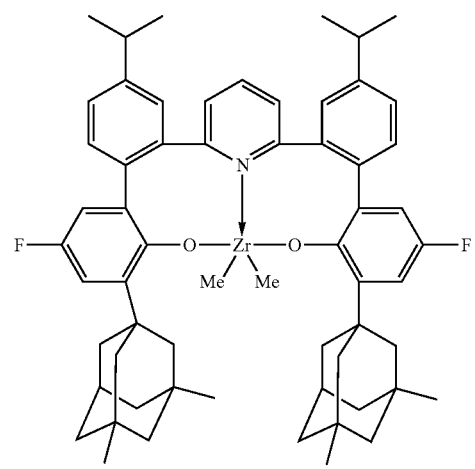
Complex 21
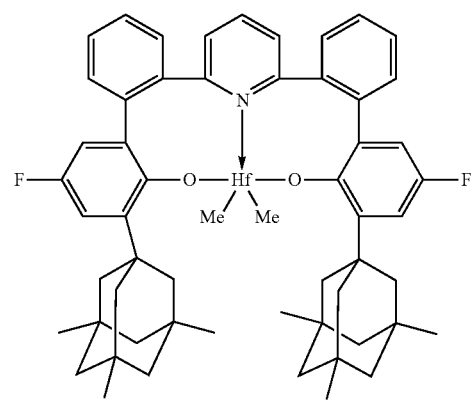

Complex 22
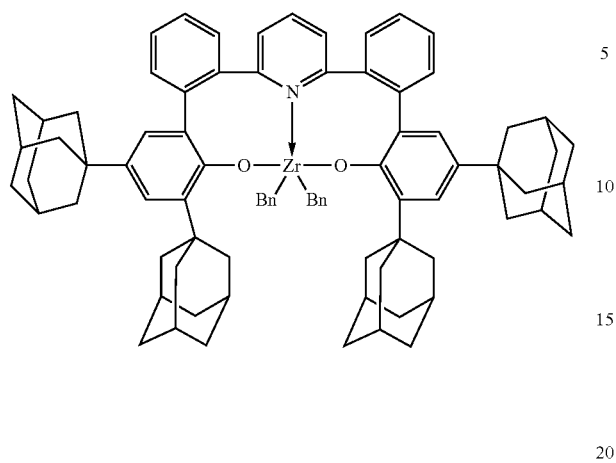
Complex 23
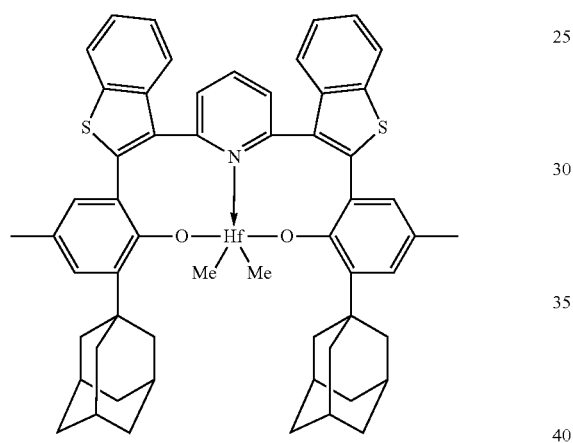
Complex 24
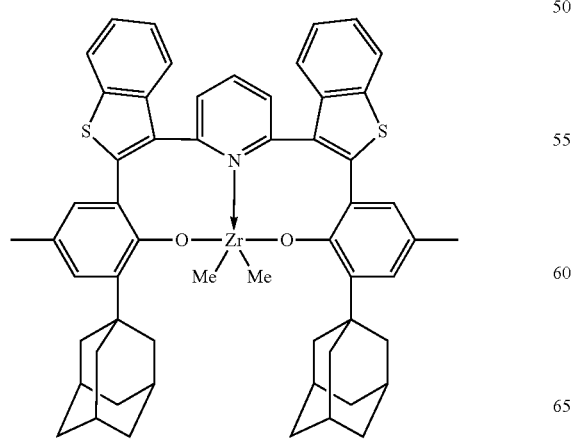
Complex 25
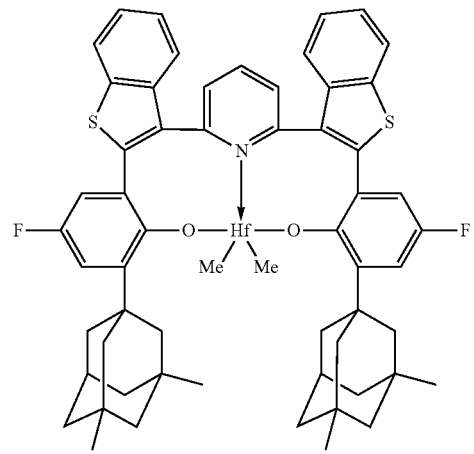
Complex 26
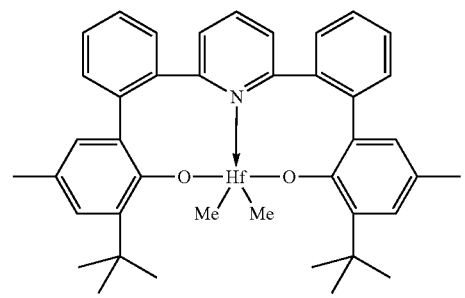
Complex 27
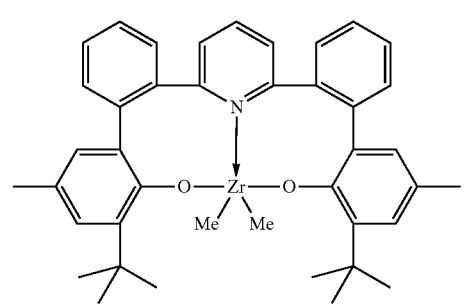
Complex 29
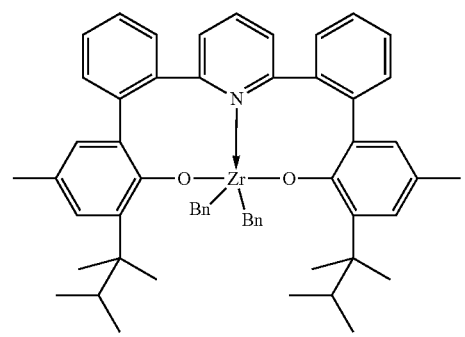

-continued
Complex 30
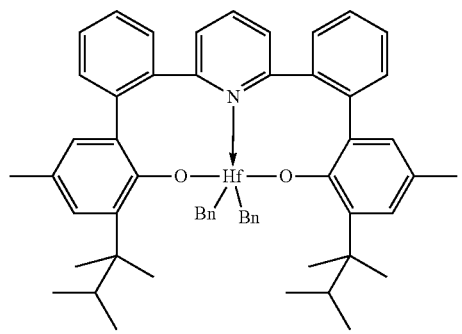
Complex 31
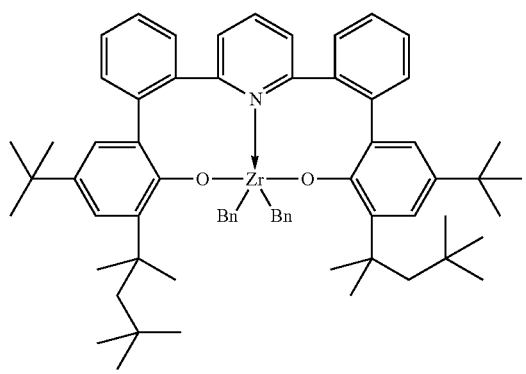
-continued
Complex 32
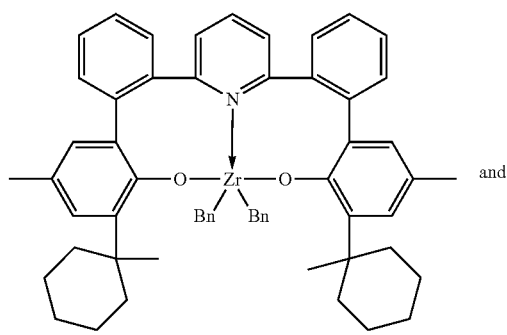 and
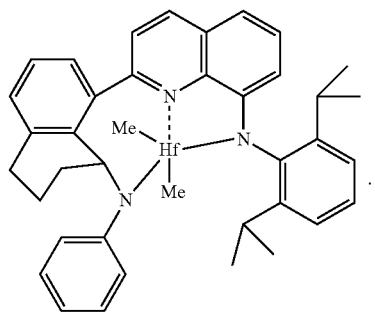
(QDA-1)HfMe$_2$
* * * * *